March 22, 1960 J. K. HAWKINS ET AL 2,929,556
DATA CONVERTER AND PUNCH CARD TRANSDUCER
FOR DIGITAL COMPUTERS
Filed May 26, 1955 47 Sheets-Sheet 1
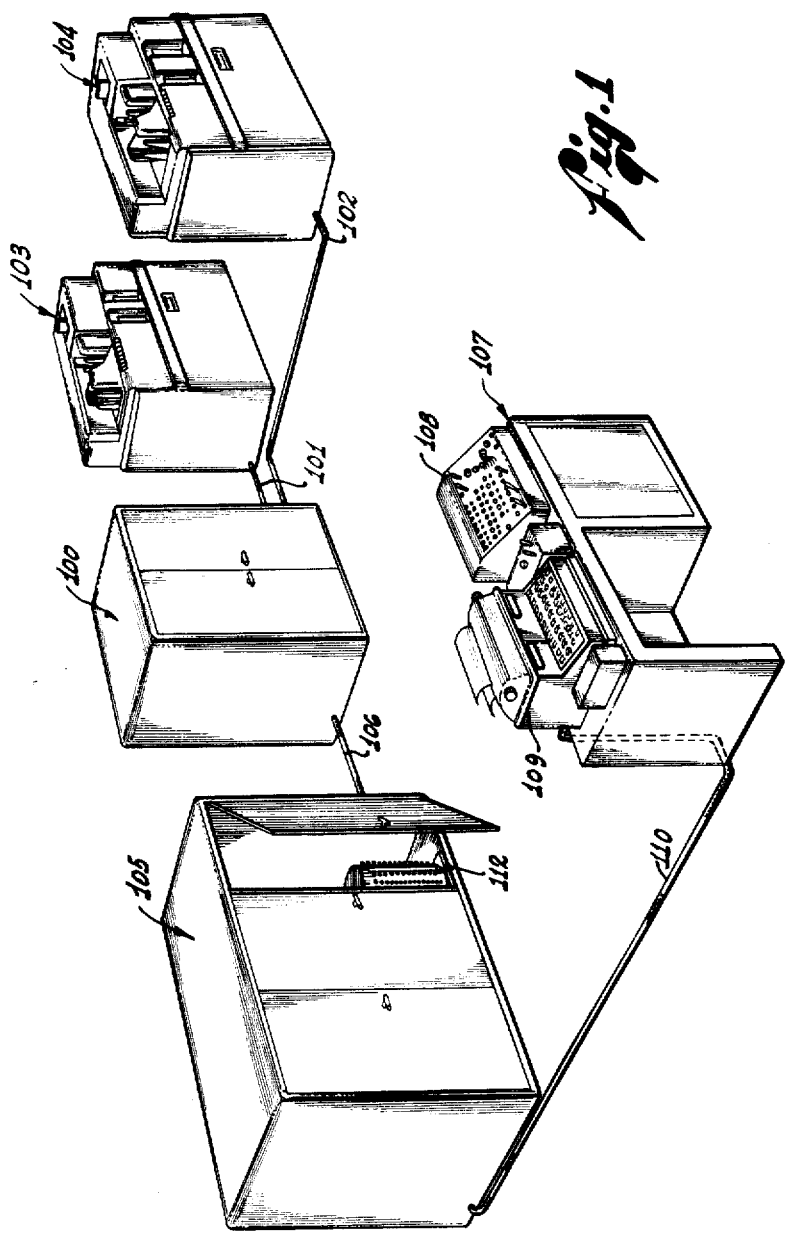
INVENTORS
JOSEPH K. HAWKINS
ROBERT E. JACKSON
BY
ATTORNEYS March 22, 1960
J. K. HAWKINS ET AL
2,929,556
DATA CONVERTER AND PUNCH CARD TRANSDUCER
FOR DIGITAL COMPUTERS
Filed May 26, 1955
47 Sheets-Sheet 2
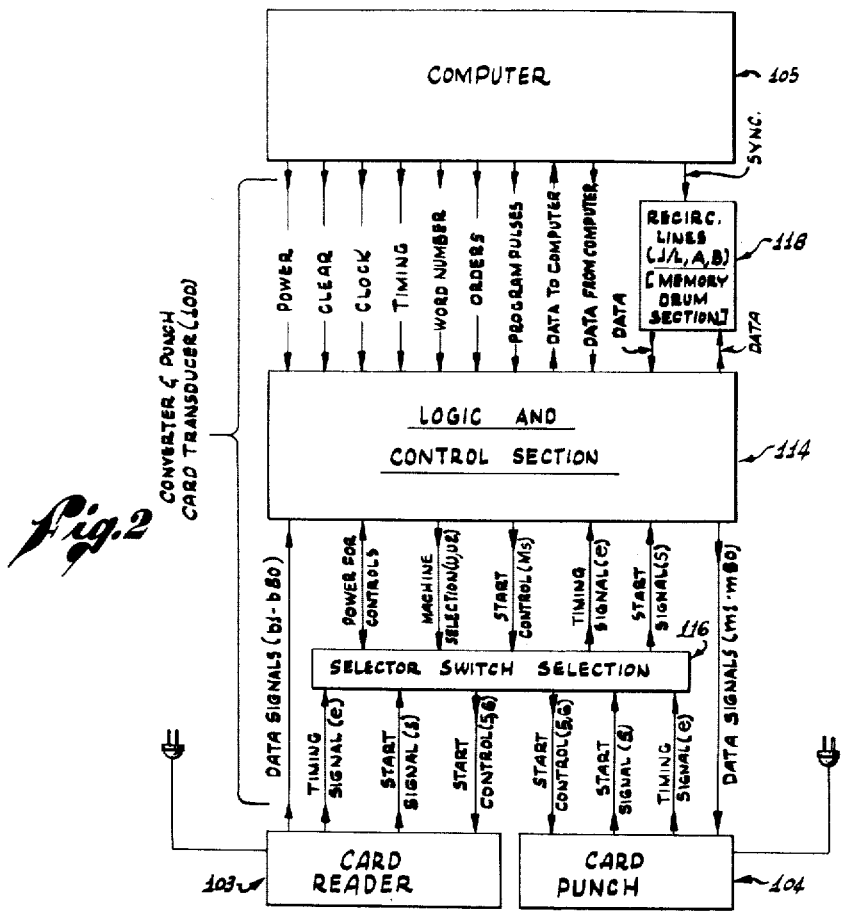
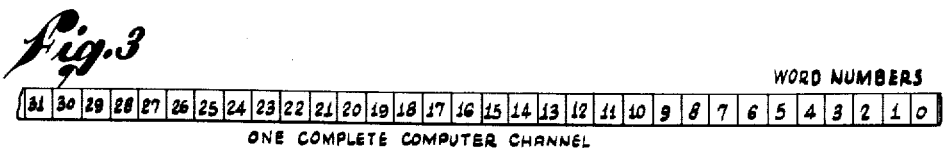
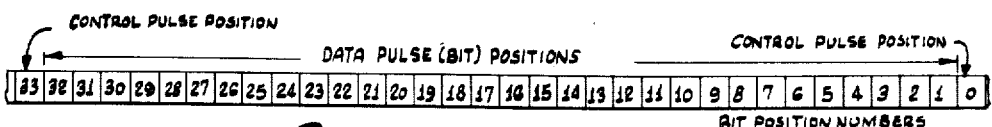
INVENTORS
JOSEPH K. HAWKINS
ROBERT E. JACKSON
BY
ATTORNEYS

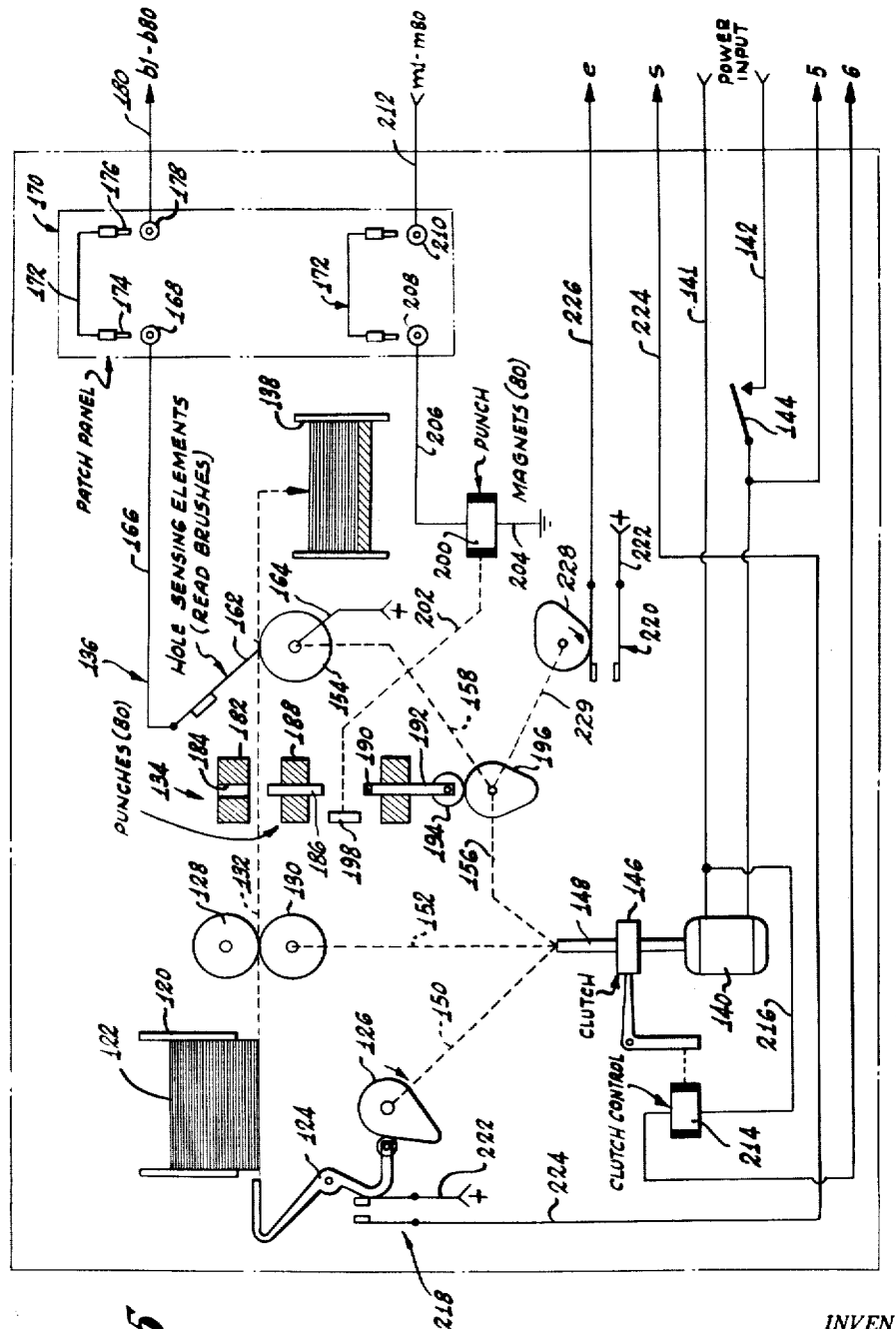

March 22, 1960
J. K. HAWKINS ET AL
2,929,556
DATA CONVERTER AND PUNCH CARD TRANSDUCER
FOR DIGITAL COMPUTERS
Filed May 26, 1955
47 Sheets-Sheet 4
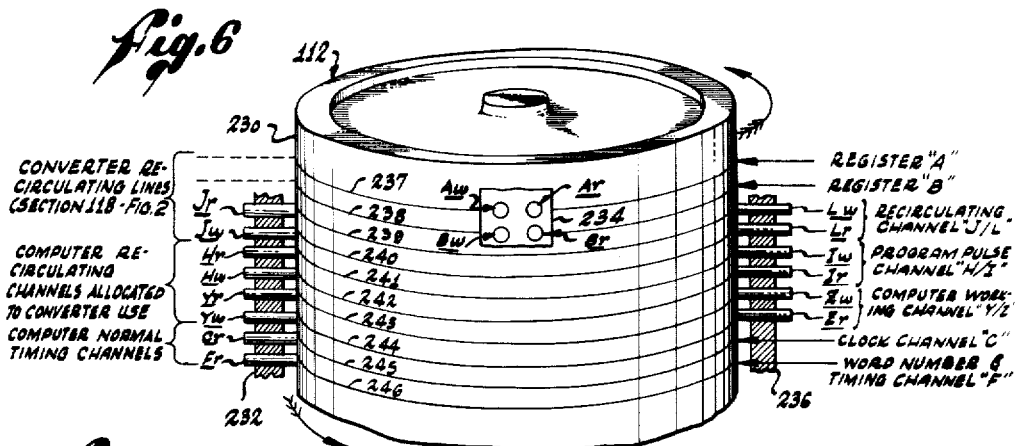
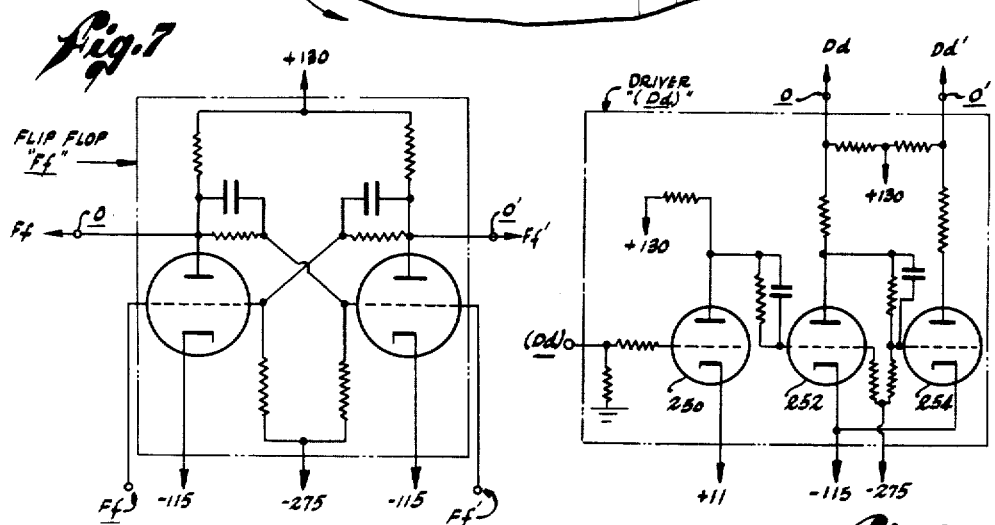
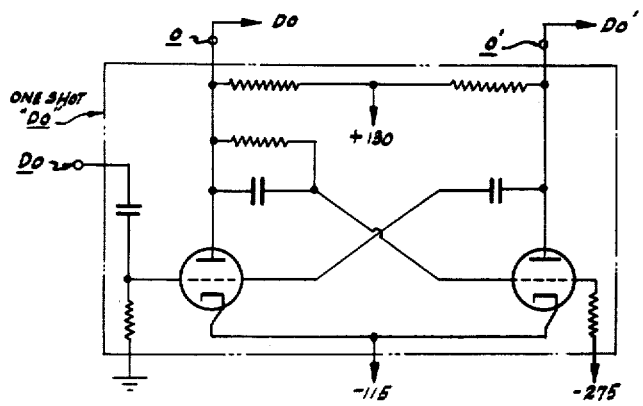
INVENTORS
JOSEPH K. HAWKINS
ROBERT E. JACKSON
BY
ATTORNEYS

INVENTORS
JOSEPH K. HAWKINS
ROBERT E. JACKSON
BY
ATTORNEYS

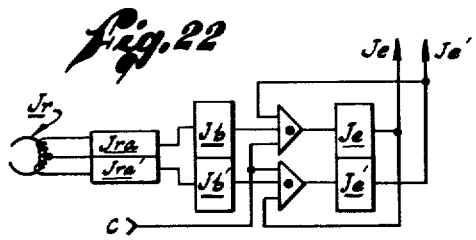
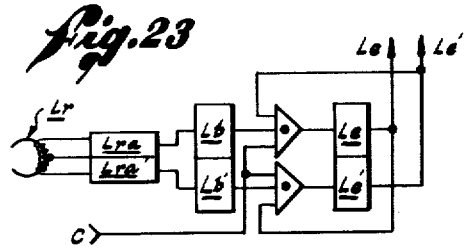
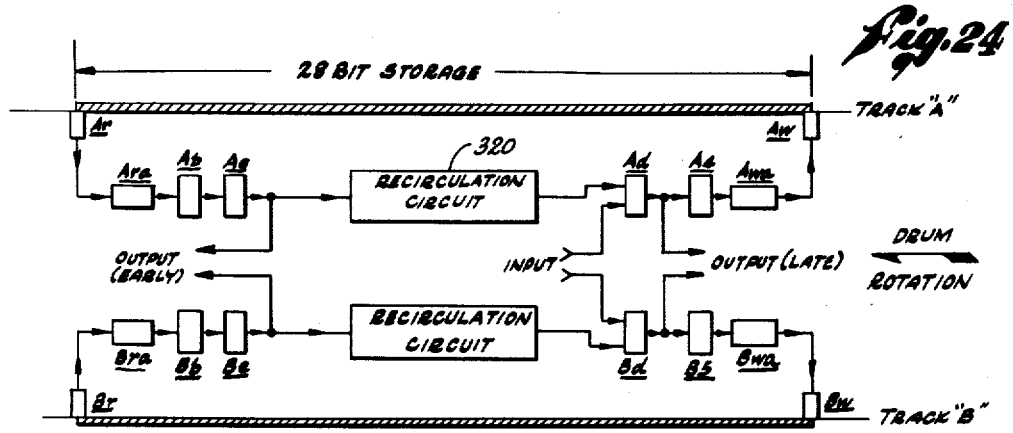
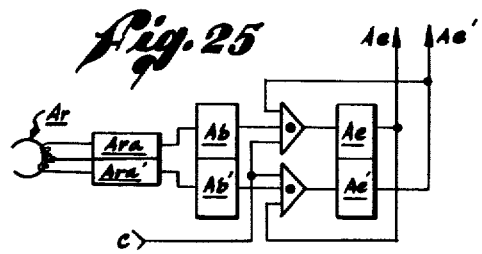
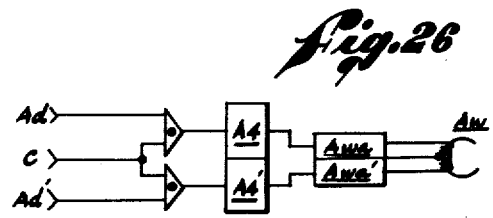
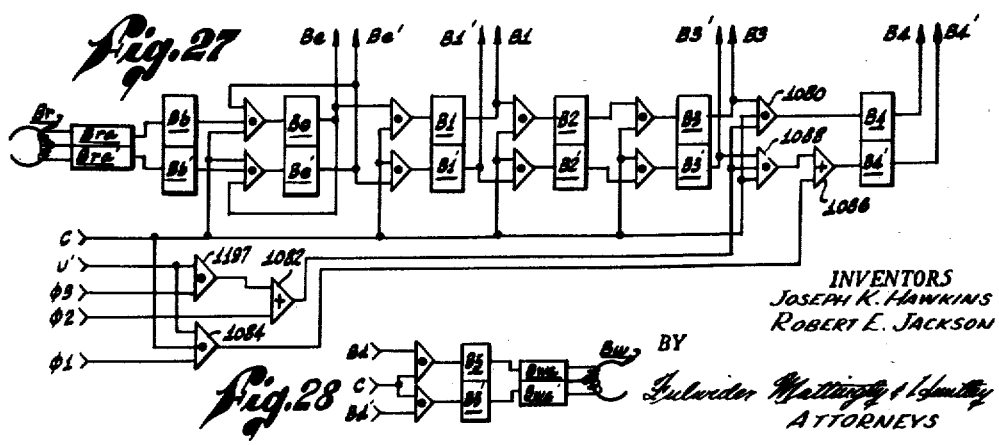

INVENTORS
JOSEPH K. HAWKINS
ROBERT E. JACKSON

INVENTORS
JOSEPH K. HAWKINS
ROBERT E. JACKSON
BY
ATTORNEYS

March 22, 1960

J. K. HAWKINS ET AL 2,929,556

DATA CONVERTER AND PUNCH CARD TRANSDUCER
FOR DIGITAL COMPUTERS

Filed May 26, 1955

INVENTORS
JOSEPH K. HAWKINS
ROBERT E. JACKSON

BY

*Fulwider Mattingly & Huntley*
ATTORNEYS

March 22, 1960

J. K. HAWKINS ET AL 2,929,556

DATA CONVERTER AND PUNCH CARD TRANSDUCER
FOR DIGITAL COMPUTERS

Filed May 26, 1955

INVENTORS
JOSEPH K. HAWKINS
ROBERT E. JACKSON

BY

*Fulwider Mattingly & Huntley*
ATTORNEYS

Fig. 58

INVENTORS
JOSEPH K. HAWKINS
ROBERT E. JACKSON

Fig. 69

INVENTORS
JOSEPH K. HAWKINS
ROBERT E. JACKSON
BY
ATTORNEYS

INVENTORS
JOSEPH K. HAWKINS
ROBERT E. JACKSON
BY
ATTORNEYS

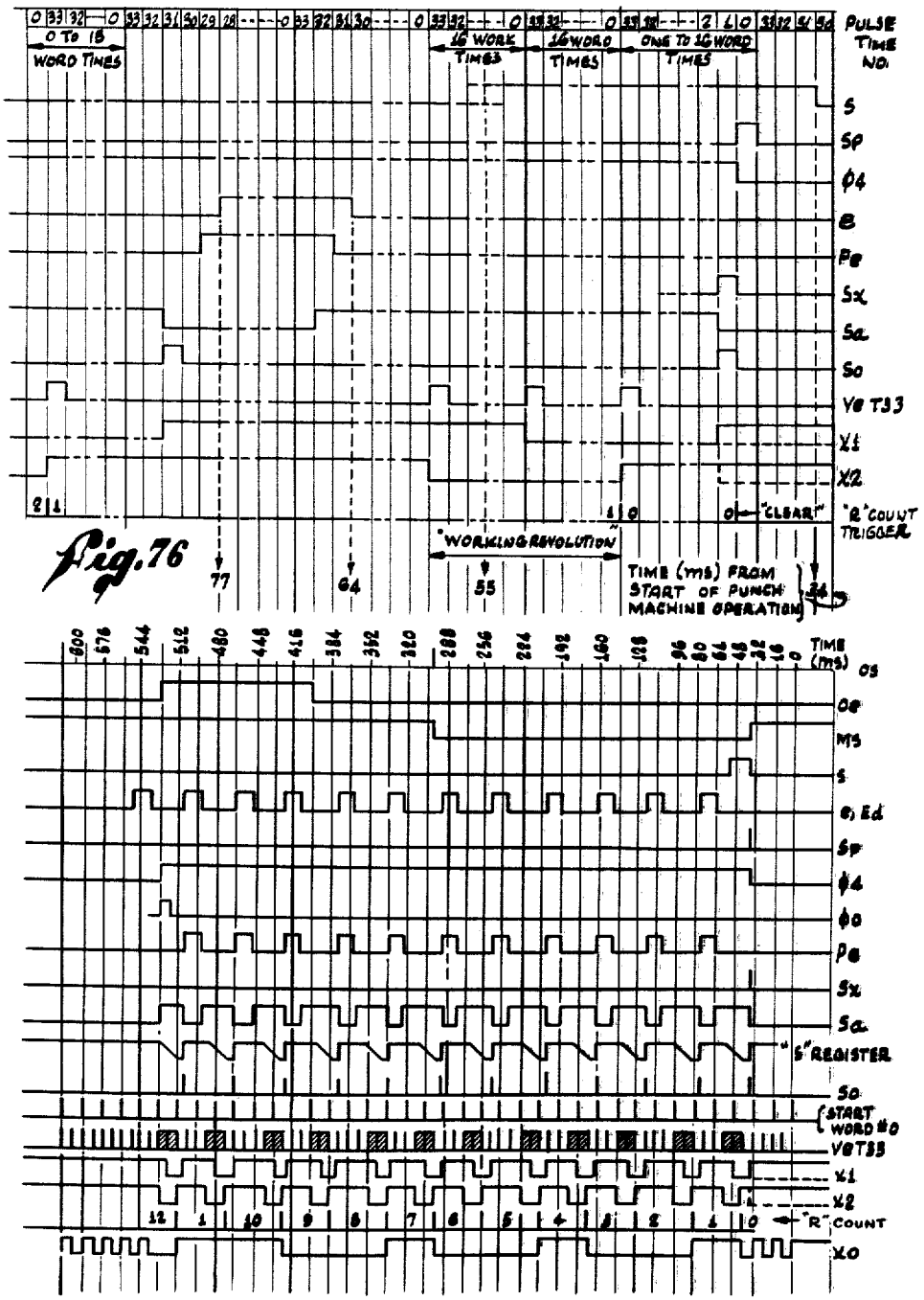

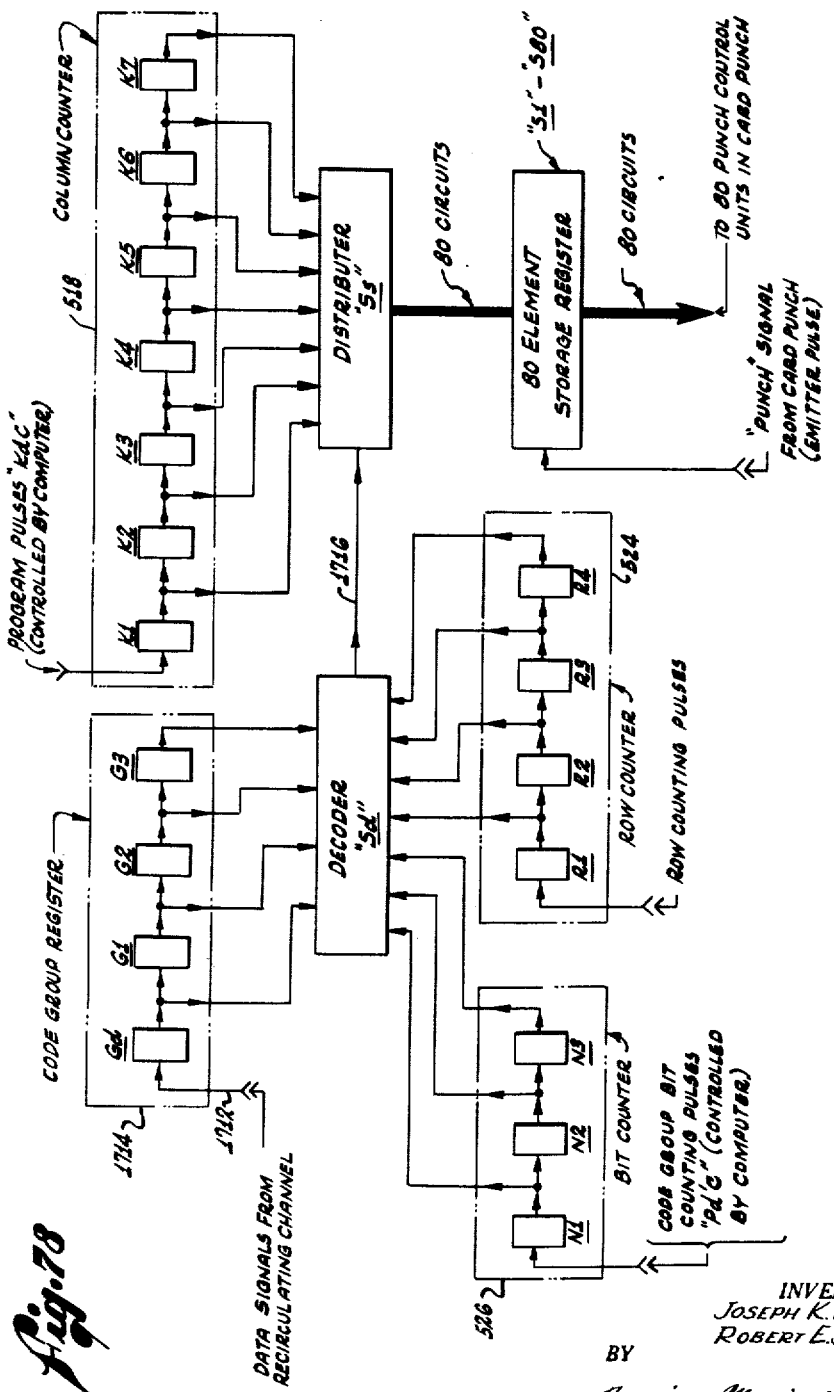

# United States Patent Office 2,929,556
Patented Mar. 22, 1960

2,929,556

DATA CONVERTER AND PUNCH CARD TRANSDUCER FOR DIGITAL COMPUTERS

Joseph K. Hawkins, Manhattan Beach, and Robert E. Jackson, Redondo Beach, Calif., assignors, by mesne assignments, to Alwac International, Bahamas, British West Indies, a corporation of the Bahamas Application May 26, 1955, Serial No. 511,156

16 Claims. (Cl. 235—155)

This invention relates generally to computing devices and more particularly to high speed electronically operated digital computers that perform various operations at an exceedingly fast rate.

Without substantial exception, modern high speed computers perform their operations upon numbers that are expressed in binary notations. However, since the decimal system is the one used in spoken and written language, some means must be provided to convert the decimal numbers into binary numbers. This is sometimes done by coding methods in which each decimal digit is expressed as a group of four binary digits, but even under the circumstances, a change must be made from the coded binary system to a true binary system.

The conversion of decimal or coded binary digits to true binary notation can readily be performed by most of the high speed automatic computers, but this requires a certain amount of time for the conversion process, which time might well be used to better advantage in the actual computations.

In some instances, the conversion from decimal to binary notation requires attention on the part of the operator in order that the proper sequence of steps may be performed, and under any conditions, the process is comparatively slow as opposed to the actual numerical computations that are performed.

As another example, much data is stored on punch cards, this information being in either alphabetic or numeric information, and usually the numeric information is in the decimal system. Card readers have been developed that will read the punched card at a comparatively high rate, such as 100 cards per minute, and some means should be provided that will enable a card reader, operating at the rate of 100 cards per minute, to have the information on these cards transferred from decimal to binary form and delivered to the computer at the rate that the cards are read. At the same time, the information stored on the card as alphabetic information should be transferred to the computer, but should be left unchanged by the transfer process.

Expressed in a different manner, some means should be provided to receive simultaneously read or parallel decimal information from a punched card or other source, convert this information into binary information and to store it in a serial manner so that the resulting serial binary form of information is usable by a computer. Conversely, information in serial binary form, as is received from a computer, should be converted into decimal information and made available in parallel or simultaneously available form. The conversion from decimal to binary and from binary to decimal form should be done very rapidly and should not require the services or direction of an operator.

It is therefore a matter of some importance that the conversion be accomplished automatically, and in view of the speed requirements and the nature of the conversion, a process akin to that performed by a digital computer is performed in making a conversion between decimal and binary information.

While the device for converting data or information from one form to another performs a specialized function, it nevertheless is an accessory or adjunct to the computer itself, and consequently, the data converter should be as simple as possible, whether it forms a separate piece of equipment or is incorporated in a complete computer. This indicates that the techniques and components that have been developed for digital computers should be followed as much as possible, but it is also necessary, particularly in the case of the control for the read out or card punching equipment, that much larger amount of power be handled than are customarily used in digital computers.

These various requirements have imposed a number of limitations upon the design of a converter, but probably the most important restriction is found in the time available for performing the conversion. It will be realized that a considerable portion of time is required to perform the actual reading of the punched card, and in actual practice, where the cards are being read at the rate of 100 per minute, a total of 500 milliseconds of the 600 milliseconds between cards, is used in reading the card. This leaves a total of 100 milliseconds for all of the various conversion operations to be performed.

It is also desirable to be able to control the operation of the conversion device by signals received from the computer so that the converter is more versatile and capable of many additional uses.

It is therefore a major object of the present invention to provide a data converter adapted to receive information in the form of alphabetical symbols and decimal digits and to convert the decimal information into information in a different form, such as binary information without making any change in the alphabetical information. This requires, of course, that the particular coding used to indicate alphabetical information be recognized by the converter, and by the same token, the particular coding used to represent decimal numerical information must also be recognized by the converter.

Another object of the invention is to provide a converter of this general type that will perform the reverse operation and convert information in some form, such as binary, to another desired form, such as decimal information. In performing these functions, it is to be remembered that the converter is to receive the decimal information in what amounts to parallel form, and the binary information is to be made available in serial form. Similarly, the binary information received from the converter is received serially, and the decimal output is to be made available in a parallel manner so that a suitable output device, such as a card punch, may be operated.

It is a further object of the invention to provide such a data converter that operates very rapidly and completes the conversion operation in a matter of milliseconds so that information sources may be read at the normal reading rate, and information may be recorded upon record members at a corresponding normal rate. Thus, in the case of information stored upon punched cards, the card may be read at a rate comparable to the normal reading rate, and information from the computer may be transferred to other cards at a corresponding rate.

It is a further object of the invention to provide a data converter of the previously described type that is capable of automatic operation so that no services of an operator or programmer are necessary, and higher speed operation is thus possible.

Still another object of the invention is to provide a converter operating upon known and proven principles of computer construction so that satisfactory operation is assured. While the interconnection of various components is new, and the resulting operation of the converter is different from that previously available, the individual components themselves are well known items and hence are capable of maintenance and servicing by computer technicians using well known principles and readily available equipment.

It is a still further object of the invention to provide a data converter of the class described that is capable of delivering appreciable amounts of power to an output or read-out device so that standard available equipment can be used. Thus, while the punches of card punch machines may be separately powered, the relays controlling the application of this separate power requires an amount of power greater than that usually available from most computers. Consequently, special provision must be made to insure that this power is available. It is to be understood, of course, that the operation of this converter is not restricted to that of an intermediate link between card reading and punching equipment and a suitable digital computer, but may be used where other types of input and output devices are used.

An additional object of the invention is to provide a converter whose operation is separate from that of the computer so that the conversion of data is removed from the computer, thereby leaving the computer free to do necessary computations, which may be done while the converter is in operation.

Likewise, another object of the invention is to provide a converter that may be so operated that the information or data it is working upon may be placed in the most appropriate portion of the computer, this being controlled by the operation of the computer itself.

These and other objects and advantages of this invention will become apparent from the following description of one form thereof, and from the drawings illustrating that form, in which:

Figure 1 is a perspective view illustrating a typical digital computer installation with the data converter and punch card transducer apparatus of this invention shown as intercoupling the digital computer with a pair of card machines, one for reading data from punched cards, and the other for punching data into blank cards;

Figure 2 is block diagram illustrating generally the interconnections among the converter-transducer apparatus, the digital computer, the recirculating line section, and two card processing machines;

Figure 3 is a schematic diagram illustrative of the arrangement of the individual word spaces comprising a full channel of information as comprised by the computer working channels and by the recirculating channel of the converter-transducer;

Figure 4 is a schematic diagram representing the relative arrangement of the 32 data pulse positions and the two control pulse positions within a single computer word;

Figure 5 is a drawing representing schematically those of the operative components of a card reading and card punching machine which are utilized in a direct cooperative relation with the converter-transducer of this invention;

Figure 6 is a fragmentary perspective view illustrating a portion of a computer magnetic memory drum illustrating the various tracks and channels used in association with the converter-transducer;

Figure 7 is a wiring diagram illustrating the essential circuitry typical of the flip-flop circuits used in the apparatus of this invention;

Figure 8 is a wiring diagram illustrating the essential features of a typical one-shot circuit;

Figure 9 is a wiring diagram illustrating the essential features typical of a driver circuit;

Figure 22 is a schematic diagram illustrating the read circuitry for the normal output from the recirculating channel;

Figure 23 is a schematic diagram illustrating the read circuitry for the alternate output from the recirculating channel;

Figure 24 is a block diagram illustrating the functional inter-relation of the various components comprising recirculating registers A and B;

Figure 25 is a schematic diagram illustrating the read circuitry for the A recirculating register;

Figure 26 is a schematic diagram illustrating the write circuitry of the A register;

Figure 27 is a schematic diagram illustrating the read circuitry of the B register;

Figure 28 is a schematic diagram illustrating the write circuitry for the B register;

Figure 57 is a schematic diagram of the arithmetic unit utilized to effect a decimal to binary conversion of numeric data;

Figure 58 is a timing chart showing the functioning of the arithmetic unit in converting to binary form the data carried by the first eight columns of the punch card shown in Figure 31;

Figure 69 is a timing chart showing the operation of the digit order reversing apparatus during Sequence One and the first two word times of Sequence Two of the "punch" cycle;

Figure 74 is a timing chart similar to Figure 70 and forming a continuation thereof showing the functioning of the arithmetic apparatus during the eighth word time of Sequence Two and the first two word times of Sequence Three of the "punch" cycle in effecting the conversion of a straight binary number to a decimal binary coded decimal number;

Figure 75 is a timing chart similar to Figure 74 and forming a continuation thereof, Figure 75 covering the third, fourth and eighth word times of Sequence Three;

Figure 76 is a timing chart showing on an expanded timing scale the functioning of the various control and timing devices operative during the first 80 milliseconds of Sequence Four of the "punch" cycle;

Figure 77 is a timing chart showing the timing and sequence control functions operative during Sequence Four of the "punch" cycle;

Figure 78 is a block diagram showing the functional inter-relation of the components and apparatus operative during Sequence Four of the "punch" cycle;

Figure 10:
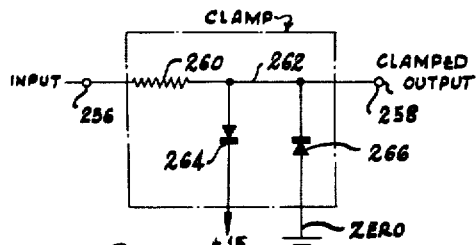
Figure 10 is a wiring diagram typical of the clamp circuits for the outputs of the flip-flops, drivers and one-shots used in the apparatus herein disclosed.

The ensuing description relates to a preferred embodiment of the invention, the various features of construction and the mode of operation thereof being set forth in various sections and sub-sections according to the following:

TABLE OF CONTENTS

| | Column |
|---|---|
| General description | 7 |
| Summary of operation | 9 |
| Description of apparatus—Principal elements | 14 |
|     Card machines | 14 |
|     Recirculating lines | 16 |
|     Basic elements | 18 |
|     Recirculation circuitry | 22 |
|         Recirculating channel "J/L" | 22 |
|         One word recirculating registers A and B | 26 |
| Logic and control section | 27 |
| Operation | 28 |
|     "Read" cycle (from card to computer) | 28 |
|         Basic timing | 30 |
|         Machine selection and start control | 33 |
|         Sequence Four | 37 |
|             Transfer data from card to storage register | 38 |
|             Encode and transfer data to recirculating channel | 40 |
|         Conversion of numerical data—Coded decimal to binary | 61 |
|             Sequence One—Transfer one word to A/B registers | 61 |
|             Sequence Two—Conversion computations | 64 |
|             Sequence Three—Transfer converted word to recirculating channel | 71 |
|         Convert remaining numerical words—word selection apparatus | 73 |
|         Numeric-alphabetic control | 77 |
|         Sequence Zero—Data transfer from recirculating channel to computer working channel | 78 |
|         Continuous card reading | 80 |
|     "Punch" Cycle (from computer to card) | 80 |
|         Machine selection and start control | 82 |
|         Sequence Zero—Transfer data from computer working channel to recirculating channel | 82 |
|         Conversion of numerical data—Binary to decimal | 83 |
|             Sequence One—Transfer one word to register B | 83 |
|             Sequence Two—Bit reversal | 83 |
|             Sequence Three—Conversion computation | 87 |
|         Convert remaining numeric words | 93 |
|         Sequence Four—Transfer data to punch card | 93 |
|         Decode data and transfer to storage register | 94 |
|         Transfer data from storage register to card | 97 |
| "Decimal to binary conversion" cycle | 98 |
| "Binary to decimal conversion" cycle | 99 |
| Complete logic | 100 |

GENERAL DESCRIPTION

In its broader aspects the present apparatus comprises a data processing machine for use in the input-output circuitry of an electronic digital computer, and arranged to transfer data in either direction between the computer and a data carrier in which the data is presented as a plurality of discrete quanta, in which the data on said carrier is represented by a different numbering or coding system than is used in the digital computer, and in which the apparatus is arranged to perform the computations necessary to convert the data from one numbering or coding system to the other.

As herein presented the machine is arranged for use with a digital computer of the internally programmed type and is completely automatic in its operation, the functioning of the machine being controlled by appropriate orders or commands contained within the computer program. As so controlled the machine may be caused to take data quantum by quantum from the data carrier, convert the data to the numbering or coding system used by the computer, and transfer the converted data into the computer for operation in accordance with the program of the computer. In a similar manner the machine may be controlled to take data from the computer quantum by quantum, convert the data to the numbering or coding system utilized on the data carrier, and perform such writing, recording or punching operations as are required to record the converted data on the data carrier. Provision is also made for so operating the machine as to take data from the computer in one numbering or coding system, convert it to another, and return the converted data to the computer.

While the data carrier to which reference is made in the preceding paragraphs may comprise any of a number of different types such as magnetic tape, photographic film, perforated tape, and the like, so long as the data carried by such continuous carriers is arranged in the form of discrete quanta, the invention is intended primarily for use with data carriers of the type commonly known as "punch cards." Punch cards may take a number of forms depending upon their intended use and function, and may vary from the relatively simple merchandise tag or sales ticket to the comprehensive data carrier represented by the well known business machine cards such as are supplied, for example, by the International Business Machines Corporation and more popularly known as IBM cards.

The machine which is described in the ensuing specification as a specific embodiment of the invention is arranged to process data taken from, or to be punched into, the IBM type of card. As described herein the machine is arranged for use with a relatively slow speed internally programmed electronic digital computer of the type known in the industry as Alwac, such a machine being described in a co-pending application of Joseph A. Beek and Henry L. Herold, Serial No. 374,990, filed August 18, 1953, and entitled "Dividing Machine."

Referring now to the drawings, Figure 1 is a representation of a computer installation utilizing the converter and punch card transducer of this invention to couple a card reading machine and a card punching machine to a general purpose internally programmed electronic digital computer. The various instrumentalities and components comprising the converter and punch card transducer preferably are enclosed within a suitable cabinet such as is indicated at 100 in Figure 1 and are electrically connected as by means of cables 101 and 102 to card machines 103 and 104, card machine 103, for example, being intended and arranged for use in reading data from previously punched cards, and machine 104, for example being intended and arranged to punch cards and thereby record data supplied by the transducer 100.

The electronic digital computer is represented in Figure 1 by the cabinet structure 105, the necessary electrical connections to the converter-transducer 100 being effected by means of a cable 106.

The electronic digital computer is represented in Figure 1 by the cabinet structure 105, the necessary electrical connections to the converter-transducer 100 being effected by means of a cable 106.

As is usual in electronic computer installations control of the computer 105 is exercised by an input-output station 107 which may include a control unit 108 and a read-in read-out device such as an electrically operated remotely controlled typewriter 109, the control panel and read-in read-out device being electrically connected to the computer 105 as by means of a cable 110.

The converter-transducer 100 may be used with many different forms of digital computers; the specific embodiment selected for illustration and description in this specification is particularly arranged for use with the above mentioned Alwac computer. This computer is of the magnetic memory type utilizing a magnetic memory drum such as is indicated generally at 112 in Figure 1. Regardless, however, of the particular type of computer or memory mechanism that is incorporated therein, the computer 105 must embody certain features and perform certain functions in order to be adaptable for use with the converter-transducer 100. For example, the computer must provide a working channel or the equivalent into which the converted data supplied by the converter-transducer 100 may be placed and from which data may be taken for processing by the converter-transducer 100 when it is desired to record that data on the aforementioned data carriers such as the IBM cards. In addition, the computer must supply certain timing and synchronizing signals in order that the various data processing operations performed by the converter-transducer 100 may be appropriately timed and controlled with reference to the functioning of the computer 105. The computer 105 must also contain a control channel or equivalent programming facility for distinguishing between numerical data (which normally requires conversion) and alphabetic data (which normally does not require conversion), and for controlling the placement and location in the computer working channel and on the IBM card of each numerical digit or alphabetic character.

In addition to the foregoing requirements (assuming that automatic operation of the converter-transducer 100 is desired), the computer 105 must include mechanism such as an order or command register for transmitting to the converter-transducer 100 control signals appropriate to control the converter-transducer in accordance with the internal program controlling the operation of the computer. Finally, while the converter-transducer 100 may be equipped with its own power supply for supplying the various electrical potentials used in the operation and control of the electronic equipment, it has been found convenient to utilize the power supply equipment of the computer for supplying these operating potentials.

More specifically, and as is represented in block diagram form in Figure 2, the converter-transducer 100 comprises three principal sections; a logic and control section 114, a selector switch section 116, and certain recirculating lines represented in Figure 2 by the rectangle bearing the reference character 118. The selector switch section 116 operates under the control of the logic and control section 114 in accordance with orders or commands received from the computer 105 to select for operation the card reading machine 103 or the card punching machine 104.

The various electrical interconnections among the logic and control section 114, the selector switch section 116, and the card machines 103 and 104 are indicated generally by suitable legends in Figure 2, wherein the designations enclosed in parentheses identify specifically certain signals which are explained in detail in subsequent sections of this specification.

The logic and control section 114 contains the necessary control apparatus for governing the operation of the recirculating lines 118, the selector switch section 116, the selected card machine 103 or 104, for carrying out the orders received from the computer 105, and for coordinating the unrelated timing of the computer and the selected card machine. The logic and control section 114 also contains the necessary apparatus for performing all of the logical functions such as mathematical computations, data identification, segregation and classification, and data transfer operations.

The recirculating line section 118 comprises three recirculating lines; the first hereinafter referred to as channel J/L, provides sufficient memory or storage capacity to store for as long as may be needed the complete quantum of information handled during a single cycle of operation; i.e., in the illustrated embodiment, all of the data that may be carried by an IBM card. The recirculating line comprising channel J/L must provide relatively rapid access to any or all of the data stored therein.

The other two recirculating lines hereinafter designated recirculating registers A and B have a storage capacity of eight decimal digits or the equivalent and provide access to any single bit of information at least once each word time (a term that is explained in detail hereinafter). Recirculating registers A and B are used principally in cooperation with the logic and control section 114 in the performance of the computations and mathematical operations attendant upon the conversion of the data from one numbering or coding system to another.

As is indicated generally in Figure 2 the electrical connections between the logic and control section 114 and the computer 105 provide the various operating potentials required by the converter-transducer 100, supply to the logic and control section 114 the various control and timing signals, and afford the circuits needed to exchange data between the computer 105 and the logic and control section 114.

SUMMARY OF OPERATION

The converter-transducer 100 may be so controlled by the computer 105 as to perform four different functions, as follows: reading data taken from an IBM card into the computer (hereinafter referred to as the "Read" cycle), punching IBM cards with data taken from the computer (hereinafter designated the "Punch" cycle), converting binary coded decimal data taken from the computer into straight binary data and returning it to the computer (hereinafter referred to as the "Decimal-Binary Conversion" cycle), and converting straight binary data taken from the computer into binary coded decimal form and returning it to the computer (hereinafter designated the "Binary-Decimal Conversion" cycle).

As used herein the term "cycle" refers to the series of functions and operations attendant upon the processing of a single quantum of data (e.g., the contents of a single IBM card, or equivalent). Continuous operation, as for example, reading or punching a continuous series of cards, is, of course, realized by appropriately repeating the corresponding cycle.

Performance of any of the four cycles above mentioned involves transfer of data into or out of a single working channel of the computer. In the Alwac computer previously referred to such a single working channel has the data storage capacity of a single circumferential track on the magnetic memory drum 112. As is represented diagrammatically in Figure 3, such a complete channel is considered as comprising thirty-two words numbered consecutively from 0 to 31. Each of the thirty-two words comprising a single channel is divided into thirty-four separate pulses numbered consecutively 0 to 33. Pulse positions P0 and P33 are reserved for control purposes whereas the 32 pulse positions (P1 to P32, inclusive), are used for the storage of data or information, the described arrangement being illustrated diagrammatically in Figure 4.

The data is stored in the working channel in the form of very small magnetized areas, each such area comprising one of the above mentioned pulse positions. When such a magnetized area passes beneath a properly designed magnetic reading head an electrical pulse is obtained. This system is similar to that used in magnetic recorders but provides for only two conditions; an area magnetized with one polarity, and an area magnetized with the opposite polarity. Since an output signal is produced in a read head by a change in the magnetization of the drum, only two conditions are normally possible, thus leading to the use of a binary system of notation.

A binary system of notation employs only two characters; conventionally, "0" and "1," having nominal values of zero and one respectively. The system is a "Radix Two" system wherein the value of "1" in a given column or position is twice the value thereof in the next lower place or denominational order, "0's" always having a value of zero. The two characters "0" and "1" conventionally used are represented in the computer channel respectively by a given polarity of magnetization and magnetization of the opposite polarity. Each of the thirty-four pulse positions of a single word as represented in Figure 4 will thus be understood to represent a single binary bit; either "0" or "1," depending upon the polarity of magnetization.

A syllable or code group of four binary bits may be used to represent any of the decimal digits from 0 to 9 whereas a code group of six bits may be used to represent any required alphabetic information. Accordingly, the thirty-two data pulse positions (P1–P32) of a single computer word will accommodate eight binary coded decimal digits or five binary coded alphabetic characters. A complete channel comprising thirty-two such words will accommodate two hundred fifty-six decimal digits or one hundred sixty alphabetic characters, more than three times the numerical data capacity of the IBM card and twice the alphabetic capacity of such a card.

Since the memory drum is electrically driven and rotated at a speed of approximately 3600 r.p.m., it will be seen that each revolution requires about sixteen milliseconds. Thus, the time required for one complete word to pass a given point such as a read head (hereinafter referred to as "one word time") is about one-half millisecond. Thus, information may be taken from the channel or placed in the channel at a rate exceeding 65,000 bits per second.

The four different operating cycles of which the converter-transducer is capable as mentioned above are each selected and initiated by appropriate commands or orders embodied in the computer program. This control is effected by the appropriate use of the four following orders: Order "O$r$"—"Prepare to read IBM card" (sometimes termed the "Read Order"); Order "O$p$"—"Prepare to punch IBM card" (sometimes designated the "Punch Order"); Order "O$s$"—"Start card machine" (sometimes referred to as the "Start Order"); and Order "O$e$"—"Exchange information between computer working channel and recirculating channel J/L" (sometimes designated the "Exchange Order"). These orders serve in a manner described hereinafter to determine the charater of operating cycle performed by the converter-transducer, and by their position in the series of orders comprising the computer program determine the time at which such a cycle of operation is performed.

The read order O$r$ serves to select for operation the card reading machine 103 and pre-sets the various logic and control circuits in the logic and control section 114 to perform the functions associated with reading a card and making the conversion appropriate to the transfer of the data to the computer. In a similar way the punch order O$p$ serves to select for operation the card punching machine 104 and pre-sets the logic and control circuits for functioning in accordance with an exchange of information in the opposite direction. The start order O$s$ serves actually to initiate operation of the card machine 103 or 104 selected by a previously given read order O$r$ or punch order O$p$. The exchange order O$e$ causes the computer to copy into its working channel whatever data is contained in recirculating channel J/L while at the same time writing into the recirculating channel J/L any data contained in the computer working channel.

The read, punch, and start orders O$r$, O$p$ and O$s$ are no-address orders requiring only one pulse time for their execution. Consequently, they may be given at any appropriate time in the computer program without interrupting the computer in its execution of the program commands one after the other. The exchange order O$e$ is merely a conventional exchange or "transfer data" order of the two-address type, the two addresses specifying the computer working channel and recirculating channel J/L as the repositories of the information to be exchanged. This order requires sixteen word times for its execution, and the computer must necessarily wait until the order is fully executed before continuing with the program.

In order to read data from an IBM card into the computer the read, start and exchange orders are incorporated in that sequence in the computer program. As previously mentioned the read order O$r$ sets the equipment for card reading and selects the card reading machine 103. The start order O$s$ actually places the card reading machine 103 in operation. If the exchange order is given well before the end of the read cycle and followed by a start order at a sufficiently early time the card reading machine 103 will be caused to operate continuously, feeding cards one at a time from the supply hopper through the machine past the hole sensing fingers and into the card stacker at the rate of about one hundred cards per minute. At this speed of operation a new card is read every six hundred milliseconds, approximately five hundred milliseconds being consumed in the actual reading of the card, and about one hundred milliseconds being required for traveling between the last row of one card and the first row of the card next following.

As will be explained in more detail hereinafter a conventional IBM card is arranged as a rectangular grid of eighty vertical columns and twelve horizontal rows, the columns being numbered from left to right one to eighty inclusive, and the rows being numbered from top to bottom twelve (or Y), eleven (or X), and zero through nine. The denominational order and/or qualitative significance of a digit or character is indicated and determined by the column in which it is placed, whereas the value of the digit or identification of the alphabetic character is determined by the row or rows in which the holes are found. Numeric data is represented in the decimal numbering system by a single hole (in a given column) in the corresponding one of rows zero to nine inclusive. Alphabetic data is represented (within a given column) by two holes; one in one of the Y, X, or 0 rows and one in one of the rows one through nine.

The card reading machine 103 feeds the cards through the machine broadside; that is, in the direction of the height of the card so that the data is read row by row as distinguished from column by column. Eighty hole sensing fingers are provided by the machine, one for each column, so as to produce electrical signals on corresponding conductors for each hole so sensed.

As each row of the card is read the data represented by the energization of the conductors connected to the hole sensing fingers is stored in an eighty element storage register. During the time the card is moving from one row to the next the storage register is scanned, the data taken therefrom is coded into the binary coded decimal number or binary coded alphabetic character and recorded in recirculating channel J/L.

As will be described more fully hereinafter the location of each code group in recirculating channel J/L is controlled by certain code group locating pulses recorded previously in the computer control channel as part of the computer program. The relative location of these code groups within channel J/L is the same as the relative columnar locations of the holes in the card, unless modified by certain position shifting facilities provided by the card reading machine 103 as hereinafter more fully described.

The card is thus read row by row as it passes the hole sensing fingers, the data from all twelve rows being stored in appropriate locations in recirculating channel J/L by the time the last row is read. During the approximately one hundred milliseconds between the last row of the one card and the first row of the following card the data, if it be numeric, is taken from the recirculating channel J/L word by word and subjected to a computational procedure serving to produce a straight binary number corresponding in value to the binary coded decimal number taken from the J/L channel. The straight binary numbers are replaced in the J/L channel in exactly the same location as occupied by the binary coded decimal numbers to which they correspond.

At the conclusion of the conversion operation, and providing the exchange order O$e$ has been given, the contents of recirculating channel J/L are read into the working channel of the computer.

The converter-transducer is caused to execute the above-mentioned punch cycle by including in the computer program in appropriate succession the punch, exchange and start orders O$p$, O$e$ and O$s$. The punch order O$p$ serves to condition the apparatus for performing the desired cycle and selects for operation the card punching machine 104. The exchange order O$e$ causes the data contained in the computer working channel to be copied into recirculating channel J/L. As soon as the exchange order is executed the converter-transducer automatically takes the data word by word from channel J/L (providing the data is numeric) and subjects the binary data to an arithmetic process which produces a binary coded decimal number having the same values as the straight binary number from which it is derived. The binary coded decimal number is then replaced in channel J/L in the same location as that occupied by the straight binary number from which it was derived.

When all of the numeric data contained in recirculating channel J/L has been thus converted, and the start order Os having in the meantime been given, the entire channel is scanned to select code groups corresponding to the value of the first row of the card to be punched. Encountering any such code group will set that element of the eighty element storage register which corresponds to the location of the code group so encountered.

It will be understood that the card punching machine 104 serves to take blank cards from a feed hopper and move them past a punching station and into a stacker at the rate of one hundred cards per minute, the punching station containing eighty punches, one for each card column. When the card has advanced to a position aligning the first row with the punching elements the data is transferred from the storage register to the card by actuating those punching elements corresponding to the previously set elements of the storage register. This operation is repeated for each row of the card, the storage register being cleared immediately following each punching operation, and each scanning and setting of the storage register taking place during the time between rows.

If a continuous feeding and punching of cards is desired the start and exchange orders Os and Oe are repeated before the end of the operating cycle of the card punching machine 104.

In order to execute the aforementioned decimal-binary conversion cycle the read order Or is first given followed by two exchange orders Oe one after the other, but at least eight milliseconds apart. A third exchange order is given later to effect the transfer of the converted data from the converter-transducer to the computer.

The read order Or serves to pre-set the logic and control equipment for performing the desired decimal to binary conversion. The first exchange order Oe, while serving to interchange data between the computer working channel and recirculating channel J/L, is used merely for control functions, the circumstance of two successive exchange orders without an intervening order of the Or, Op, or Os kind being the circumstance actually causing execution of the decimal to binary conversion cycle. The second exchange order operates to place in recirculating channel J/L the binary coded decimal data from the computer which is to be converted into straight binary form, it being understood that the computer program also provides for placing this binary coded decimal data in the working channel before the second exchange order is given.

As soon as the binary coded decimal data is placed in recirculating channel J/L, the converter-transducer automatically performs the conversion function previously described in connection with the "read" cycle. At the conclusion of this conversion operation, the third exchange order having in the meantime been given, the straight binary number is placed in the computer working channel. If the third exchange order Oe be followed by a fourth and a fifth without an intervening read, punch, or start order, the decimal to binary conversion cycle will be repeated. An intervening read, punch, or start order will interrupt the sequence and cause operation according to the read or punch cycles hereinabove described.

In order to cause the converter-transducer to execute the previously mentioned binary to decimal conversion cycle, the punch and exchange orders Op and Oe are given in the same way as in the case of the punch cycle. The start order Os of the punch cycle is however omitted and in its place there is given a second exchange order Oe.

In executing this series of orders the apparatus copies from the computer working channel into recirculating channel J/L the binary numbers desired to be converted. These numbers are automatically converted into binary coded decimal form in the manner previously described in connection with the "punch" cycle. At the conclusion of the conversion the apparatus normally waits for a start order to place the card punching machine in operation. In the instant cycle an exchange order Oe given during this period causes the converted data contained in recirculating channel J/L to be placed in the computer working channel.

It will be noted in connection with the two conversion cycles above described that the card machines are not operated, the read and the punch orders Or and Op serving merely to condition the logic and control apparatus for performing the desired conversion processes.

DESCRIPTION OF APPARATUS—PRINCIPAL ELEMENTS

Card machines

The card machines 103 and 104, although not, strictly speaking, a part of the present invention, are herein generally described in order that the operation of the converter-transducer 100 may be more readily understood. These machines will normally constitute a reading machine and a punching machine intended for use with cards or data carriers of the type with which the apparatus is intended to be used. According to the embodiment of the invention selected for illustration and description herein wherein the apparatus is arranged to use IBM cards, card machines 103 and 104 are preferably identical and comprise the IBM machine known as the "Summary Punch." Identical machines may be used as the reading machine 103 and the punching machine 104 when the IBM Summary Punch is selected because such machine includes hole sensing fingers for reading cards and punching elements for punching cards. Thus, in one of the machines the punches so provided are not used whereas in the other machine the hole sensing fingers are not used.

Figure 5 illustrates in a purely schematic fashion the general arrangement and construction of the card machines 103 and 104. As is shown therein the machine includes a feed hopper 120 within which may be placed a stack 122 of cards to be read or punched as the case may be. A card pusher 124 arranged to be actuated every six hundred milliseconds as by a cam 126 serves to move the lowermost card of the stack 122 into a position to be caught by a pair of feed rollers 128 and 130. In this way the cards are caused one at a time to move along the path indicated by the dotted line 132 past a punching station indicated generally by the reference character 134, through a reading station indicated generally by the reference character 136, and into a card stacker such as is diagrammatically represented at 138.

The machine is provided with an electric driving motor 140 which is supplied with electric power as by means of conductors 141 and 142, a manually operable switch 144 being placed in conductor 142 to provide for turning on or off the electric motor 140. The rotating shaft of the motor 140 is connected through a clutch 146 to a driving shaft 148 to which in turn the cam 126 and feed rollers 128 and 130 are suitably drivably connected as is schematically represented by the dashed lines 150 and 152.

The hole sensing apparatus situated at the reading station 136 is represented in Figure 5 as comprising a feed roller 154 positioned to engage the underside of a card and arranged to be driven from the driving shaft 148 by a suitable driving interconnection represented schematically by the dashed lines 156 and 158. Above the card path 132 and carried by a suitable insulating support 160 are mounted eighty hole sensing elements or brushes 162. These brushes are positioned directly above the roller 154 in positions spaced axially along the length of the roller 154 to align each of the eighty brushes with a corresponding column of the card. When a hole is encountered in any card column an electric circuit is completed between the corresponding brush 162 and the roller 154.

The roller 154 will be understood to be insulated and suitably connected as indicated at 164 to an appropriate source of positive direct potential. Each of the brushes 162 is connected as by a conductor 166 to a corresponding receptacle 168 provided on a patch panel 170.

Patch cords each comprising an electrical conductor 172 terminating in suitable plugs 174 and 176 may be used to connect each of the eighty receptacles 168 to any desired one of eighty hubs 178. The hubs 178 are each connected to a corresponding outgoing conductor 180, the eighty conductors 180 serving to transmit the data from the card machine to the logic and control section 114 (see Figure 2).

It will be seen that whenever a reading brush 162 encounters a hole in any column of a card being read a positive direct potential will be applied to a corresponding one of the outgoing conductors 180. As is indicated in Figure 5 these data signals are identified by the designations $b1$ to $b80$ inclusive.

The card punching apparatus situated at the punching station 134 is represented in Figure 5 as comprising a die 182 disposed above and closely adjacent to the card path 132 having provided therein eighty holes 184 in locations corresponding to the columnar locations of the card to be punched. The die 182 co-acts with eighty reciprocable punches 186 supported as indicated at 188 below the card path 132 and in a position to cooperate with the die 182 and holes 184 therein.

The eighty punches 186 are arranged to be actuated mechanically, as for example, by means of a transversely extending bar 190 positioned in alignment with all of the punches 186. The bar 190 is supported for vertical reciprocation by a push rod 192 carrying on its lower end a cam follower roller 194 engaging a cam 196 coupled for rotation to the driving shaft 148 as represented by the dashed line 156. The driving ratios afforded by the coupling 150, 152, 156 and 158 is such that cam 126 makes one revolution for each card fed, and such that cam 196 makes one revolution for each row to pass the punching station 134.

As may be noted from Figure 5, the actuating bar 190 is positioned so far below the lower ends of the punches 186 that the punches may not be directly engaged by the bar 190. Selective actuation of the punches 186 is achieved by the provision of eighty movable interposers 198, each of which is arranged to be moved from a normal non-punching position such as is shown in Figure 5 to a punching position directly between the actuating bar 190 and the lower end of the punch 186 desired to be actuated.

The described selective movement of the interposers 198 is obtained by connecting each interposer to a corresponding punch magnet 200 as represented by the dashed line 202. The eighty punch magnets each have one terminal grounded as indicated at 204 and the other terminal connected as shown at 206 to corresponding receptacles 208 provided on the patch panel 170. Interconnection of the eighty receptacles 208 with eighty hubs 210 may be effected by such means as patch cords 172. The eighty hubs 210 are connected to eighty incoming conductors 212 which may be selectively energized to energize the corresponding punch magnets 200. The punch selecting signals constituting an energized condition of the conductors 212 are herein identified by the designations $m1$ to $m80$ and are generated within the logic and control section 114 to which the eighty conductors 212 extend (see Figure 2).

The clutch 146 is arranged for remote actuation and is a self-latching type so arranged that once engaged it will remain engaged until the end of a single revolution of the cam 126 (i.e., for the feeding of one card), even though the remote control used to effect clutch engagement is sooner released. Engagement of the clutch may be effected by energization of a clutch control magnet or solenoid 214 one terminal of which is connected as indicated at 216 to the power supply conductor 141 and the other terminal of which is extended as conductor 6 to the selector switch section 116 (Figure 2). Conductor 5 from the selector switch section 116 is connected to the load side of power switch 114 so that energization of the clutch control magnet 214 may be effected by interconnecting conductors 5 and 6, a function which is performed in the selector switch section 116 in a manner to be described hereinafter.

In addition to the instrumentalities thus far mentioned the card machines 103 and 104 include means for generating a start signal (hereinafter designated as "$s$") and an emitter pulse (hereinafter designated as "$e$"). To this end there is provided a pair of cam actuated switches such as are represented diagrammatically at 218 and 220, one terminal of each switch being connected as indicated at 222 to a suitable source of positive operating potential, and other terminal of the switches being connected as by conductors 224 and 226 respectively to the selector switch section 116 to transmit thereto the start signal "$s$" and emitter pulse "$e$," respectively effected by the closing of the corresponding cam switch. The emitter pulse switch 220 is arranged to be actuated by a cam 228 connected as shown at 229 to rotate with the cam 196, the arrangement causing switch 220 to be closed momentarily each time a card row passes the punching station 134, or the reading station 136, as the case may be, of the punching machine 104 or the reading machine 103. The cam switch 218 is arranged to be actuated by rotation of cam 126 and thus momentarily closed shortly after the feeding of a card is initiated and thereafter remain open until the feeding of the next card is initiated. The timing of switches 218 is made slightly different in the two machines, the start signal being generated by the read machine 103 approximately sixty-seven milliseconds after the clutch is engaged, and approximately thirty-four milliseconds after clutch engagement in the case of the punch machine 104.

*Recirculating lines*

The recirculating line section 118 (Figure 2) comprises as previously explained recirculating channel J/L and recirculating one word registers A and B. While these recirculating lines may comprise any of the well known types of such devices, a preference is expressed for the magnetic drum type delay line because of its simplicity and reliability of operation. Also, while the invention contemplates the use of an individual drum memory device for the converter-transducer 100, considerable economy is effected if the magnetic drum memory 112 of the computer 105 is used for this purpose, particularly when the computer is of the magnetic drum memory type such as the Alwac computer hereinabove mentioned.

When the computer memory drum is utilized it is only necessary to assign for use with the converter-transducer eight of the many tracks provided by the drum, and to mount on the mountings normally provided the necessary read and write heads for co-operating with these tracks. Such an arrangement is illustrated in Figure 6. Figure 6 includes a perspective view of one end portion 230 of the magnetic drum memory device 112 of the computer 105. As is well known such a memory device comprises a drum or cylinder mounted for rotation about its longitudinal axis, the smooth outer surface of the cylinder being coated with a magnetizable material such as one of the iron oxides used in the well known magnetic recording tapes. A plurality of longitudinally extending support bars such as are represented at 232, 234 and 236 are provided for supporting the various heads in aligned and cooperating relationship with each of a plurality of tracks such as are represented in Figure 6 by the circumferential lines 237 to 246 inclusive in Figure 6.

17

As is indicated by the legends on Figure 6 four tracks such as 237–240 provide the converter recirculating lines A, B and J/L. Another four tracks such as 241–244 provide a pair of computer recirculating channels (herein designated channels H/I and Y/Z) which are allocated for use in association with the converter-transducer 100.

In addition to the eight tracks above mentioned, Figure 6 includes also two of the normal computer channels not used exclusively in connection with the converter-transducer. These channels comprise tracks 245 and 246 and the illustrated read heads associated therewith and provide the master timing and word identification signals upon which the operation of the computer depends.

Recirculating register A comprises a write head $\underline{Aw}$ and a read head $\underline{Ar}$ suitably mounted in the support bar in alignment with the track 237. The heads $\underline{Aw}$ and $\underline{Ar}$ are circumferentially spaced a distance substantially equal to that occupied by one word in the track 237 so that data written in the track 237 by the write head $\underline{Aw}$ will be read from the track by the read head $\underline{Ar}$ approximately one word time later. A similar arrangement is used for register B, a write head $\underline{Bw}$ and a read head $\underline{Br}$ spaced about one word apart being supported by the bar 234 in co-operative alignment with the track 238.

The aforementioned recirculating channel comprises a write head $\underline{Jw}$ carried by the support bar 232 in operative alignment with the track 240. Also, aligned with the track 240 but disposed on the opposite side of the drum from the write head $\underline{Jw}$ is a read head $\underline{Lr}$ carried by the support bar 236. A second write head $\underline{Lw}$ is supported by the support bar 236 in operative alignment with the track 239 which passes under a diametrically opposite read head $\underline{Jr}$ carried by the support bar 232.

The diametrically opposite position of the write heads $\underline{Jw}$ and $\underline{Lw}$ from their associated read heads $\underline{Lr}$ and $\underline{Jr}$ permits data written in the associated track by one of the write heads to be read from the track sixteen word times later by the associated read head.

As is explained in more detail hereinafter certain recirculation circuitry interconnects the read head $\underline{Lr}$ with the write head $\underline{Lw}$ and interconnects the read head $\underline{Jr}$ with the write head $\underline{Jw}$. In this way thirty-two full words may be stored in the tracks 238 and 239, sixteen words being stored between the write head $\underline{Jw}$ and the read head $\underline{Lr}$ and another sixteen words being stored between the write head $\underline{Lw}$ and the read head $\underline{Jr}$. A particular data bit written on track 240 by the write head $\underline{Jw}$ will be read by the read head $\underline{Lr}$ sixteen word times later and immediately rewritten by the write head $\underline{Lw}$ on track 239 and read therefrom sixteen word times later by the read head $\underline{Jr}$ and immediately rewritten on track 240 by write head $\underline{Jw}$ in its original location on that track.

A similar arrangement is used for the program control channel H/I and the computer working channel Y/Z, write heads $\underline{Hw}$ and $\underline{Iw}$ and associated read heads $\underline{Ir}$ and $\underline{Hr}$ co-operating with tracks 242 and 241 to provide the H/I channel, and write heads $\underline{Yw}$ and $\underline{Zw}$ and associated read heads $\underline{Zr}$ and $\underline{Yr}$ co-operating with tracks 243 and 244 to provide the working channel Y/Z.

A clock read head $\underline{Cr}$ is suported by the bar 232 in a position to read from track 245 the 1088 uniformly spaced individual clock pulses which are premanently recorded thereon. In a similar fashion a timing channel read head $\underline{Fr}$ is supported by the bar 232 in a position to read from track 246 the word number and timing signals which are permanently recorded in that track.

18

Basic elements

In addition to the mechanism thus far described, there is included in the Logic and Control Section 114 a number of new and novel circuits incorporating certain basic elements such as amplifiers, flip-flops, drivers, one shots, gates and logic networks, etc., the operation of which should be understood before proceeding to a consideration of such circuits.

The flip-flops just mentioned may be defined as constituting bi-stable state devices, preferably comprising electronic circuits each provided with two inputs and two corresponding outputs. A well known form of such a device is a slightly modified type of Eccles-Jordan trigger circuit, such as that indicated in Figure 7 wherein is illustrated a flip-flop "Ff" having a pair of input terminals $\underline{Ff}$ and $\underline{Ff'}$ and a pair of output terminals $\underline{O}$ and $\underline{O'}$, the $\underline{Ff}$ and $\underline{O}$ terminals being referred to as the "on" or "true" terminals and the $\underline{Ff'}$ and $\underline{O'}$ terminals being designated as the "off" or "false" terminals.

The nature of the flip-flop circuit is such that a negative-going pulse applied to a given input terminal produces a steady state high positive voltage at the corresponding output terminal and a low or zero voltage at the other output terminal. These output voltages will remain constant until a negative-going pulse is applied to the other input terminal, at which time the conditions reverse and the high positive output voltage appears on the alternate output terminal. Since it is the higher positive potential that is used to operate the various components of the present device, signals representing the true condition of the flip-flop are taken from the true output terminal $\underline{O}$ as is represented by the designation Ff, and when a signal is required that corresponds to the false condition on the flip-flop, the positive signal Ff' then appearing on the $\underline{O'}$ output terminal is used.

The one shots above-mentioned may be defined as constituting monostable state devices, preferably comprising electronic circuits each provided with a single input and two outputs. The circuit of a one shot designated "Do" is shown in Figure 8 as a typical one shot circuit. This circuit provides a single input terminal $\underline{Do}$ and a pair of output terminals $\underline{O}$ and $\underline{O'}$. As may be seen from Figure 8 the biasing conditions are such that the tube having its plate connected to output terminal $\underline{O}$ is normally conductive whereas the tube having its plate connected to the output terminal $O'$ is normally cut off. Thus, under normal circumstances and in the absence of an input signal the voltage at the true output terminal $\underline{O}$ is low or zero and that at the false output terminal $\underline{O'}$ is high producing a false output signal Do'.

A negative going pulse applied to the input terminal $\underline{Do}$ will trigger the circuit in a manner analogous to the triggering of a flip-flop, the normally conducting tube being cut off and the normally non-conducting tube being caused to conduct. As a consequence, the voltage on output terminal $\underline{O}$ rises to produce a positive output signal Do whereas the voltage on the false output terminal $O'$ falls. Unlike the operation of a flip-flop, the conditions just described do not endure until another triggering pulse is received; on the contrary, the circuit automatically triggers back to the original condition in a time which is determined by the time constants of the resistance capacitance networks associated with the grids of the one shot tubes. In the one shots used in the apparatus of this invention the time constants are adjusted so that the true output signal Do lasts for about one pulse time.

A driver (illustrated schematically by the circuit of driver "$(\underline{Dd})$" in Figure 9) comprises a form of direct current amplifier including a pre-amplifier 250, a "true"

power amplifier 252, and "false" power amplifier 254, interconnected as shown. A single input terminal ($\underline{Dd}$) connects to the pre-amplifier 250 which is so biased as to respond only to the application of a substantial positive voltage (for example, +15) to the input terminal ($\underline{Dd}$). A "true" output terminal $\underline{O}$ is coupled to the output circuit of the "true" power amplifier 252, and a "false" output terminal $\underline{O}'$ is coupled to the output circuit of the "false" power amplifier 254. The power amplifiers 252 and 254 operate in phase opposition so that when the positive potentials on the "true" output terminal $\underline{O}$ is high to provide the output signal D$d$, it is low on the "false" output terminal $\underline{O}'$, and when the positive potential on the "false" output terminal $\underline{O}'$ is high to produce the output signal D$d'$, it is low on the "true" output terminal $\underline{O}$.

The operation of the driver circuit of Figure 9 is such that there appears on the "true" output terminal $\underline{O}$ an amplified (as to available power) version of the signal applied to the input terminal ($\underline{Dd}$), whereas the signal appearing on the "false" output terminal $\underline{O}'$ is the opposite. For example, a +15 volt signal applied to the input terminal ($\underline{Dd}$) produces a corresponding "true" output signal D$d$ at output terminal $\underline{O}$ and an oppositely low voltage at the "false" output terminal $\underline{O}'$. On the other hand, if the voltage at the input terminal ($\underline{Dd}$) falls to zero, the high voltage output signal D$d'$ appears on the "false" output terminal $\underline{O}'$, and the "true" output voltage is low.

It will be seen that whereas the output of a driver follows the input signal (directly on the "true" output, oppositely on the "false" output), a flip-flop acts as a toggle device, being set to one condition by one negative-going input pulse and remaining in that condition regardless of the presence or absence of the input signal, until it is triggered to the opposite condition by a negative-going pulse on the other input terminal.

In most cases the output voltages of the flip-flops, one shots and drivers are clamped to make the high voltage condition +15 volts and the low voltage condition zero volts. This may readily be accomplished by a conventional clamping circuit such as is shown in Figure 10 wherein an input terminal 256 is shown as being connected through a resistance 260 and an output conductor 262 to an output terminal 258. To the output conductor 262 are connected the anode of a first diode 264 and the cathode of a second diode 266. The cathode of diode 264 is connected to a suitable high capacity source of +15 volt direct potential, and the anode of diode 266 is connected to a zero voltage point such as ground. When the signal applied to input terminal 256 lies between zero and +15 volts, both diodes 264 and 266 present a high impedance. However, when the input voltage rises to a value exceeding +15 volts diode 264 becomes highly conductive and holds the voltage at output terminal 258 at +15 volts, the difference being taken as a drop in the resistance 260. Similarly, when the voltage on input terminal 256 falls below zero to a negative value diode 266 becomes highly conductive and holds the voltage at output terminal 258 at zero volts, the difference again being taken as a drop in the resistance 260. The circuit thus operates to clamp the output voltage at zero and +15.

The circuits which control the operation of various devices, such as the flip-flops, one shots and drivers above described, are defined herein by certain logic equations. These equations are used in this specification to express not only the generic functional concepts involved, but also the actual circuit construction. These equations utilize a form of algebra known as "Boolean algebra" which has been developed and is extensive used in the design and construction of digital computers. Boolean algebra is essentially an algebra consisting of only two admissive states which may be represented by the marks 0 and 1 or designated by any two conditions such as "on" and "off" or "true" and "false." A familiarity with the elements of Boolean algebra will greatly facilitate a complete understanding of the operation of the apparatus of this invention.

According to Boolean algebra as used herein, capital letters (A, B, C, etc.) represent the "true" quantities in the logic equations, whereas such letters followed by a prime (A', B', C', etc.) represent the "false" quantities, being read "not A," "not B," etc.

All of the logic equations presented in this specification are variations and combinations of two basic relationships known respectively as the logical "or" and logical "and" combinations. The logical "or" relationship is typified by: $D=A+B'+C$, wherein the plus (+) sign is used to represent the "or" relationship. This equation means that D is true if A is true $\underline{or}$ if B is false $\underline{or}$ if C is true. The logical "and" relationship is typified by: $D=A(B'C)$, wherein the multiplications represented by the parentheses and the absence of any plus signs between the letters are used to represent the "and" relationship. This equation means that D is true $\underline{only\ if}$ A is true $\underline{and}$ B is false $\underline{and}$ C is true.

A logic equation may contain both "and" and "or" combinations, and the laws of ordinary algebra regarding the factoring and expansion of expressions holds true. For example, the equation: $D=A(B'+C)$ may be written: $D=AB'+AC$, and vice versa. In either form the equations means that D is true is A is true $\underline{and}$ B is false, $\underline{or}$, if A is true $\underline{and}$ C is true.

Logic equations as above described are used herein to define the actual construction of the various circuits employed. As so used, the captital letters (A, B, C, etc.), alone or in combination with lower case letters or numerals (A$d$, B3, etc.) are used to represent electrical signals produced on similarly designated output terminals of various devices similarly identified, underscoring being used to distinguish the device and its terminals from the signal. In the machine herein described the signals so represented constitute, in most cases, a positive direct potential of the order of 15 volts. Thus "$\underline{A}$" means that the "true" output terminal $\underline{A}$ is at +15 volts, whereas "$\underline{B'}$" means that the "false" output terminal $\underline{B}'$ is at +15 volts. The various devices are given the same designating letter as the output terminal, so that "$\underline{A}$" means the "true" output terminal of device $\underline{A}$, and "$\underline{B'}$" means the "false" output terminal of device $\underline{B}$. Furthermore, since it is the control (function and apparatus) of the various circuit components that is defined by the logic equations, the equations most often relate to the device itself, rather than to its output signal. Thus, instead of writing (as above): $D=A+B'+C$, and "or" equation is herein written: $\underline{D}=A+B'+C$, meaning that device $\underline{D}$ will be actuated to produce a +15 volt signal at its "true" output terminal, if such a signal obtains at the "true" output terminals of either of devices $\underline{A}$ or $\underline{C}$ or at the "false" output terminal of device $\underline{B}$.

The various gating networks used in this apparatus are readily defined by logic equations of the character above-described. These gating networks preferably comprise interconnected diodes and resistances arranged in such manner as to deliver an output signal whenever certain input signal configurations exist, the input signal configurations being defined by logical "and" and logical "or" relations, or by both logical "and" and logical "or" relations.

Figure 11:
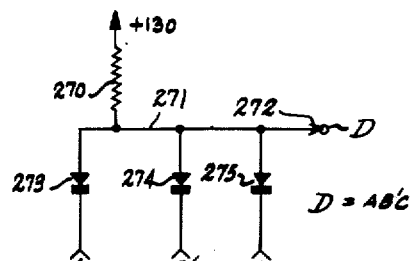
Figure 11 is a wiring diagram illustrating schematically the construction of an "and" gate.

An "and" gate is illustrated in Figure 11. A relatively high positive potential, for example, +130 volts, is applied through a resistor 270 to a conductor 271 to which is connected an output terminal 272. Connected in parallel to the conductor 271 are a number of diodes such as the well known germanium diodes 273, 274, and 275. Each of these diodes has its other terminal serving as an input terminal to which input signals such as A, B', and C may be applied. Such a gate circuit is well known and operates to produce on the output terminal 272 a positive output potential only when a positive potential is applied to all of the input terminals. If this positive output potential be designated "D," the circuit shown in Figure 11 is defined by the logic equation $D = A \ B' \ C$.

Figure 12:
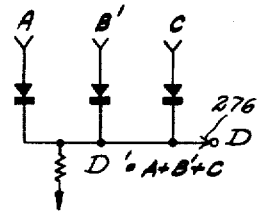
Figure 12 is a wiring diagram illustrating schematically the construction of an "or" gate.

The logical "or" gate is illustrated in Figure 12. This gate is identical with the "and" gate except for a reversal of the supply potential and a reversal of the polarity of the individual diodes. The "or" gate shown in Figure 12 is also well known and operates to produce a positive output signal on an output terminal 276 if a positive potential is applied to any one or more of the input terminals. Thus, if the positive output signal may be designated "D," the "or" gate illustrated in Figure 12 is completely defined by the logic equation $D = A + B' + C$.

In Figures 11 and 12 and elsewhere herein, the symbols used for the diodes are based upon the conventional assumption as to the direction of current flow, that is, that current flows from positive to negative, a relatively low resistance being presented to current flowing in the direction indicated by the arrowhead portion of the symbol, and an extremely high resistance being presented to current flowing in the opposite direction. Since these diode gates conform to the two admissive states of Boolean algebra, any terminal not at a positive potential will be understood to be at zero potential.

Figure 13:
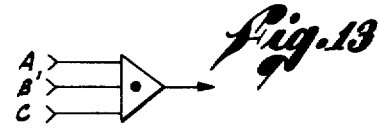
Figure 13 represents the convention used in various of the drawings herein to represent an "and" gate.
Figure 14:
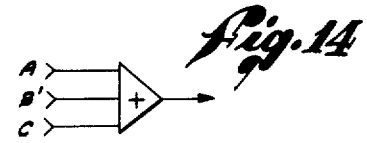
Figure 14 is a drawing representative of the convention used in the various figures of the drawing to represent an "or" gate.
Figure 15:
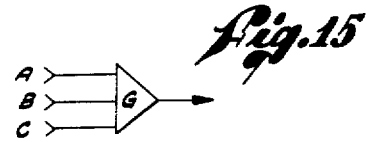
Figure 15 is a drawing illustrating the convention used variously herein to indicate a gating network.
Figure 16:
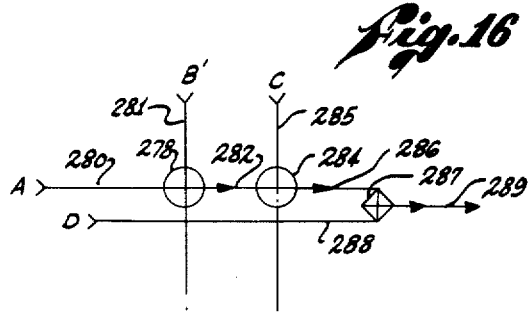
Figure 16 is a diagram illustrating the conventions used in various of the drawings to illustrate gating matrices.

In the various block and functional diagrams which are included in the accompanying drawings, a symbol such as is shown in Figure 13 is used to represent diagrammatically an "and" gate, whereas a symbol such as that shown in Figure 14 is used to represent diagrammatically an "or" gate. When its is desired to represent a gate generally, or to indicate a more complex network involving combinations of "and" gates and "or" gates, the symbol of Figure 15 is employed. In certain of the drawings, in the interests of simplicity, conventions such as are shown in Figure 16 are employed. According to this convention the small circle 278 represents an "and" gate to which signals A and B' are applied as inputs by conductors 280 and 281, respectively. The output conductor, identified as such by the arrowhead 282 constitutes one of the inputs to an "and" gate represented by the small circle 284, another input to that gate being the signal C applied by conductor 285. The output of gate 284, identified as such by the arrowhead 286 is applied as one input to an "or" gate represented by the small diamond 287 having a plus symbol inscribed therein. A signal D is indicated as applied through conductor 288 as a second input to the "or" gate 287. The output of the gate 287 is identified as such by the arrowhead 289.

Gates and gating networks, such as above-described, are used to control the functioning of the various flip-flops, one shots, drivers and the like, and are therefore connected to the input terminals of such devices. This is reflected in the logic equations. For example, a set of equations defining the control of a flip-flop $\underline{Ff}$ might be:

$$Ff = A \ B' \ C$$
$$Ff' = A + B' + C$$

In other words, the "and" gate is connected to the "true" input terminal of flip-flop $\underline{Ff}$ (the connection required to produce the +15 volt signal on the "true" output terminal under the conditions specified), and the "or" gate is connected to the "false" input terminal. In the case of a driver $(\underline{Dd})$ and equation such as: $(\underline{Dd}) = A \ B' \ C$ defines and "and" gate connected to the single input terminal to product an output signal Dd of +15 volts on the "true" output terminal when the input conditions are satisfied, and to produce an output signal Dd' of +15 volts on the "false" output terminal when the input conditions are not satisfied.

Because flip-flops and one shots are triggered by negative-going pulses as above-explained, and because the times of operation may be delayed as explained hereinafter, all devices other than delayed flip-flops and one shots are distinguished in the logic equations by enclosing their designation in parentheses, thus: $(\underline{Dd}) = A \ B' \ C$, for a driver such as above-mentioned. One shots may be distinguished from flip-flops in the logic equations by the fact that flip-flops have two input terminals whereas one shots have a signal input terminal, and also by the lower case letter "o" included in the designation. In order to distinguish drivers from other devices whose designations are enclosed in parentheses, the convention has been adopted of following the capital letter designation for each driver with the lower case letters "d" or "a," thus: $(\underline{Bd})$ or $(\underline{Ja})$ for a driver, $(\underline{Br})$ for a read head, and $(\underline{Bb})$ for a "non-delayed" flip-flop.

The logic equations set forth in this specification, taken together with the foregoing description of the construction and operation of flip-flops, one shots, drivers, clamps and diode gates, thus constitute a complete and accurate description of the construction of the apparatus. To one understanding such type of equations, the construction is disclosed much more accurately and in a more readily understandable form than is possible with the more conventional drawings, wiring diagrams, and the like.

*Recirculation circuitry*

As previously pointed out the recirculation lines comprising channel J/L and one word registers A and B are provided for the primary purpose of storing a specified quantity of information until such time as it is required in the logical operations, and storing the information in suchwise as to make it readily accessible when needed. In addition, such lines are provided for allowing the data to be altered or replaced with different information as the various computational steps proceed. Consequently, the storage must be more than static; the bits of information must be continuously circulated past one or more points of access in order to permit rapid access and the amending of the data. It is for this purpose that certain recirculation circuitry is used to interconnect the various read and write heads previously referred to in connection with Figure 6.

RECIRCULATING CHANNEL "J/L"

Figure 17:
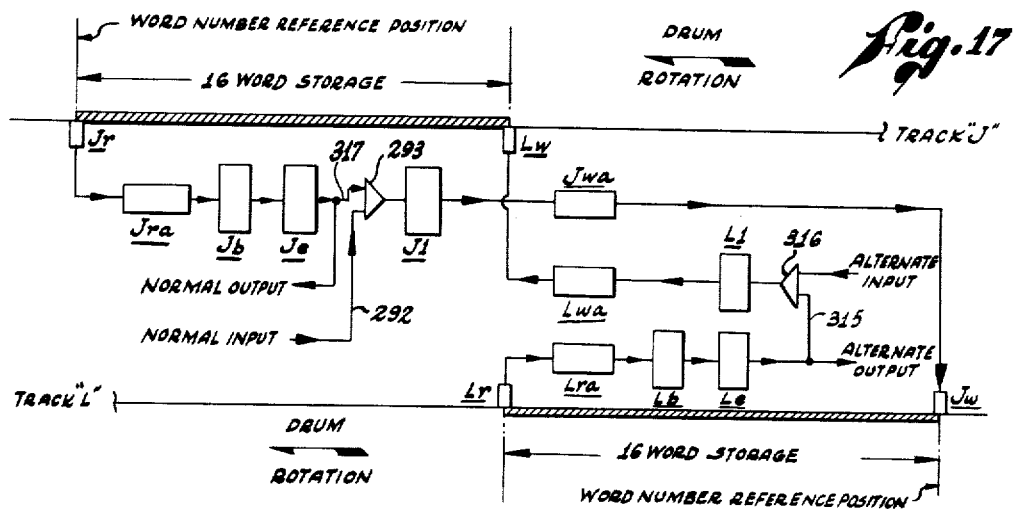
Figure 17 is a block diagram illustrating the functional inter-relation of the various components comprising a recirculating channel herein designated J/L.

Figure 17 is a block diagram representing recirculation channel J/L together with the recirculation circuitry involved. Normal input to the channel is represented by the input line 292, the signals passing a gating network 293 to actuate the J line recording flip-flop $\underline{J1}$. The output signals from flip-flop $\underline{J1}$ are amplified by the write amplifier $\underline{Jwa}$ and applied to the write head $\underline{Jw}$. The associated read head $\underline{Lr}$ is spaced from the write head $\underline{Jw}$ a distance equivalent to sixteen words so that information written by the head $\underline{Jw}$ will be read by the head $\underline{Lr}$ sixteen word times later, a total of sixteen words being stored as a magnetic recording in the track between the heads $\underline{Jw}$ and $\underline{Lr}$.

Figure 18:
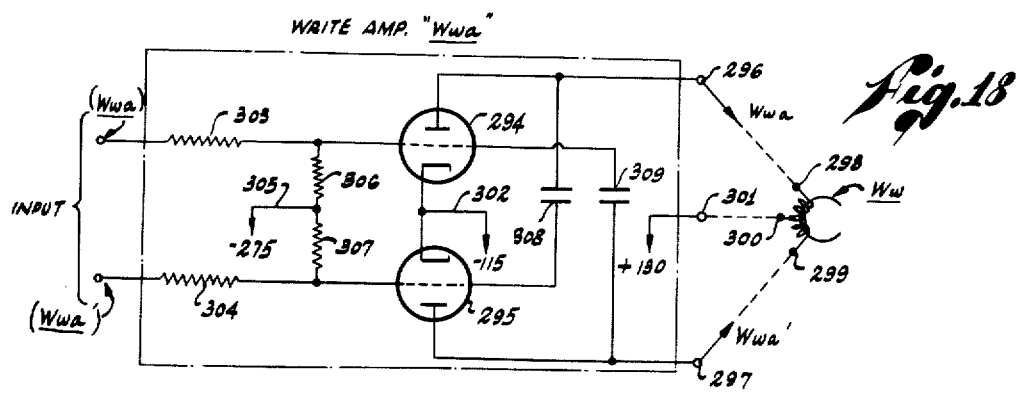
Figure 18 is a wiring diagram illustrating the arrangement of the components in a typical write amplifier such as is used in the apparatus herein disclosed.

The write emplifier $\underline{Jwa}$ may comprise any suitable power amplifier, preferably of the duo-channel or push-pull type to co-operate with the center-tapped winding provided by the write head $\underline{Jw}$. Figure 18 illustrates schematically a write amplifier designated $\underline{Wwa}$ as typical of an amplifier which is particularly adapted for use as the amplifier $\underline{Jwa}$ as well as for other write amplifiers hereinafter referred to. As is shown in Figure 18 the preferred form of write amplifier comprises a pair of thermionic amplifier tubes 294 and 295 having their plates connected to a pair of output terminals 296 and 297. As is indicated in the drawing the output terminals 296 and 297 will be operatively connected to corresponding end terminals 298 and 299 of the center-tapped winding of the indicated write head $Ww$. The center tap 300 of the head winding will be connected to a suitable source of +130 volt potential as indicated at 301, thus constituting the two halves of the head winding the respective load impedances for the tubes 294 and 295. The cathodes of the tubes 294 and 295 are both preferably connected to a suitable source of −115 volt potential as shown at 302.

The grids of the tubes 294 and 295 are connected to associated input terminals (W$wa$) and (W$wa'$) through series resistances 303 and 304 respectively, and are also each connected to a suitable source of −275 volt potential, as indicated at 305, through grid return resistances 306 and 307. Since the input terminals will be either at zero volts or +15 volts depending on the absence or presence of a signal to be recorded, the ohmic values of resistances 303, 304, 306 and 307 are so proportioned with respect to the grid bias supply voltage of −275 and the cathode voltage of −115 as to bias the tubes 294 and 295 substantially at cut-off when the associated input terminal (W$wa$), (W$wa'$), is at zero volts, and to cause the tubes to draw a substantial plate current when the input terminal is at +15 volts. Preferably, condensers 308 and 309 are connected as shown between the plate of one tube and the grid of the other to pass a strong negative pulse to the grid of the other tube when the one tube conducts, thus insuring against faulty operation of the non-conductive tube.

It will be seen that if a +15 volt signal is applied to one input terminal the corresponding tube will draw a large plate current which flows in one direction in the associated half of the winding of the head $Ww$, thus magnetizing the recording medium to one polarity, whereas such a signal applied to the other input terminal will cause the other tube to draw a plate current in the opposite direction through the other half of the winding of the head $Ww$, thus magnetizing the recording medium to an opposite polarity. Accordingly, signals representative of 1's are applied to the input terminal (W$wa$) to produce one polarity of magnetization, and signals representative of 0's are applied to the input terminal (W$wa'$) to produce an opposite polarity of magnetization.

Figure 19:
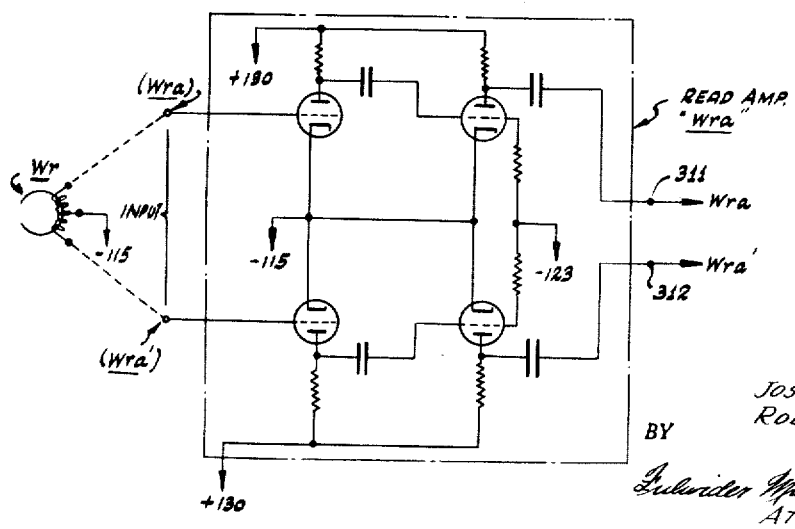
Figure 19 is a wiring diagram illustrating a typical read amplifier.

As is represented by the block diagram Figure 17 the signals produced by the read head $Lr$ are amplified by a read amplifier $Lra$. This read amplifier, which is typical of other read amplifiers used in the present invention, is of known construction as may be seen from Figure 19 which shows schematically the circuit of a read amplifier $Wra$ typifying the various read amplifiers used in the apparatus. The read heads, typified by the read head $Wr$ in Figure 19, have center-tapped windings providing two outputs which are applied to corresponding input terminals (W$ra$) and (W$ra'$) of the read amplifier. The amplifier has two output terminals 311 and 312, and the circuit operates to produce on output terminal 311 a negative going pulse W$ra$ whenever the recorded information changes from a "0" to a "1" and to produce a negative going pulse W$ra'$ on the other output terminal 312 whenever the change is from "1" to "0."

As is shown in Figure 17 the output from the read amplifier $Lra$ is applied to a buffer flip-flop $Lb$ the output of which controls an input flip-flop $Le$. The output of flip-flop $Le$ is applied as indicated at 315 through a gating network 316 to operate a recording flip-flop $L1$. The signals produced by flip-flop $L1$ are amplified by a write amplifier $Lwa$ and applied to a write head $Lw$.

A read head $Jr$ is mounted as previously described to read from the memory drum information recorded thereon by the write head $Lw$, the heads being spaced apart a distance equivalent to sixteen words to provide for the storage of sixteen words of data in the memory track between the two heads. Signals produced by the read head $Jr$ are amplified by the read amplifier $Jra$ and passed through a buffer flip-flop $Jb$ to an input flip-flop $Je$. Signals produced by the flop-flop $Je$ are applied as indicated at 317 to the gate 293 to operate the recording flip-flop $J1$ and thus be again recorded through the write head $Jw$.

As is indicated by the legends in Figure 17 flip-flops $J1$ and $Je$ are respectively considered to constitute the normal input and output positions to and from the J/L channel, these positions being designated "normal" because the information is written on the drum and read from the drum at locations corresponding to the locations identified by the previously mentioned word number signals recorded in the computer timing channel. In other words, at the word time identified by the word number signals as word No. 0, word No. 0 may be read at the output of flip-flop $Je$ or may be written in the proper location by signals applied to the flip-flop $J1$.

Flip-flops $L1$ and $Le$ are designated as the alternate input and output positions respectively, the designation "alternate" indicating that the position is displaced one-half channel or sixteen words from the normal input and output positions. Thus at the word time zero above mentioned, while word No. 0 may be read from the flip-flop $Je$, word No. 16 may at that same time be read from the flip-flop $Le$, and a new word No. 16 may at that time be recorded in the space allocated to word No. 16 by signals applied to the alternate input to flip-flop $L1$.

The J/L channel normal write circuitry is defined by the following logic equations:

$$(Jwa)=J1$$
$$(Jwa')=J1'$$
$$(Jw)=Jwa$$
$$(Jw')=Jwa'$$

The logic defining the control of the flip-flop $J1$ is explained hereinafter because the logic is arranged to vary the control of the flip-flop in accordance with the various cycles and sequences of operation of the apparatus.

Figure 20:
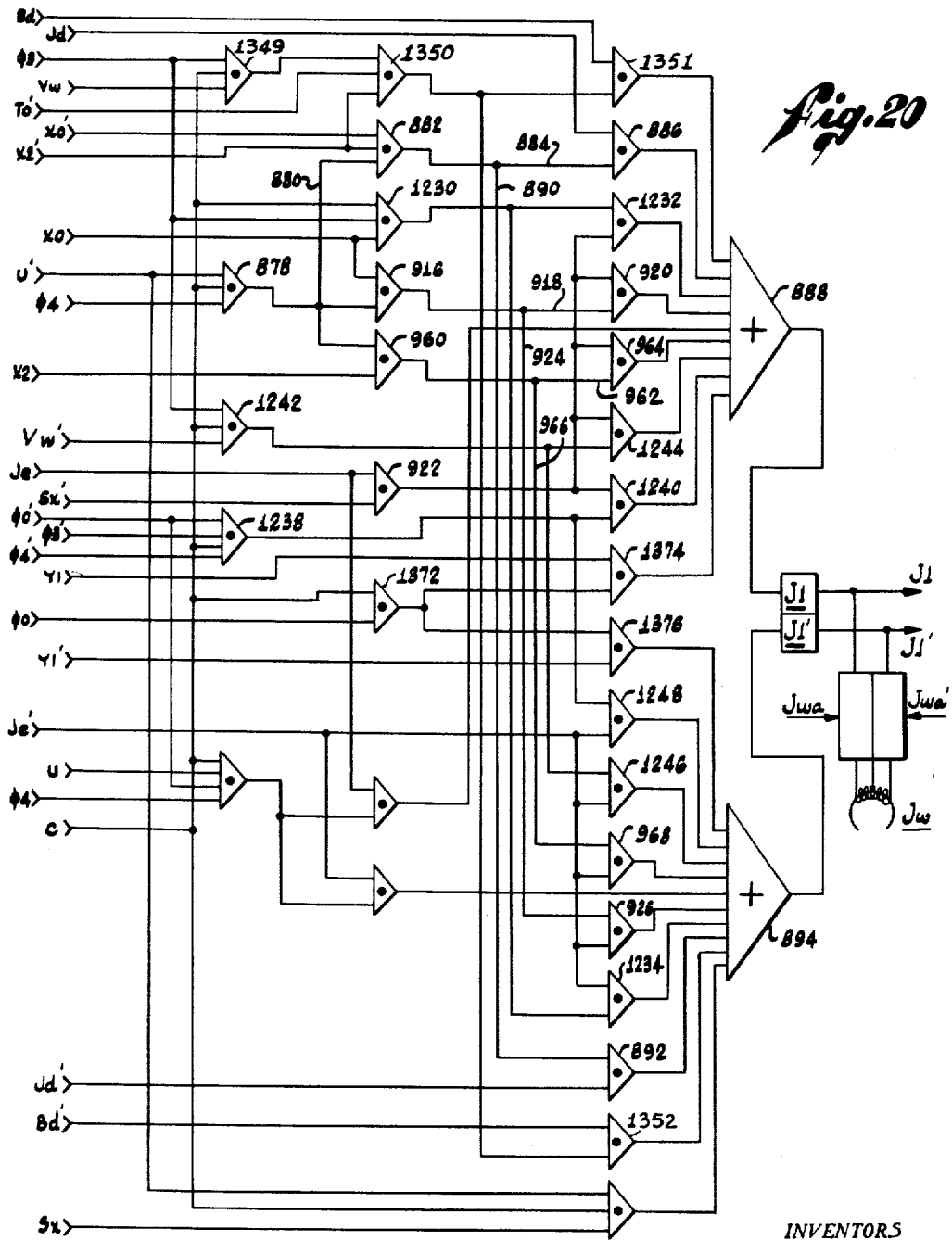
Figure 20 is a schematic diagram illustrating the circuitry associated with the normal input to the recirculating channel.

The circuitry defined by the above logic equations is shown in Figure 20 wherein the two output terminals of flip-flop $J1$ are illustrated as being connected to the two input terminals of the write amplifier $Jwa$, and wherein the outputs of the amplifier $Jwa$ are shown as connected to corresponding terminals of the write head $Jw$. The complex input gating circuitry for flip-flop $J1$ shown on Figure 20 is explained in ensuing portions of this specification. The alternate input circuitry for the J/L channel is similar to the normal input circuitry as may be seen from Figure 21 and the following logic equations:

$$(Lwa)=L1$$
$$(Lwa')=L1'$$
$$(Lw)=Lwa$$
$$(Lw')=Lwa'$$

Channel J/L normal output circuitry defined in logic equations as follows:

$$(Jra)=Jr$$
$$(Jra')=Jr'$$
$$(Jb)=Jra$$
$$(Jb')=Jra'$$
$$Je=Je'\ Jb\ C$$
$$Je'=Je\ Jb'\ C$$

As previously explained the output signals $Jra$ and $Jra'$ constitute negative going pulses serving to identify only the time and direction of change of the recorded data. It is for this reason that the pulse shaping or buffer flip-flop $Jb$ is interposed between the read amplifier $Jra$ and the flip-flop $Je$. The buffer flip-flop serves to produce signals representative of the recorded data, the true and false input terminals of flip-flop $Jb$ being connected to corresponding output terminals of the read amplifier $Jra$ as is indicated in Figure 22. Thus, a negative going signal $Jra$ representing a change from "0" to "1" will trip flip-flop $Jb$ to its true state to produce an output signal $Jb$ representing one or more "1's," depending on its duration. The signal $Jb$ will continue until the recorded data changes from "1" to "0" and produces the output signal $Jra'$. This negative pulse applied to the false input terminal of flip-flop $Jb$ will trigger the flip-flop to its false condition and produce an output signal $Jb'$ representing "0's."

Because all operations are synchronized by the timing or clock signal recorded on the aforementioned clock channel and because of circuit delays encountered in the read amplifier $Jra$, the signals $Jb$ and $Jb'$ are used to control the input flip-flop $Je$, the operation of which is gated to the clock signal C as is shown in Figure 22. The clock signal C will be understood to be a square wave signal having a frequency equal to the previously mentioned pulse repetition rate, each complete cycle of the clock signal C constituting a single pulse time. The fall of the clock signal from its maximum positive value to its maximum negative value is used to mark the end of each pulse time and the beginning of the pulse time next following.

As is indicated by the logic equations above and is shown in Figure 22 each input terminal of flip-flop $Je$ is connected to an output of an "and" gate having three inputs, signals $Jb$, $Je'$ and C being used to control the true input to flip-flop $Je$ and signals $Jb'$, $Je$ and C being used to control the false input.

The circuit described operates to control flip-flop $Je$ in suchwise as to follow flip-flop $Jb$ and to produce a signal $Je$ representing "1's" in response to a similar signal $Jb$ produced by flip-flop $Jb$ and producing a signal $Je'$ representing "0's" in response to a similar signal $Jb'$ produced by flip-flop $Jb$. The terms $Je'$ and $Je$ in the logic for $Je$ and $Je'$ respectively require $Je$ to be off before it can receive an "on" trigger and vice versa, thus protecting against faulty operation which might result if triggering signals were inadvertently applied to both input terminals at the same time.

The clock signal C appearing in the logic for both $Je$ and $Je'$ provides the required negative going trigger pulses. Since this "fall of the clock" that produces the required negative going pulse occurs at the end of the pulse time, the flip-flop is triggered to be in its new condition the following pulse time.

The operation of flip-flop $Je$ under the conditions described will be apparent from the ensuing example. Let it be assumed that at the beginning of a given pulse time flip-flop $Je$ is "off," producing a signal $Je'$, and that flip-flop $Jb$ is "on" producing the signal $Jb$. This satisfies two of the three conditions ($Jb$ $Je'$ C) required to produce a positive output signal from the "and" gate connected to the true input terminal of flip-flop $Je$. The third condition is satisfied mid-way of the given pulse time when the clock signal goes to its positive half cycle. As a result a positive voltage is at this time applied to the true input terminal of flip-flop $Je$, but no operation results because the flip-flop will not respond to a positive-going pulse.

At the end of the given pulse time, the clock falls, the gating conditions are no longer met, and the voltage on the true input terminal of $Je$ falls to zero. This negative pulse triggers the flip-flop to be "on" during the next pulse time. In other words, the operating conditions are defined by two factors; i.e., the input signal configuration ($Jb$ $Je'$) and the clock signal C. The input signal configuration may be thought of as cocking the mechanism and the fall of the clock as pulling the trigger.

Thus the $Je$ signal appears one pulse later than the $Jb$ signal which produced it. All flip-flops which are gated to the clock delay the signals one pulse time in a like manner. A driver, on the other hand, does not produce such a delay since it is not gated to the clock and its output signals follow the input signal, changing at the same time and persisting only so long as the input signal persists.

The alternate output circuitry for the recirculating channel J/L is similar to the normal output circuitry just described as may be seen from Figure 23 and the following logic equations:

$$(Lra) = Lr$$
$$(Lra') = Lr'$$
$$(Lb) = Lra$$
$$(Lb') = Lra'$$
$$Le = Le' \; Lb \; C$$
$$Le' = Le \; Lb' \; C$$

It will be noted that a signal in making a complete circuit through the J/L recirculating line passes through four clock-controlled flip-flops; i.e., flip-flops $Je$, $J1$, $Le$ and $L1$. Since the signal is delayed one pulse time by each flip-flop the spacing between the $Jw$ and $Lr$ heads and between the $Lw$ and $Jr$ heads must be shortened accordingly, that is, two pulse spaces each; otherwise stated, of the sixteen word storage between the head pairs indicated in Figure 17 all but two of the pulses are stored in the memory channel, the two pulses being stored in flip-flops $Le$ and $L1$ in the one case and in flip-flops $Je$ and $J1$ in the other case.

ONE WORD RECIRCULATING REGISTERS A AND B

Figure 24 is a block diagram illustrating the recirculating registers A and B and the recirculation circuitry associated therewith. As is shown the input to the A register is through driver $Ad$ which controls recording flip-flop $A4$. The output of flip-flop $A4$ is amplified by the write amplifier $Awa$ and applied to the write head $Aw$, whereby the data is recorded on the magnetic drum. Twenty-eight pulse times after a given bit is written on the drum by the write head $Aw$ it is read by the read head $Ar$.

Signals produced by the read head $Ar$ are amplified by a read amplifier $Ara$ and passed through a buffer flip-flop $Ab$ to control an input flip-flop $Ae$. Recirculation is obtained by connecting the output of flip-flop $Ae$ to the input of driver $Ad$ through appropriate circuitry represented generally in Figure 24 by the rectangle 320. Since this portion of the circuitry is varied from time to time depending on the cycle and sequence being performed, it is not described in detail at this time.

As is indicated in Figure 24 the write and read heads $Aw$ and $Ar$ are spaced apart a distance corresponding to twenty-eight bits so that twenty-eight bits of data are carried in the track of the magnetic drum. Since a full word comprises thirty-four bits, six bits must be stored in the recirculation circuitry. Flip-flops $Ae$ and $A4$ are gated to the clock as hereinafter described and serve to store one bit each. Thus, for normal recirculation the recirculation circuit 320 must provide a four pulse relay so as to provide storage for the four remaining bits. As will be pointed out hereinafter, this circuitry may be by-passed by connecting the output of $\underline{Ae}$ directly to the input of driver $\underline{Ad}$ when it is desired to shift the individual bits four pulse positions each word time, the shifting resulting from the fact that the recirculating line is four bits shorter than the word which is circulated. In the same way shifting in the opposite direction may be achieved by interposing more than four pulses delay in the recirculation circuit 320.

As may be seen from Figure 24 the circuitry for recirculating register B is identical with the circuitry described for register A, the input signals being applied through the driver $\underline{Bd}$ for register A, the input signals being applied through driver $\underline{Bd}$ to recording flip-flop $\underline{B5}$, the output of which is amplified by the write amplifier $\underline{Bwa}$ and applied to the write head $\underline{Bw}$. Signals read from the drum by the read head $\underline{Br}$ are amplified by the read amplifier $\underline{Bra}$ and passed through the buffer flip-flop $\underline{Bb}$ to control the input flip-flop $\underline{Be}$.

Two outputs are indicated for each of the registers A and B, the output that may be taken from the flip-flops $\underline{Ae}$ or $\underline{Be}$ being designated as "early" and the outputs which may be taken from the drivers $\underline{Ad}$ or $\underline{Bd}$ being designated as "late," these designations being relative only, a particular bit appearing at the output of flip-flop $\underline{Ae}$ four pulses earlier in a word time than its appearance in a previous word time at the output of driver $\underline{Ad}$.

The read and write circuitry for registers A and B respectively is similar to the corresponding circuitry previously described for the J/L channel as may be seen from Figures 25, 26, 27 and 28 and the following logic equations:

$$(\underline{Ara})=Ar$$
$$(\underline{Ara'})=Ar'$$
$$(\underline{Ab})=Ara$$
$$(\underline{Ab'})=Ara'$$
$$\underline{Ae}=Ae'\ Ab\ C$$
$$\underline{Ae'}=Ae\ Ab'\ C$$
$$\underline{A4}=Ad\ C$$
$$\underline{A4'}=Ad'\ C$$
$$(\underline{Awa})=A4$$
$$(\underline{Awa'})=A4'$$
$$(\underline{Aw})=Awa$$
$$(\underline{Aw'})=Awa'$$
$$(\underline{Bra})=Br$$
$$(\underline{Bra'})=Br'$$
$$(\underline{Bb})=Bra$$
$$(\underline{Bb'})=Bra'$$
$$\underline{Be}=Be'\ Bb\ C$$
$$\underline{Be'}=Be\ Bb'\ C$$
$$\underline{B5}=Bd\ C$$
$$\underline{B5'}=Bd'\ C$$
$$(\underline{Bwa})=B5$$
$$(\underline{Bwa'})=B5'$$
$$(\underline{Bw})=Bwa$$
$$(\underline{Bw'})=Bwa'$$

LOGIC AND CONTROL SECTION

As previously mentioned, the logic and control section 114 includes numerous circuits and logical elements arranged to perform the various functions intended. Since the construction and operation of each of these various circuits and logical arrangements are best understood by relating them to the various circuits and arrangements with which they are associated, such features are described in connection with the following explanation of the operation of the apparatus, and the various underlying concepts involved.

OPERATION

As has been explained the apparatus forming the subject matter of this invention is arranged to perform four different functions; i.e. the four functions previously referred to as the read cycle, the punch cycle, the decimal to binary conversion cycle, and the binary to decimal conversion cycle. Since these four functions are to a great extent basically dissimilar and since certain of the instrumentalities are utilized in one of the cycles and not in another or perform in dissimilar ways in different cycles the operation of the apparatus will be described with reference to each of the four above-mentioned principal functions.

"Read" cycle (from card to computer)

Figure 29:
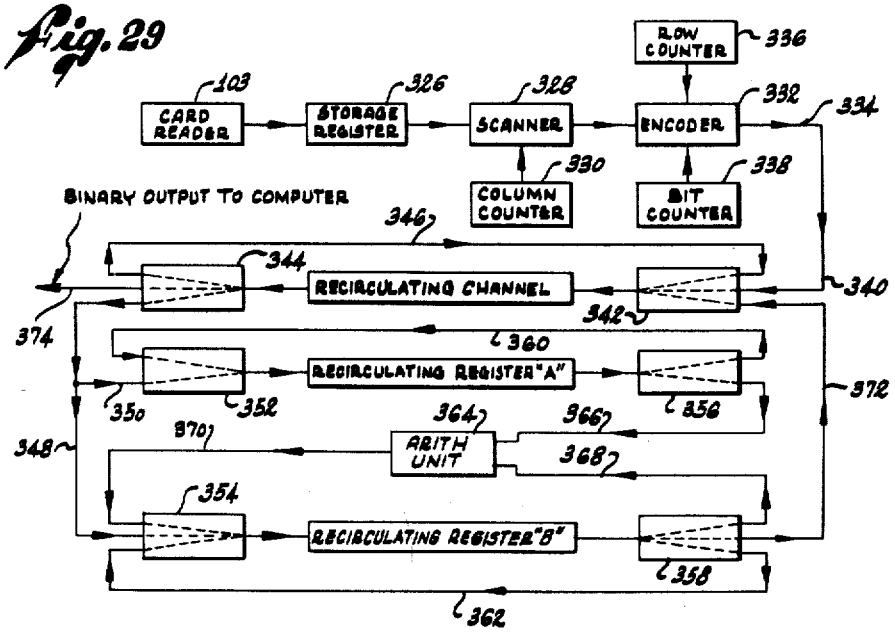
Figure 29 is a block diagram illustrating the functional inter-relation of the principal components of the apparatus and their functioning during the "read" cycle.

A general understanding of the sequence of operations utilized in the read cycle may be gained from a consideration of Figure 29 which is a functional diagram illustrating the flow of data from the card reader to the computer and the principal instrumentalities utilized during the cycle. As is indicated in Figure 29 the data taken from each card row is transferred from the card reader 103 to an eighty element storage register 326. Between rows the storage register 326 is scanned by a scanner 328 under the control of a column counter 330. The information taken from the storage register 326 by the scanner 328 is coded by an encoder 332 to provide at its output 334 a binary coded decimal number for each decimal digit read from the card or a binary coded alphabetic character for each unit of alphabetical data read from the card. The encoder is controlled in its operation by a row counter 336 coperating with a bit counter 338.

The binary coded information is transmitted as indicated at 340 through appropriate gating indicated by the rectangle 342 and placed in the recirculating channel, the location of each code group depending upon the time of its introduction into the channel, the time of such introduction being controlled by the timed operations of the scanner 328. The information so placed in the recirculating channel is recirculated by the co-operation of an output gating network 344 co-operating with the input network 342 and appropriate recirculation circuitry represented by the flow line 346. This recirculation is continued during the entire card reading process, the data taken from each row of the card being inserted in the appropriate locations in the recirculating channel as it is taken from the card.

The above described transfer of the data from the card into the recirculating channel takes place during an operational sequence designated as Sequence Four which terminates when the last of the data is placed in the recirculating channel.

Figure 30:
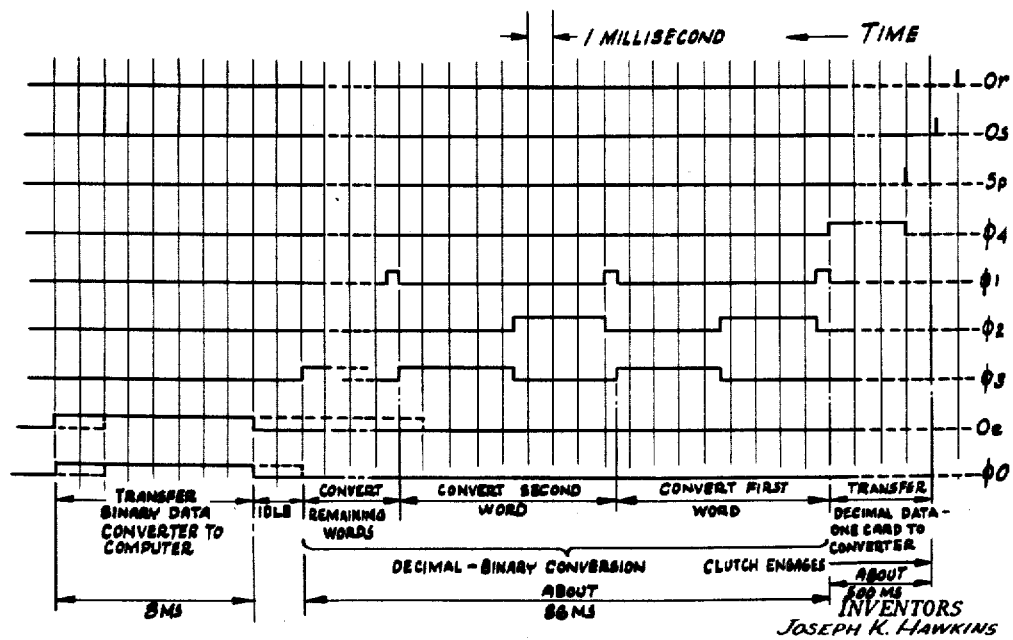
Figure 30 is a timing chart illustrating the relative times of occurrences of the various sequences and phases of the "read" cycle of operation.

Sequence Four lasts for about five hundred milliseconds as seen from the read cycle timing chart set out in Figure 30. In this figure as in other timing charts later referred to, time is considered as progressing to the left so that events indicated on the chart as lying to the left of a given point will be understood to occur after events indicated to the right of that given point. In Figure 30 the duration of Sequence Four is indicated by the line marked $\phi 4$ which indicates the operation of a sequence flip-flop $\phi 4$ which is fully described hereinafter. Reference to the line marked $\phi \underline{1}$ indicates that at the conclusion of Sequence Four the operation of the apparatus proceeds to a second phase herein designated as Sequence One.

Sequence One lasts for one word time during which the first word (word No. 0) in the recirculating channel is transferred into the recirculating registers, the routing of the signals being controlled by the gating network 344 and the circuitry indicated at 348 and 350 leading to the A register and B register input gating networks 352 and 354 respectively. During Sequence One the entire word is placed in recirculating register A and the first code group of the word is placed in recirculating register B. As will be made clear subsequently, the code groups are placed in each word space in the recirculating channel in inverse order with the most significant digit occupying the least significant position. As a consequence the digit represented by the first code group placed in recirculating register B is the most significant digit of the word.

At the conclusion of the above described transfer operation Sequence One goes off and Sequence Two comes on as is indicated in Figure 30 by the line $\phi 2$.

During Sequence Two, which lasts for seven word times, certain of the data contained in registers A and B are recirculated through co-operation of their respective output gating networks 356 and 358 with the associated input networks 352 and 354 and recirculation circuitry indicated at 360 and 362, while part of the data from both registers A and B are transmitted to an arithmetic unit 364 as indicated by the flow lines 366 and 368. The arithmetic unit operates to take the individual binary code groups (each representing a decimal digit) one by one and by suitable computation build up in recirculating register B a straight binary number having the same value as the binary coded decimal number originally placed in register A, the output from the arithmetic unit 364 being introduced into register B as indicated by flow line 370 through the input gating network 354. At the conclusion of the conversion operation Sequencie Two goes off and Sequence Three comes on as is indicated by the line $\phi 3$ in Figure 30.

Sequence Three lasts for nine word times, during the first eight of which the straight binary number contained in recirculating register B is recirculated through the route 358, 362, 354. During the ninth word time of Sequence Three the converted word is replaced in the recirculating channel through the output gating 358 and appropriate coupling as indicated at 372 to the input gating 342 for the recirculating channel.

It will at this point be observed that the converted word is replaced in the recirculating channel exactly sixteen word times after it was taken from the recirculating channel and placed in the recirculating registers. During this sixteen word times the magnetic memory drum has made one-half of a revolution disposing the first word space at the write head opposite to the read head from which it was initially taken. Thus, by supplying the converted word to the input which is alternate to the recirculating channel output from which it was initially taken, the converted word is written into the recirculating channel in exactly the same location as that originally occupied by the binary coded decimal word from which it was derived.

At the end of Sequence Three the second word in recirculating channel begins to pass under the alternate read head. At this time, as may be seen from Figure 30, the operation transfers to Sequence One so that the second word of the channel will be transferred to the recirculating registers A and B in exactly the same manner as was described above with reference to the first word. The second word is converted during Sequences Two and Three and replaced in the channel in converted form in the original location in the same manner. This operation continues until all of the numerical data has been so converted. During the time required to make the various conversions, all of the data contained in the recirculating channel is maintained by continuous circulation through the routing 344, 346, 342.

If an exchange order Oe has been given before all of the numerical data is converted, the operation transfers immediately to a fifth phase herein designated Sequence Zero immediately upon the conclusion of the conversion of the last of the numeral data, otherwise the machine idles in a sequence herein referred to as Sequence Blank (so designated because all of the sequence flip-flops are at this time in their "off" condition) until the exchange order Oe is received at which time the operation progresses to Sequence Zero. During Sequence Zero all of the data contained in the recirculating channel is transferred to the computer working channel Y/Z through the output gating 344 and as is indicated by flow line 374 in Figure 29. This transfer operation requires sixteen word times (about eight milliseconds). At the conclusion of the data transfer operation Sequence Zero goes off marking the end of the read cycle. The apparatus then idles in Sequence Blank until another or different cycle is initiated by appropriate computer commands.

From the foregoing it will be seen that the operation of the apparatus must co-ordinate the completely unrelated timing cycles of the card reading machine 103 and the digital computer 105. Such co-ordination requires the use of extensive basic timing circuitry, a full understanding of which is essential to a complete understanding of the operation of the data processing apparatus.

BASIC TIMING

Figure 31:
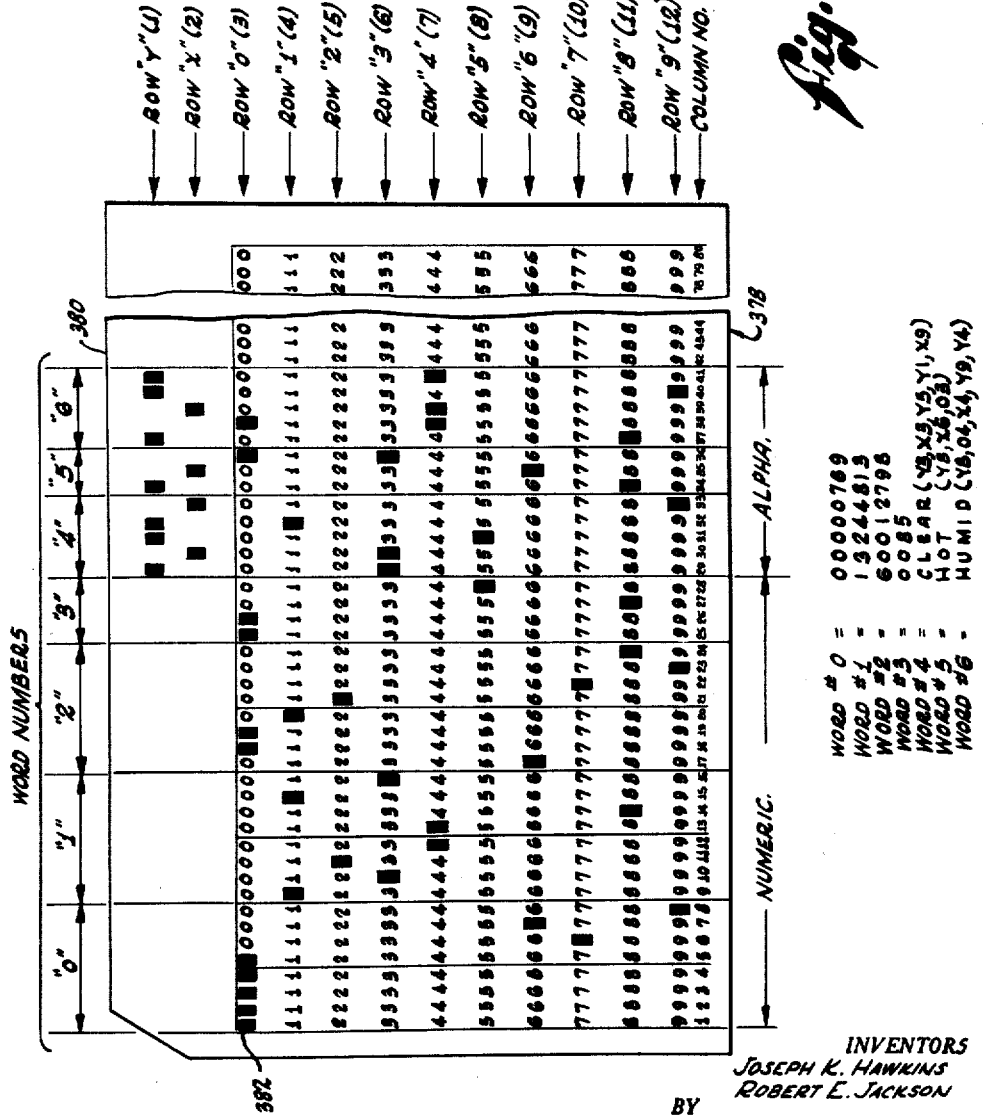
Figure 31 is a fragmentary drawing representative of a typical data carrier or punch card.

The timing conditions which must be met are imposed by the timing characteristics of the card machines 103, 104 on the one hand, and by the digital computer 105 on the other. The timing restrictions imposed by the card machines depend in part upon the arrangement and location of the data on the particular card and in part on the manner in which that card is processed by the card machine. In Figure 31 is illustrated a typical IBM card 378 which measures approximately seven and three-eighths inches wide by three and one-quarter inches high, the long horizontal edge marked 380 in Figure 31 being considered the top of the card. This edge is also the leading edge of the card as it is processed by the card machine, the cards being fed in the direction of their height with the upper edge 380 leading.

The width of the card is divided into 80 columns numbered 1 to 80 from left to right as indicated in the lower part of Figure 31. The particular column in which data is recorded by a punched hole represents the qualitative nature of the data as well as its denominational order. For example, in Figure 31 the first eight columns have been designated as representing word No. 0 constituting identifiable numeric information in which column No. 1 represents the most significant digit and column No. 8 represents the least significant digit.

The height of the card 378 is divided into twelve horizontal rows each separately designated for convenience as indicated at the right hand side of Figure 31. Rows Y and X are used solely for alphabetic information, row 0 is used for for alphabetic inormation and also to indicate the numerical quantity zero, when used alone in a given column. Rows 1 to 9 inclusive, when used individually in a given column, represent numerical data, and are used also in connection with rows Y, X, and 0 when two punches are made in a given column to code alphabetic data. In word No. 0 (columns No. 1 through No. 8) the decimal number indicated by the hole punched (the holes being represented by the black rectangles such as that marked 382) in word No. 0 is 00000769 as indicated in the tabulation below the figure.

Figure 32:
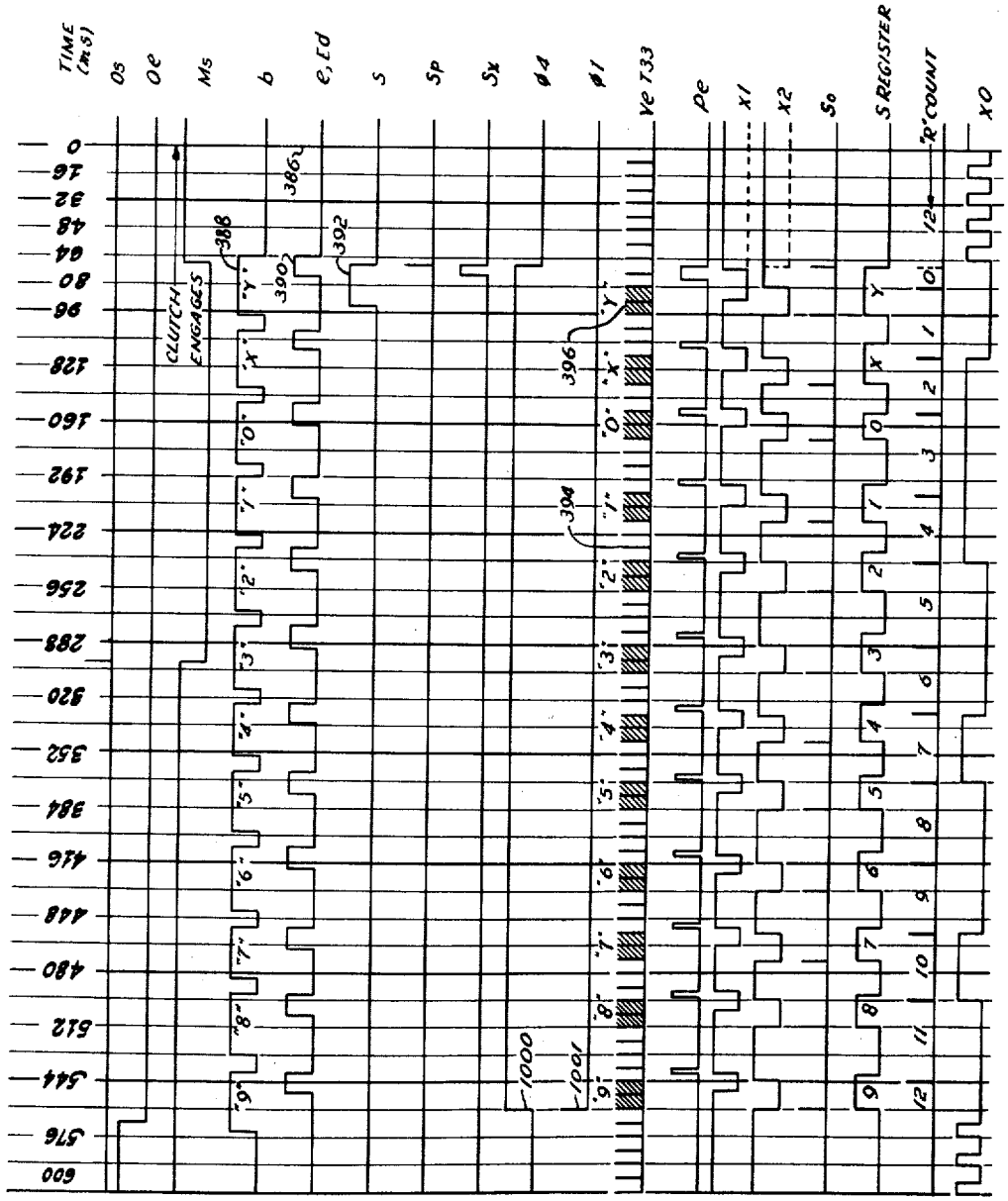
Figure 32 is a timing chart showing the times of occurrence of various functions and operations as they occur in Sequence Four of the "read" cycle.

The operating cycle of the card reading machine 103 is illustrated in a timing chart Figure 32 and is considered to begin at the time line 386 representing the time of engagement of the clutch 146 (see Figure 5). As soon as the clutch is engaged the card is started in its passage through the machine. About 64 milliseconds later the emitter pulse "e" comes on simultaneously with any of the data signals ($b1$ to $b80$) produced by holes punched in the Y row as is indicated at 390 and 388. About five milliseconds later (approximately 69 milliseconds after clutch engagement) the start signal "$s$" comes on as is indicated at 392.

The emitter pulse "$e$" lasts for 13 milliseconds whereas the information signals persist for about 35 milliseconds. An emitter pulse "$e$" is produced for each of the 12 rows of the card as are the information signals "$b$" for any rows having one or more holes punched therein. The start signal "$s$," on the other hand, lasts for about 25 milliseconds and then remains off until the next card is read.

From the above and by reference to Figure 32 it will be seen that there is an idle period of approximately 64 milli-seconds between the time of clutch engagement and the time the first information is read co-incidentally with the emitter pulse coming on. It will also be observed that while a card row is read every 43 milliseconds, there is an idle time of 30 milliseconds between consecutive emitter pulses.

It is during the 30 millisecond time between emitter pulses 390 that the data is transferred from the storage register to the recirculating channel J/L, an operation which requires one full revolution of the memory drum or 16 milliseconds. As a consequence, during the 30 millisecond period between emitter pulses 390 the timing is controlled by the computer. The apparatus must necessarily wait until the first word of the channel (word No. 0) is available either at the normal input or at the alternate input to the J/L channel as previously explained. Since word No. 0 will come under one or the other of these inputs in a maximum time of one-half drum revolution, the waiting period will never exceed eight milliseconds. The 22 milliseconds remaining before the next emitter pulse comes along, allows the 16 milliseconds required for the one working revolution of the memory drum and an idle time of not less than six milliseconds following the transfer of the data into the J/L channel.

The timed relationship between the emitter pulses 390 and the rotation of the memory drum is shown in Figure 32 wherein the line marked V$e$ T33 shows a series of pulses 394 having a duration of one pulse time and occurring every half revolution of the memory drum; i.e. eight milliseconds apart. As will be explained subsequently, the signal designation V$e$ T33 serves to mark the time at which word No. 0 becomes available, either at the normal input to the J/L channel or at the alternate input. In Figure 32 the cross hatched sections 396 extending over a time of 16 milliseconds between two pairs of timing pulses V$e$ T33 identify the "working" revolution of the memory drum; i.e. the one revolution during which the data is transferred from the storage register to the J/L channel. These hatched areas are marked Y, X, 0, etc. to indicate that it is the data from the correspondingly designated rows of the IBM card that is placed in the J/L channel during the identified working revolution.

From what has been said it will be apparent that certain timing signals derived from the digital computer will be required to identify the various word positions and various pulse times within each word. Such signals, which are supplied by the digital computer, are based upon permanently recorded timing and word number signals carried by the computer timing channel "F," one word of which is diagrammatically represented in Figure 33.

Figure 33:
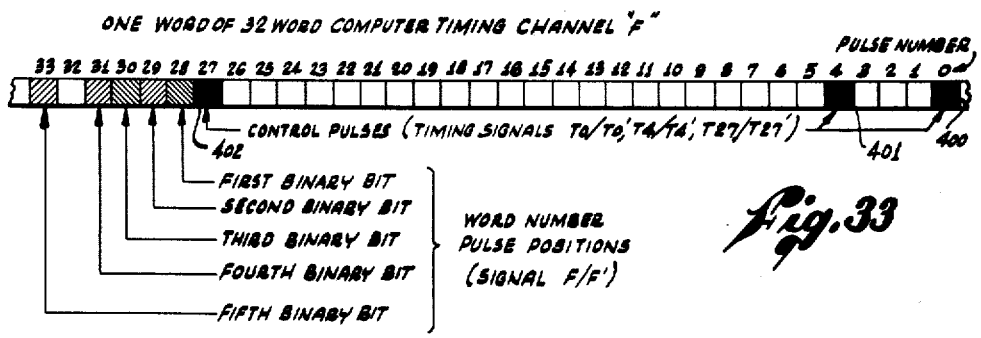
Figure 33 is a schematic representation of one word of a computer timing channel showing the locations of certain word number pulses and certain control pulses.

As is indicated in Figure 33 by the filled-in areas 400, 401 and 402 each word of the timing channel F has a timing pulse permanently recorded in pulse positions P0, P4 and P27. These recordings are of course sensed by the F channel read head F$r$ and by appropriate circuitry are separated from the other F channel signals and are separately transmitted to the converter-transducer as timing signals herein identified as T0/T0', T4/T4', and T27/T27', each of these signals occurring at the pulse times indicated and lasting for a single pulse duration.

The previously mentioned word number identification signals are recorded in pulse positions P28, P29, P30, P31, and P33 as is represented in Figure 33 by the cross hatched areas, 1's or 0's being recorded in these pulse positions according to a conventional binary numbering system with the bit in P28 being the least significant and the bit in P33 being the most significant bit of the binary number, the words being numbered from 0 to 31 (e.g. 0–0000 to 1–1111). Pulse position P32 is left blank as indicated in Figure 33 for reasons which will clearly appear hereinafter.

The word numbers above-described are permanently recorded in pulse positions P28–P31 and P33 of the word preceding the word which the number identifies. This, as also more fully appears hereinafter, permits a particular word to be selected and identified before the particular word so identified is reached in the series of words.

The aforementioned word number signals are read by the F channel read head F$r$ and, in the digital computer, are passed through appropriate read circuitry similar to that previously described with reference to the other read heads and the resulting word number signals are transmitted to the converter-transducer as signals F/F' which, it will be understood, do not include the timing signals produced by the pulses in P0, P4, and P27.

Timing signals T0/0', T4/T4', and T27/T27' are not only used directly in the converter-transducer but are used also to actuate certain timing flip-flops to provide timing pulses identifying pulse times P1, P28, P29, P30, P31, P32 and P33, such flip-flops being designated $\underline{T1}$, $\underline{T28}$, $\underline{T29}$, $\underline{T30}$, $\underline{T31}$, $\underline{T32}$ and $\underline{T33}$. In addition, two auxiliary timing flip-flops $\underline{X3}$ and $\underline{X4}$ are provided for generating signals identifying the time from pulse P29 through P33 inclusive, and from pulse P1 through P4 inclusive, such auxiliary timing flip-flops being designated $\underline{X3}$ and $\underline{X4}$.

The circuitry defining the control of the timing flip-flops is defined by the following logic equations:

$$T1 = T0\ C$$
$$T1' = T1\ C$$
$$T28 = T27\ C$$
$$T28' = T28\ C$$
$$T29 = T28\ C$$
$$T29' = T29\ C$$
$$T30 = T29\ C$$
$$T30' = T30\ C$$
$$T31 = T30\ C$$
$$T31' = T31\ C$$
$$T32 = T31\ C$$
$$T32' = T32\ C$$
$$T33 = T32\ C$$
$$T33' = T33\ C$$
$$X3 = T28\ C$$
$$X3' = T33\ C$$
$$X4 = T0\ C$$
$$X4' = T4\ C$$

Figure 34:
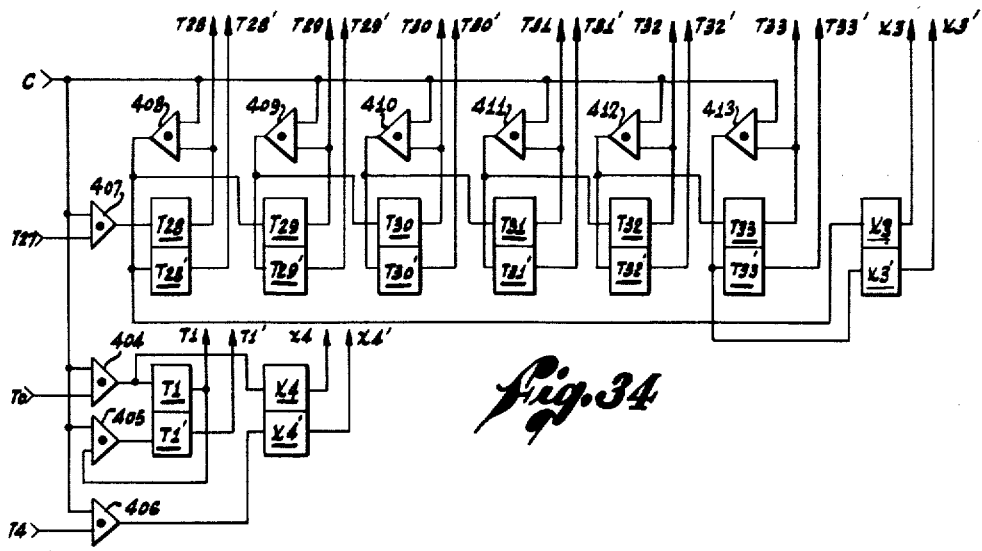
Figure 34 is a schematic diagram illustrating the circuitry for controlling the timing flip-flops.

The control circuitry for the timing flop-flops is presented schematically in Figure 34. As is shown therein flip-flops $\underline{T1}$ and $\underline{X4}$ are arranged to be turned on at the end of pulse time P0 by the output of an "and" gate 404 to which the clock signal C and timing signal T0 are applied as inputs as indicated. Flip-flop $\underline{T1}$ is turned off one pulse time later at the end of pulse P1 by an "off" side input signal taken from "and" gate 405 to which the clock signal C and the "true" output signal T1 of flip-flop T1 are applied as inputs. Flip-flop X4 is turned off at the end of pulse time P4 by an "off" side input signal taken from gate 406 in which the clock signal C and timing signal T4 are combined.

The clock signal C and timing signal T27 are combined in an "and" gate 407 the output of which is used to turn on flip-flop T28 at the beginning of pulse time P28. Its "true" output signal T28 is combined with the clock signal C in an "and" gate 408 and applied to the "off" side input of flip-flop T28 to turn the flip-flop off at the end of pulse P28. This signal is also applied to turn on flip-flop T29.

In a similar fashion flip-flop T29 is turned off and T30 is turned on by a control signal obtained by combining in an "and" gate 409 the "true" output signal T29 with the clock signal C. Flip-flops T30, T31, T32, and T33 are similarly controlled, each being turned on one pulse time later by the preceding flip-flop and being turned off by its own "true" output signal after it has been on for one pulse time, such signals being combined with the clock signal C in the gates marked 410, 411, 412 and 413.

Flip-flop X3 is turned on at the end of pulse time P28 by the same signal T28 C that is taken from the "and" gate 408 and used to turn off flip-flop T28. Flip-flop X3 is turned off at the end of pulse time P33 by the same signal T33 C that is produced by the "and" gate 413 and used to turn off flip-flop T33.

The manner in which the above-described timing and word identification signals are used in the control of the converter-transducer will become apparent as the description proceeds.

MACHINE SELECTION AND START CONTROL

As previously explained, the converter-transducer is arranged for automatic operation to respond to orders and commands contained in the internal program of the digital computer. As was previously mentioned and as is indicated in the timing chart Figure 30 by the lines marked Or and Os, the read cycle is selected and initiated by including in the computer program the orders Or and Os, which order signals are supplied as previously mentioned to the logic and control section of the converter-transducer.

The read order signal Or is used to select the card reading machine 103 and to set the logic and control section apparatus 114 for the logic and control functions associated with the read cycle. This control is exercised by a flip-flop U2 which responds to the read order signal Or and the punch order signal Op, by an auxiliary relay U1, and a transfer relay U according to the following logic equations:

$$(U)\ (\text{Relay}) = U1$$
$$(U1)\ (\text{Relay}) = U2$$
$$U2 = \phi 0'\ \phi 1'\ \phi 2'\ \phi 3'\ \phi 4'\ Op\ C$$
$$U2' = \phi 0'\ \phi 1'\ \phi 2'\ \phi 3'\ \phi 4'\ Or\ C$$

Figure 35:
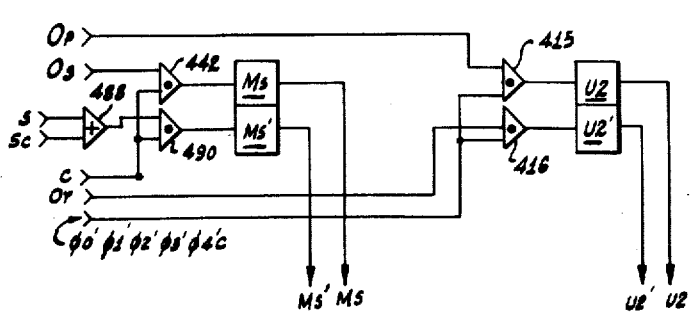
Figure 35 is a schematic diagram illustrating the circuitry controlling the machine selecting and start control flip-flops.
Figure 36:
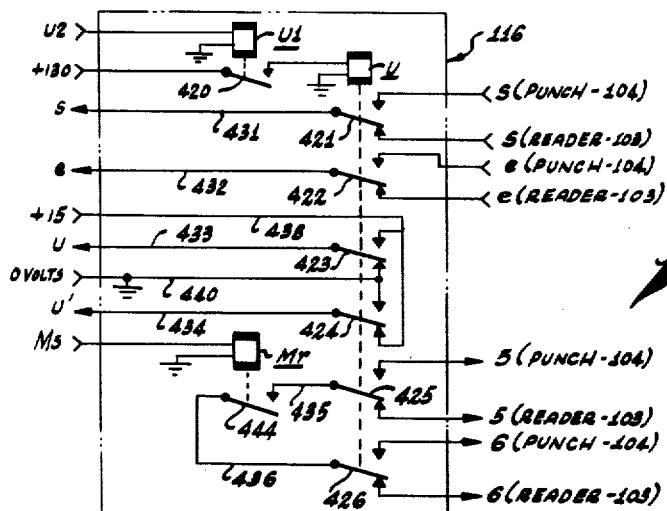
Figure 36 is a wiring diagram illustrating the circuitry employed in connection with the selector relays.

The above defined gating and control of the flip-flop U2 is illustrated in Figure 35 and the wiring for the transfer relays U1 and U is illustrated schematically in Figure 36. As may be seen, flip-flop U2 is arranged to be turned on by the punch order signal Op and is arranged to be turned off by the read order signal Or, these signals being applied to the true and false input terminals respectively of the flip-flop U2 through "and" gates 415 and 416. These gates each have another input; the signal configuration ($\phi 0'\ \phi 1'\ \phi 2'\ \phi 3'\ \phi 4'\ C$), the clock signal C serving to trigger the flip-flop as hereinabove explained, and the remaining terms serving to prevent actuation of the flip-flop unless the apparatus is in that operational idling phase previously referred to as Sequence Blank and identified by the off condition of the five sequence flip-flops $\phi 0-\phi 4$.

As is shown in Figure 36 the signal U2 is applied to the operating coil of the relay U1 so that relay U1 will be energized whenever flip-flop U2 is on and will be de-energized whenever flip-flop U2 is off. Normally open contacts 420 of the relay U1 are included in the power supply circuit for the actuating coil of the relay U as shown. As a consequence, both relay U1 and U will be energized whenever flip-flop U2 is in its "on" condition and will be de-energized in the "off" condition of flip-flop U2.

Relay U is the selector relay which selects the punch machine 0104 when the relay is energized pursuant to the punch order Op and which selects the card reader 103 when the relay is de-energized in accordance with the read order signal Or.

Relay U provides six sets of contacts comprising double throw switches 421–426, the movable members of which are connected to outgoing conductors 431–434 (extending to the logic and control section 114) and 435–436 which are internally connected as hereinafter described. In the energized condition of relay U, switches 421, 422, 425 and 426 serve to connect conductors 431, 432, 435 and 436 to the punch machine 104 and in the de-energized condition connect these conductors to the read machine 103. As is indicated in Figure 6, these conductors carry the start signal "s" and the emitter punch signal "e" and comprise the start control conductors 5, 6. Switches 423 and 424 are arranged as shown to connect conductor 433 to a +15 volt source 438 and to connect conductor 434 to ground as indicated at 440 in the energized condition of relay U and to reverse these connections in the de-energized condition, +15 volts then being applied to conductor 434 and ground being applied to conductor 433. Conductors 433 and 434 thus serve to carry logic signals U and U' respectively to the logic and control section 114 while conductors 431 and 432 serve to supply the start signal "s" and the emitter pulse signal "e" from the selected card machine.

It will be seen that in the read cycle presently under consideration the read order signal Or serves to turn off flip-flop U2 and de-energize relay U so that the start and emitter pulse signals "s" and "e" will be supplied by the card reading machine 103, and so that a signal U' will be sent to the logic and control section 114 by the energization of conductor 434.

The start order signal Os which follows the read order signal Or serves to place the card reader 103 in operation. This is effected by the energization of a clutch control relay Mr which is controlled by a starting flip-flop Ms in response to the start order signal Os as is defined by the following logic equations:

$$(Mr)(\text{relay}) = Ms$$
$$Ms = Os\ C$$
$$Ms' = s\ C + Sc\ C$$

The circuitry defined by the above equations is also shown in Figures 35 and 36. The start order signal Os is combined in an "and" gate 442 with the clock signal C and applied to the true input terminal out flip-flop Ms to trigger the flip-flop to its true condition upon receipt of the start order signal Os. As may be seen in Figure 36, the true output signal Ms is used to energize the coil of the clutch control relay Mr, which when energized, closes its normally open contact for 444 to interconnect conductors 435 and 436. Relay U being de-energized, this serves to connect conductor 5 of the card reader 103 to conductor 6, thus energizing the clutch control magnet to engage the clutch and place the machine in operation as was described in connection with Figure 5. About 69 milliseconds later the start signal "s" is produced (see pulse 392 of Figure 32). As is shown by the preceding logic equations and illustrated in Figure 35, the start signal "s" is applied through an "or" gate 488 to an "and" gate 490 where it is combined with the clock signal and used to turn off flip-flop M$s$ thus de-energizing the clutch control relay M$r$ and thereby de-energizing the clutch control magnet. However, as previously explained, the clutch is of the self-latching type and remains engaged until the end of the normal machine operating cycle is reached.

The signal S$c$ shown in Figure 35 as constituting a second input to the "or" gate 488 is a "clear" signal produced by the digital computer in response to the manual operation of depressing a "clear" button arranged to clear all registers, reset all circuits to specified initial conditons, etc.

Figure 37:
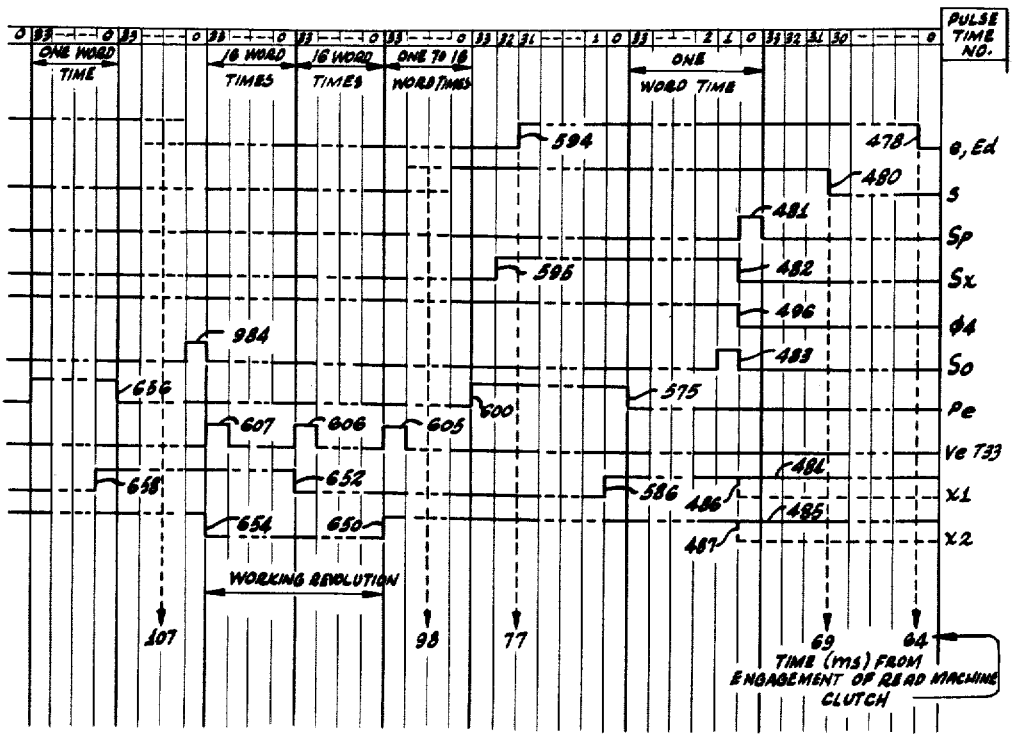
Figure 37 is a timing chart showing on an expanded time scale the relative times of occurrence of certain control functions taking place during the first 100 milliseconds of Sequence Four of the "read" cycle.

The events which take place during the first 100 milliseconds shown on Figure 32 (i.e. prior to transferring the data from the Y row of the card to the storage register) are represented to an expanded time scale in a timing chart Figure 37. As is shown therein, the emitter pulse "$e$," acting through a driver E$d$, cooperates with the start signal "s" to turn on a start pulse flip-flop S$p$ at the first P33 pulse time occurring following the beginning of the start pulse "s." The start pulse flip-flop S$p$ is turned on by the circuitry defined by the following partial logic:

$$Sp = U'sEdSx'T33C$$

The signal E$d$ in the above equation is supplied by an emitter pulse driver (E$d$) which operates to produce a "true" output signal E$d$ which is coextensive with the emitter pulse "$e$" during the read cycle as is shown by the following partial logic:

$$(Ed) = e\ U'$$

Figures 38, 39:
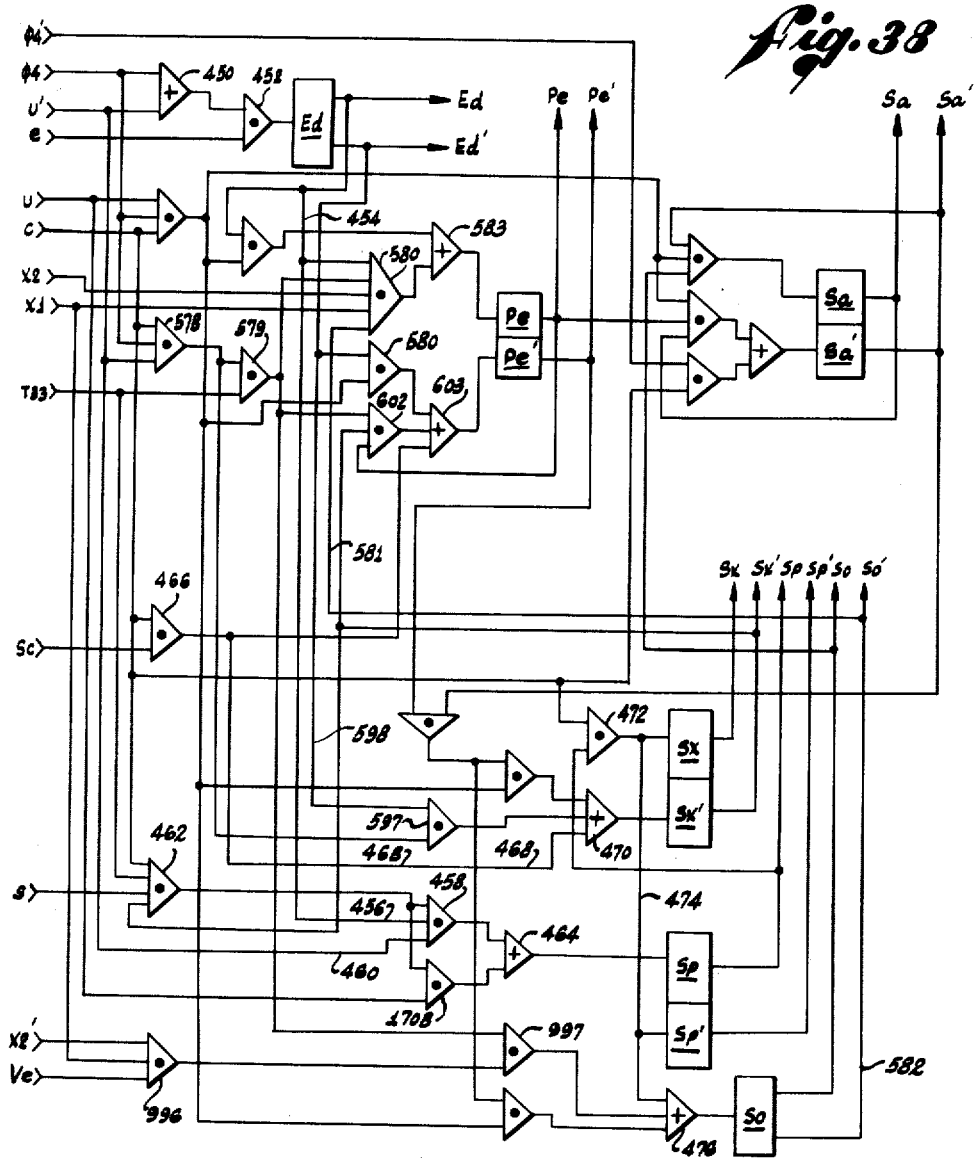
Figure 38 is a schematic diagram illustrating the circuitry employed in connection with the emitter and control pulse switching apparatus.
Figure 39 is a schematic diagram illustrating the circuitry controlling the auxiliary timing flip-flops X1 and X2.

The circuitry defined by the above equations is illustrated in Figure 38, wherein it is seen that the signal U' is passed through an "or" gate 450 and combined in an "and" gate 452 with the emitter pulse signal "$e$," the output of "and" gate 452 being used to control the emitter pulse driver (E$d$). The "true" output signal E$d$ is applied as indicated by conductors 454 and 456 to an "and" gate 458 where it is combined with the signal U' applied by conductor 460 with the output of an "and" gate 462. As may be seen from the drawing, the "and" gate 462 has four inputs comprising the signals S$x'$, C, T33, and "s." The output of "and" gate 458 is passed through an "or" gate 464 and applied to the "on" input terminal of the flip-flop S$p$. At the first pulse time P33 to occur after the start signal "s" comes on, start pulse flip-flop S$p$ will be turned on providing auxiliary flip-flop S$x$ is then off, a condition which is assured by the use of the "clear" signal S$c$ to turn S$x$ off as indicated by the following partial logic:

$$Sx' = ScC$$

As is shown in Figure 38, the signal S$c$ is combined with the clock signal C in an "and" gate 466 and the resulting coincidence signal S$c$C is applied as by conductor 468 and "or" gate 470 to the "off" input terminal of flip-flop S$x$.

Start pulse flip-flop S$p$ is allowed to remain on for a single pulse time only by turning it off at the next fall of the clock as is shown by the following "off" logic:

$$Sp' = Sp\ C$$

As is shown in Figure 38, the signal configuration S$p$ C of the above equation is obtained by combining the signals S$p$ and C in an "and" gate 472, the output of which is applied as indicated at 474 to the false input terminal of the flip-flop S$p$. The same signal configuration is applied to the "on" side of the auxiliary flip-flop S$x$ and through an "or" gate 476 to the one shot S$o$, serving to fire the one shot S$o$ and turn on flip-flop S$x$ at the same time that flip-flop S$p$ is turned off, as is indicated also by the following partial logic:

$$Sx = SpC$$
$$So = SpC$$

The timed relation of the above described events is shown in Figure 37 from which it may be seen that the emitter pulse driver signal E$d$ comes on about 64 milliseconds after engagement of the read machine clutch as is represented at 478. The commencement of the start signal "s" five milliseconds later is indicated at 480 and the one pulse duration of the signal S$p$ is shown at 481. As may be seen, this pulse occupies pulse time P0 at the end of which signals S$x$ and S$o$ come on as indicated at 482 and 483 respectively.

The one shot S$o$ is arranged as hereinafter described to clear the storage register to be in a condition to accept the first of the data from the IBM card. As previously mentioned the one shot is self-resetting and so goes off one pulse time later as is shown in Figure 37.

The pulse produced by the start pulse flip-flop S$p$ is also used to turn on two auxiliary timing flip-flops X1 and X2 as is shown by the following partial logic:

$$X1 = Sp\ C$$
$$X2 = Sp\ C$$

In many instances as is indicated by the solid lines 484 and 485 in Figure 37, flip-flops X1 and X2 will be already in their "on" conditions at the time of the start pulse S$p$. However, if they are in the "off" condition at this time they will be turned on as indicated by the dotted lines 486 and 487 according to the logic given above. The circuitry defined by this partial logic is illustrated in Figure 39 wherein it is shown that the signals S$p$ and C may be combined in an "and" gate 490, the output of which may be applied as indicated at 491 through an "or" gate 492 to the "on" input terminal of flip-flop X1 and as indicated at 493 through an "or" gate 494 to the "on" input terminal of flip-flop X2.

Another function which is effected by the start pulse S$p$ is that of putting the machine into that operational phase hereinbefore defined as Sequence Four by setting flip-flop $\phi$4 to the "on" condition and turning off all of the other sequence counter flip-flops as is defined by the following partial logic:

$$\phi 4 = Sp\ C$$
$$\phi 0' = Sp\ C$$
$$\phi 1' = Sp\ C$$
$$\phi 2' = Sp\ C$$
$$\phi 3' = Sp\ C$$
$$\phi x' = U'Sp\ C$$

Figure 40:
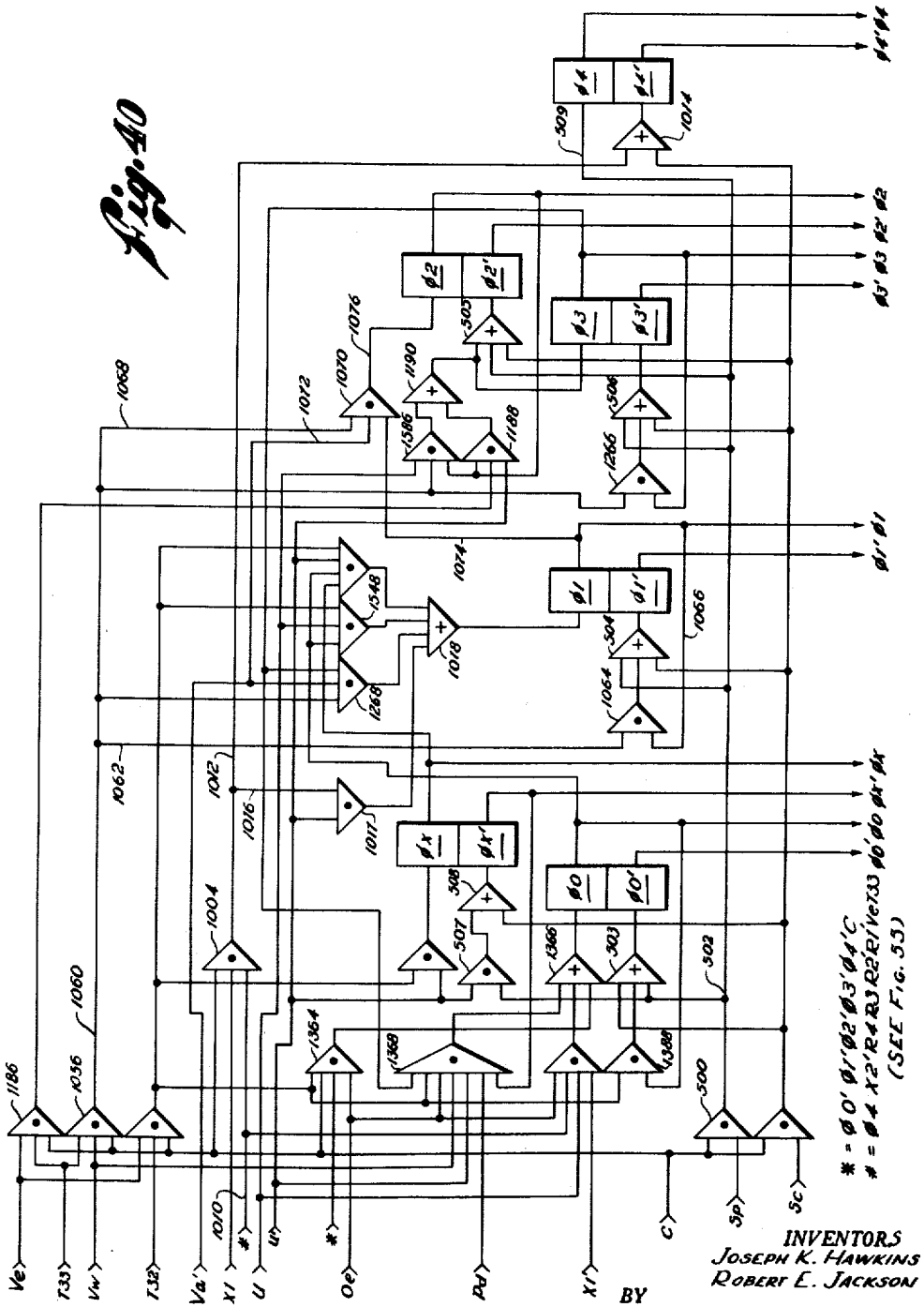
Figure 40 is a schematic diagram of the sequence counter.

The time at which sequence flip-flop $\phi$4 is turned on is indicated at 496 in Figure 37 and the circuitry defined by the above logical expressions is shown in Figure 40 which is a schematic diagram of the sequence counter. As is shown in the drawing the signals S$p$ and C are combined in an "and" gate 500 to provide the signal configuration S$p$ C to a bus 502 carrying the signal configuration to all of the flip-flops of the sequence counter. The signal is applied to the "off" input terminals of flip-flops $\phi$0 $\phi$1 $\phi$2 and $\phi$3 through respective input "or" gates 503, 504, 505, and 506. The signal is combined in an "and" gate 507 with the signal U' to provide a signal configuration U' S$p$ C which is passed through an "or" gate 508 to the "off" input terminal of the auxiliary flip-flop $\phi x$. The signal configuration $Sp$ C is applied directly from the bus 502 to the "on" input terminal of flip-flop $\phi 4$ as is indicated at 509.

By the means just described the sequence counter is set to the condition in which flip-flop $\phi 4$ is on and the other flips-flops are off, a condition which defines the operational phase known as Sequence Four. It is during this operational phase that the data is taken from the IBM card, encoded, and stored in the circulating channel J/L.

SEQUENCE FOUR

In the main the transfer operation which is effected during Sequence Four consists in transferring the data row by row from the IBM card into the recirculating channel J/L. The transfer of the data from each of the rows is accomplished in the same fashion, the data being first transferred from the card to the storage register during the time the card is being read, the transfer of the data from the storage register into channel J/L being accomplished during the 30 millisecond time between the reading of the individual rows.

Figure 41:
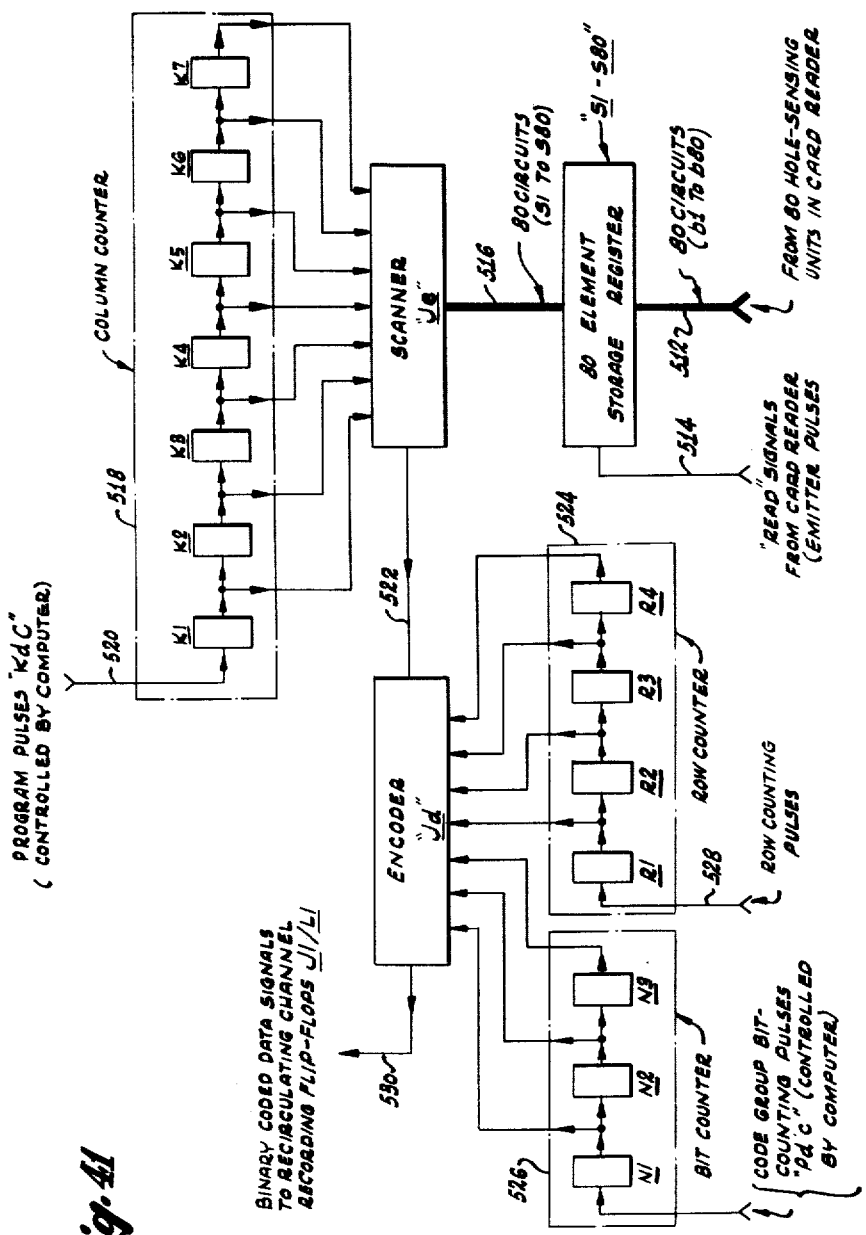
Figure 41 is a block diagram showing the functional inter-relation of the components operative during Sequence Four of the "read" cycle.

The apparatus utilized in these data transfer operations is schematically represented in block diagram form in Figure 41. As is shown therein, the 80 data transmission circuits carrying signals $b1$ to $b80$ are extended as indicated at 512 to the 80 element storage register comprising storage elements $\underline{S1}$ to $\underline{S80}$ inclusive. These storage elements are actually all set at the same time to correspond to the input data, the setting being effected by read signals derived from the aforementioned emitter pulses and applied to the storage register as indicated at 514.

After the emitter pulse goes off and at the appropriate time with reference to the rotational position of the memory drum the 80 elements of the storage register are scanned one at a time by the scanner $\underline{Ja}$, the storage element data being presented to the scanner $\underline{Ja}$ by the 80 circuits S1 to S80 indicated at 516 in Figure 41.

Each of the 80 elements of the storage register corresponds to one of the 80 card columns, and the scanner operates to test each storage element one at a time to ascertain whether data is stored therein. This step by step scanning is controlled by a column counter represented by the broken line 518 in Figure 41 and comprising flip-flops $\underline{K1}$ to $\underline{K7}$ inclusive. As will be explained subsequently, these flip-flops are arranged in a binary counting circuit and the seven outputs are applied as indicated in Figure 41 to the scanner wherein gating circuits are employed to take information only from the storage element numbered corresponding to the column number identified by the column counter setting. The column counter 518 counts from 1 to 80, being counted up one by each program control pulse which is applied as indicated at 520. As will be more fully explained hereinafter, these program control pulses serve to locate the data within the recirculating channel and therefore within the computer working channel as desired by the program author.

Each time the scanner $\underline{Ja}$ encounters a storage element conditioned to indicate that a hole has been punched in the corresponding column of the card, a signal is transmitted as indicated at 522 to the encoder $\underline{Jd}$. The encoder $\underline{Jd}$ is controlled by a row counter 524 comprising counting flip-flops $\underline{R1}$ to $\underline{R4}$ inclusive, and by a bit counter 526 comprising flip-flops $\underline{N1}$, $\underline{N2}$, $\underline{N3}$. The row counter counts from 1 to 12, being counted up one at the conclusion of the reading of each row by row-counting pulses applied as indicated as 528. Since the decimal value represented by any hole punched in the IBM card is determined by the row in which it is found, the row counter serves to set the encoder $\underline{Jd}$ to produce code groups having a corresponding value whenever called upon to do so by signals received from the scanner $\underline{Ja}$.

As previously explained, the code groups consist of four binary bits counting from 0 to 9 for numerical data, and including additional appropriately coded fifth and sixth bits whenever alphabetic information is being encoded. The 1's required for each of the six code group positions are generated by the bit counter 526 and through appropriate gating associated with the encoder driver $\underline{Jd}$ are selected at appropriate times to transmit on the output line 530, the binary coded data signals which are recorded in the recirculating channel. The bit counter 526 is counted up one for each clock pulse during the four or six pulse times which are designated for each code group by the program control pulses.

The above generally described sequence of operations is completed for each row during the 30 millisecond interval between emitter pulses and is repeated for each 12 rows of the card until all of the data is written into the recirculating channel J/L. This phase of the read cycle and the construction and operation of the various instrumentalities referred to is more fully described in the following sections of this specification.

*Transfer data from card to storage register.*—While a number of different types of storage elements may be used for the 80 element storage register, a preference is expressed for the grid controlled gas discharge tube of the type commonly known as a Thyratron because the use of such a tube permits the storage elements to be used also in the punch cycle as a power gate for controlling the punch magnets. An 80 element storage register utilizing Thyratron tubes is illustrated schematically in Figure 42 wherein is shown in detail the circuitry for storage elements S1 and S80, it being understood that the remaining 78 elements are of identical construction.

Figure 42:
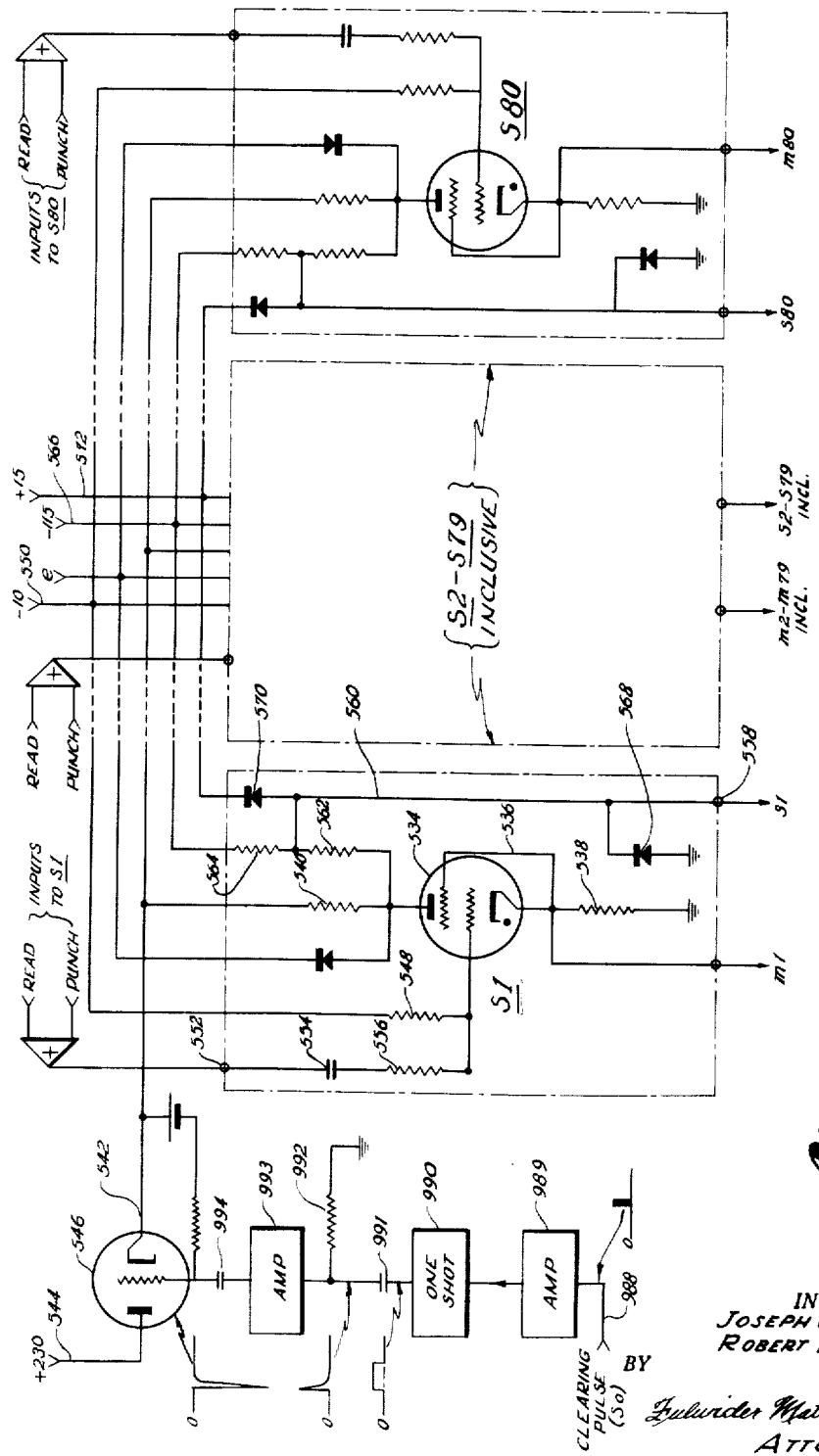
Figure 42 is a wiring diagram illustrating the circuitry employed in an 80 element storage register.

As is shown in Figure 42, each element of the storage register utilizes a Thyratron tube 534, preferably of the four element type having a shielded grid which is connected to the cathode as shown at 536. The cathode of the tube is connected to ground through a load resistance 538 and the plate is connected through a current limiting resistance 540 to a plate supply bus 542. The plate supply bus 542 is connected to a suitable source 544 of direct potential of about +230 volts through a high current capacity vacuum tube 546. As is explained hereinafter, the tube 546 is normally biased to pass a maximum current with a minimum voltage drop through the tube of the order of 100 volts. The control grid of the Thyratron 534 is normally biased negatively with respect to the cathode by connecting the grid through a suitable grid resistance 548 to an appropriate source of —10 volt direct potential represented at 550 in Figure 42.

Each register element ($\underline{S1}$ to $\underline{S80}$) is provided with an input terminal 552 to which the information signals from the card reader may be applied. This terminal is connected to the control grid of the Thyratron 534 through a coupling condenser 544 and a series resistance 556. The information signals are of the order of +15 volts and so serve to raise the grid of the tube to zero volts or above so as to fire the tube.

Each of the storage register elements is also provided with an output terminal 558 which is connected as by conductor 560 and resistance 562 to the plate of the Thyratron 534. This conductor is also connected through a resistance 564 to a suitable source of —115 volt direct potential as indicated at 566 in Figure 42.

When the Thyratron 534 is fired, the voltage at the plate falls from a relatively high positive value to a value of about 20 volts. The voltage on conductor 560 drops correspondingly from +15 volts to 0 volts, being limited to the values indicated by clamping diodes, one of which, diode 568, is connected between conductor 560 and ground and the other, diode 570, is connected between conductor 560 and a +15 volt source indicated at 572.

The register element output signals $\underline{S1}$ to $\underline{S80}$ are taken from the output terminals 558. In this connection it is to be observed that the Thyratron is fired by a hole in the punched card and that the fired condition of the Thyratron produces zero volts on the output terminal 558. Thus, an output signal of +15 volts represents the absence of a hole in the punched card whereas an output signal of zero volts represents a hole punched in the corresponding card column.

The Thyratrons are actually fired by applying to the input terminals 552, a +15 volt signal taken from an emitter pulse flip-flop $\underline{Pe}$ which is connected to the 80 input terminals through gating arranged to apply the signal only to those input terminals which are associated with those of the data conductors which are energized (the "b1 to b80 signals") to represent a hole punched in the corresponding card column in the row being read. This gating is defined generally by the logic equation:

$$(\underline{Si}) = U' \, \phi 4 \, bi \, Pe$$

where "$i$" goes from 1 to 80.

This general expression represents 80 logical equations, one for each of the 80 values that "$i$" may take. For example, the equation defining the input conditions for storage element $\underline{S9}$ is obtained by substituting the arabic numeral 9 for the "$i$" in the above expression thus:

$$(\underline{S9}) = U' \, \phi 4 \, b9 \, Pe$$

Figure 43:
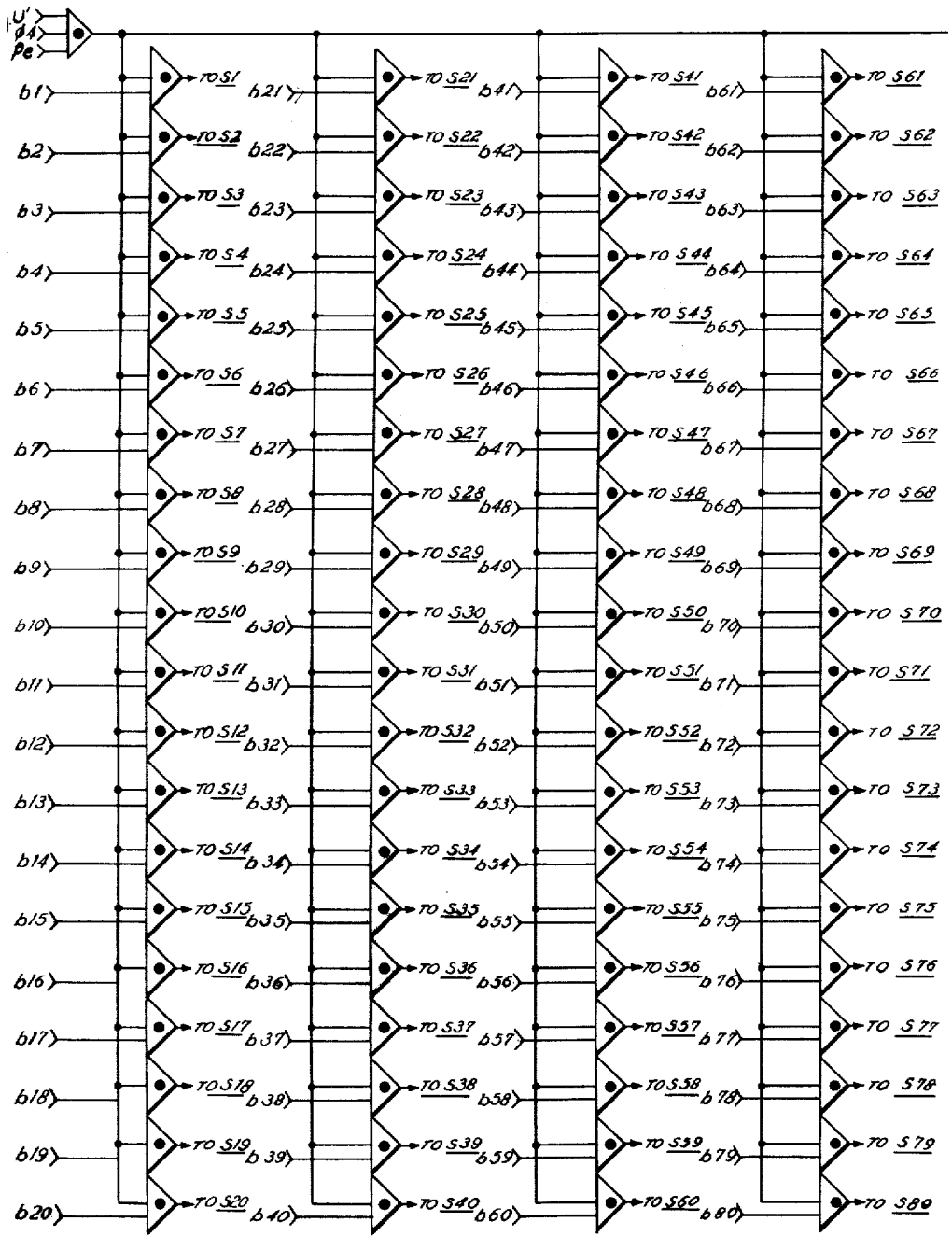
Figure 43 is a schematic diagram of the input circuitry operative during the "read" cycle for controlling the 80 element storage register.

For the complete logic defining the control of each of the 80 elements of the storage register, reference should be had to the section of the specification entitled Complete Logic wherein the logic is fully set forth for each of the 80 elements. The circuitry so defined is also shown in Figure 43. It will be seen that the arrangement is such that the gating conditions for passing the signal Pe to each of the register elements will be satisfied whenever an information signal (b1 to b80) is present. Accordingly, when the signal Pe comes on it will fire the Thyratrons of the register elements corresponding to the columns of the card in which a hole has been sensed by the hole sensing fingers, so that each hole punched in the card and the column in which it is found is represented by each Thyratron that is fired and the number thereof corresponding to the card column number.

The signal Pe is generated by a pulse emitter flip-flop $\underline{Pe}$ which is turned on by the emitter pulse driver at the end of the word time during which Sequence Four comes on. This time is indicated in Figure 37 at 575 and the circuitry for turning flip-flop $\underline{Pe}$ on is defined by the following logic equation:

$$Pe = U'\phi 4 \, X2 \, X1 \, So' \, Ed \, T33 \, C$$

The circuitry defined by the above logic is illustrated in Figure 38 which shows an "and" gate 578 as connected combine signals U', $\phi 4$, and the clock signal C to produce an output signal which in an "and" gate 579 is combined with the timing signal T33. The output of gate 579 is applied as one input to an "and" gate 580, the other inputs to which are the signal Ed taken from conductor 454, signals X2 and X1 applied as indicated and a signal So' taken from the "false" output of the one shot $\underline{So}$ as is indicated at 581 and 582. The output of the "and" gate 580 which corresponds to the signal configuration defined by the logic equation given above, is passed through an "or" gate 583 and applied to the "on" input terminal of the flip-flop $\underline{Pe}$.

It will be seen that at the end of the word time during which Sequence Four came on, all of the gating conditions defined by the logic for flip-flop $\underline{Pe}$ are met, flip-flops $\underline{X2}$ and $\underline{X1}$ having been previously turned on, as indicated at 486 and 487 in Figure 37, the one shot $\underline{So}$ having gone off because of the short time duration of its output signal, the emitter pulse driver signal Ed still being present because the emitter pulse has not yet gone off, and the final timing requirements T33 and C being supplied at the end of the mentioned word time.

When Pe comes on, it turns flip-flop $\underline{X1}$ off as indicated at 586 in Figure 37, this operation being effected by the circuitry defined by the following partial logic:

$$X1' = U' \, \phi 4 \, X1 \, Pe \, C$$

The circuitry defined by the above logic equation is illustrated in Figure 39 wherein signals $\phi 4$ and C are combined in an "and" gate 590, the output of which is applied to an "and" gate 591 to which there is applied also as inputs, signals U', Pe, and a signal X1 taken from the "true" output terminal of the flip-flop $\underline{X1}$ as indicated at 592.

The conditions just described endure until the emitter pulse "e" goes off approximately 77 milliseconds after the read machine clutch was engaged. This time is indicated in Figure 37 in the e, Ed line by reference character 594. Since the emitter pulse driver Ed follows the emitter pulse, its output signal Ed also goes to zero and the false output signal Ed' comes on. This signal serves to trigger flip-flop $\underline{Sx}$ to its "off" condition at the end of the next pulse time as is indicated in Figure 37 at 595. This is accomplished by the circuitry defined in the following logic equation:

$$Sx' = U' \, \phi 4 \, Ed' \, C$$

As is shown schematically in Figure 38, the signal configuration U' $\phi 4$ C may be taken from the "and" gate 578, and in an "and" gate 597 combined with a signal Ed' taken from the driver $\underline{Ed}$ as indicated at 598, the resulting output signal being applied to the "false" input terminal of the "flip-flop $\underline{Sx}$ through the "or" gate 470.

The "on" period of flip-flop $\underline{Sx}$ is used to clear channel J/L by turning flip-flops J1 and L1 off, as by means of the circuits defined by the following logic equations:

$$J1' = U' \, Sx \, C$$
$$L1' = U' \, Sx \, C$$

Figure 21:
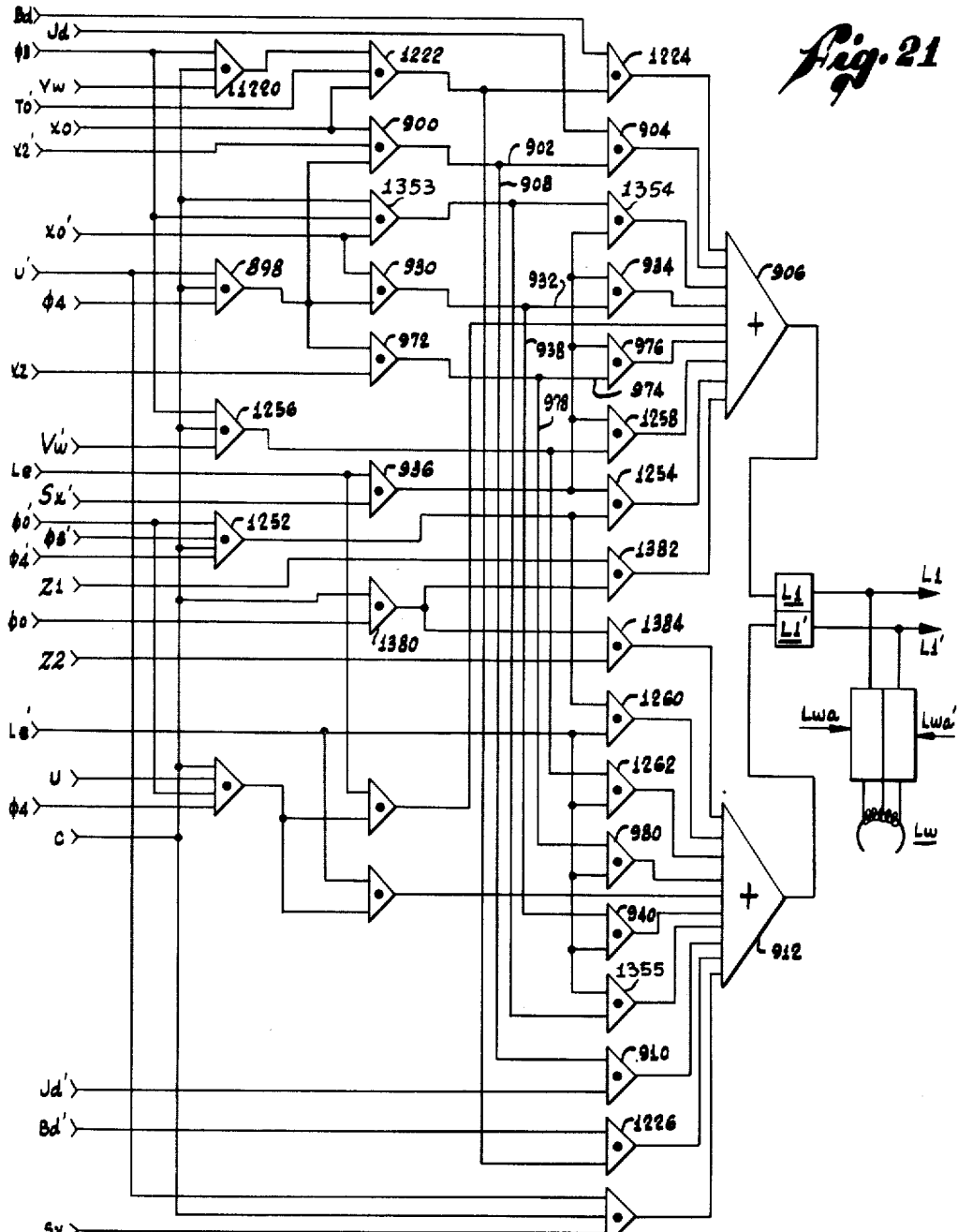
Figure 21 is a schematic diagram illustrating the write circuitry for the alternate input to the recirculating channel.

The circuits above defined, which are illustrated in Figures 20 and 21, cause "0's" to be recorded throughout the J/L channel, thus erasing all previous data.

As is indicated at 600 in Figure 37, the emitter pulse flip-flop $\underline{Pe}$ is turned off one pulse after flip-flop $\underline{Sx}$ goes off. This is effected by circuitry logically defined as follows:

$$Pe' = U' \, \phi 4 \, Pe \, Sx' \, T33 \, C$$

The above described circuitry is also illustrated in Figure 38 wherein, as is therein shown, the signal configuration U' $\phi 4$ T33 C produced by "and" gates 578 and 579 previously described is applied to an "and" gate 602 where it is combined with signals Pe and Sx' taken from the "true" and "false" output terminals respectively of the flip-flops $\underline{Pe}$ and $\underline{Sx}$. The output signal from gate 602 is passed through an "or" gate 603 and applied to the "false" input terminal of the flip-flop $\underline{Pe}$, thus triggering flip-flop $\underline{Pe}$ to its "false" condition.

The turning off of the pulse emitter flip-flop $\underline{Pe}$ as described, marks the end of the data transfer operation from the first or Y row of the punched card to the storage register. The machine then idles until word No. 0 becomes available at either the normal or alternate inputs to the J/L working channels.

*Encode and transfer data to recirculating channel.*—
It will be appreciated that since the card reading machine 103 and the digital computer 105 operate on entirely separate and independent timing systems, the length of the idle time between the end of the pulse P*e* (seen at 600 in Figure 37) and the time word No. 0 becomes available at either the normal or alternate input to the J/L channel will vary anywhere from one pulse time to sixteen word times. For this reason means is provided for determining and indicating the instant that the selected word (word No. 0 in Sequence Four) becomes available at one or the other of the recirculating channel inputs. This means comprises a comparison flip-flop V*e* which is so arranged and controlled as to be on at pulse time P33 only when word No. 0 becomes available at one or the other of the two inputs. The coincidence signals V*e* T33 marking the times of such availability are shown in Figure 32 and indicated by the reference character 394. In Figure 37 the first three V*e* T33 pulses to occur after the pulse P*e* goes off are shown at 605, 606 and 607.

Flip-flop V*e* is turned on at the end of the twenty-seventh pulse time (P27) in each word time, but is turned off before P33 in every case except words No. 0 and No. 16, as may be seen from the following partial logic:

$$Ve = T27\ C$$
$$Ve' = \phi 4(T28 + T29 + T30 + T31)F\ C$$

Since T27 comes on at pulse time P27 every word time, it will be seen that V*e* is turned on at the end of the twenty-seventh pulse of each word. It will also be seen that during Sequence Four flip-flop V*e* will be turned off before pulse time P33 if there is a signal F at any of pulse times P28, P29, P30 or P31. It will be recalled that the signal F provides the word number identification, the words being identified by a straight binary number in which the bit at pulse time P28 is the least significant bit. The only time that flip-flop V*e* will remain on until pulse time P33 is when the four lowest order bits of the word identification number are zeros. This condition obtains only in the cases of word No. 0 (0–0000) or word No. 16 (1–0000).

Since the word number signals are read by the F channel read head F*r* at a position corresponding to the normal input and output positions to the recirculating channel J/L, the V*e* T33 pulse occurring when the word No. 0 is read means that the word No. 0 is available at the normal input/output whereas the V*e* T33 pulse produced by reading word No. 16 means that word No. 0 is available at the alternate input/output.

Figure 45:
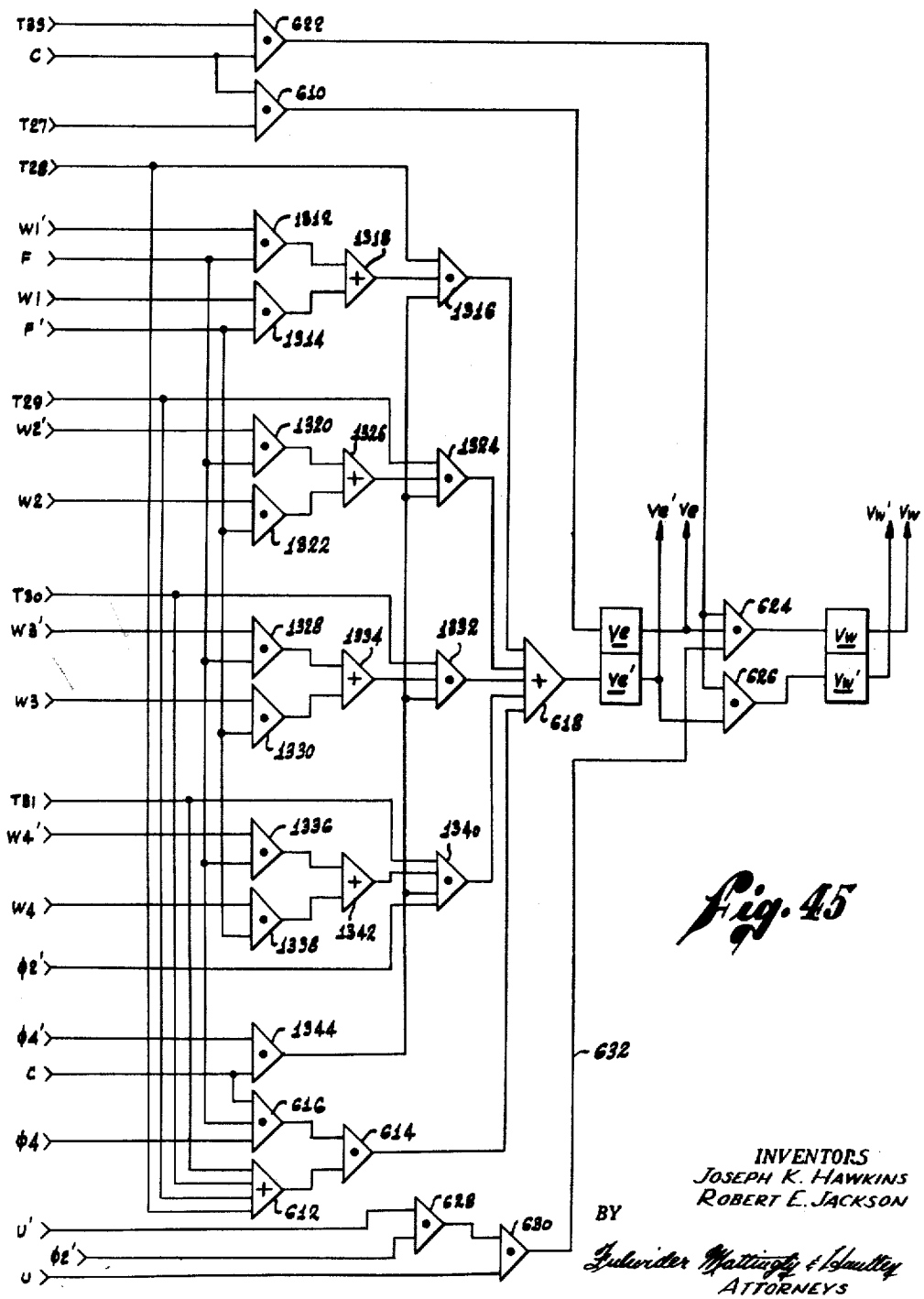
Figure 45 is a schematic diagram of the word selection apparatus.

The circuitry defined by the above logic equations is illustrated in Figure 45 from which it may be seen that signals T27 and C are combined in an "and" gate 610 and applied to the "on" input terminal of flip-flop V*e*. The signal configuration which is used to turn off flip-flop V*e* is obtained by applying the signals T28, T29, T30, and T31 to the four inputs of an "or" gate 612 to provide the signal configuration (T28+T29+T30+T31). The output of "or" gate 612 is applied as one input to an "and" gate 614, the other input of which comprises the signal configuration $\phi 4$ F C supplied by an "and" gate 616 to which the signals $\phi 4$, F, and C are applied as inputs. The output of gate 614 constituting the signal configuration given in the logic equation above for V*e*' is supplied by the gate 614 and passed through an "or" gate 618 to the "off" input terminal of flip-flop V*e*.

A selected word flip-flop V*w* is used in cooperation with the flip-flop V*e* to mark the selected word (word No. 0 or No. 16 in Sequence Four). Flip-flop V*w* is caused to be on for one word time coincident with the one word time of availability at the normal or alternate inputs or outputs to the J/L channel as may be seen from the following logic equations:

$$Vw = U'\ \phi 2'\ Ve\ T33\ C$$
$$Vw' = Ve'\ T33\ C$$

From the above equations it will be seen that V*w* will be turned on beginning with pulse P0 of words No. 0 and No. 16 immediately following the signal V*e* T33. The terms U' and $\phi 2'$ limit the operation to the read cycle and exclude the phase of operations known as Sequence Two. It will also be apparent that flip-flop V*w* will be turned off at the end of the word in which it is turned on since at the end of such word time (word No. 0 or No. 16), flip-flop V*e* must necessarily be off at pulse P33 because the word number read from the F channel is either 1 or 17. Thus, flip-flop V*w* is during Sequence Four of the read cycle caused to be "on" for one word time twice each revolution of the memory drum; once when word No. 0 is passing the normal input/output station, and again when word No. 0 is passing the alternate input/output station.

The circuitry defined by the above logic equations may be seen in Figure 45 wherein an "and" gate 622 is illustrated as combining signal T33 with the clock signal C, the resulting signal configuration T33 C being applied as one input to each of two "and" gates 624 and 626. "And" gate 624 controls the "on" input terminal of the flip-flop V*w* and has two other inputs; one comprising the signal V*e* taken from the true output terminal of flip-flop V*e*, and the other comprising the signal configuration U' $\phi 2'$ formed in an "and" gate 628 and passed through an "or" gate 630 and applied as an input to the "and" gate 624 as is indicated at 632.

"And" gate 626 controls the "off" input terminal of the flip-flop V*w*, and has in addition to the input signal configuration T33 C above described, a second input comprising the signal V*e*' taken from the false output terminal of the flip-flop V*e* as shown.

Figure 46:
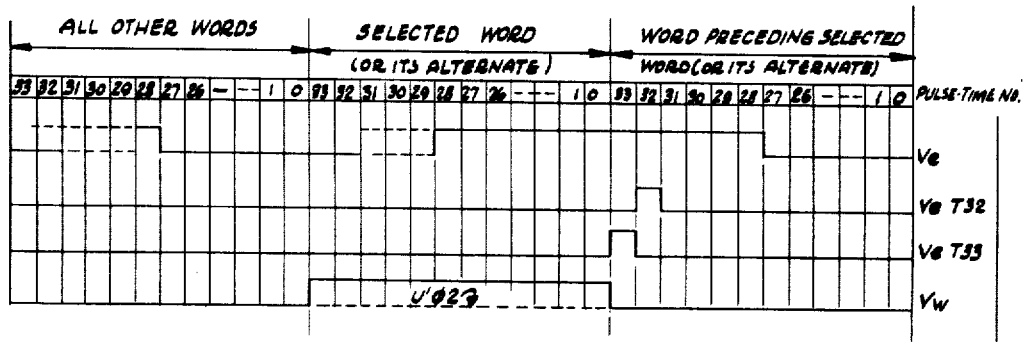
Figure 46 is a timing chart showing the functioning of the word selection apparatus during Sequences Zero, One, Two and Three.

As is more fully explained hereinafter in the operational sequences other than Sequence Four, flip-flops V*e* and V*w* coact with a word counter to select the word specified by the counter. The complete functioning of the flip-flops V*e* and V*w* and the control pulses V*e* T32 and V*e* T33 is delineated in a timing chart Figure 46 which sets forth also a tabulation of the word numbers during which flip-flop V*w* is on, these word numbers being tabulated as a function of the word counter setting and the particular sequence of operation.

While the first V*e* T33 pulse 605 (Figure 37) following the end 600 of pulse P*e* identifies the first time word No. 0 is available at either the normal or alternate input to channel J/L, it is necessary also to ascertain at which of such two inputs word No. 0 is available. This function is performed by a flip-flop X0 which is controlled by the most significant word number digit (in P33), being turned on if that digit is a "1" and being turned off if that digit is a "0," as is indicated by the following logic equations:

$$X0 = \phi 4(X2\ X1'\ So'\ Pe')Ve\ T33\ F\ C$$
$$X0' = \phi 4(X2\ X1'\ So'\ Pe')Ve\ T33\ F'\ C$$

At the V*e* T33 time, marked 605 in Figure 37, all of the specified gating conditions exist to cause the flip-flop X0 to be controlled by the F signal in accordance whether the digit represented thereby is a "1" or a "0." As may be seen from Figure 37, the terms enclosed in parentheses serve to distinguish the first V*e* T33 pulse 605 from such pulses occurring at other times such as 606, 607 and others.

Since the most significant word number digit will be a 0 for words No. 0 to No. 15 inclusive and a 1 for words No. 16 to No. 31 inclusive, it will be seen that an F signal at V*e* T33 time means word No. 16, whereas an F' signal at V*e* T33 time means word No. 0. Since the F signals identify the words with reference to the normal input/output position, it will be seen that flip-flop X0 will be turned off when the selected word (word No. 0 in Sequence Four) is available at the normal input/output station and will be turned on when the selected word is available at the alternate input/output station.

Figure 47:
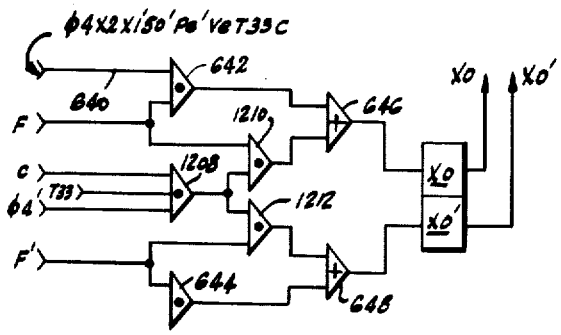
Figure 47 is a schematic diagram illustrating the circuitry used to control the normal-alternate input-output selector.
Figure 48:
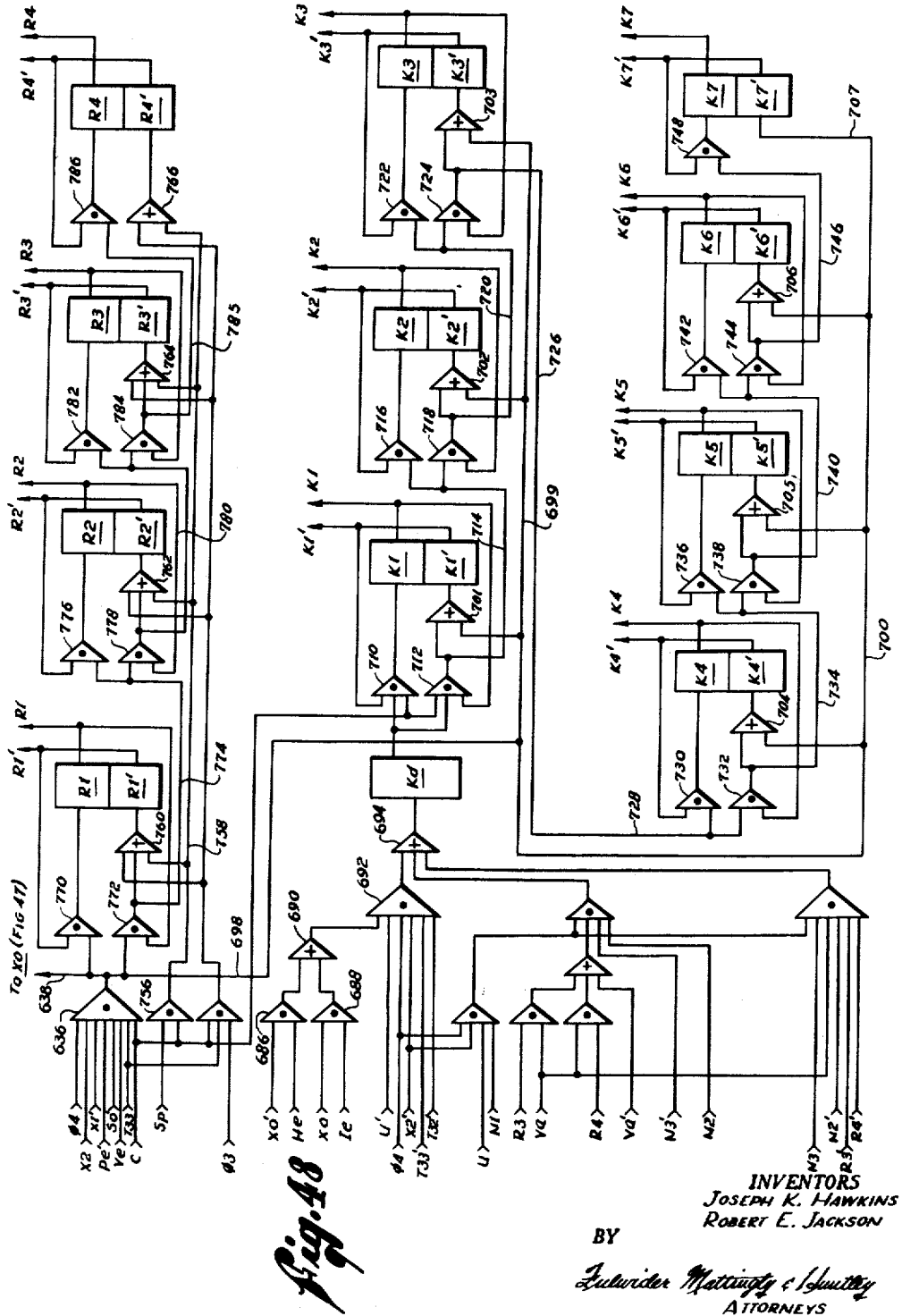
Figure 48 is a schematic diagram illustrative of a row counter and a column counter.

The circuitry defined by the above logic equations is illustrated in Figures 47 and 48. As is shown in Figure 48, an "and" gate 636 is used to combine signals φ4, X2, X1', P*e*', S*o*', V*e*, T33, and C to provide an output signal which is applied (as indicated at 638 in Figure 48 and 640 in Figure 47) to the input terminals of a pair of "and" gates 642 and 644. In "and" gate 642 signal configuration (φ4 X2 X1' S*o*' P*e*' V*e* T33 C) is combined with the signal F and passed through an "or" gate 646 for application to the "on" input terminal of the flip-flop X0, and in gate 644 it is combined with signal F' and passed through an "or" gate 648 for application to the "off" input terminal of flip-flop X0'.

As was pointed out above, the signal configuration (X2 X1' S*o*' P*e*') serves to distinguish the first V*e* T33 pulse 605 (Figure 37) to occur after the pulse P*e* goes off as indicated at 600. The signal V*e* T33 thus identified is therefore used to turn flip-flop X2 off to provide a signal configuration (X2' X1') marking the first half of the working revolution of the drum. Flip-flop X2 is turned off as indicated at 650 in Figure 37 by circuitry defined as follows:

$$\underline{X2'} = \phi 4(X2\ X1'\ Pe')Ve\ T33\ C$$

The next V*e* T33 pulse 606 (Figure 37) serves to turn X1 on as indicated at 652. This is accomplished by circuitry defined by the following logic equation:

$$\underline{X1} = \phi 4(X2'\ X1')Ve\ T33\ C$$

The resulting signal configuration (X2' X1) serves to identify the second 16 word times of the working revolution. This configuration terminates at the third V*e* T33 pulse 607 by turning on flip-flop $\underline{X2}$ as indicated at 654.

Flip-flop X2 is at this time turned on by circuitry defined as follows:

$$\underline{X2} = \phi 4(X2'\ X1)Ve\ T33\ C$$

The resulting signal configuration (X2 X1) endures until the emitter pulse flip-flop P*e* is turned on by the second or X row emitter pulse "*e*" as is indicated in Figure 37 at 656, flip-flop X1 being turned off one pulse later as is represented at 658, through circuitry which has already been described.

To summarize the foregoing explanation of the significance of the signals produced by flip-flops X1 and X2: configuration (X2 X1') identifies the period from the time the emitter pulse flip-flop P*e* comes on until the beginning of the working revolution; configuration (X2 X1' P*e*' S*o*') serves to identify the first V*e* T33 pulse to occur after the emitter pulse goes off; configuration (X2') marks the duration of the working revolution; configuration X2' X1' marks the first 16 word times of the working revolution; configuration X2' X1 marks the second 16 word times of the working revolution; and configuration X2 X1 marks the idle period from the end of the working revolution until the next emitter pulse comes on. The signal configurations are used extensively in the control of the other apparatus.

The circuitry defined by the foregoing logic equations is illustrated in Figure 39. As is shown therein, the previously mentioned "or" gate 492 controlling the "on" input of flip-flop X1 has a second input which is taken from an "and" gate 662. This gate has three inputs one of which, the signal configuration φ4 V*e* T33 C, is obtained by combining the output of "and" gate 590 with signals V*e* and T33 in an "and" gate 664. The second input to "and" gate 662 is the signal X2' taken from the false output terminal of flip-flop X2, as is indicated at 666, and the third input is the signal X1' which is taken from the false output terminal of flip-flop X1, as indicated at 668.

The previously mentioned "or" gate 494 which controls the "on" input to flip-flop X2 has a second input in addition to that previously described. This second input is taken from an "and" gate 670 in which the output of "and" gate 664 is combined with signals X1 and X2' taken from the true and false output terminals of the respective flip-flops X1 and X2, as is indicated at 672 and 674.

Flip-flop X2 is turned off by a signal configuration produced in an "and" gate 676 having four inputs: the output of "and" gate 664, signal P*e*' applied as indicated at 678, signal X1' taken from the false output terminal of flip-flop X1 as indicated at 680, and signal X2 taken from the true output terminal of flip-flop X2 as indicated at 682.

As previously mentioned, the first operation to be performed during the working revolution is the scanning of the eighty element storage register to ascertain which ones of the card columns have holes punched in them in the row currently being read. This scanning is controlled by the column counter 518 (Figure 41) which is in turn counted by certain program control pulses, thus permitting the program author to locate the various digits and code groups as required by the particular work being done by the digital computer. This phase of the program is controlled by recording in the computer control channel H/I, and will be described with reference to an assumed example.

Figure 31 which illustrates the IBM card shows various holes punched in each of the first 41 rows of the card. It is assumed that the data thus represented comprise four decimal numbers which are identified as words No. 0 to No. 3 by the indications at the top of the figure, the words consisting of three eight-digit numbers and one four-digit number having the values indicated in the tabulation below the figure. The card is also assumed to carry three words of alphabetic data identified by the indications at the top of the figure as words No. 4, No. 5, and No. 6, such words comprising a five-character word, a three-character word, and a five-character word having the significance indicated in the tabulation below the figure.

It is further assumed that it is the desire of the program author to have the numeric data represented by words Nos. 0, 1, 2, 3, on the IBM card appear in correspondingly numbered words of the computer working channel, and that the three words of alphabetic information, Nos. 4, 5, and 6, be placed in correspondingly numbered words of the computer working channel. It is also assumed that the program author desires the individual code groups in each word to begin with pulse P1 and to follow one after the other through the word until the last code group of the particular word is completed.

Figure 49:
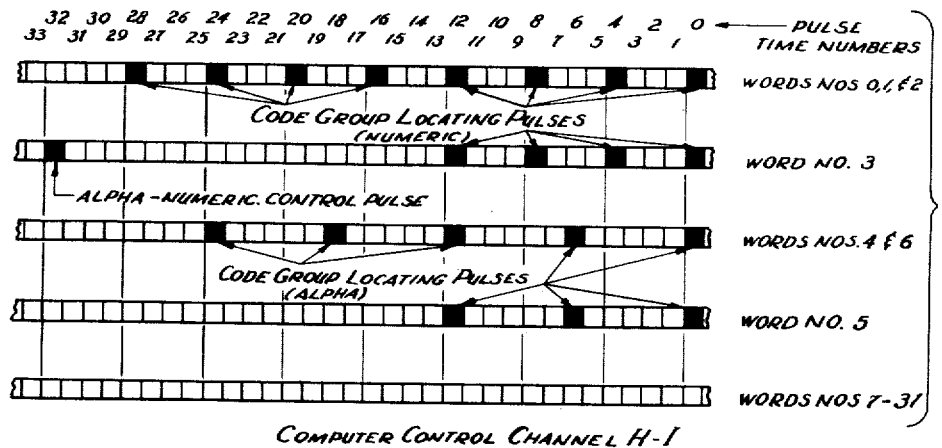
Figure 49 is a diagrammatic representation of selected portions of a computer control channel H/I illustrating the positioning of program control pulses corresponding to the data arrangement on the punch card illustrated in Figure 31.

As is shown in Figure 49, and in accordance with the above stated assumptions, code group locating pulses are recorded in each of pulses P0, P4, P8, P12, P16, P20, P24, and P28 for each of words No. 0, No. 1 and No. 2, thus marking off eight four-pulse code groups extending from P1 to P32 inclusive. Code groups locating pulses are also recorded at P0, P4, P8 and P12 of word No. 3 to place the four decimal digits of that number in the space P1–P16 inclusive. Code group locating pulses are also placed in P0, P6, P12, P18 and P24 of words No. 4 and No. 6 to provide five six-bit code groups extending from P1 through P30 for accommodating the five alphabetic characters. Similarly, in word No. 5, code group locating pulses are recorded at P0, P6 and P12 to provide three six-bit code groups extending from P1 to P18 inclusive to accommodate the three alphabetic characters of word No. 5.

In addition to the code group locating pulses abovementioned, there is also recorded in P32 of word No. 3 a control pulse identified in Figure 49 as comprising an alphabetic-numeric control pulse. As will be explained hereinafter, this pulse serves to mark the division between the numeric data and the alphabetic data. Until that control pulse is encountered the converter-transducer operates on numeric data. After that pulse is encountered, the data are processed as alphabetic. Regardless of the actual arrangement of data on the IBM card, the numeric data is handled as though it were all contained in columns having numbers lower than the lowest numbered column of alphabetic data, the patch panel 170 and patch cards 172 (Figure 5) being used to route the signals as required.

Computer control channel H/I is identical as to read circuitry with recirculating channel J/L previously described, providing normal output signals He and alternate output signals Ie. In addition, for reasons explained hereinafter, these same output signals are also delayed one pulse time in the computer, such delayed signals being made available to the converter-transducer as signals H1 and I1.

The code group locating pulses (control pulses in any pulse positions other than P32 or P33) are used to actuate a column counter driver $\underline{Kd}$, the output of which is used to drive the column counter 518 (Figure 41). During the working revolution (X2') of Sequence Four ($\phi 4$) of the "read" cycle (U'), except for pulse times P33 and P32 (T33' T32') the driver $\underline{Kd}$ follows control pulse signal He or Ie, depending upon whether word No. 0 is available at the normal input (X0') or at the alternate input (X0), as is indicated by the following logic equation:

$$(\underline{Kd}) = U' \ \phi 4 \ X2' \ T33' \ T32' \ (X0' \ He + X0 \ Ie)$$

The circuitry above defined is illustrated in Figure 48. Signals He and X0' are combined in an "and" gate 686 and signals Ie and X0 are combined in an "and" gate 688. The output of these two "and" gates constitutes the two inputs to an "or" 690, the output of which is applied to an "and" gate 692 along with signals U', $\phi 4$, X2', T33', and T32' as indicated in Figure 48. The output of "and" gate 692 is passed through an "or" gate 694 to the input terminal of the driver $\underline{Kd}$. The true output signal of the driver $\underline{Kd}$ is thus caused to be on for one pulse time coincidentally with each of the control pulse signals read from the control channel H/I. This relationship is shown in a timing chart Figure 50 wherein the control pulse times are shown for each of words No. 0, No. 3 and No. 4 in relation to various electrical signals including the output of driver $\underline{Kd}$ (see the line marked "$Kd-(U' \ \phi 4 \ X2')$").

As is represented at 518 in Figure 41, the column counter comprises seven flip-flops $\underline{K1}$ to $\underline{K7}$ arranged as a binary counter to count the control pulses $Kd$ delivered by the driver $\underline{Kd}$. All of the flip-flops of the column counter are initially turned off to correspond to a count of 0 by the signal configuration which marked the first Ve T33 pulse 605 (Figure 37) to occur after the emitter pulse goes off, as is represented by the following logic equation:

$$\underline{Ki'} = \phi 4 (X2 \ X1' \ Pe' \ So') Ve \ T33 \ C$$

where "i" goes from 1 to 7.

The circuitry so defined is illustrated in Figure 48 wherein it is seen that the mentioned signal configuration taken from "and" gate 636 is applied as indicated at 698, 699 and 700 to one input of each of six "or" gates 701, 702, 703, 704, 705, and 706, the output terminals thereof being connected to the false input terminals of flip-flops $\underline{K1}$, $\underline{K2}$, $\underline{K3}$, $\underline{K4}$, $\underline{K5}$ and $\underline{K6}$ respectively. The resetting signal configuration is applied directly to the false input terminal of flip-flop $\underline{K7}$ as is indicated at 707.

By reason of the circuitry just described, all of the flip-flops $\underline{K1}$ to $\underline{K7}$ are in their "off" conditions at the time of presentation of the first pulse $Kd$; i.e., at pulse time P0. The first $Kd$ pulse advances the column count to 1 beginning with pulse time P1. As is indicated by the timing chart Figure 50, this count endures for four pulse times; i.e., until the end of the second $Kd$ pulse in P4.

The circuit arrangement providing for this counting function by the flip-flops $\underline{K1}$ to $\underline{K7}$ is conventional, as is indicated by the following logic equations:

$$\underline{K1} = K1' \ Kd \ C$$
$$\underline{K1'} = K1 \ Kd \ C$$
$$\underline{K2} = K2' \ K1 \ Kd \ C$$
$$\underline{K2'} = K2 \ K1 \ Kd \ C$$
$$\underline{K3} = K3' \ K2 \ K1 \ Kd \ C$$
$$\underline{K3'} = K3 \ K2 \ K1 \ Kd \ C$$
$$\underline{K4} = K4' \ K3 \ K2 \ K1 \ Kd \ C$$
$$\underline{K4'} = K4 \ K3 \ K2 \ K1 \ Kd \ C$$
$$\underline{K5} = K5' \ K4 \ K3 \ K2 \ K1 \ Kd \ C$$
$$\underline{K5'} = K5 \ K4 \ K3 \ K2 \ K1 \ Kd \ C$$
$$\underline{K6} = K6' \ K5 \ K4 \ K3 \ K2 \ K1 \ Kd \ C$$
$$\underline{K6'} = K6 \ K5 \ K4 \ K3 \ K2 \ K1 \ Kd \ C$$
$$\underline{K7} = K7' \ K6 \ K5 \ K4 \ K3 \ K2 \ K1 \ Kd \ C$$

The circuitry defined by the equations given above is shown in Figure 48. As may there be seen, signal $Kd$, K1' and C are combined in an "and" gate 710 and applied to the "on" input terminal of flip-flop $\underline{K1}$. An "and" gate 712 is used to combine signals $Kd$, K1 and C for application through "or" gate 701 to the "off" input terminal of flip-flop $\underline{K1}$ and for application, as indicated at 714, to input terminals of "and" gates 716 and 718 associated with the "on" and "off" sides respectively of flip-flop $\underline{K2}$. In gate 716 the output of gate 712 is combined with a signal K2' and applied to the "on" input terminal of flip-flop $\underline{K2}$, while in gate 718 it is combined with a signal K2 to provide an output which is applied through an "or" gate 702 to the "off" input terminal of flip-flop $\underline{K2}$, and as indicated at 720, to the inputs of two "and" gates 722 and 724, associated with the "on" and "off" sides respectively of flip-flop $\underline{K3}$.

In gate 722, the output of "and" gate 718 is combined with a signal K3' for application to the "on" input terminal of flip-flop $\underline{K3}$, while in "and" gate 724 the output of gate 718 is combined with a signal K3 to provide a signal configuration which is passed through "or" gate 703 to the "off" input terminal of flip-flop $\underline{K3}$ and which is applied also as indicated at 726 and 728 to input terminals of two "and" gates 730 and 732 associated respectively with the "on" and "off" input terminals of flip-flop $\underline{K4}$. "And" gate 730 serves to combine the output of gate 724 with a signal K4' for application to the "on" terminal of flip-flop $\underline{K4}$. Gate 732 serves to combine the output of gate 724 with a signal K4 to provide an output signal which is passed through "or" gate 704 to the "off" input terminal of flip-flop $\underline{K4}$ and which is also applied, as indicated at 734, to the inputs of two "and" gates 736 and 738, associated respectively with the "on" and "off" sides of flip-flop $\underline{K5}$. The output of gate 732 is combined in gate 736 with a signal K5' for application to the "on" input terminal of flip-flop $\underline{K5}$, and it is combined in gate 738 with a signal K5 to provide an output signal which is passed through "or" gate 705 to the "off" input terminal of flip-flop K5 and which is also applied, as indicated at 740, to input terminals of two "and" gates 742 and 744, associated with the "on" and "off" sides, respectively, of flip-flop K6.

In "and" gate 742 the output of "and" gate 738 is combined with a signal K6' and applied to the "on" input terminal of flip-flop K6. In gate 744 the output of gate 736 is combined with a signal K6 to provide an output signal which is passed through "or" gate 706 to the "off" input terminal of flip-flop K6, and which is also applied as indicated at 746 to an "and" gate 748. The "and" gate 748 combines the output of gate 744 with a signal K7' to provide an output signal which is applied to the "on" input terminal of flip-flop K7. The column counter comprising flip-flops K1 to K7 scans the 80 element storage register, element by element, and through an appropriate gating network, controls the scanner Ja in such wise as to produce a signal Ja' for every storage element registering a hole in the punched card and to produce a signal Ja for those columns in which no hole has been punched.

The gating network operates only during Sequence Four of the read cycle to apply the storage register signals S1 to S80 to the input terminal of the driver constituting the scanner Ja whenever the column count defined by signals K7-K1 and their complements K7'-K1' correspond to the number of the register signal, a signal S1 to S80 of +15 volts serving to turn on the driver Ja to provide an output signal Ja and a signal of zero volts representing a hole punched in the card serving to produce from Ja the data indicating signal Ja'.

The circuitry defining the gating controlling the scanner driver Ja is defined by the following general logic expression:

$$(Ja = U'\phi 4[f1(K)S1 + f2(K)S2 + \ldots + f80(K)S80]$$

where:

$fn(K) = (K7 + K7')(K6 + K6')(K5 + K5')(K4 + K4')(K3 + K3')(K2 + K2')(K1 + K1')$; a binary number having a value equal to "$n$" in which $Ki = 1$ and $Ki' = 0$, "$i$" being any digit from 1 to 7.

Figure 51:
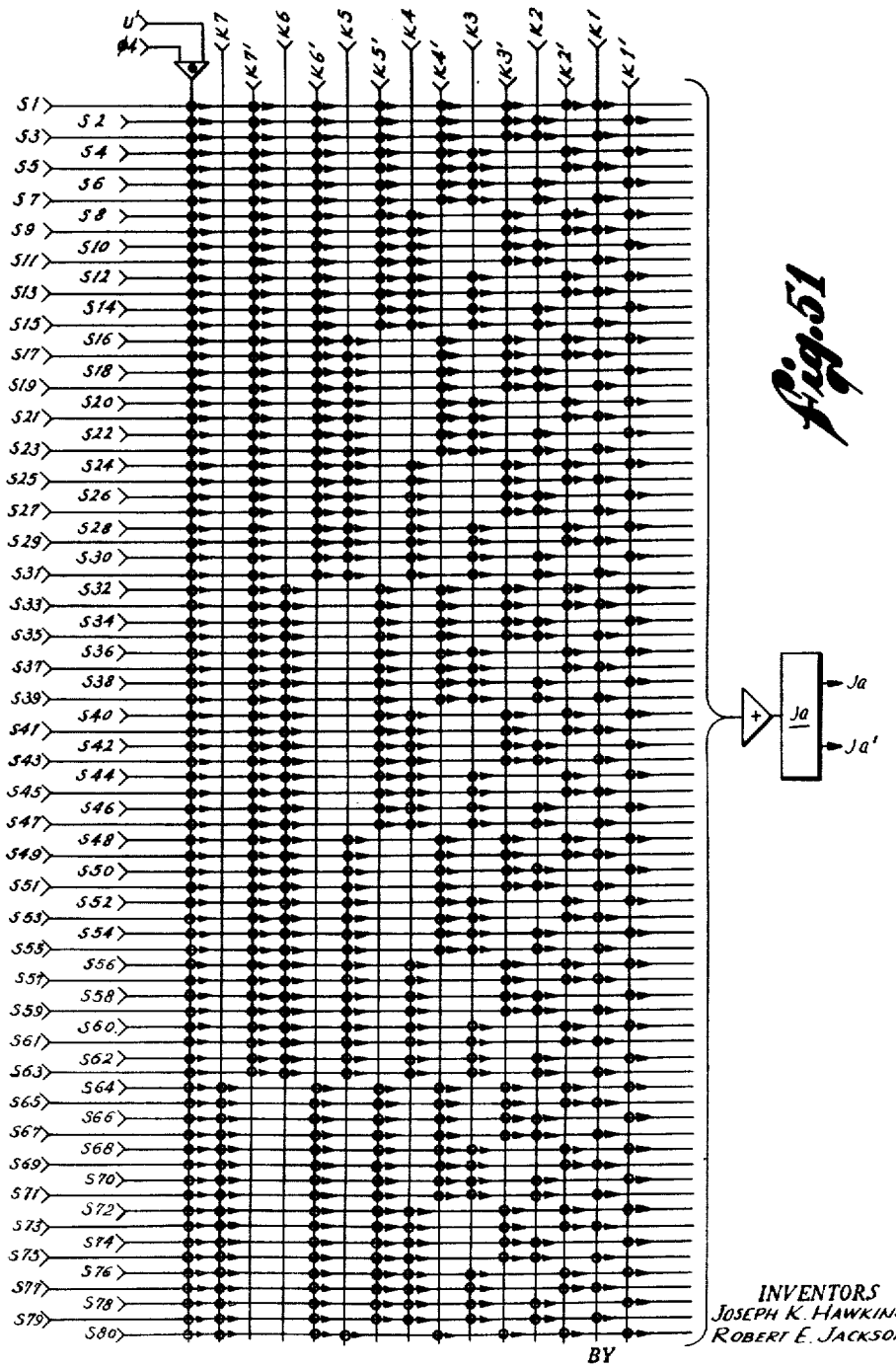
Figure 51 is a schematic diagram of the scanning circuitry used during the "read" cycle to scan the 80 element storage register.

The 80 terms of the logical equation above generally represented will be found set forth fully in the section of this specification entitled Complete Logic. The gating circuitry so defined is also illustrated schematically in Figure 51.

It will be noted that the column counter holds each count for a period of four or six pulses (from the end of one K$d$ pulse to the end of the next) and that as a result the signals Ja and Ja' have a duration of not less than four or six pulse times, depending upon whether it is numeric or alphabetic information that is being transferred.

To relate the above generally described operation of the scanner driver Ja to the assumed example, reference to Figure 31 shows that word No. 0 comprising columns No. 1 through No. 8 of the card have punched therein holes corresponding to the eight digit decimal number 00000769. To consider only this first word, it will be seen that when that data was transferred to the 80 element storage register as previously described, elements S1 to S8 will be left in their off conditions during the reading of rows Y, X, 1, 2, 3, 4, 5, and 8. In reading row 0, elements S1, S2, S3, S4, and S5 will be turned on. When row 6 is read element S7 will be turned on. When row 7 is read element S6 will be turned on, and when row 9 is read element S8 will be turned on.

Since the scanning and encoding of the data is handled in the same way regardless of the particular row being read except for the association of the numerical value with the row number, let it for the moment be assumed that row 6 has been read so that storage register element S7 is fired and elements S1 through S6 and S8 are off. As a consequence, signals S1 through S6 are +15 volts, S7 is zero volts and S8 is +15 volts. As a consequence, the driver scanner Ja will produce a "true" output signal Ja for column counts of 1 through 6; i.e. during pulse times 1 to 24 inclusive.

At a "K" count of 7, signal S7 will be zero volts so as to produce from Ja an output signal Ja' during pulse times 25 through 28. At a "K" count of 8 the S8 signal is +15 volts so as to produce from Ja the high output signal Ja during pulse times 29–32.

The information-representing signals Ja' are used to actuate the encoder comprising driver Jd as controlled by the row counter 524 and the bit counter 526 (Figure 41). The row counter 524 comprises four flip-flops R1, R2, R3 and R4 arranged in a conventional binary counting circuit, being counted up one as each row of the card is read. Flip-flops R1–R4 are all turned off prior to the scanning and encoding operation by the start pulse S$p$ in accordance with the following logic:

$$\overline{R1'} = Sp\ C$$
$$\overline{R2'} = Sp\ C$$
$$\overline{R3'} = Sp\ C$$
$$\overline{R4'} = Sp\ C$$

The row counter is thus set to zero at the start of the card reading operation. It is counted up one to a count of 0001 by the V$e$ T33 pulse 605, first occurring after the pulse P$e$ goes off (see Figure 37). This particular V$e$ T33 pulse is identified by the signal configuration ($\phi$4 X2 X1' P$e$' S$o$' V$e$ T33). As was pointed out, this signal configuration marks the beginning of each working revolution and is accordingly used as the counting pulse to advance the row count by one as each row of the card is read. The circuitry for so advancing the row counter is defined by the following logic equations:

$R1 = \phi 4(X2\ X1'\ Pe'\ So'\ Ve\ T33)R1'\ C$
$\overline{R1'} = \phi 4(X2\ X1'\ Pe'\ So'\ Ve\ T33)R1\ C$
$R2 = \phi 4(X2\ X1'\ Pe'\ So'\ Ve\ T33)R2'\ R1\ C$
$\overline{R2'} = \phi 4(X2\ X1'\ Pe'\ So'\ Ve\ T33)R2\ R1\ C$
$R3 = \phi 4(X2\ X1'\ Pe'\ So'\ Ve\ T33)R3'\ R2\ R1\ C$
$\overline{R3'} = \phi 4(X2\ X1'\ Pe'\ So'\ Ve\ T33)R3\ R2\ R1\ C$
$\overline{R4} = \phi 4(X2\ X1'\ Pe'\ So'\ Ve\ T33)R4'\ R3\ R2\ R1\ C$ The circuitry above defined is illustrated in Figure 48. Signals S$p$ and C are combined in an "and" gate 756 to apply to a bus 758 the clearing signal configuration (S$p$ C). The signal is applied from the bus 758 to the "off" input terminal of each of flip-flops R1, R2, R3 and R4 through "or" gates 760, 762, 764 and 766 respectively.

The counting pulse configuration ($\phi$4 X2 X1' P$e$' S$o$' V$e$ T33 C) is produced in the "and" gate 636 previously described and applied to the inputs of two "and" gates 770 and 772, associated respectively with the "on" and "off" sides, of flip-flop R1. In gate 770 the output of gate 636 is combined with a signal R1' and applied to the "on" input terminal of flip-flop R1; in gate 772 it is combined with a signal R1 to provide an output signal which is applied through "or" gate 760 to the "off" input terminal of flip-flop R1, and which is applied as indicated at 774, to the input terminals of two "and" gates 776 and 778, associated with the "on" and "off" sides, respectively, of flip-flop R2.

In "and" gate 776 the output of gate 772 is combined with a signal R2' and applied to the "on" input terminal of flip-flop R2. In gate 778 the output of gate 772 is combined with a signal R2 to provide an output signal which is passed through "or" gate 762 to the "off" input terminal of flip-flop R2 and which is also applied, as indicated at 780, to the input terminals of two "and" gates 782 and 784, associated respectively with the "on" and "off" sides of flip-flop R3.

In gate 782, the output of gate 778 is combined with a signal R3' and applied to the "on" input terminal of flip-flop R3. In gate 784 the output of gate 778 is combined with a signal R3 to provide an output signal which is passed through "or" gate 764 to the "off" input terminal of flip-flop R3 and which is also applied as indicated at 785 to an "and" gate 786 in which it is combined with a signal R4' and applied to the "on" input terminal of flip-flop R4.

By the circuitry above described the row counter is cleared before the first row of the card is read and is counted up one as each row of the card is read, a row count of "1" corresponding to row Y, "2" corresponding to row X, "3" corresponding to row 0 and "4"–"12" corresponding to rows 1–9 respectively. The outputs from flip-flop R1 represent the least significant digit of the count and the outputs of flip-flop R4 represent the most significant digit.

The bit counter 526 comprising flip-flops N1, N2 and N3 is arranged to count up one for each clock pulse occurring after a program control pulse, and to be cleared to zero by each such control pulse. Thus, the "N" count goes from "0" to "3" for a four bit code group and "0" to "5" for a six bit code group. The gating control signal which is used to permit the counter to be actuated by the clock signal between control pulses is produced by a pulse driver Pd. This driver is controlled by the control pulse signals He and Ie and its control during Sequence Four is identical with that previously explained in connection with the driver Kd, as may be seen from the following logic equation:

$$(Pd) = \phi 4 \ X2' \ T33' \ T32' (X0' \ He + X0 \ Ie)$$

Figure 52:
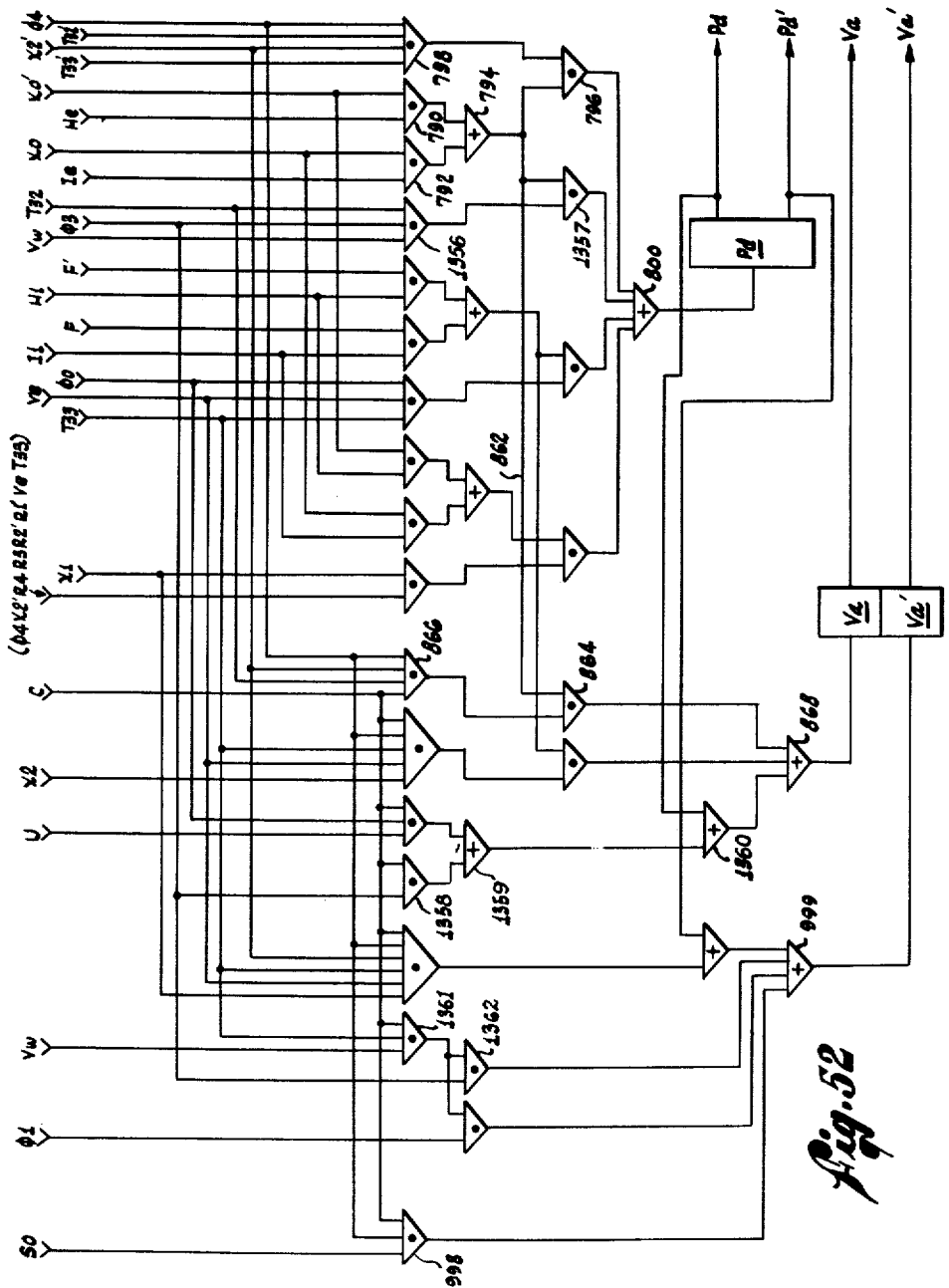
Figure 52 is a schematic diagram of the alphabetic-numeric control pulse driver and flip-flop.

The circuit defined by the above logic is illustrated in Figure 52. Signals He and X0' are combined in an "and" gate 790 and signals Ie and X0 are combined in an "and" gate 792. The outputs from the gates 790 and 792 are passed through an "or" gate 794 to one input of an "and" gate 796 where they are combined with the output of an "and" gate 798 in which signals $\phi 4$, X2', T33', and T32' are combined. The output of "and" gate 796 is passed through an "or" gate 800 to the input terminal of the pulse driver Pd.

The action of the pulse driver Pd is illustrated in the timing chart, Figure 50, by the line marked "Pd—($\phi 4$)." For reasons which will appear hereinafter, the bit counter is initially set to a count of 111 by turning on each of the the flip-flops N1, N2 and N3 by the start pulse Sp as is indicated by the following logic equations:

$$N1 = Sp \ C$$
$$N2 = Sp \ C$$
$$N3 = Sp \ C$$

The circuits for the flip-flops N1, N2 and N3 are arranged so that each "true" output signal Pd of the pulse driver Pd will turn all of the flip-flops off to give a count of 000 at the pulse following the control pulse (i.e. for bit No. 0 of each code group). This is accomplished by the circuit arrangement defined by the following logical expressions:

$$N1' = \phi 4 \ Pd \ C$$
$$N2' = \phi 4 \ Pd \ C$$
$$N3' = \phi 4 \ Pd \ C$$

Figure 50:
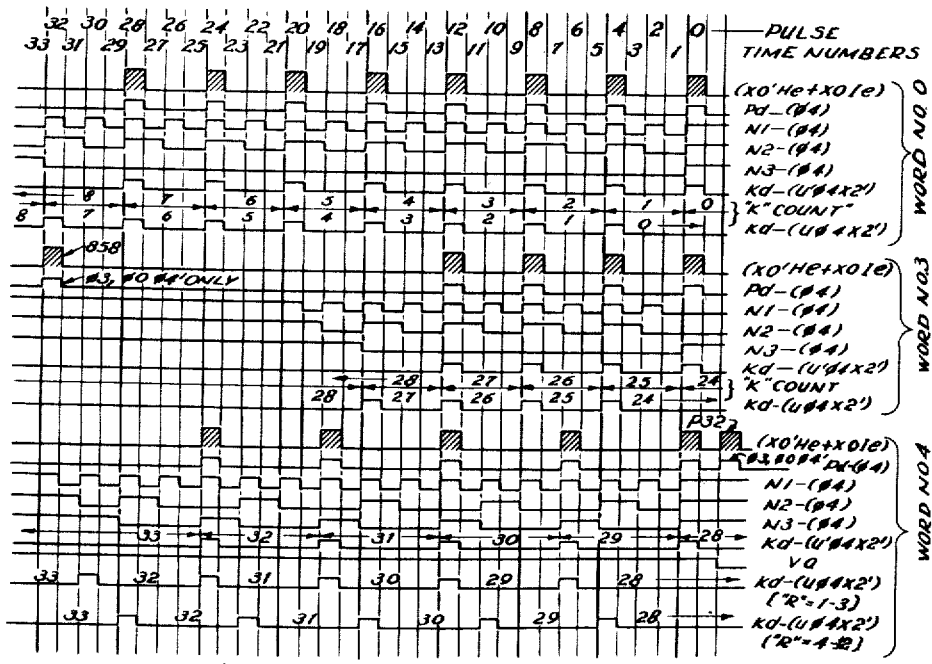
Figure 50 is a timing chart for word numbers zero, three and four of the punch card illustrating the functioning of the program control punches in controlling a bit counter and the column counter.

This action is illustrated in the timing chart Figure 50, where the condition of flip-flops N1, N2 and N3 is indicated by the lines correspondingly marked.

The bit counter is arranged to count up one at each clock pulse during the pulse times between control pulses; that is, during the time the pulse driver Pd is off producing an output signal Pd'. The circuitry for the counter is arranged to make flip-flop N1 represent the least significant bit of the count and to cause the counter to lock up at a count of 111 when all three flip-flops are turned on, as is indicated by the following logic equations:

$$N1 = \phi 4 \ Pd' \ N1' \ C$$
$$N1' = \phi 4 \ N2' \ N1 \ C + \phi 4 \ N3' \ N1 \ C$$
$$N2 = \phi 4 \ Pd' \ N2' \ N1 \ C$$
$$N2' = \phi 4 \ N3' \ N2 \ N1 \ C$$
$$N3 = \phi 4 \ Pd' \ N3' \ N2 \ N1 \ C$$

Two terms are used in the logic defining the control of the "off" input terminal to N1 to make the counter stall when it reaches a count of 111.

Figure 53:
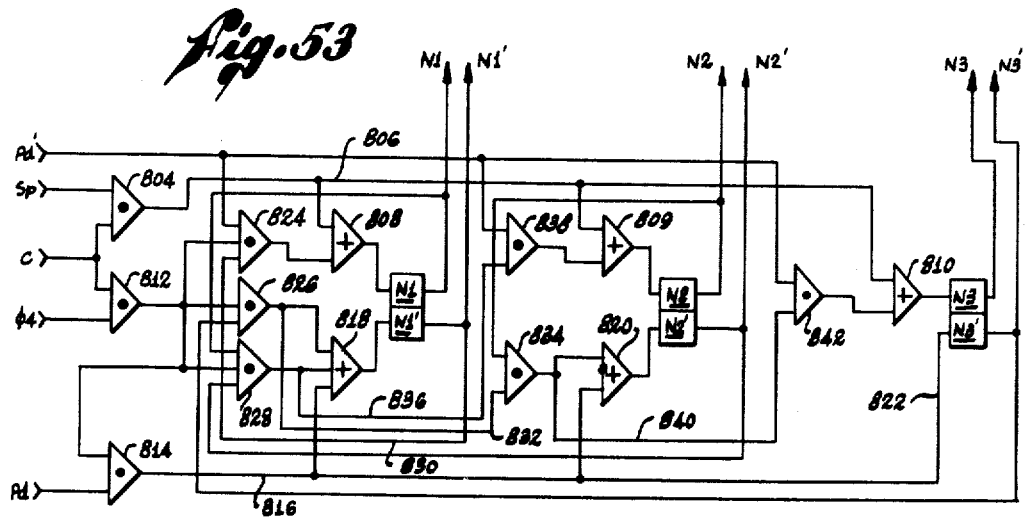
Figure 53 is a schematic diagram of a bit counter.

The circuitry defined by the above logic equations for flip-flops N1, N2 and N3 is illustrated schematically in Figure 53. As is illustrated therein, signals Sp and C are combined in an "and" gate 804 to provide the setting signal configuration (Sp C) which is carried by a bus 806 and applied through "or" gates 808, 809, and 810 to the "on" input terminals of flip-flops N1, N2, and N3, respectively.

The clearing signal configuration ($\phi 4$ Pd C) is obtained by combining signals $\phi 4$ and C in an "and" gate 812 and combining the output thereof with the signal Pd in an "and" gate 814. The output of "and" gate 814 is carried by a bus 816 and applied through "or" gates 818, 820, and directly as indicated at 822 to the "off" input terminals of flip-flops N1, N2, and N3, respectively.

The output of "and" gate 812 is applied as an input to an "and" gate 824 associated with the "on" side of flip-flop N1 and also as an input to each of two "and" gates 826 and 828, both associated with the "off" side of flip-flop N1. In gate 824, the output of gate 812 is combined with a signal Pd' and a signal N1' taken from the "false" output terminal of flip-flop N1 as indicated at 830, the output of gate 824 being passed through the "or" gate 808 to the "on" input terminal of flip-flop N1.

In gate 826, the output of gate 812 is combined with a signal N1 and a signal N3' taken from the "true" and "false" output terminals of flip-flops N1, and N3, respectively. The output of gate 826 is passed through "or" gate 818 to the "off" input terminal of flip-flop N1 and also as is indicated at 832 is applied as an input to an "and" gate 834 associated with the "off" side of flip-flop N2. In "and" gate 828 the output from gate 812 is combined with a signal N1 and with a signal N2' taken from the "true" and "false" output terminals of flip-flops N1 and N2, respectively. The resulting output signal is passed through gate 818 to the "off" input terminal of flip-flop N1 and is also applied as indicated at 836 as an input to an "and" gate 838 associated with the "on" side of flip-flop N2.

In gate 834 the output of gate 826 is combined with a signal N2 to provide an output signal which is passed through the "or" gate 820 to the "off" input terminal of flip-flop N2 and which also is applied as indicated at 840 to one input of an "and" gate 842 associated with the "on" side of flip-flop N3.

In gate 838 the output of gate 828 is combined with the signal Pd' and passed through the "or" gate 809 to the "on" input terminal of flip-flop N2. In gate 842 the signal Pd' is combined with the output of gate 834 and the resulting coincidence signal is passed through "or" gate 810 and applied to the "on" input terminal of flip-flop N3.

With the arrangement described the bit counter thus serves to count up one each pulse time from an initial count of 000 at the first pulse following the code group locating pulse to a maximum count of 111 unless sooner reset to 000 by a following code group pulse and pulse driver signal P$d$.

The way in which the bit counter and row counter cooperate to control the response of the encoder driver $\underline{Jd}$ to code the incoming information signals $\underline{Ja'}$ is best explained with reference to the logic equations. While the complete logic includes terms relating to the recirculation of the binary coded data in the J/L channel and relating to the coding of alphabetic information, these considerations will be deferred in favor of a present consideration of the binary coding of decimal information. The partial logic for the driver $\underline{Jd}$ relating to the coding of decimal information is as follows:

Row value $(\underline{Jd}) = U'\phi 4\ Ja'[(R4'\ R3\ R2'\ R1')(N3'\ N2'\ N1')$ ---- 1
$+(R4'\ R3\ R2'\ R1)(N3'\ N2'\ N1)$ ---------- 2
$+(R4'\ R3\ R2\ R1')(N3'\ N2')$ -------------- 3
$+(R4'\ R3\ R2\ R1)(N3'\ N2\ N1')$ ---------- 4
$+(R4\ R3'\ R2'\ R1')(N3'\ N1')$ ------------ 5
$+(R4\ R3'\ R2'\ R1)(N3'\ N2'\ N1+N3'\ N2\ N1')$ 6
$+(R4\ R3'\ R2\ R1')(N3'\ N1'+N3'\ N2'\ N1)$ -- 7
$+(R4\ R3'\ R2\ R1)(N3'\ N2\ N1)$ ----------- 8
$+(R4\ R3\ R2'\ R1')(N3'\ N2\ N1+N3'\ N2'\ N1')]$ 9

The above equations define nine separate inputs to the driver $\underline{Jd}$ each operable in Sequence Four of the read cycle to apply the data signal $Ja'$ to the input terminal of the driver $\underline{Jd}$ whenever the gating requirements represented by the two sets of parenthetical expressions in each term are satisfied. The "R" signals enclosed by the first parenthesis of each term are taken from the row counter and correspond to counts of "4" to "12" inclusive representing the nine numerical data rows of the IBM card having decimal values from one to nine as indicated in the row value column appearing at the right of the above equations. As a consequence only one of the nine input circuits to driver $\underline{Jd}$ is operative during any one working revolution; i.e., the one in which the row count conditions are actually met by the setting of the row counter flip-flops. Thus, during the working revolution devoted to encoding the data taken from the fourth row of the card, at which time the row count stands at "4" (0100), the only input circuit that can be operative to actuate the driver $\underline{Jd}$ is the first set of terms in the above logic equations. In a similar fashion when the fifth row of the card is read and the data taken therefrom is to be encoded, the only input to the driver $\underline{Jd}$ that can be operative during that working revolution is that containing the "R" signals representing a count of "5" (0101); i.e., the second "or" term of the above logic equation.

It will be recalled that when numerical data is being processed, the data indicating signal $Ja'$ (whenever it occurs) endures for at least four pulse times. It is the office of the encoder driver $\underline{Jd}$ and its input gating to break this $Ja'$ signal up into a four bit code group of "0's" and "1's" to correspond to the numerical value represented by the card row just read. This is the function performed by the bit counter and the gating defined by the second parenthetical signal configuration in each term of the above logic equation, the "and" signal configuration representing the code group bit positions in which a "1" is required in order to generate a code group having a value representative of the decimal value of the row just read. The relationships are summarized in the following table:

ENCODING NUMERICAL DATA

[Input gating for encoder $\underline{Jd}$.]

| Row Count | Row Value | Code Group Required for each $Ja'$ | Group bit Positions of 1's ($Jd$'s) | Bit Counter Signal Configuration for passing $Ja'$ when 1's required |
|---|---|---|---|---|
| 4 | 1 | 0 0 0 1 | 0 | $N3'\ N2'\ N1'$ |
| 5 | 2 | 0 0 1 0 | 1 | $N3'\ N2'\ N1$ |
| 6 | 3 | 0 0 1 1 | 1,0 | $N3'\ N2'\ N1+N3'\ N2'\ N1'$ * |
| 7 | 4 | 0 1 0 0 | 2 | $N3'\ N2\ N1'$ |
| 8 | 5 | 0 1 0 1 | 2,0 | $N3'\ N2\ N1'+N3'\ N2'\ N1'$ # |
| 9 | 6 | 0 1 1 0 | 2,1 | $N3'\ N2'\ N1+N3'\ N2\ N1'$ |
| 10 | 7 | 0 1 1 1 | 2,1,0 | $N3'\ N1'+N3'\ N2'\ N1$ |
| 11 | 8 | 1 0 0 0 | 3 | $N3'\ N2\ N1$ |
| 12 | 9 | 1 0 0 1 | 3,0 | $N3'\ N2\ N1+N3'\ N2'\ N1'$ |
| Group bit positions | | / / / / <br> 3 2 1 0 | | |

*Equivalent=$N3'\ N2'$.
Equivalent=$N3'\ N1'$ (see row count 10).

As the above table indicates, the code group bit positions are numbered upwardly from zero, zero representing the position of the least significant bit.

The operation of the encoding apparatus may now be readily understood by reference to the above table in connection with the logic equation previously set forth. If it be assumed, for example, that the card reading operation has progressed to row number 9 representing decimal values of 6 and that the data has been set into the storage register, it will be seen that the scanner $\underline{Ja}$ will produce a signal $Ja'$ at a column count of 7, the $Ja'$ signal extending from pulse time P25 to pulse time P28 inclusive of word No. 0 as may be seen from Figure 50. Since the flip-flops of the row counter stand in a configuration corresponding to the count of 9, it is only the sixth "or" term of the above given logic for driver $\underline{Jd}$ that can operate to pass the $Ja'$ signal. This signal must be passed in such a way as to produce a code group representing a decimal value of 6; i.e., the code group 0 1 1 0.

In order to produce the required code group the signal $Ja'$ must be passed only for bit positions No. 1 and No. 2 constituting pulse times P26 and P27 of word No. 0. The condition specified is met by the "N" gating specified in the sixth term of the logic equation for $\underline{Jd}$; i.e., the conditions ($N3'\ N2'\ N1+N3'\ N2\ N1'$). These conditions will be satisfied at the times "N" counter reaches a count of "1" and again at a count of "2" but will not be satisfied for any other counting configuration.

As previously pointed out, the "N" counter starts with an initial count of zero at the first pulse following the occurrence of the control pulse; that is, for the first or No. 0 bit of the code group. From this it follows (as may also be seen by reference to Figure 50) that the "N" gating conditions will be satisfied only during the pulse times corresponding to the second and third code group bits (bit positions No. 1 and No. 2); e.g., at pulse times P26 and P27 of word No. 0. As will be apparent from a consideration of the table set forth hereinbefore, the "N" gating conditions specified in the logic equation for $\underline{Jd}$ are selected to pass the $Ja'$ signal at the pulse times appropriate to establish a binary code group having a binary value equal to the decimal value of the card row just read. The manner in which the resulting code group signals $Jd$ are written into the J/L channel will be explained subsequently.

Figure 54:
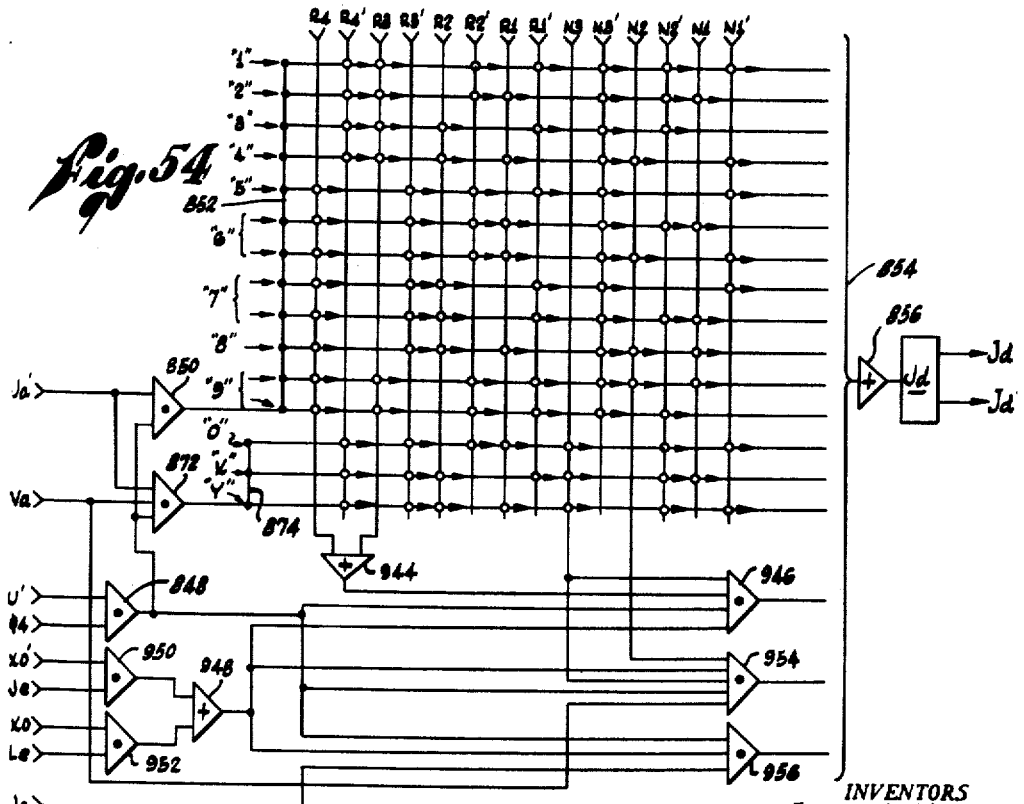
Figure 54 is a schematic diagram of the circuitry used to encode data taken from the 80 element storage register.

The circuitry defined by the partial logic for driver $\underline{Jd}$ set forth above is illustrated in Figure 54. As is shown therein U' and $\phi 4$ are combined in an "and" gate 848 and the resulting output is combined in an "and" gate 850 with the signal $Ja'$. The output of gate 850, having the signal configuration (U' $\phi 4\ Ja'$) is applied to a gating network bus 852 from which are extended twelve inputs into the gating matrix shown to provide twelve outputs corresponding to the nine terms of the logic equation set forth as is indicated by the references appearing on Figure 54 to the left of the bus 852.

As is shown in the drawing the row counter signals R4–R1 and their complements R4'–R1' and the bit counter signals N3–N1 and their complements N3'–N1' are supplied by conductors drawn vertically through the network as shown in Figure 54. Each of these lines is intersected by each of the twelve horizontal lines drawn from bus 852, the "and" gate relation between each of the horizontal lines and the selected vertical lines, all in accordance with the logic equation above set forth, are represented by the symbols explained earlier in connection with Figure 16.

The above mentioned twelve outputs from the gating network are applied, as is schematically represented by the bracket 854 in Figure 54 as individual inputs to an "or" gate 856, the output of which is connected as shown to the input terminal of the driver $\underline{Jd}$.

It is thus seen that as each row of the card is read and beginning with the start of the ensuing working revolution of the memory drum the eightly element storage register is scanned bit by bit to produce the data indicative signals Ja' which are encoded as above described to produce by the signal Jd a series of code groups appropriate to the value designated by the card row just read and in the proper timed relation to be placed in the desired pulse positions in each word of the J/L channel.

The scanning and encoding operation above described will be continued throughout the scanning of the eighty element storage register until all of the numeric data has been encoded; i.e., until the column counter has reached a count of 28 and any data represented by an energized or set condition of storage register element S28 has then been encoded, an operation which is completed at the end of pulse time P16 of word No. 3, as may be seen from Figure 50. This column count of 28 will be held until the next code group locating pulse is read from the control channel H/I, an event which occurs at pulse time P0 at word No. 4. Before this time, however, the alphabetic control pulse recorded at pulse time P32 of word No. 3 appears as the signal He/Ie. This signal is used to set the logic controls to condition the apparatus for thereafter processing alphabetic information as distinguished from purely numeric data. Such setting of the controls is effected by an "alphabetic" flip-flop $\underline{Va}$. The controls for flip-flop $\underline{Va}$ are arranged so that when it is turned on during a working revolution it will then remain on until the end of that revolution, so that the "on" condition of flip-flop $\underline{Va}$ identifies the time during which alphabetic data is being processed. The circuitry for turning $\underline{Va}$ on at the appropriate time is defined by the following logic equation:

$$\underline{Va} = \phi 4\ X2'\ (X0'\ He + X0\ Ie)\ T32\ C$$

The above logic equation indicates that flip-flop $\underline{Va}$ will be turned on only during Sequence Four ($\phi 4$) during the course of a working revolution (X2') if a control pulse signal (X0' He + X0 Ie) occurs at a time (T32) corresponding to pulse position P32 of any word in the channel. In the assumed example, as may be seen be reference to Figure 50, these gating conditions are satisfied when the alphabetic control pulse indicated at 858 in Figure 50 is read from the control channel. Thus, during the processing of the data constituting words No. 4, No. 5 and No. 6 of the IBM card (Figure 31) flip-flop $\underline{Va}$ will be in its "on" condition.

The circuitry defined by the above logic equation is illustrated in Figure 52 wherein it may be seen that the signal configuration (X0' He+X0 Ie) taken from previously mentioned "or" gate 794 is applied as indicated at 862 as one input to an "and" gate 864, the other input of which constitutes the output from an "and" gate 866. In "and" gate 866 four individual signals are combined as shown to provide an output signal configuration ($\phi 4$ X2' T32 C). The two signal configurations mentioned as combined in the "and" gate 864 conform to the terms of the logic equation set forth above. This output signal is passed from the "and" gate 864 through an "or" gate 868 and applied to the "on" input terminal of flip-flop $\underline{Va}$ as shown.

The signal Va produced by flip-flop $\underline{Va}$ when it is turned on by the alphabetic pulse 858 (Figure 50), serves to operatively add three additional input circuits for controlling the encoder driver $\underline{Jd}$, as is indicated by the following additional partial logic:

$$(\underline{Jd}) = U'\ \phi 4\ Va\ Ja'\ [(R4'\ R3'\ Rw'\ R1)\ (N3\ N2')\ \text{-- Y}$$
$$+ (R4'\ R3'\ R2\ R1')(N3\ N2'\ N1)\ \text{---------- X}$$
$$+ (R4'\ R3'\ R2\ R1)(N3\ N2'\ N1')]\ \text{---------- 0}$$

As is indicated by the row value designation at the right of the three "or" terms given above these three input circuits are operative for "R" counts of "1," "2" and "3" corresponding to IBM card rows Y, X and 0 respectively. Furthermore, since the signal Va bears an "and" relation to the other signal configurations in each term the three input circuits to $\underline{Jd}$ so defined are operative only when flip-flop $\underline{Va}$ is on; i.e., when the control pulse in P32 indicates that all of the remaining data is alphabetic.

As is shown in Figure 31 alphabetic data is recorded on the IBM card by punching two holes in each column, one hole in one of rows Y, X or 0 and one hole in one of the rows 1–9 inclusive. As previously pointed out and indicated in Figure 50 alphabetic data is represented by a six bit code group, the numerical punch being coded into bit positions No. 0, No. 1, No. 2 and No. 3 as previously described, and the Y, X and 0 punches being coded into bit positions No. 4 and No. 5 as is shown by the following table:

ENCODING ALPHABETIC DATA

[Input gating for encoder $\underline{Jd}$.]

| Row Count | Row Value | Code Group Required for each Ja' | Group bit Positions of 1's (Jd's) | Bit Counter Signal Configuration for passing Ja' when 1's required |
|---|---|---|---|---|
| 1 | Y | 1 1 - - - - | 5, 4 | N3 N2' N1+N3 N2' N1' * |
| 2 | X | 1 0 - - - - | 5 | N3 N2' N1 |
| 3 | 0 | 0 1 - - - - | 4 | N3 N2' N1' |
| Group Bit Positions | | / / / / / /<br>5 4 3 2 1 0 | | |

*Equivalent = N3 N2'

As is indicated by the table above the "N" counter co-operates with the "N" signal gating requirements shown in the above logic equation to pass the signal Ja' during the appropriate one or two pulse times required to produce the two most significant bits of the six bit code group. As a specific example, consider the punch in the X row of column 30 of the card shown on Figure 31. This data will be stored in the storage register at the reading of the second row and will produce a signal Ja' when the "R" count stands at "2" and the "K" count stands at "30." The operative input circuit for the driver Jd is that defined by the second term of the logic equation given above corresponding to a row counter setting of "2." As may be seen from Figure 50, the resulting signal Ja' will be presented for six pulse times; from P7 to P12 inclusive. The coding requirements as shown in the above table are such that the signal Ja' is to be applied to the input of driver Jd only in code group bit position No. 5; i.e., at pulse time P12. Reference to the "N" counter and the signals produced thereby as shown in Figure 50 will indicate that only at pulse time P12 do the "N" signals conform to the gating requirement (N3 N2' N1) indicated in the preceding table.

The additional input circuitry for the driver Jd defined by the above logic equation is also shown on Figure 54. As is shown therein the output (U' $\phi 4$) output of gate 848 is combined in an "and" gate 872 with the signals Va and Ja' to produce an output signal configuration (U' $\phi 4$ Va Ja') which is applied to a gating matrix bus 874. As shown three additional inputs to the driver Jd originate at the bus 854 and extend in intersecting relation to the "R" counter wires and the "N" counter wires drawn vertically as previously described. The "and" gating relationships associating the two sets of wires of the matrix are indicated by the symbols previously described with reference to Figure 16. The three outputs so produced are included among those applied to the "or" gate 856 as indicated schematically by the bracket 854.

It will now be apparent that during each working revolution of the drum during Sequence Four of the read cycle the apparatus above described so controls the encoder driver Jd as to deliver at the output terminals thereof signals representing according to a binary code the date read from the IBM card, the "1's" appearing in the binary coded character being represented by "true" output signals Jd and the "0's" of such character being represented by "false" output signals Jd'.

The signals Jd and Jd' are recorded in recirculating channel J/L, being applied either at the normal input to flip-flop J1 (Figure 17) or at the alternate input to flip-flop L1, depending upon the point of available access to word No. 0 at the start of the working revolution. It will be recalled that the point of access is indicated by the condition of flip-flop X0, a signal X0' indicating the normal input-output station and a signal X0 indicating the alternate input-output station.

The gating circuitry used to apply the signals Jd and Jd' to flip-flops J1 or L1 as determined by the condition of flip-flop X0 are defined by the following logic equations:

$$J1 = U'\phi 4\ X0'\ X2'\ Jd\ C$$
$$J1' = U'\phi 4\ X0'\ X2'\ Jd'\ C$$
$$L1 = U'\phi 4\ X0\ X2'\ Jd\ C$$
$$L1' = U'\phi 4\ X0\ X2'\ Jd'C$$
$$J1 = U'\phi 4\ Sx'X0\ Je\ C$$
$$J1' = U'\phi 4\ X0\ Je'\ C$$
$$L1 = U'\phi 4\ Sx'\ X0'\ Le\ C$$
$$L1' = U'\phi 4\ X0'\ Le'\ C$$

On the above equations it is apparent that during the read cycle (U') in Sequence Four ($\phi 4$) and during each working revolution of that sequence (X2') flip-flop J1 will follow the output of driver Jd if the working revolution started at the normal input-output station (X0'), and that the alternate recording flip-flop L1 will follow the output of driver Jd if the working revolution started at the alternate input-output station (X0).

Also, as will be seen from the above equations when the data from driver Jd is being introduced through flip-flop J1 (condition X0'), flip-flop L1 is connected to follow the read flip-flop Le to complete the recirculation circuit, and when in the converse condition flip-flop L1 is taking data from driver Jd (condition X0), flip-flop J1 is connected to follow the read flip-flop Je thus completing the recirculation circuit in the alternate condition. The signal Sx' included in the above mentioned logic for J1 and L1 merely means that the recirculation is ineffective prior to the time the first emitter pulse 390 (Figure 32) goes off, reference being had to the lines in timing charts Figure 32 and Figure 37 marked "Sx" indicating that Sx remains in its "off" condition from the time mentioned until the end of Sequence Four.

The circuitry defined by the above logic equations is illustrated schematically in Figures 20 and 21. Referring first to Figure 20, it will be seen that signals U', $\phi 4$, and C are combined in an "and" gate 878, the output of which is applied as indicated at 880 as an input to an "and" gate 882 having two other inputs X2' and X0'. The output of gate 882 is applied as indicated at 884 to one input of an "and" gate 886, the other input to which comprises the signal Jd. The output of gate 886 is passed through an "or" gate 888 and applied to the "on" input terminal of flip-flop J1.

The output of "and" gate 882 is also applied as indicated at 890 to one input terminal of an "and" gate 892, the other input terminal of which is supplied with a signal Jd'. The output of "and" gate 892 is passed through an "or" gate 894 and applied to the "off" input terminal of flip-flop J1.

The corresponding circuitry for controlling flip-flop L1 is similar to that above described as may be seen by reference to Figure 21 wherein an "and" gate 898 is shown as combining signals U', $\phi 4$, and C, the output of gate 898 being applied as an input to an "and" gate 900 which is supplied with two other input signals, X2' and X0. The output of gate 900 is applied as indicated at 902 to one input of an "and" gate 904 where it is combined with a signal Jd applied to the other input. The output of gate 904 is passed through an "or" gate 906 to the "on" input terminal of flip-flop L1. The output of gate 900 is also applied as indicated at 908 to the input of an "and" gate 910 which is supplied with the signal Jd' as its other input. The output signal delivered by gate 910 is passed through "or" gate 912 and applied to the "off" input terminal of flip-flop L1.

The circuitry for interconnecting the reading and writing flip-flops at one station when the Jd signals are being introduced at the other is also illustrated in Figures 20 and 21. As may be seen from Figure 20 the signal configuration (U'$\phi 4$ C) produced by "and" gate 878 is combined with signal X0 in "and" gate 916. The resulting output is applied as indicated at 918 to one terminal of an "and" gate 920, the other input terminal of which is connected to the output of an "and" gate 922 in which signals Je and Sx' are combined. The output of "and" gate 920 is passed through "or" gate 888 to the "on" input terminal of flip-flop J1 as previously described.

The output of "and" gate 916 is also applied as indicated at 924 to one input terminal of an "and" gate 926 to the other input terminal of which is applied the signal Je'. The output signal from "and" gate 926 is passed through the previously mentioned "or" gate 924 and applied to the "off" input terminal of flip-flop J1 as previously described.

The circuitry for flip-flop L1 is similar to that above described in that the signal configuration (U' $\phi 4$ C) produced by "and" gate 898 is applied to one input terminal of an "and" gate 930 to the other input terminal of which is applied the signal X0'. The output of "and" gate 930 is applied as indicated at 932 to an "and" gate 934 where it is combined with the output of an "and" gate 936 in which signals L*e* and S*x'* are combined. The output of gate 934 is passed through the aforementioned "or" gate 906 to the "on" input terminal of flip-flop L̲1̲. The output of "and" gate 930 is also applied as indicated at 938 to an "and" gate 940 where it is combined with the signal L*e'*. The output of "and" gate 940 is passed through the previously mentioned "or" gate 912 and applied to the "off" input terminal of flip-flop L̲1̲ as previously described.

It will be appreciated that during those times when driver J̲d̲ is not actually supplying coded data to the writing flip-flops J1/L1 (as for example, when scanner J̲a̲ is scanning a register element S̲1̲ to S̲80̲ which has not been set by the reading of a hole in the punched card), it is necessary to recirculate in the J/L channel any coded data that may have been placed in the channel at that particular location, as by the reading of a previous card row. Provision for this circulation includes the necessary circuitry to cause the driver J̲d̲ to follow the recirculating channel read flip-flops J̲e̲/L̲e̲ whenever the data indicative signal J*a'* is absent; i.e., when the signal J*a* is present. Such circuitry is defined by the following logic equation:

$$(\underline{Jd}) = U'\phi 4 \; Ja \; (X0' \; Je + X0 \; Le)$$

The parenthetical expression in the above logic equation expresses the control exercised by the flip-flop X̲0̲ in selecting the proper input-output station as previously described. The circuit from the appropriate read flip-flop J̲e̲/L̲e̲ is completed to the input of J̲d̲ by the signal J*a*. The resulting output of the flip-flop J̲d̲ is re-written in the J/L channel through writing flip-flops J1/L1 in accordance with the circuitry described immediately above in connection with Figures 20 and 21.

Another recirculation requirement arises in connection with the coding of alphabetic data. It will be appreciated that data contained in card rows Y, X and 0 are first encoded and placed in channel J/L, these characters representing appropriate bits recorded in bit positions No. 5 and No. 4, zeros being recorded in the remaining four bit positions No. 3, No. 2, No. 1 and No. 0. The second character of the alphabetic code is encoded as previously described for the encoding of numerical data, since it is represented by a punch in one of the card rows one through nine. When this is done the required "1's" are written into the appropriate bit positions in the first four bits of the code group in the manner already explained above. It is necessary, however, to recirculate the data previously placed in the bit positions No. 4 and No. 5, otherwise it would be replaced by zeros due to the J*d'* signal which would otherwise ensue. The required recirculation is achieved through the circuitry defined by the following logic equation:

$$(\underline{Jd}) = U'\phi 4 \; (R4 + R3) \; N3 \; (X0' \; Je + X0 \; Le)$$

The final parenthetical expression in the above equation defines the rear signal taken from the appropriate read flip-flop J̲e̲/L̲e̲. The output of the driver J̲d̲ will follow this input signal whenever the two gating requirements (R4+R3) and (N3) are satisfied coincidentally. Since signal N3 will not come on until the bit counter reaches a count of "4" the circuit above defined must operate only during bit positions No. 4 and following. Furthermore, reference to the previously described operation of the row counter will indicate that both of signals R3 and R4 will be absent during the Y, X and 0 rows but one or the other will be present for the remaining nine numerical rows of the card. Thus, during the encoding of data taken from the numerical rows one through nine any data previously recorded in the fifth and sixth bit positions (bit positions No. 4 and No. 5) will be taken from the read flip-flops J̲e̲/L̲e̲ and re-recorded through driver J̲d̲ and the appropriate writing flip-flop J1/L1.

A still further recirculation requirement is presented by the fact that the program author may space the code group locating pulses apart a distance exceeding the four or six pulses required to accommodate the numeric or alphabetic code group, as for example, in the case illustrated in Figure 50, word No. 3, wherein all pulse positions later than P16 lie beyond the last pulse position required for recording the final digit of the word. Under these circumstances it is ordinarily preferable to preserve whatever data is contained in such presently unused pulse positions. Insofar as the working revolutions associated with the reading of the numerical card rows one through nine are concerned, the recirculation circuitry described immediately above meets the stated requirement because it operates to recirculate as to all pulse positions following the fourth code group bit until the first bit of the next code group is reached. This circuitry does not operate, however, with respect to rows Y, X and 0. The recirculation requirement with reference to these three rows is met by the circuitry defined by the following logic equation:

$$(\underline{Jd}) = U'\phi 4 \; Va \; (N3 \; N2) \; (X0' \; Je + X0 \; Le)$$

The above defined circuitry is similar to that previously discussed differing only in substituting the gating requirements (V*a*) and (N3 N2) for the gating conditions previously discussed. The signal V*a*, of course, makes the circuit operative only during the encoding of alphabetic information, thus extending the recirculation operation to rows Y, X and 0. Signal configuration (N3 N2) will obtain at a bit count of "6" or "7" (it being recalled that the bit counter stalls at the seven count of 111) thereby covering all pulses subsequent to the sixth alphabetic code group bit.

The recirculation circuitry defined by the three logic equations set forth above is also illustrated in Figure 54. As is shown therein signals R3 and R4 are applied as inputs to an "or" gate 944 the output of which is applied as one of four inputs to an "and" gate 946. Of the other three inputs to gate 946 one comprises the signal N3, the second comprises the signal configuration (U'*ϕ*4) taken from "and" gate 848 and the third comprises the signal configuration (X0' J*e*+X0 L*e*) which is supplied by the output of an "or" gate 948. The "or" gate has two inputs, one of which is supplied by an "and" gate 950 in which signals X0' and J*e* are combined, and the other of which is supplied by an "and" gate 952 in which signals X0 and L*e* are combined. The output of "and" gate 946 constitutes one of the inputs to "or" gate 856 as is schematically indicated by the bracket 854, the "or" gate 856 being connected to control the input of the driver J̲d̲ as previously explained.

Another of the recirculation circuits for the driver J̲d̲ is supplied by an "and" gate 954 having five inputs, one of which constitutes the signal N2, another of which constitutes the signal V*a*, a third of which constitutes the signal N3, the fourth of which constitutes the signal configuration (U'*ϕ*4) taken from "and" gate 848, and the fifth of which comprises the signal configuration (X0' J*e*+X0 L*e*) supplied by "or" gate 948. The output of "and" gate 954 also comprises one of the inputs to the previously mentioned "or" gate 856.

The third input control for recirculating the J/L channel through the driver J̲d̲ is provided by an "and" gate 956 having three inputs, one taken from each of the previously mentioned gates 848 and 948, and the third comprising the signal J*a*. The output of "and" gate 956 also constitutes one of the many inputs to the "or" gate 856 schematically represented by the bracket 854 in Figure 54.

The above described recirculation circuitry operates to preserve by recirculation through the driver J̲d̲ all of the information carried by the J/L channel for the entirety of each working revolution except for those periods of time when new data is being written in through the encoding function of driver $\underline{Jd}$ and its input gating network. In order to provide for a similar preservation of the data during the idle periods between successive working revolutions the data is recirculated directly from the read flip-flops at each input-output station to the write flip-flop at the same station, as is shown by the following logic equations:

$$J1 = U'\phi 4\ Sx'\ X2\ Je\ C$$
$$\overline{J1'} = U'\phi 4\ X2\ Je'\ C$$
$$L1 = U'\phi 4\ Sx'\ X2\ Le\ C$$
$$\overline{L1'} = U'\phi 4\ X2\ Le'\ C$$

The signal X2 in the above equations defines the idle time between successive working revolutions and the signal Sx' prevents such circulation from operating until the first emitter pulse goes off.

The circuitry defined by the equations given above is illustrated in Figures 20 and 21.

Referring to Figure 20 which illustrates the gating controlling the inputs to flip-flop $\underline{J1}$, it is seen that the signal X2 is combined in an "and" gate 960 with the output of "and" gate 878, the output of gate 960 being applied as indicated at 962 to an "and" gate 964 where it is combined with the signal configuration (Sx' Je) taken from "and" gate 922. The output of gate 964 is passed through previously mentioned "or" gate 888 to be applied to the "on" input terminal of flip-flop $\underline{J1}$.

The output from "and" gate 960 is also applied as indicated at 966 to an "and" gate 968 where it is combined with the signal Je'. The output of "and" gate 968 is passed through the previously mentioned "or" gate 894 for application to the "off" input terminal of flip-flop $\underline{J1}$.

Figure 21 showing schematically the input control for flip-flop $\underline{L1}$ shows an "and" gate 972 connected to combine the signal X2 with the output of gate 898, the output of gate 972 being applied as indicated at 974 to an "and" gate 976 where it is combined with the output of previously mentioned "and" gate 936. The output of gate 976 is fed through previously mentioned "or" gate 906 to the "on" input terminal of flip-flop $\underline{L1}$. The output of gate 972 is also fed as indicated at 978 to an "and" gate 980 where it is combined with the signal Le'. The output of "and" gate 980 is passed through previously mentioned "or" gate 912 to the "off" input terminal of flip-flop $\underline{L1}$.

All of the data from a single card row contained in the eighty element storage register is scanned, encoded and written into recirculating channel J/L during the immediately following single revolution of the memory drum hereinbefore termed the working revolution. Between the end of the working revolution and the next emitter pulse occurring when the next following card row is read, it is necessary to clear the eighty element storage register to allow it to be set anew in accordance with the next group of data taken from such following row. The register is cleared by turning off all eighty of the thyratron tubes 534 of which it is comprised. This is effected by dropping the voltage on plate supply conductor 542 (see Figure 42) to a value of zero, or at least below that required to maintain tube conduction. This switching operation is performed by the vacuum tube 546 in response to a resetting pulse 984 (Figure 37) delivered by the one shot $\underline{So}$.

The output pulse So produced by the one shot $\underline{So}$, having a duration of about one pulse time as indicated at 984 in Figure 37, is applied as indicated at 988 in Figure 42 to the input terminal of a pulse amplifier 989 of suitable and conventional construction.

The output of the amplifier 989 is used to fire a one shot 990 which is adjusted to deliver a square wave pulse of the order of one hundred volts lasting for about five milliseconds. This pulse is differentiated by a network comprising a series condenser 991 and a shunt resistance 992 to provide a positive going spike signal which is applied to the input of a pulse amplifier 993. The pulse amplifier delivers through a coupling condenser 994 to the control grid of the tube 546, a negative going spike-like pulse having a magnitude of at least a few hundred volts and a pulse width at the negative potential level corresponding to the cut-off bias of tube 546 of the order of two or three milliseconds. As a consequence, when the one shot $\underline{So}$ is fired tube 546 is momentarily biased to cut-off so as to interpose a substantially infinite resistance in the circuit between the +230 volt supply conductor 544 and the plate supply conductor 542, thus momentarily dropping the anode voltage of the eighty thyratons 534 sufficiently to stop conduction. This serves to clear the thyraton register in readiness for being set anew in accordance with data read from the next following card row.

The one shot $\underline{So}$ is arranged to be fired by the fall of the clocking marking the end of the last pulse of the working revolution as is shown by the following logic.

$$\underline{So} = U'\ \phi 4(X2'\ X1\ Ve\ T33)C$$

The signal configuration enclosed in parentheses in the above equation marks the last pulse of the working revolution as has been previously explained.

The circuitry defined by the above equation is illustrated in Figure 38. As is there schematically indicated signals Ve, X2' and X1 are combined in an "and" gate 996 and applied as one input to an "and" gate 997, the other input of which is taken from gate 579 previously described as delivering a signal according to the configuration (U'$\phi$4 T33C).

The output of gate 997 is passed through the previously mentioned "or" gate 476 to the input terminal of the one shot $\underline{So}$.

The output pulse signal So produced by the firing of the one shot is used also to turn off the alphabetic flip-flop $\underline{Va}$ as is indicated by the following logic.

$$Va' = \phi 4\ So\ C$$

The circuit logically defined above is illustrated in Figure 52 an "and" gate 998 being used to combine signals $\phi 4$, So and C to provide a coincidence output signal which is passed through an "or" gate 999 and applied to the "off" input terminal of the flip-flop $\underline{Va}$.

Thus at the end of each working revolution flip-flop $\underline{X2}$ is turned on as previously described (see 654 in Figure 37), one shot $\underline{So}$ is fired clearing the eighty element storage register $\underline{S1}$ to $\underline{S80}$ and turning flip-flop $\underline{Va}$ to its "off" condition. The operative conditions thus established remain unchanged while the apparatus idles until the emitter pulse comes on again at the reading of the next card row. As previously explained this causes the emitter pulse flip-flop $\underline{Pe}$ and timing control flip-flop $\underline{X1}$ to be turned off, whereupon the various steps involved in reading data from a card row hereinabove described are repeated.

The operation of reading the data from one card row, transferring it to the storage register, and then during the following working revolution, scanning the storage register, encoding the data so registered, and writing the binary coded signals so produced into the recirculating channel J/L is repeated row for row as the card is moved by the card reading machine past the card reading station. At the fall of the clock at the end of the last pulse of the twelfth working revolution sequence flip-flop $\phi 4$ is turned off and sequence flip-flop $\underline{\phi 1}$ is turned on as indicated at the points marked 1000 and 1001 in lines $\phi 4$ and $\phi 1$ respectively of Figure 32, and as is defined by the following logic equations.

$$\phi4' = \phi4(X2'\ X1\ Ve\ T33)(R4\ R3\ R2'\ R1')C$$
$$\phi1 = U'\phi4(X2'\ X1\ Ve\ T33)(R4\ R3\ R2'\ R1')C$$

In the above logic equations the signal configuration enclosed in the first parentheses defines the last pulse of a working revolution as previously explained and the signal configuration set off by the second parentheses constitutes a row count of twelve, the complete expression serving to identify the last pulses of the working revolution following the reading of the last row of the card.

The circuitry defined in the above logic equations is illustrated schematically in Figure 40 wherein an "and" gate 1004 is shown as being connected to combine signal X1 and the clock signal C with a signal ($\phi4$ X2' R4 R3 R2' R1 Ve T33) obtained by applying the designated signals individually to an "and" gate 1006 (see Figure 55), the output signal from "and" gate 1006 being applied as indicated at 1008 and 1010 (Figure 40) to the "and" gate 1004. The output of "and" gate 1004 is applied as indicated at 1012 to the "off" input terminal of flip-flop $\phi4$ through an "and" gate 1014, or is also applied as indicated at 1016 to one terminal of an "and" gate 1017 wherein it is combined with a signal U' applied through the other input terminal of the gate. The output signal delivered by gate 1017 is passed through an "or" gate 1018 and applied to the "on" input terminal of flip-flop $\phi1$.

The turning off of flip-flop $\phi4$ by the instrumentalities described terminates read Sequence Four and puts the apparatus into another sequence of operations designated Sequence One by reason of the "on" condition of flip-flop $\phi1$ serving as its identification.

CONVERSION OF NUMERICAL DATA—CODED DECIMAL TO BINARY

Sequence One, which comes on at the beginning of pulse time P0 of word No. 0 and lasts for one word time, is the initial sequence of a repetitive series of operations as indicated by the timing lines marked $\phi1$, $\phi2$, and $\phi3$ in Figure 30 and the explanatory legends at the bottom of the figure. The apparatus progresses through Sequences One, Two, and Three in converting one word, this series of operations being repeated for each word converted. During Sequence One, which lasts for one word time, the word to be converted is transferred from the recirculating line to the A and B recirculating registers; during Sequence Two (seven word times) the binary coded decimal word is converted to a straight binary number; and during Sequence Three (nine word times) the apparatus idles for eight word times and then writes the converted word in the J/L channel in the place originally occupied by the word from which it was derived.

*Sequence One—Transfer one word to A/B registers.—* It will be recalled that in the data transfer operations performed during Sequence Four, the 80 element storage register was scanned in the order S1, S2, . . . S80 in correspondence with the arrangement of the 80 columns of the IBM card, and that data taken from column No. 1 was made the first code group of word No. 0, that from column No. 2 was made the second code group, etc. Thus, the data recorded in the J/L channel by this data transfer operation is presented with the decimal digits and alphabetic characters in reverse order, the most significant digit or character of the word on the card occupying the position of the least significant digit in the recirculating channel.

Figure 56:
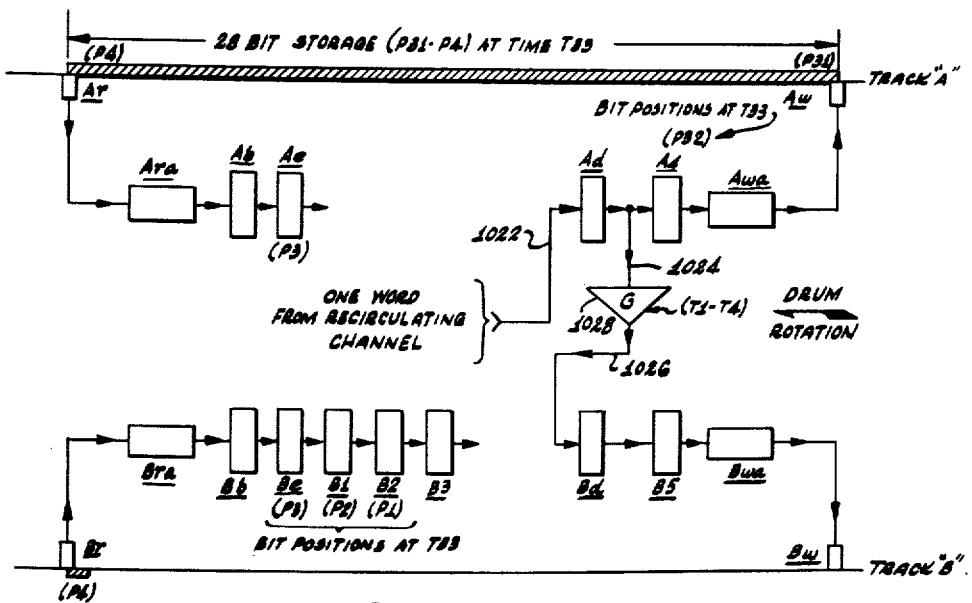
Figure 56 is a block diagram illustrating the functional inter-relations of the various components of the apparatus utilized during Sequence One of the "read" cycle.
Figure 51:
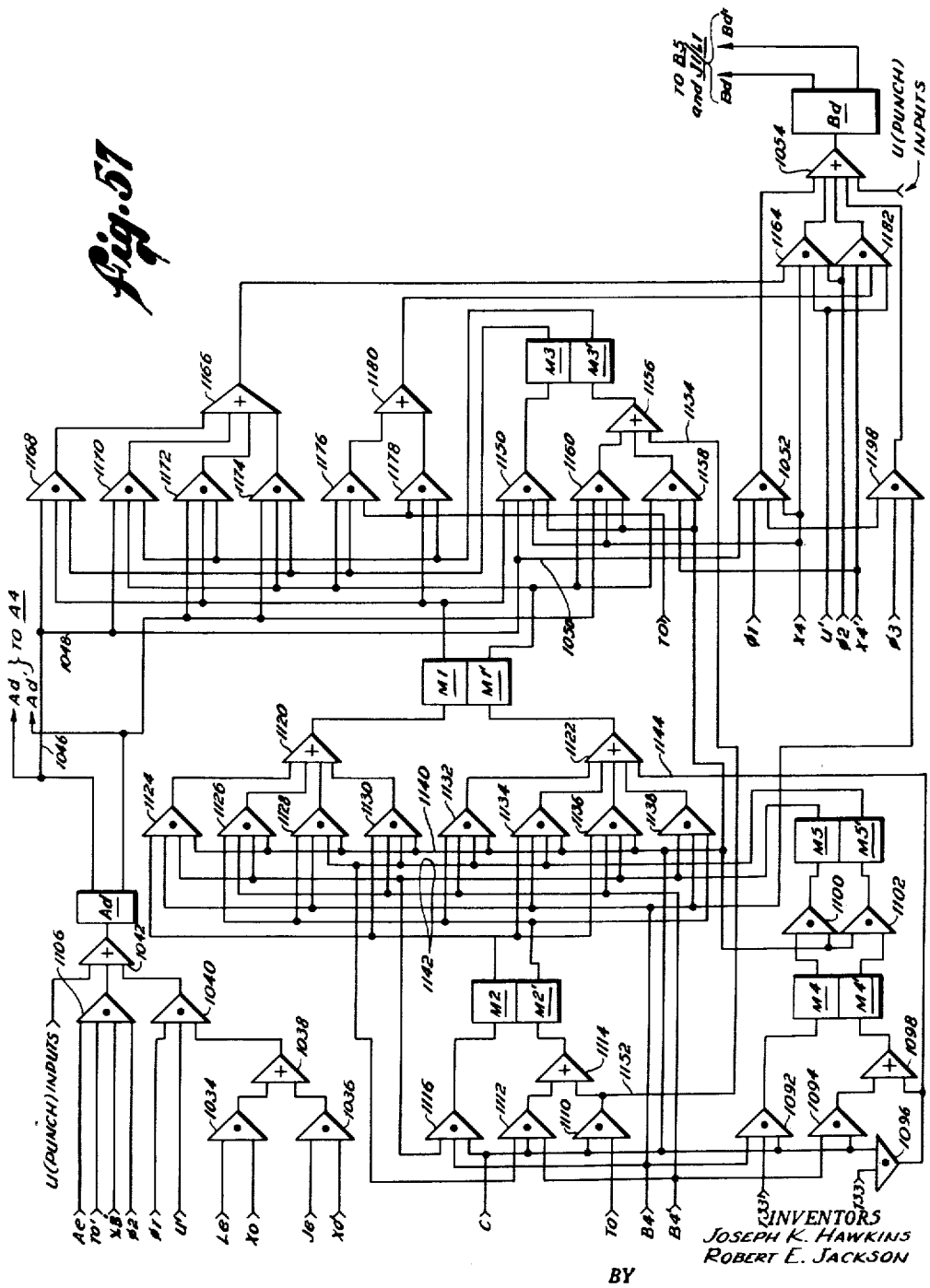

During Sequence One, word No. 0 is read from the recirculating channel into recirculating register A and at the same time the first code group of the word is read into recirculating register B, all by means of the instrumentalities represented in block diagram form in Figure 56.

As is indicated at 1022 in Figure 56, word No. 0 from recirculating channel J/L is introduced into the recirculating registers A and B through the driver Ad, the output of the driver Ad being recorded on the A register track through the write flip-flop A4, the write amplifier Awa and the write head Aw all as described hereinbefore. The output of the driver Ad is however, connected as indicated at 1024 and 1026 to the input of the B register driver Bd through a gating circuit indicated generally at 1028 which operates to pass signals during pulse times P1 to P4 inclusive. This operates to place the first code group of word No. 0 in the B register since the output of driver Bd is written on the B register track through the write flip-flop B5, the write amplifier Bwa, and the write head Bw.

Near the end of the one word time constituting Sequence One, the bits first written into the register tracks begin to be read therefrom by the respective read heads. The first five bits (P0–P5) are lost from the A register because until Sequence Two comes on at the following P0 time the output of flip-flop Ae is not used. However, the four bits introduced into the B register are preserved by a chain of flip-flops Be, B1, B2 and B3, connected as shown in Figure 56 with the B1–B3 chain connected to the output of the read flip-flop Be.

Appropriate legends on Figure 56 indicate the positions of the various bits at time T33, the last pulse time of Sequence One, from which indications it will be seen that the A register holds in the magnetic drum pulse numbers P4 through P31, with P32 being held by the write flip-flop A4. Pulse P3 is at T33 time held in flip-flop Ae, but will be lost one pulse time later (P0 of the next word time). At this same time T33, the four pulses introduced into the B register are held as follows: P1 is held in flip-flop B2, P2 is held in flip-flop B1, P3 is held in flip-flop B3, and P4 is held on the drum. One pulse time later (P0 of the next word time) the pulses will have moved one flip-flop to the right in Figure 56 from the positions there indicated.

The circuitry used in copying word No. 0 from the J/L channel through the driver Ad is defined by the following logic equation:

$$(Ad) = U'\ \phi1\ (X0'\ Je + X0\ Le)$$

In the above circuit the signal configuration (U' $\phi1$) merely limits the functioning of the circuit to Sequence One of the read cycle. The conditions specified by the parenthetical term serve merely to connect the input of the driver Ad to whichever of the read flip-flops Je or Le is reading word No. 0, all as previously explained.

The transfer of the first code group to the B register through driver Bd is accomplished by the circuitry defined as follows:

$$(Bd) = U'\ \phi1\ X4\ Ad$$

According to the above equation, driver Bd follows the "true" output of driver Ad so long as the signal X4 is present. As was previously explained in connection with Figure 34, flip-flop X4 is caused to be on from pulse time P1 to pulse time P4 inclusive. Since, when the code groups were first recorded in recirculating channel J/L, pulse position P0 was left blank, the four bits comprising the first code group are passed to driver Bd during the four pulse times P1–P4.

The circuitry defined by the above logic equations is illustrated in schematic form in Figure 57 wherein an "and" gate 1034 is used to combine signals X0 and Le and an "and" gate 1036 is used to combine signals X0' and Je, the outputs of gates 1034 and 1036 being applied as the inputs of an "or" gate 1038 to provide at the output thereof the signal configuration (X0' Je+X0 Le). The output of gate 1038 is combined in an "and" gate 1040 with signals U' and $\phi1$, the output of gate 1040 being passed through an "or" gate 1042 and applied to the input terminal of the driver $\underline{Ad}$.

The "true" output signal $Ad$ is taken from the corresponding output terminal of the driver $\underline{Ad}$ and applied, as indicated at 1046, 1048 and 1050 to an "and" gate 1052 where it is combined with signals U', $\phi 1$, and X4, the output of "and" gate 1052 being passed through an "or" gate 1054 and applied to the input terminal of driver $\underline{Bd}$.

The circuitry employed at the end of Sequence One for storing the first code group placed in the B register is defined by the following logical expressions:

$$\underline{B1} = Be\ C$$
$$\underline{B1'} = Be'\ C$$
$$\underline{B2} = B1\ C$$
$$\underline{B2'} = B1'\ C$$
$$\underline{B3} = B2\ C$$
$$\underline{B3'} = B2'\ C$$

From the above equations, it is seen that at each clock pulse, each flip-flop is caused to take the condition of the preceding flip-flop during the previous pulse time, thus in effect stepping the individual bits of the code group through the chain of flip-flops from one to the next, the bits moving from flip-flop to flip-flop at each fall of the clock. The logic and schematic diagram defining the circuitry for the read flip-flop $\underline{Be}$ have already been given and explained. The circuitry defined by the above logic equations is illustrated schematically in Figure 27 from which it is seen that as to each of flip-flops $\underline{B1}$, $\underline{B2}$ and $\underline{B3}$, the two input terminals thereof are connected to the output of associated "and" gates in which the corresponding output signal of the preceding flip-flops are combined with the clock signal.

Figure 58:
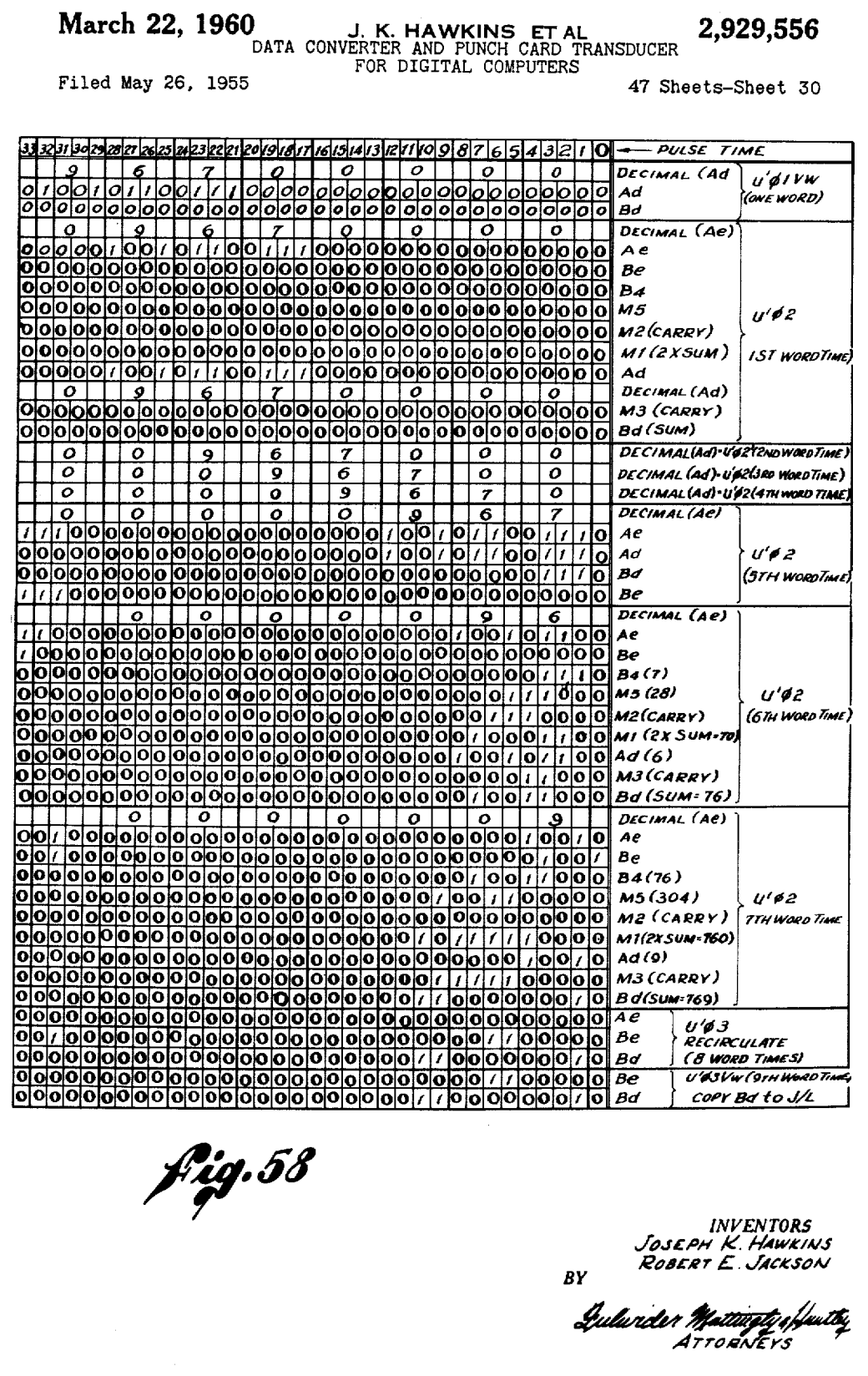

At this point reference should be had to Figure 58 which is a timing chart showing the performance pulse by pulse of the various instrumentalities operating during Sequences One, Two and Three in effecting the conversion of a binary coded decimal number to a straight binary number. In Figure 58 the pulse times are indicated by arabic characters heading the 33 columns of the chart. The segregation of the data relating to one word time from that relating to another is effected by means of the heavy horizontal lines. Within a single word time thus segregated, the performance of each flip-flop, driver, and the like is indicated by the horizontal rows identified with the device designation in the right hand margin. In this chart 0's are used to indicate the false condition of the flip-flops and 1's are used to indicate the times of occurrence of the true output signals. Figure 58 illustrates the conversion of the eight digit decimal number (e.g. 00000769) comprising word No. 0 of the IBM card illustrated in Figure 31. The decimal value of the individual code groups is indicated from time to time by the decimal digits appearing in rows identified by the word "decimal." As in previously described timing charts, time is considered to progress from right to left. Thus, to consider the second row of Figure 58 as an example, driver $\underline{Ad}$ delivers a "false" output signal at pulse time 28. One pulse time later, it delivers a "true" output signal and another pulse time later, at P30, it delivers a "false" output signal.

The first three rows of Figure 58 which are bracketed and identified by the legend "U' $\phi 1$ Vw (one word)" show the performance of drivers $\underline{Ad}$ and $\underline{Bd}$ during Sequence One, the decimal values of the code groups passing driver $\underline{Ad}$ being indicated by the decimal digits in the first row. From this it will be seen that the digits are introduced into the A register in inverse order, that is the most significant ("0") being first introduced, and the least significant digit ("9") being the last introduced into the register.

Figure 59:
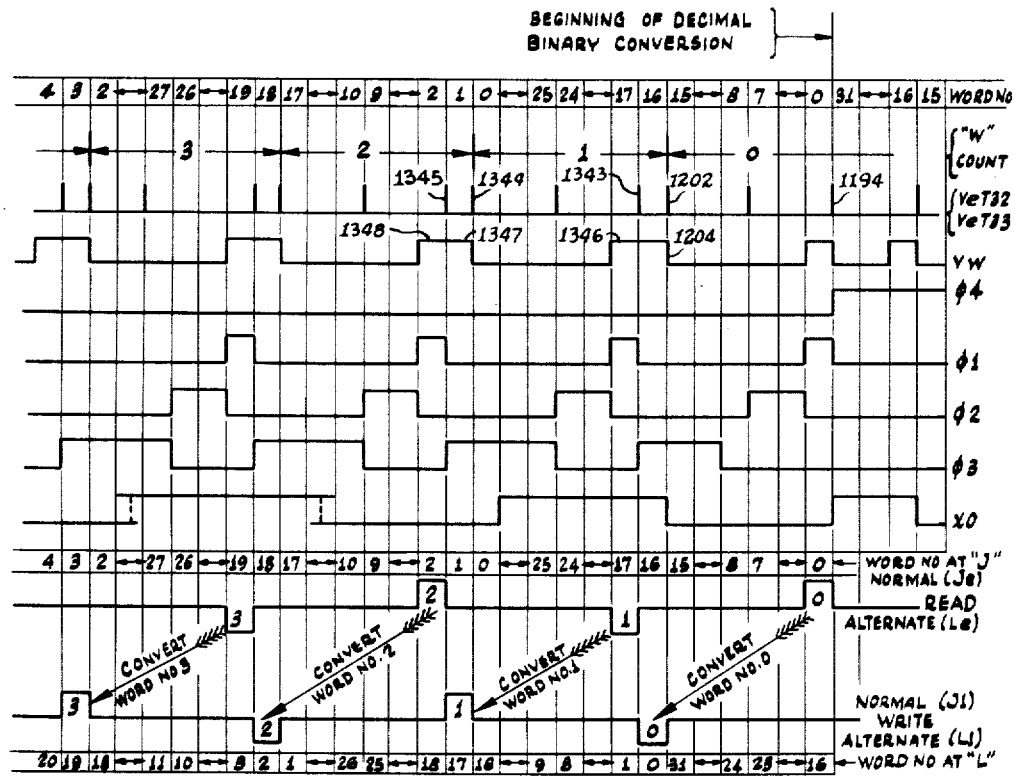
Figure 59 is a timing chart showing the relative times of occurrence of the various functions and operations taking place during Sequence One, Two and Three of the "read" cycle.

Reference is also made to Figure 59 which is a timing chart showing the times of occurrence with respect to the various words of the recirculating channel of pulses V$e$ T32 and V$e$ T33 as well as the output of flip-flop $\underline{Vw}$. The operations of sequence flip-flops $\underline{\phi 1}$, $\underline{\phi 2}$ and $\underline{\phi 3}$ is given as is also the normal-alternate determining flip-flop $\underline{X0}$. In the lower part of the figure at the lines marked "Read" and "Write" are indicated the points of access to the required word in the recirculating channel J/L and the times at which such access occurs. The heavy vertical lines at the right of the chart marked "Beginning of Decimal-Binary Conversion" marks the division between words No. 31 and No. 0 and is the time at which flip-flop $\phi 4$ goes off and Sequence One comes on. It is assumed that during the following Sequence One, flip-flop $\underline{X0}$ is in the "off" or X0' condition, and accordingly, in the lower part of the figure the reading of word No. 0 from the normal output station (read flip-flop $\underline{Je}$) is indicated.

It will be noted that in the first Sequence One, indicated in Figure 59 at the beginning of the series of conversion operations, flip-flop $\underline{Vw}$ is indicated as being in its "on" condition. This follows from the logic and circuitry previously described and as may also be seen from Figure 46 and the tables there presented. In this connection it will be understood that the V$e$ T33 pulse which turned $\underline{Vw}$ on, occurred as the last pulse of Sequence Four and that the following condition of $\underline{Vw}$ can be ascertained from the tables by reference to the columns headed "Sequences 0, 1, 3."

At the end of the first word time of Sequence One, (i.e. at time V$w$ T33 C) Sequence One goes off and Sequence Two comes on as is indicated by the following logic equations:

$$\phi 1' = \phi 1\ Vw\ T33\ C$$
$$\phi 2 = \phi 1\ Va'\ Vw\ T33\ C$$

In the above equation for flip-flop $\phi 2$, the signal V$a'$ will be present since the processing of numerical data is assumed. Flip-flop $\underline{Va}$, it will be recalled, is used to indicate whether the data is numeric or alphabetic. It was turned off by the $So$ signal at the end of Sequence Four. As will later be explained, it cannot again be turned on until the operation has proceeded to Sequence Three.

The circuitry defined by the above logic equations is illustrated schematically in Figure 40, wherein an "and" gate 1058 is used to combine signals W$w$, T33, and C to supply to a bus 1060 the signal configuration (V$w$ T33 C) which is applied as indicated at 1062 to an "and" gate 1064 where it is combined with a signal $\phi 1$ taken from the "true" output terminal of the flip-flop $\phi 1$ as indicated at 1066. The output of the "and" gate 1064 is passed through the previously described "or" gate 504 and applied to the "off" input terminal of flip-flop $\phi 1$.

The signal configuration (V$w$ T33 C) is also applied as indicated at 1068 to an "and" gate 1070 where it is combined with the signal V$a'$ applied as indicated at 1072 and a signal $\phi 1$ which is taken from the "true" output terminal of flip-flop $\phi 1$ as indicated at 1074. The coincidence signal delivered by "and" gate 1070 is applied directly to the "on" input terminal of flip-flop $\phi 2$ as indicated at 1076.

The turning off of flip-flop $\phi 1$ at the end of word No. 0 and the turning on of flip-flop $\phi 2$ at the beginning of the P0 pulse of word No. 1 marks the end of Sequence One and the beginning of Sequence Two.

*Sequence Two—Conversion computations.*—In Sequence Two, which lasts for seven word times, the individual code groups circulated in register A are taken one at a time and subjected to an arithmetic operation leading finally to the production of a straight binary number having the same numerical value as the original binary coded decimal number, the binary number being built up in the B register during the computation process.

The conversion computations are carried forward in ordinary binary arithmetic, this being made possible by processing the binary coded decimal number one decimal digit at a time, it being recognized that a single decimal digit expressed as a binary coded decimal number is identical with the straight binary number having the value of the decimal digit. In other words, each code group of a binary coded decimal number is nothing more than a binary number having the same value as is represented by the decimal digit.

The conversion from binary coded decimal form to straight binary is accomplished by taking the four bit binary number representing the most significant decimal digit and multiplying that number by ten. To the resulting product is then added the four bit binary number representing the next lower order decimal digit. The binary sum thus obtained is multiplied by ten and to the binary product so obtained is added the four bit binary number representing the next lower order decimal digit, etc. until the four bit binary number corresponding to the decimal digit of least significance is added to the binary number built up by the preceding series of computations.

Figure 60:
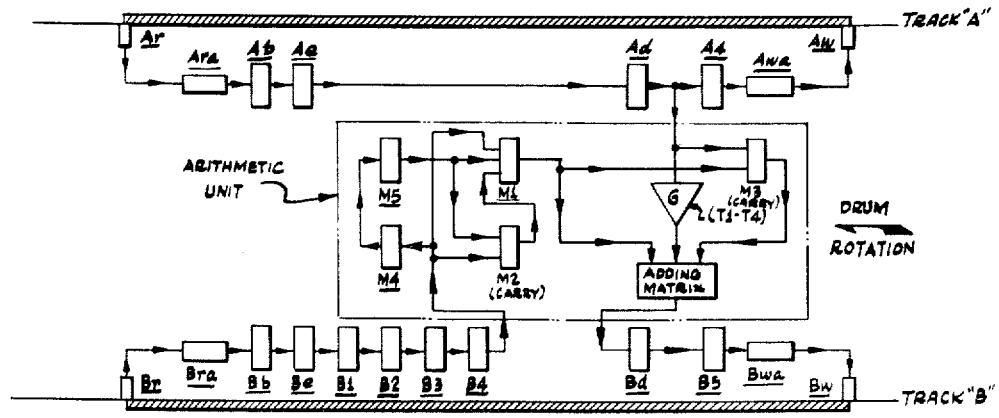
Figure 60 is a block diagram illustrating the functional inter-relationships of the various components and parts of the apparatus functioning during Sequence Two of the "read" cycle.

The apparatus which performs the above-described computation extends the conversion by one code group each word time, thus completing the conversion of an eight digit decimal number in seven word times (no conversion of the eighth code group being required as it is the least significant decimal digit). The apparatus used for performing the decimal-binary conversion is illustrated in Figure 60, and comprises, in addition to the apparatus mentioned with reference to Figure 56, a flip-flop $\underline{B4}$ and the instrumentalities enclosed within the broken line marked "arithmetic unit" in the drawing. These instrumentalities, which take the binary number from the output of flip-flop $\underline{B4}$, comprise delay flip-flops $\underline{M4}$ and $\underline{M5}$ which, by interposing a two pulse delay, shift the number two places to the left thereby multiplying its value by four, and an adding flip-flop $\underline{M1}$ in which the input gating to the binary number from $\underline{B4}$ is added to the shifted number of four times the value and is additionally delayed one pulse providing an output having a value of ten times the original number delivered by flip-flop $\underline{B4}$. Flip-flop $\underline{M1}$ operates in conjunction with a carry flip-flop $\underline{M2}$ which produces any bit to bit carries required by the addition performed in the input gating to flip-flop $\underline{M1}$. The number of ten times the original value delivered by flip-flop $\underline{M1}$ is added in an adding matrix to the binary number representing the next lower order decimal digit supplied by driver $\underline{Ad}$ through the gating network G. A carry flip-flop $\underline{M3}$ is used to produce and propagate any carries that may be required by the addition. The output of the adding matrix constituting the binary number resulting from each step of the conversion process is delivered to the driver $\underline{Bd}$ for entry into the B register.

The logic equations defining the circuitry controlling the operation of flip-flop $\underline{B4}$ and the delay flip-flops $\underline{M4}$ and $\underline{M5}$ are as follows:

$\underline{B4} = \phi 2 \ B3 \ C$
$\underline{B4'} = U' \ \phi 1 \ C + \phi 2 \ B3' \ C$
$\underline{M4} = T33' \ B4 \ C$
$\underline{M4'} = T33 \ C + B4' \ C$
$\underline{M5} = M4 \ C$
$\underline{M5'} = M4' \ C$ The U' $\phi 1$ C and T33 C terms in the "off" side logic for flip-flops $\underline{B4}$ and $\underline{M4}$, respectively, serve to turn these flip-flops off before Sequence Two comes on, to thereby avoid erroneous computation that might result should either of these flip-flops be in the "on" condition at the start of Sequence Two. The other terms of the logic indicate quite clearly that during Sequence Two flip-flop $\underline{B4}$ follows flip-flop $\underline{B3}$ and flip-flop $\underline{M4}$ follows flip-flop $\underline{B4}$ except at pulse time T33 when $\underline{M4}$ is turned off. Flip-flop $\underline{M5}$ merely follows $\underline{M4}$.

The above defined circuitry for flip-flop $\underline{B4}$ is illustrated in Figure 27, wherein it is seen that an "and" gate 1080 serves to combine the clock signal C and signal B3 with a signal $\phi 2$ which is passed through an "or" gate 1082, the output of "and" gate 1080 being applied to the "on" input terminal of flip-flop $\underline{B4}$. Signals U', $\phi 1$, and C are combined in an "and" gate 1084 and passed through an "or" gate 1080 to the "off" input terminal of flip-flop $\underline{B4}$. The "or" gate 1080 has a second input which is taken from the output of an "and" gate 1088 which serves to combine signals B3' and the clock signal C with signal $\phi 2$ taken from the "or" gate 1082.

The circuitry defined by the above logic equations for flip-flops $\underline{M4}$ and $\underline{M5}$ is illustrated schematically in Figure 57. As shown therein, an "and" gate 1092 having its output connected to the "on" input terminal of flip-flop $\underline{M4}$ serves to combine signals T33', B4, and the clock signal C. Signals B4' and C are combined in an "and" gate 1094 while signals T33 and C are combined in an "and" gate 1096, the outputs of the "and" gates 1094 and 1096 being applied as the two inputs to an "or" gate 1098, the output of which is applied to the "off" input terminal of flip-flop $\underline{M4}$. The "true" and "false" outputs of flip-flop $\underline{M4}$ are combined with the clock signal in "and" gates 1100 and 1102 respectively, the outputs of which are respectively applied to the "true" and "false" input terminals of flip-flop $\underline{M5}$.

As was pointed out with reference to pulse time T33 of Sequence One, the first bit (P1) of the first code group is held in flip-flop $\underline{B2}$. This digit moves to flip-flop $\underline{B3}$ at pulse time P0 of Sequence Two and is held by flip-flop $\underline{B4}$ at pulse time P1 of Sequence Two. Thus, the output of flip-flop $\underline{B4}$ represents the "numerically correct" value of the binary bits defining the first code group.

In the same way, bit P3 is held in $\underline{Ae}$ and bit P4 is held on the magnetic drum at T33 time of Sequence One. One pulse later, at P0 time of Sequence Two, P3 is lost and P4 is moved to $\underline{Ae}$. As will be explained later, driver $\underline{Ad}$ is connected to follow flip-flop $\underline{Ae}$ during pulse times P1 to P28 inclusive, and therefore, does not reproduce the fourth bit held in $\underline{Ae}$ at pulse time P0 of Sequence Two. One pulse time later, that is at pulse time P1 of Sequence Two, the fifth bit moves into flip-flop $\underline{Ae}$ and is at the time reproduced by $\underline{Ad}$ to appear at the $\underline{Ad}$ output. Since $\underline{Ad}$ is reproducing the fifth bit at the first pulse time, it is seen that the number held in the A register has been shifted to the right four bits or one code group so that the second original code group now occupies the first four pulse positions.

During Sequence Two, driver $\underline{Ad}$ follows the read flip-flop $\underline{Ae}$ during pulse times P1 to P28 as is defined by the following logic equation:

$$(\underline{Ad}) = \phi 2 \ X3' \ T0' \ Ae$$

In the above equation the timing signal configuration (X3' T0') defines pulse times P1–P28, inclusive, as may be seen from the fact as previously pointed out that flip-

67 flop X3 is "off" from pulse times P0 to P28, inclusive while flip-flop T0 is on at pulse time P0. The circuitry defined by the preceding logic equation is illustrated schematically in Figure 57 as including an "and" gate 1106 in which signals Ae, T0', X3', and $\phi2$ are combined, the output from gate 1106 being passed through the aforementioned "or" gate 1042 to the input terminal of driver $\underline{Ad}$.

From what has been said, it will be seen that during Sequence Two the output of flip-flop $\underline{B4}$ represents the "numerically correct" value of the binary number carried by the B register, while the output of flip-flop $\underline{M5}$ which follows $\underline{B4}$ two pulses later, represents a binary number having four times the value of the number as seen at the output of flip-flop $\underline{B4}$. It follows that the addition of the two numbers represented by the output signals of flip-flops $\underline{B4}$ and $\underline{M5}$, will yield a sum having a value five times the value of the number as seen at the output of $\underline{B4}$. The input gating for flip-flop $\underline{M1}$ performs this arithmetic addition, any carries that may be required being introduced into that gating by flip-flop $\underline{M2}$ which determines the presence or absence of a carry from a comparison of the output signals of flip-flops $\underline{B4}$ and $\underline{M5}$. The circuitry for so controlling flip-flops $\underline{M1}$ and $\underline{M2}$ is defined by the following logic equations:

$\underline{M1} = M5\ B4\ M2\ C + M5\ B4'\ M2'\ C + M5'\ B4\ M2'$
$\quad\quad C + M5'\ B4'\ M2\ C$
$\underline{M1'} = T33\ C + M5'\ B4'\ M2'\ C + M5'\ B4\ M2$
$\quad\quad C + M5\ B4'\ M2\ C + M5\ B4\ M2'\ C$
$\underline{M2} = M5\ B4\ C$
$\underline{M2'} = T0\ C + M5'\ B4'\ C$ The signal configuration (T0 C) included in the "off" term for flip-flop $\underline{M2}$ serves merely to turn the flip-flop off to prevent the introduction of a spurious carry into the calculation at the time the computation is begun. It will be seen that the logic for flip-flop $\underline{M2}$ is that commonly used in carry flip-flops and is arranged to turn the flip-flop on and inject a carry into the addition whenever the addend and augend are both "1's" (it being realized that "true" output signals represent "1's" and "false" or primed output signals represent "0's"). Once a carry is produced it must continue to be produced until both the augend and addend are "0's." Such a circumstance will turn off flip-flop $\underline{M2}$ by the signal configuration (M5' B4' C).

The signal configuration (T33 C) included in the "off" side logic for flip-flop $\underline{M1}$ as an alternative input is used to turn off the flip-flop before the addition has begun. The remaining logic is that conventional for serial adding networks, the "on" side terms being arranged to turn the flip-flop $\underline{M1}$ on whenever the augend, addend and carry include an odd number of "1's." The "or" terms used to turn $\underline{M1}$ off follow the well known laws requiring a zero to be placed in the sum whenever the augend, addend and carry are either all "0's" or contain two "1's."

In connection with the operation of flip-flops $\underline{M1}$ and $\underline{M2}$, it is to be noted that each flip-flop is actually triggered by the fall of the clock and so produces the indicated output signal at the pulse time following that in which the triggering signal configuration occurred. This is proper in the case of a carry flip-flop since the carry required by the input conditions must be added in the next higher binary order. In the case of flip-flop $\underline{M1}$ it serves to shift the sum represented by the output signals one order to the left, thereby multiplying its value by two. Since the sum before shifting was five times the original value of the number in register B, it follows that the ouptut signals of $\underline{M1}$ constitute a binary number hav-

68 ing a value ten times the value of the number originally taken from the B register.

The circuitry for flip-flops $\underline{M1}$ and $\underline{M2}$ defined by the above logic equations is illustrated in schematic form in Figure 57. As is there shown signals T0 and C are combined in an "and" gate 1110 while signals M5', B4' and C are combined in an "and" gate 1112. The two outputs of "and" gate 1110 and 1112 are applied as the two inputs of an "or" gate 1114, the output of which is applied to the "off" input terminal of flip-flop $\underline{M2}$. In an "and" gate 1116 signals B4, M5 and C are combined and the resulting coincidence signal is applied to the "on" input terminal of flip-flop $\underline{M2}$.

The "'on" and "off" input terminals of flip-flop $\underline{M1}$ are supplied from the output terminals of "or" gates 1120 and 1122 respectively. Each of these "or" gates has four inputs, the four inputs to "or" gate 1120 being supplied by "and" gates 1124, 1126, 1128 and 1130. The four inputs to "or" gate 1122 are supplied by the outputs of four "and" gates 1132, 1134, 1136 and 1138.

Each of the eight "and" gates associated with "or" gates 1120 and 1122 combine the clock signal C carried on a bus 1140 with a selected three of the six signals carried on the six buses enclosed by the loop marked with the reference character 1142. These six buses carry signals B4, B4', M2, M2', M5 and M5'. The connections from the buses 1142 to the input terminals of the eight "and" gates just mentioned are such, as may be seen from an inspection of Figure 57, as to conform to the four "on" side signal configurations and the four "off" side signal configurations set forth in the above logic equations for flip-flop $\underline{M1}$. The fifth "off" side term for flip-flop $\underline{M1}$ comprises the signal configuration (T33 C) taken from the previously mentioned "and" gate 1096 and applied as indicated at 1144 as one of the inputs to the "or" gate 1122.

Input gating is provided for the driver $\underline{Bd}$ which is so arranged as to function during pulse times P1 to P4 inclusive to add the bits supplied by the driver $\underline{Ad}$ to the output of flip-flop $\underline{M1}$ along with any required carries as produced by flip-flop $\underline{M3}$, thus effecting the addition of the code group representing the next lower order decimal digit to the binary number represented by the output signals of flip-flop $\underline{M1}$ and having a value of ten times the value of the binary number taken from the B register. The required gating is defined by the following logic equation.

$(\underline{Bd}) = U'\phi2\ X4(Ad\ M1\ M3 + Ad\ M1'$
$\quad\quad M3' + Ad'\ M1\ M3' + Ad'\ M1'\ M3)$ The two signals U' and $\phi2$ limit the described operation to Sequence Two of the read cycle, whereas the signal X4 constitutes the "true" output of timing flip-flop X4 which as has been previously explained is "on" during pulse times P1 to P4 inclusive. The four alternative terms enclosed in the parentheses define the four conditions under which the addition of three binary bits must yield a "1" for the sum, namely, when there is presented an odd number of "1's."

The circuitry defining the control of the carry flip-flop M3 is specified by the following logic equations.

$\underline{M3} = X4\ M1\ Ad\ C$
$\underline{M3'} = T0\ C + X4\ M1'\ Ad'\ C + X4'\ M1'\ C$ The two arithmetic terms which include the signal X4 are, of course, operative only during pulse times P1 to P4 and conform to the well known laws determining the production of carries; i.e., a carry is to be produced whenever augend and addend are "1's" and a carry is to be produced thereafter until both addend and augend are "0's." The third alternative term for $\underline{M3'}$ is operative from pulse time P5 to the end of the word and serves to turn M3 off on the first occasion that the output of M1 is a zero. This function relates to the matter of propagating a carry subsequent to pulse time P4 as is hereinafter explained.

The input gating for the driver Bd operative after pulse time P4 is arranged to write into the B register the balance of the binary number as it comes from flip-flop M1. However, in the event a carry was produced by the addition of the bits in pulse positions P4 the carry muse be propagated until an M1' signal is produced by flip-flop M1, such a signal representing a "0" permitting the substitution of the propagated carry and eliminating the need for propagating the carry any further. The circuitry for accomplishing this result is defined by the following logic equation.

$$(Bd) = U'\phi 2 \ X4' \ T0'(M1' \ M3 + M1 \ M3')$$

The signals U' and φ2 are included to limit the operation of the gating to Sequence Two of the read cycle. The signal configuration (X4' T0') defines, as has been previously explained, pulse times P5 to P33 inclusive. In that connection it will be observed that if a carry is produced at pulse time P4 flip-flop M3 will remain on until the first "0" is delivered by flip-flop M1. The M1' signal representing such a zero will then turn M3 off and it will remain off until the end of the word.

Referring now to the logic equation given above defining the operation of driver Bd during the time period X4' T0' (Pulse times P5-P33), it is seen that so long as M1 and M3 are both on (a "1" bit and a "1" carry) the Bd output will be "0" correctly representing the sum bit resulting from the addition of two "1's." As soon as the first "0" from flip-flop M1 is encountered the condition (M1' M3) will be satisfied and Bd will deliver an output signal representing "1" in place of the "0" represented by the M1' signal. This correctly represents the result of adding the "0" in M1 to the "1" carry that has been propagated by M3. The M1' signal will, of course, turn M3 off so that thereafter Bd is controlled by the signal configuration (M1 M3'); i.e., to copy M1 and produce "1's" when flip-flop M1 produces "1's" and to produce "0's" when flip-flop M1 produces "0's."

The circuitry for flip-flop M3 defined by the above logic equations and the additional control circuitry defined above for the driver Bd are shown on Figure 57. Considering first flip-flop M3, it is seen that the "on" input terminal of M3 is connected to the output of an "and" gate 1150 in which are combined signals M1, Ad, X4 and the clock signal C.

The signal configuration (T0 C) produced by the "and" gate 1110 previously mentioned is applied as indicated at 1152 and 1154 to one input of an "or" gate 1156 connected to the "off" input terminal of flip-flop M3. An "and" gate 1158 serves to combine signals M1' and X4' with the clock signal C. The output from gate 1158 is also passed through the "or" gate 1156 to the "off" terminal of flip-flop M3. An "and" gate 1160 serves to combine signals X4, M1' and Ad' with the clock signal C and to pass the resulting coincidence signal through the "or" gate 1156 to the "off" input terminal of flip-flop M3.

With reference to the controls for the driver Bd it will be seen that there is provided an "and" gate 1164 which serves to combine signals U', φ2, and X4 with the output of an "or" gate 1166. "Or" gate 1166 has four inputs supplied by four "and" gates 1168, 1170, 1172 and 1174. Gate 1168 serves to combine signals Ad M1 and M3 while gate 1170 serves to combine signals Ad M1' and M3'.

Gate 1172 serves to combine signals Ad' M1 and M3' while gate 1174 combines signals Ad' M1' and M3'.

The output of "and" gate 1164 is passed through the aforementioned "or" gate 1054 to the input terminal of driver Bd.

Two "and" gates 1176 and 1178 serve respectively to combine the signal T0' with signals M1' and M3 and to combine the signal T0' with signals M1 and M3'. The outputs of "and" gates 1176 and 1178 are connected to the two inputs of an "or" gate 1180, the output of which is applied as one of the inputs to an "and" gate 1182. The other inputs to "and" gate 1182 comprise the signals U', φ2, and X4', the output of "and" gate 1182 being passed through previously mentioned "or" gate 1054 to the input terminal of the driver Bd.

The nature of, and the manner in which the computations are carried out by the above described apparatus may best be understood by a consideration of the timing chart Figure 58. As appears from the drawing the original word introduced into the A register through driver Ad during Sequence One appears at the first word time of Sequence Two in flip-flop Ae and driver Ad shifted four pulse positions or one decimal digit to the right. No computations are actually performed during this first word time in the assumed example because the decimal digits represented by the code groups involved are zeros.

The shifting of the code groups four bit positions to the right each word time continues through the second, third, and fourth word times so that at the fifth word time the decimal digit "7" occupies the first code group position as appears in the output of the driver Ad. This digit alone is copied into the B register through the Bd driver as previously explained. During the sixth word time the original number appears at the output of flip-flop Ae shifted to the right four pulse positions to bring the digit "6" into the lowest order position. At the same time the digit "7" previously copied into the B register through the driver Bd appears at the output of flip-flop B4. This binary number is shifted two places to the left and having a numerical value of twenty-eight appears at the output of flip-flop M5. The line marked "M2 (carry)" indicates the operation of the carry flip-flop M2 and the next line shows the sum of the binary numbers produced by flip-flops B4, M5 and M2, this number being shifted one bit position to the left and having a numerical value of seventy. The next row marked "Ad (6)" shows the binary coded decimal number "96" delivered by the flip-flop Ae. The first code group ("6") of this number is added to the number in M1, the next line marked "M3" showing the operation of the carry flip-flop. The sum resulting from this addition is shown as the binary number in Bd having a numerical value of 76.

At the seventh word time the original word in the A register appears at the output of flip-flop Ae shifted again four bits to the right so as to place the decimal digit "9" in the lowest order code group position. The binary number having a value of 76 previously introduced into the B register through the driver Bd appears at the output of flip-flop B4 and this same binary number shifted two bit positions to the left and having a value of 304 appears at the output of flip-flop M5. The next line in the seventh word time section of Figure 58 marked "M2" shows the operation of the carry flip-flop M2 and the line next below marked "M1" shows the binary number resulting from adding the outputs of B4, M5, and M2 and shifting the sum one bit position to the left. The binary number so produced has a numerical value of 760.

The line marked "Ad (9)" shows the binary number corresponding to the decimal digit "9" supplied by the flip-flop $\underline{Ae}$. The $\underline{M3}$ carry flip-flop is controlled by the signals delivered by flip-flop $\underline{M1}$ and driver $\underline{Ad}$ as hereinabove described; its functioning is indicated by the line marked "M3 (carry)." The sum of the binary numbers produced by flip-flop $\underline{M1}$, driver $\underline{Ad}$ and flip-flop $\underline{M3}$ appear at the output of $\overline{\underline{Bd}}$ and is shown at the last line of the seventh word time of Sequence Two in Figure 58 as a binary number having the value 769, the binary equivalent of decimal word No. 0 taken from the first eight columns of the IBM card shown in Figure 31.

At the end of the seventh word time of Sequence Two the machine transfers to Sequence Three by turning off flip-flop $\phi 2$ and turning on flip-flop $\phi 3$. This is accomplished by the circuits shown in Figure 40 associated with "and" gates 1186 and 1188 and "or" gates 1190 and 505 previously mentioned, the construction and operation of such circuits being also defined by the following logic equations.

$$\underline{\phi 2'} = U' \phi 2 \ Ve \ T33 \ C$$
$$\underline{\phi 3} = U' \phi 2 \ Ve \ T33 \ C$$

As is indicated at 1194 in Figure 59 the pulse $Ve$ $T33$ comes on at the end of word No. 7 by reason of certain circuitry controlling the flip-flop $\underline{Ve}$— which is later described herein.

As a consequence, as will be seen from the above logic equations, flip-flop $\phi 2$ is turned off and flip-flop $\phi 3$ is turned on thus transferring the operation to Sequence Three.

*Sequence Three.—Transfer converted word to recirculating channel.*—The end of Sequence Two and the beginning of Sequence Three marks the end of the conversion operation, word No. 0 having been converted from a binary coded decimal number to a straight binary number which has been placed in the B register through the driver $\underline{Bd}$.

As may be seen from Figure 59, eight word times were consumed in transferring word No. 0 from the recirculating channel to the A register (Sequence One) and converting the word to the straight binary number. Since this number is to be rewritten in the recirculating channel in word space No. 0 in place of original binary coded decimal number therein still contained, it is necessary to wait an additional eight word times until word No. 0 becomes available at the alternate input (i.e., at the write flip-flop $\underline{L1}$). The converted word is accordingly recirculated in the B register for the required eight word times by connecting the input to the driver $\underline{Bd}$ to the output of flip-flop $\underline{B4}$ to cause the driver to place into the one end of the register the data coming out of the other end. The described arrangement of the components utilized in the B register recirculation circuitry is illustrated in block diagram form in Figure 61 which illustrates diagrammatically also the routing of the signals during the ninth word time of Sequence Three during which time the converted word is copied into the J/L channel.

Figure 61:
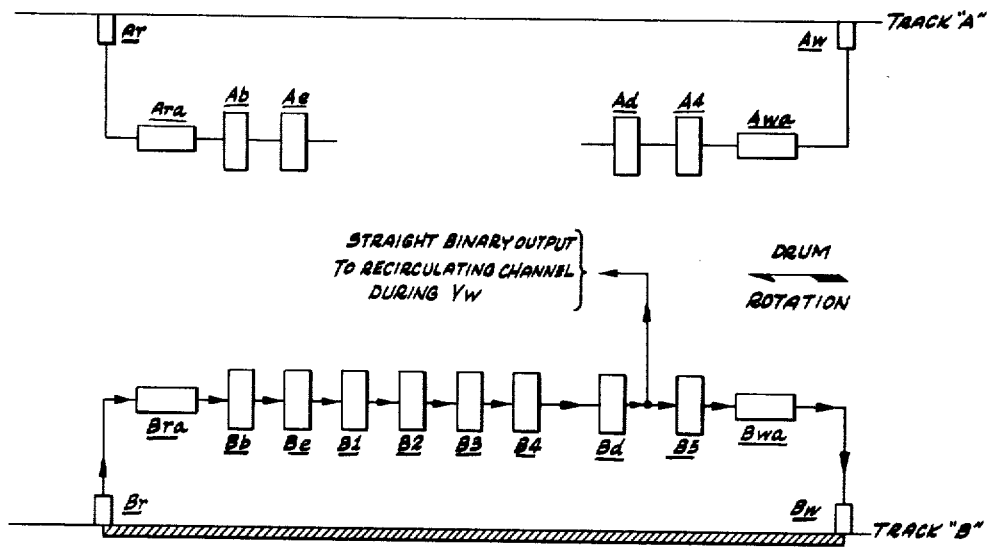
Figure 61 is a block diagram illustrating the functional inter-relationships of the various parts and components operative during Sequence Three of the "read" cycle.

As will be obvious from an inspection of Figures 27 and 61, data read from the B register track on the memory drum will be fed from flip-flop $\underline{B3}$ through flip-flop $\underline{B4}$ and the driver $\underline{Bd}$ to be rewritten on the track at the write head $\underline{Bw}$. This recirculation is accomplished by the circuitry associated with "and" gates 1080, 1088, 1197, and "or" gates 1082 and 1086 in Figure 27, and that associated with "and" gate 1198 as illustrated in Figure 57 and as defined by the following self-explanatory logic equations.

$$\underline{B4} = U' \ \phi 3 \ B3 \ C$$
$$\underline{B4'} = U' \ \phi 3 \ B3' \ C$$
$$\underline{(Bd)} = U' \ \phi 3 \ B4$$

The data circulated through flip-flops $\underline{Ae}$ and $\underline{Be}$ and driver $\underline{Bd}$ during the first eight word times of Sequence Three are shown in the next to last section of Figure 58.

During the ninth word time of Sequence Three the converted word in the B register is copied back into channel J/L. The last section of Figure 58 illustrates the data passed by flip-flop $\underline{Be}$ and driver $\underline{Bd}$. From Figure 59 it will be seen that at the beginning of the ninth word time of Sequence Three (i.e., at the beginning of word No. 16 as seen at the normal input-output station, word No. 0 becomes available at the alternate station). The converted word is thus copied into the original location by connecting driver $\underline{Bd}$ to drive the alternate write flip-flop $\underline{L1}$, $\underline{Bd}$ being supplied with the data from flip-flop $\underline{B4}$ during this ninth word time of Sequence Three by the circuitry defined immediately above.

The entire transfer operation is initiated by the pulse $Ve$ $T33$ $C$ and is controlled by the "on" condition of flip-flop $\underline{Vw}$, the selection of the normal or alternate input to channel J/L being controlled by the flip-flop $\underline{X0}$. As is indicated at 1202 in Figure 59 and as will be subsequently explained the control pulse $Ve$ $T33$ $C$ comes on at the end of word No. 15. Also by reason of the previously explained circuitry controlling flip-flop $\underline{Vw}$, flip-flop $\underline{Vw}$ will be on during word No. 16 as indicated at 1204 in Figure 59.

The normal-alternate input-output selector X0 is (during all sequences other than Sequence Four) controlled by the circuitry which is illustrated in Figure 47 and associated with "and" gates 1208, 1210 and 1212 and the previously mentioned "or" gates 646 and 648. The circuitry so illustrated, and the functioning thereof, is defined by the following logic equations.

$$\underline{X0} = \phi 4' \ F \ T33 \ C$$
$$\underline{X0'} = \phi 4' \ F' \ T33 \ C$$

Since the P33 pulse position of the computer timing channel carries the fifth binary bit of the word identification number it will be seen that the signal F will be produced at P33 time for words No. 16 to No. 31 and that the signal F' will be produced at pulse time P33 for words No. 0 to No. 15. Flip-flop $\underline{X0}$ will accordingly be off during words No. 0 to No. 15 and on during words No. 16 to No. 31 as is indicated by the line marked "X0" in Figure 59.

Thus at the beginning of word No. 16 as seen at the normal input-output station the conditions $Vw$ and $X0$ are established appropriate to copying the output of driver $\underline{Bd}$ into the J/L line at word No. 0 location through the alternate write flip-flop $\underline{L1}$. The circuitry for performing this function is that illustrated in Figure 21 as associated with "and" gate 1220, 1222, 1224 and previously mentioned "or" gate 906, and that associated with "and" gate 1226 and previously mentioned "or" gate 912. The construction and operation of the circuit arrangement thus illustrated is defined by the following logic equations.

$$\underline{L1} = \phi 3 \ X0 \ Vw \ T0' \ Bd \ C$$
$$\underline{L1'} = \phi 3 \ X0 \ Vw \ T0' \ Bd' \ C$$

In the above the signal T0' is included to prevent copying the bit carried by pulse number P0 of the converted word, since this pulse forms no part of the data desired to be entered in the J/L recirculating line.

During the time the converted word is being introduced into the J/L line through flip-flop $\underline{L1}$ it is necessary, of course, to operatively connect the flip-flop $\underline{J1}$ to its associated read flip-flop $\underline{Je}$ in order to maintain the continuity of the circulation circuit. This is accomplished by the circuits illustrated in Figure 20 as associated with "and" gates 1230 and 1232 and the previously mentioned "or" gate 888, and that associated with "and" gate 1234 and previously mentioned "or" gate 894. The construction and operation of the arrangement thus illustrated is defined by the following logic equations.

$$J1 = \phi3 \ X0 \ Je \ C$$
$$\overline{J1'} = \phi3 \ X0 \ Je' \ C$$

In connection with the recirculation in channel J/L it will be appreciated that the data therein must be maintained in constant recirculation all during Sequences One and Two as well as during the first eight word times of Sequence Three. This is accomplished by appropriate circuitry serving during the time periods mentioned to connect flip-flop J1 to follow the output of flip-flop Je and to connect flip-flop L1 to follow the output of flip-flop Le. Such circuitry for flip-flop J1 is illustrated in Figure 20 as that associated with "and" gate 1238, 1240, 1242 and 1244 and previously mentioned "or" gate 888, and that associated with "and" gates 1246 and 1248 and previously mentioned "or" gate 894.

The corresponding recirculation circuits for flip-flop L1 are those illustrated in Figure 21 as associated with "and" gates 1252, 1254, 1256 and 1258 and previously mentioned "or" gate 906, and those associated with "and" gates 1260 and 1262 and previously mentioned "or" gate 912. The construction and operation of the circuits thus illustrated are defined by the following logic equations.

$$J1 = \phi0' \ \phi3' \ \phi4' \ Je \ C + \phi3 \ Vw' \ Je \ C$$
$$\overline{J1'} = \phi0' \ \phi3' \ \phi4' \ Je' \ C + \phi3 \ Vw' \ Je' \ C$$
$$L1 = \phi0' \ \phi3' \ \phi4' \ Le \ C + \phi3 \ Vw' \ Le \ C$$
$$\overline{L1'} = \phi0' \ \phi3' \ \phi4' \ Le' \ C + \phi3 \ Vw' \ Le' \ C$$

As is represented by the timing chart Figure 59 the copying of the converted word into word space No. 0 of the J/L line is completed at the end of the word time No. 16. At this time Sequence Three goes off and Sequence One comes on. This is accomplished by turning off flip-flop $\phi3$ and by turning on flip-flop $\phi1$. This control of flip-flops $\phi3$ and $\phi1$ is effected by the circuits illustrated in Figure 40 as associated with "and" gate 1266 and previously mentioned "or" gate 506 and that associated with "and" gate 1268 and previously mentioned "or" gate 1018. The construction and operation of the circuit arrangement thus illustrated is defined by the following logic equations.

$$\phi3' = \phi3 \ Vw \ T33 \ C$$
$$\phi1 = \phi3 \ Va' \ Vw \ T33 \ C$$

The signal Va' included in the control for turning on flip-flop $\phi1$ merely requires that the apparatus be engaged in the processing of numerical data, it being recalled that flip-flop Va remains in its off condition until it is turned on by the control pulse marking the end of the numerical data. According to the assumed example, words No. 0, 1, 2, and 3 all contain numerical data; accordingly, flip-flop Va will be off, and the transfer to Sequence One will take place as described, and Sequences One, Two, and Three will be repeated to convert the next word of the numerical data.

CONVERT REMAINING NUMERICAL WORDS—WORD SELECTION APPARATUS

The conversion operation previously described as taking place during Sequences One, Two and Three is repeated for each of the words of numeric data to be converted. The preceding description was directed by way of example, to the conversion of word No. 0. Upon the transfer of the operation control to Sequence One the apparatus operates as before to copy into the A and B registers one word from the recirculating channel J/L. On this second occasion, however, the word so copied is word No. 1 rather than word No. 0 which has already been converted. When the conversion of word No. 1 is completed, the apparatus will pick up word No. 2 and convert it, and so on until all of the numeric data is converted, all as is schematically indicated in the lower portion of the timing chart Figure 59.

It will be seen from the foregoing general description that the operation proceeds from one word to the next each time Sequences One, Two, and Three are repeated. This progression through the words one after another is effected by the times at which flip-flop Vw is caused to be on, the signal Vw serving as a control not only for the copying and recirculation operation but also as a control for timing the operation of the sequence flip-flops $\phi1$, $\phi2$, and $\phi3$. Appropriate control of flip-flop Vw is obtained by so controlling the flip-flop Ve as to cause the Ve T33 pulse to be produced at the beginning of the word time during which flip-flop Vw is to be in its "on" condition. To this end the control for flip-flop Ve in all sequences other than Sequence Four is arranged to be governed by certain word selection signals generated by a word counter consisting of flip-flops W1, W2, W3 and W4 interconnected by appropriate gating as illustrated in Figure 55.

Figure 55:
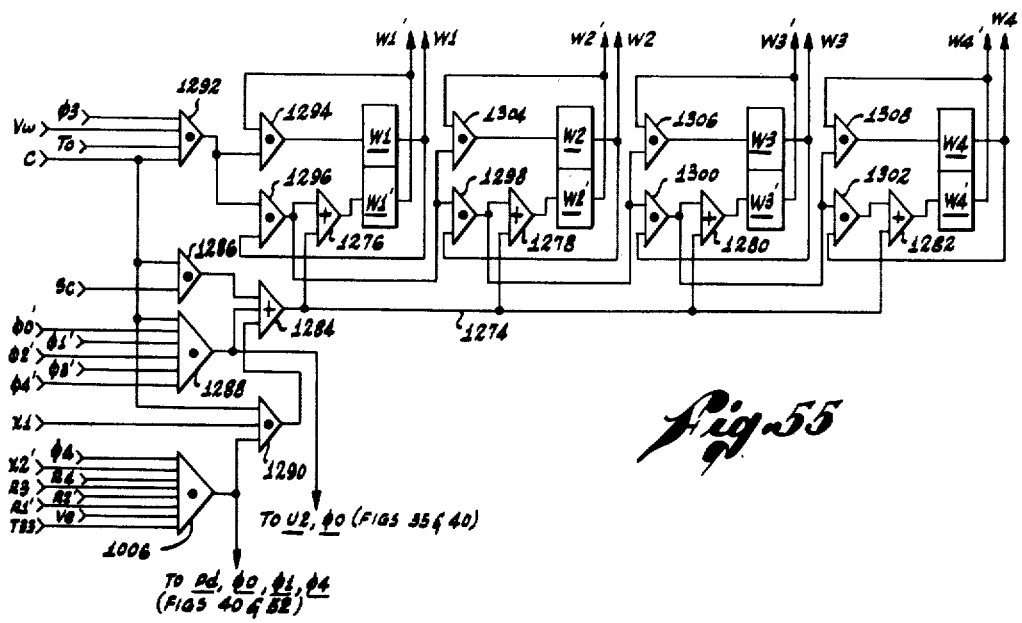
Figure 55 is a schematic diagram of a word counter.

As is illustrated schematically in Figure 55, provision is made for clearing the counter at appropriate times by turning all four flip-flops off. This is accomplished by a clearing bus 1274 connected to the "off" input terminals of the four flip-flops W1–W4 through associated "or" gates 1276, 1278, 1280 and 1282. The bus 1274 is connected to the output of an "or" gate 1284 which serves to pass each of three clearing signals.

The first clearing signal is (Sc C) formed by an "and" gate 1286. The second clearing signal ($\phi0' \ \phi1' \ \phi2' \ \phi3' \ \phi4'$ C) serves to clear the counter wherever all of the sequence flip-flops are in their "off" conditions. This signal is produced by an "and" gate 1288. The third clearing signal operates to clear the register at the end of Sequence Four (i.e., at the final pulse of the last card row) by means of the signal ($\phi4 \ X2' \ X1 \ R4 \ R3 \ R2' \ R1' \ Ve \ T33 \ C$) which is formed by combining the output of previously mentioned "and" gate 1006 with signals X1 and C in an "and" gate 1290.

The word counter is arranged to count up one at each P0 pulse time during Sequence Three that occurs when flip-flop Vw is on, the counting signal configuration being ($\phi3 \ Vw \ \overline{T0} \ C$) which is formed by an "and" gate 1292. The counting circuitry is conventional, the aforementioned counting signal being combined with a signal W1' in "and" gate 1294 for controlling the "on" side of flip-flop W1 and being combined in an "and" gate 1296 with a signal W1 for controlling the "off" side of flip-flop W1. As is conventional, the signal used to control the "off" side of each flip-flop is at the next flip-flop combined with a "true" output signal of such next flip-flop and used to control its "off" side, such an arrangement being shown in Figure 55 in connection with "and" gates 1298, 1300 and 1302. Similarly, the signal used to control the "off" side of each flip-flop is carried to the next flip-flop and combined with a "false" output signal of such next flip-flop to provide a control for the "on" side of that flip-flop, such an arrangement being illustrated by the circuitry associated with "and" gates 1304, 1306 and 1308.

The construction and operation of the clearing circuits previously described are defined by the following equations.

$$W1' = \phi4 \ X2' \ X1 \ R4 \ R3 \ R2' \ R1' \ Ve \ T33 \ C$$
$$+ \phi0' \ \phi1' \ \phi2' \ \phi3' \ \phi4' \ C + Sc \ C$$
$$W2' = \phi4 \ X2' \ X1 \ R4 \ R3 \ R2' \ R1' \ Ve \ T33 \ C$$
$$+ \phi0' \ \phi1' \ \phi2' \ \phi3' \ \phi4' \ C + Sc \ C$$

$$\overline{W3'} = \phi 4 \ X2' \ X1 \ R4 \ R3 \ R2' \ R1' \ Ve \ T33 \ C$$
$$+ \phi 0' \ \phi 1' \ \phi 2' \ \phi 3' \ \phi 4' \ C + Sc \ C$$
$$\overline{W4'} = \phi 4 \ X2' \ X1 \ R4 \ R3 \ R2' \ R1' \ Ve \ T33 \ C$$
$$+ \phi 0' \ \phi 1' \ \phi 2' \ \phi 3' \ \phi 4' \ C + Sc \ C$$

The construction and operation of the counting circuitry above described is defined in the following logic equations.

$$W1 = \phi 3 \ Vw \ T0 \ W1' \ C$$
$$\overline{W1'} = \phi 3 \ Vw \ T0 \ W1 \ C$$
$$W2 = \phi 3 \ Vw \ T0 \ W2' \ W1 \ C$$
$$\overline{W2'} = \phi 3 \ Vw \ T0 \ W2 \ W1 \ C$$
$$W3 = \phi 3 \ Vw \ T0 \ W3' \ W2 \ W1 \ C$$
$$\overline{W3'} = \phi 3 \ Vw \ T0 \ W3 \ W2 \ W1 \ C$$
$$W4 = \phi 3 \ Vw \ T0 \ W4' \ W3 \ W2 \ W1 \ C$$
$$\overline{W4'} = \phi 3 \ Vw \ T0 \ W4 \ W3 \ W2 \ W1 \ C$$

From the above it will be seen that the W counter is cleared to a count of zero (00000) at the first Sequence One marking the beginning decimal-binary conversion. The first coincidence of signals $Vw$ and $\phi 3$ occurs during word No. 16, the last word time of Sequence Three. At P0 time of this word time the word counter is counted up one to a count of 0001, the least significant bit 1 being the "true" output of flip-flop W1. As may be seen from Figure 59, the required counting conditions are encountered at the beginning of the last word time each Sequence Three, so that the word counter is counted up one for each word converted, the count held by the word counter being equal to the word number of the word converted during the time that count is held.

The signals generated by the four flip-flops W1–W4 of the word counter are used to so control flip-flop Ve as to select the word identified by the count held in the flip-flops of the word counter. This is accomplished by turning on flip-flop Ve at every P27 pulse time and turning it off before pulse time P33 for every word except when the word identification signals F/F' correspond to the word counter flip-flop output signals, thus producing the pulse Ve T33 at the beginning of the word which is numbered in correspondence with the word number held by the word counter.

The above mentioned operation of turning off flip-flop Ve when the word numbers do not correspond is effected by comparing the word number signals F/F' at pulse times P28, P29, P30 and P31 with the signals delivered by flip-flops W1, W2, W3 and W4 respectively. As will be seen from Figure 45 the comparison circuits operate through the "or" gate 618 to turn flip-flop Ve off whenever a difference between the two numbers is found. The required signal for turning the flip-flop off is obtained by comparing the "true" identification signal (F) with the "false" outputs (W1'–W4') of the counter flip-flops and by comparing the "false" word identification signals (F') with the "true" outputs (W1–W4) of the counter flip-flops.

As may be seen from Figure 45, the comparison of the F channel signals with the outputs from flip-flop W1 at pulse time P28 is made in the circuits associated with "and" gates 1312, 1314 and 1316 and "or" gate 1318. Similarly, circuits associated with "and" gates 1320, 1322 and 1324 and "or" gate 1326 operate to effect the comparison with the outputs of flip-flop W2 at pulse time P29. The comparison at pulse time P30 with the output signals from flip-flop W3 is carried out in the circuits associated with "and" gates 1328, 1330 and 1332 and "or" gate 1334, while the final comparison at P31 time with the output signals from flip-flop W4 is effected by the circuits associated with "and" gates 1336, 1338 and 1340 and "or" gate 1342.

The signal configuration ($\phi 4'$ C) is formed in "and" gate 1344 and combined with the above mentioned comparison signals in "and" gates 1316, 1324, 1332 and 1340, the outputs of which are all passed through the aforementioned "or" gate 618 to the "off" input terminal of flip-flop Ve. In addition to the above, a signal $\phi 2'$ is combined in "and" gate 1340 to render ineffective during Sequence Two the comparison made at pulse time P31 between the F channel signal and the output signal from flip-flop W4.

The construction and operation of the circuit arrangement thus schematically illustrated in Figure 45 are defined by the following logic equations.

$$Ve = T27 \ C$$
$$\overline{Ve'} = \phi 4' \ (T28 \ F) \ W1' \ C + \phi 4' \ (T28 \ F') \ W1 \ C$$
$$+ \phi 4' \ (T29 \ F) \ W2' \ C + \phi 4' \ (T29 \ F') \ W2 \ C$$
$$+ \phi 4' \ (T30 \ F) \ W3' \ C + \phi 4' \ (T30 \ F') \ W3 \ C$$
$$+ \phi 2' \ \phi 4' \ (T31 \ F) \ W4' \ C + \phi 2' \ \phi 4' \ (T31 \ F') \ W4 \ C$$

From the above logic equations it will be seen that flip-flop Ve is controlled by only four of the digits of the five digit word number so that (as was the case with the comparison described in connection with Sequence Four) the pulse Ve T33 will be produced twice each revolution of the memory drum; once, marking the beginning of the word numbered in correspondence with the setting of the word counter, and again at the alternate of such identified word, the term "alternate" in this context being used to indicate a word having a number sixteen greater or sixteen less than the word called for by the word counter. In other words, for a word counter setting of 00000, Ve T33 will precede words No. 0 and No. 16; for a counter setting of 00001, Ve T33 will precede each of words No. 1 and No. 17; etc.

What has just been said applies during Sequences Zero One and Three. In Sequence Two the comparison of the fourth digit is inoperative by reason of the signal $\phi 2'$ with the result that during Sequence Two the pulse Ve T33 is produced four times each drum revolution, once every eight word times, with the first of the four being produced immediately preceding the word called for by the word counter setting.

The functioning of the word counter (flip-flops W1–W4) during the conversion operation of the "read" cycle is shown in Figure 59 by the line marked "W count." The next line marked "Ve 132, Ve 133" shows the times at which the correspondingly designated pulses are produced and the next line shows the production of the signal $Vw$. The functioning of flip-flops Ve and Vw for all sequences is illustrated in the timing chart, Figure 46, and summarized in the two tables included in that figure.

It will now readily be seen that the end of the conversion operation with respect to each word is marked by the production of two successive Ve T33 pulses spaced apart one word time as is indicated in Figure 59, for example, by the pulses 1202 and 1343, by the pulses 1344 and 1345, and the succeeding pairs as is indicated on the drawing. Since each of these Ve T33 pulses causes flip-flop Vw to be "on" (except during Sequence Two), the Vw signal is produced for two consecutive word times as is indicated in Figure 59 at 1204 and 1346, at 1347 and 1348, and so on as indicated on the drawing. Also, as will be observed the two word times during which Vw is "on" comprise the last word time of each Sequence Three and the one word time comprising the immediately following Sequence One. The second word time of each double word time "on" period for Vw provides the necessary Vw signal for effecting the transfer from Sequence One to Sequence Two as previously explained.

It will now be observed that as the word counter counts up one upon the conversion of each word the times during which the $\phi 3$ Vw and $\phi 1$ Vw coincidences occur are likewise advanced by one word number. In this fashion the next word converted is caused always to be the one immediately following the word just converted. This is represented in the lower part of Figure 59 which shows also that the Sequence Three write and immediately following Sequence One read operations first occur at one input-output station and then at the other, the converted word being written into the J/L channel at the station alternate to that at which it was picked up.

The circuitry for supplying the data to channel J/L through the normal input station when flip-flop X0 is off, and for establishing the recirculating connection at the alternate input station, is shown in Figure 20 as that associated with "and" gates 1349, 1350, and 1351, and previously mentioned "or" gate 888, together with that associated with "and" gate 1352 and previously mentioned "or" gate 894; in Figure 21 it is that associated with "and" gates 1353 and 1354, and previously mentioned "or" gate 906, together with that associated with "and" gate 1355 and previously mentioned "or" gate 912. The construction and operation of the circuits thus schematically shown are defined by the following logic equations:

$$\underline{J1} = \phi3 \ Vw \ X0' \ T0' \ Bd \ C$$
$$\underline{J1}' = \phi3 \ Vw \ X0' \ T0' \ Bd' \ C$$
$$\underline{L1} = \phi3 \ X0' \ Le \ C$$
$$\underline{L1}' = \phi3 \ X0' \ Le' \ C$$

The above described word by word conversion of the information in the J/L channel from binary coded decimal data to straight binary numbers continues until all of the numeric data has been converted. In the assumed case represented by the IBM card as shown in Figure 31, four words No. 0, No. 1, No. 2 and No. 3 are thus converted. At pulse time P32 of word No. 3 the alphabetic control pulse is reproduced from control channel H/I, putting a stop to the conversion operation by turning off Sequence Three without turning on Sequence One thus either putting the machine into Sequence Blank (all sequence flip-flops off), or, if an exchange order Oe has been reached in the computer program, transferring the operations to Sequence zero.

NUMERIC-ALPHABETIC CONTROL

When the last of the numerical data has been converted the alphabetic-numeric control pulse recorded by the program author in pulse position P32 of the last word of numeric data is read by the H/I channel read circuitry. As will be described, this pulse is relayed through the pulse driver $\underline{Pd}$ and used to turn the alphabetic-numeric flip-flop $\underline{Va}$ on at the beginning of pulse time P33. This eliminates the Va' signal required as previously explained to turn Sequence One on following Sequence Three so that Sequence One flip-flop $\phi1$ remains in the "off" condition. Sequence Three goes off, however, as previously explained at the end of the pulse time P33 by the normal operation of the circuitry previously described.

The circuit arrangement by which the pulse driver $\underline{Pd}$ is caused to pass the alphabetic-numeric control pulse on to flip-flop $\underline{Va}$ comprises those circuits illustrated in Figure 52 as associated with the previously described "and" gates 790, 792 and "or" gate 794 along with "and" gates 1356 and 1357 and "or" gate 800. The circuits for turning flip-flop $\underline{Va}$ "on" in response to the output of driver $\underline{Pd}$ are those illustrated in Figure 52 as associated with "and" gates 1358 and 1360, "or" gate 1359, and previously mentioned "or" gate 868.

The construction and operation of the circuit arrangement thus schematically shown is defined by the following logic equations.

$$(\underline{Pd}) = \phi3 \ Vw \ T32(X0' \ He + X0 \ Ie)$$
$$\underline{Va} = \phi3 \ Pd \ C$$

Flip-flop $\underline{Va}$ is turned "off" as soon as it has performed its required function; i.e., at the end of pulse time P33, Va being "on" for only one pulse time. The circuitry for so turning off flip-flop $\underline{Va}$ is that associated with "and" gates 1361 and 1362 and the previously mentioned "or" gate 999 shown in Figure 52. The construction and operation of this circuit arrangement is defined by the following logic equation.

$$\underline{Va}' = \phi3 \ Vw \ T33 \ C$$

It is thus seen that the action of the alphabetic-numeric program control pulse recorded in the H/I channel at pulse position P32 by the program author has the effect of arresting the conversion operation. The remaining data in the J/L channel, which is presumably all alphabetic, is merely held in the channel without modification, and the contents of the J/L channel are then in readiness for transfer into the digital computer.

*Sequence Zero—Data transfer from recirculating channel to computer working channel.*—The transfer of the data from the recirculating channel J/L to the computer working channel is effected during a phase of the operation which has been designated Sequence Zero, so designated because it is identified by the "on" condition of flip-flop $\phi0$ and the "off" condition of the remaining sequence flip-flops. As is indicated in the timing chart for the entire "Read" cycle (Figure 30), an exchange order given sufficiently early in the computer program will provide a waiting exchange order signal Oe at the time $\phi3 \ Vw \ Ve$ T32 (pulse time P32 in the last word time of Sequence Three) when the decimal-binary conversion operation is completed. The presence of the order signal Oe at this time will effect an immediate transfer from Sequence Three to Sequence Zero. On the other hand, if the order has not been given, Sequence Three will go off leaving the operations in that phase, designated Sequence Blank, during which the machine will idle until the exchange order is given. The operations will then transfer to Sequence Zero at the first Ve T32 pulse following the appearance of the order signal Oe.

The circuitry for turning on Sequence Zero from Sequence Blank are shown in Figure 40 as those associated with "and" gate 1364 and "or" gate 1366. The circuits for turning flip-flop $\phi0$ on directly at the end of Sequence Three are those associated with "and" gate 1368, the output of which is also fed through "or" gate 1366 to the "on" input terminal of flip-flop $\phi0$.

The construction and operation of the circuits thus illustrated are defined by the following logic equations:

$$\phi0 = (\phi0' \ \phi1' \ \phi2' \ \phi3' \ \phi4')Oe \ Ve \ T32 \ C$$
$$\phi0 = (U'\phi3 \ Vw \ Ve \ T32)\phi X' \ Oe \ Pd \ C$$

In the first equation set forth above, the signal configuration enclosed in parentheses merely marks the Sequence Blank condition. Ve T32 specifies, of course, pulse time P32 of the word preceding word No. 0 or word No. 16 as previously described. If, at these times and under these conditions, the exchange order signal Oe is present, flip-flop $\phi0$ will be turned on.

In the second equation above set forth, the signal configuration enclosed in parentheses merely identifies the pulse time P32 of the last word of any Sequence Three. The signal $\phi X'$ will be present since, as will be explained, flip-flop $\phi X$ can be turned on only in Sequence Zero, a sequence which has not yet been reached in the operating cycle presently under consideration. The preliminary gating configuration being completed by the presence of the exchange order signal Oe, flip-flop $\phi0$ will be turned on by the output of the pulse driver $\underline{Pd}$, a signal which is produced, as previously described, at pulse time P32 of the last word time utilized in the conversion of the last of the numeric data.

The transfer of the data from the recirculating channel J/L to the working channel of the computer is effected by exchanging information so that what was in the recirculating channel will be found in the computer working channel, and what was in the computer working channel will be found in the recirculating channel. Any unwanted data that are thus placed in the recirculating channel are merely obliterated by the new data which are written into the recirculating channel during the reading of the next card.

Figure 62:
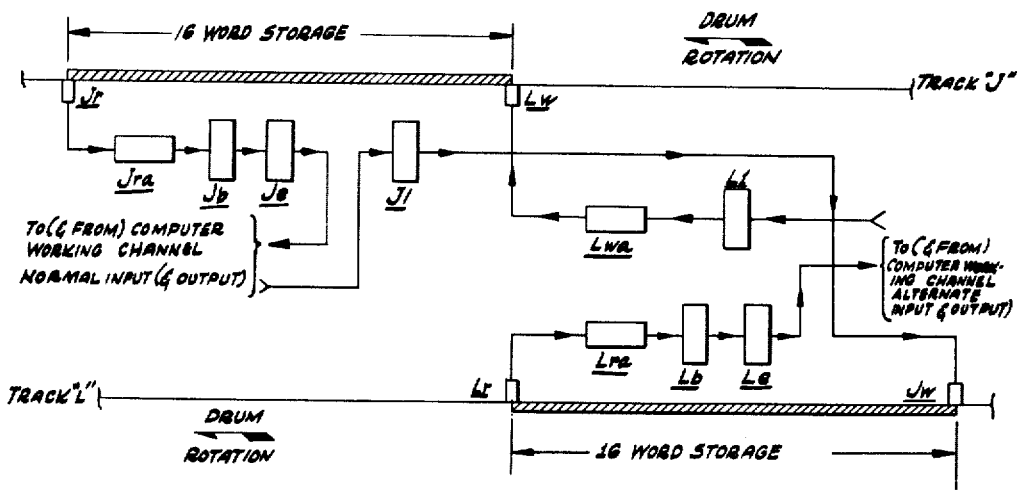
Figure 62 is a block diagram showing the functional inter-relationships of the various parts and components operative during Sequence Zero of the "read" cycle.

The above-mentioned exchange of information between the computer working channel and the recirculating channel, an operation which is completed in sixteen word times, is effected in the manner shown diagrammatically by the block diagram Figure 62.

The information exchange begins as soon as Sequence Zero comes on; i.e., with pulse P0 of words No. 0 or No. 16. As is indicated in Figure 62, the normal read flip-flop $\underline{Je}$ is connected to deliver the data to the normal write flip-flop of the computer working channel and the alternate read flip-flop $\underline{Le}$ is connected to supply data to the alternate write flip-flop for the computer working channel. At the same time the normal write flip-flop $\underline{J1}$ is gated to accept data from the computer working channel normal read flip-flop and the alternate write flip-flop $\underline{L1}$ is gated to accept data from the computer working channel alternate read flip-flop. In this way the thirty-two words of the channel are exchanged in sixteen word times, words No. 0 to No. 15 inclusive being exchanged at the normal read and write flip-flops $\underline{Je}$ and $\underline{J1}$ and words No. 16 to No. 31 being exchanged at the alternate read and write flip-flops $\underline{Le}$ and $\underline{L1}$.

As shown in Figure 20, the circuits for feeding the data from the computer working channel into the write flip-flop $\underline{J1}$ are those associated with the "and" gates 1372, 1374, and 1376, and the "or" gates 888 and 894, previously mentioned, the information signals from the normal output of the computer working channel being represented as Y1 and Y1'. The circuit arrangement for feeding data from the computer working channel alternate output into flip-flop $\underline{L1}$ is similar, being that shown in Figure 21 as associated with "and" gates 1380, 1382 and 1384 and the previously mentioned "or" gates 906 and 912, the information signals from the computer being represented by the designations Z1 and Z1'.

The construction and operation of the circuits just described are defined by the logic equations:

$$J1 = \phi 0 \ Y1 \ C$$
$$\overline{J1'} = \phi 0 \ Y1' \ C$$
$$\underline{L1} = \phi 0 \ Z1 \ C$$
$$\overline{L1'} = \phi 0 \ Z1' \ C$$

A similar gating arrangement is employed in the digital computer itself for conditioning the working channel normal and alternate write flip-flops to accept from the converter-transducer recirculating channel the information signals Je, Je', and Le, Le'.

Sixteen word times after it came on, the exchange of information between the recirculating channel and the computer working channel then being completed, Sequence Zero goes off. This is accomplished by turning off flipflop, $\phi 0$ through the circuit arrangement illustrated in Figure 40, as associated with "and" gate 1388 and previously described "or" gate 503. The construction and operation of this circuit arrangement is defined by the following logic equation:

$$\phi 0' = \phi 0 \ Ve \ T32 \ C$$

That Sequence Zero lasts for sixteen word times is indicated by the fact that it is turned on by one Ve T32 pulse and turned off by the next, these pulses occurring each sixteen word times as previously described.

The completion of the data transfer operation and the turning off of Sequence Zero marks the end of the "Read" cycle. During this cycle, which is performed automatically under the control of the internal program of the digital computer, and which is completed in less than 600 milliseconds, all of the data, both numeric and alphabetic, recorded on an IBM card are transferred into the working channel of the digital computer, numeric information being presented in the form of straight binary numbers ready for immediate use by the computer circuitry, and the alphabetic information being introduced as binary coded alphabetic characters.

*Continuous card reading.*—The computer program may be arranged, if desired, to cause continuous operation of the card reading machine. This is accomplished by interposing in the computer program between the first start order Os and the first exchange order Oe a second start order Os. The second start order must be given after the start signal "s" is delivered by the card reading machine, and early enough in the operating time of the card reading machine to turn flip-flop $\underline{Ms}$ back on and so prevent the automatic disengagement of the driving clutch. Also, the exchange order Oe must be given before the data conversion operation is completed in order to avoid the wasted idle time which will follow in Sequence Blank if the exchange order is not given sufficiently early.

By way of example, it has been found that continuous card reading may be effected by giving the second start order Os about 300 milliseconds after the initial clutch engagement, and by giving the first exchange order at about the time the data conversion operation is started; i.e., about 570 milliseconds after initial clutch engagement. Start orders Os and exchange orders Oe are then alternated, being presented at like relative times in each subsequent operating cycle of the card machine.

*"Punch" cycle (from computer to card)*

In the "punch" cycle which is initiated and controlled automatically by appropriate orders and program control pulses forming a part of the internal program of the digital computer, the flow of data is in a direction opposite that described with reference to the "read" cycle. In the "punch" cycle numeric data expressed as straight binary numbers and binary coded alphabetic data are transferred to the converter-transducer. The binary numbers are then converted to binary coded decimal form and these code groups together with the binary coded alphabetic data are then distributed to the punch selectors of the card punching machine 104 in appropriate relation to the feeding of the card through the machine so as to transfer the data correctly to the card in the form of the usual holes punched in the appropriate locations.

Figure 63:
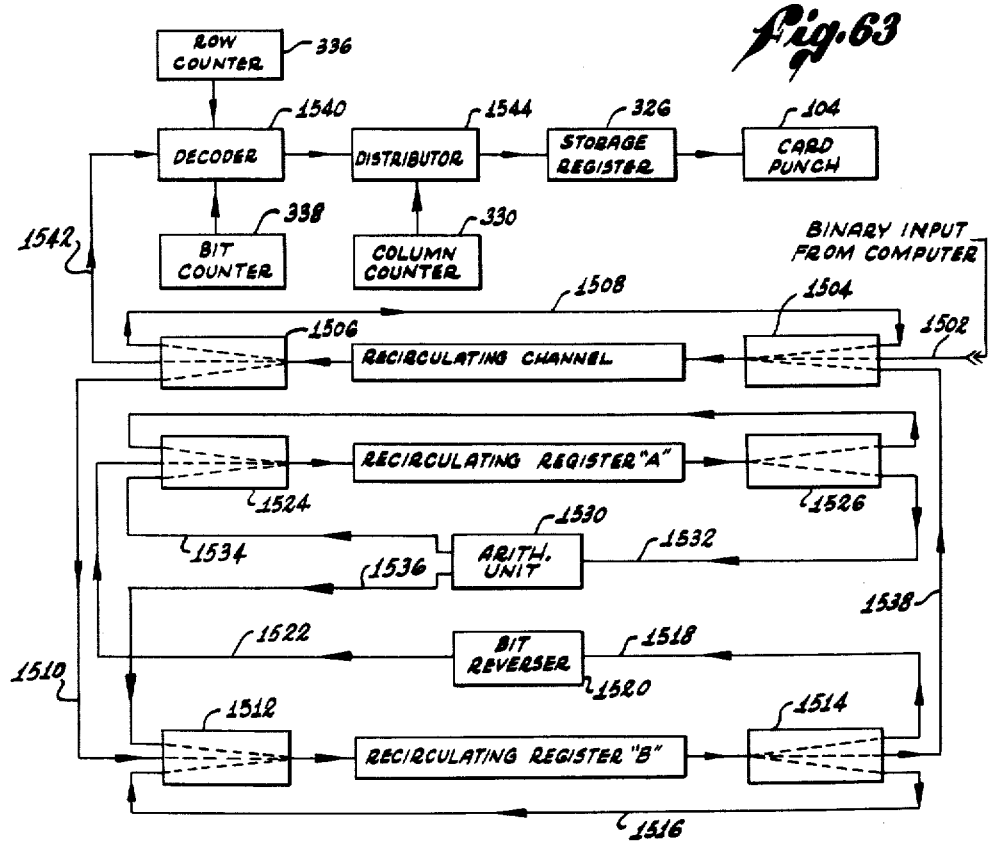
Figure 63 is a block diagram illustrating generally the functional inter-relationships of the major parts and components of the apparatus operative during the "punch" cycle.

As may be seen from Figure 63 which is a block functional diagram illustrating the operation of the converter-transducer during the "punch" cycle, the instrumentalities used to transmit the data from the computer to the card punching machine 104 are generally the same as those used in the "read" cycle. As may be seen from Figure 63, the data from the computer are introduced into the converter-transducer as indicated at 1502, passing through suitable gating 1504, to be recorded in the recirculating channel. The data are recirculated in the channel as required by cooperation of suitable output gating 1506 with the input gating 1504 as diagrammatically represented by the flow line 1508.

The numeric data in the recirculating channel are taken a word at a time from the output gating 1506, as indicated at 1510, and applied through appropriate input gating 1512, to recirculating register B. While the word contained in register B is recirculated through cooperation of output gating 1514 with the input gating 1512, as represented by the flow line 1516, the data are also routed as indicated at 1518 through a bit reverser 1520, the output of which is connected, as indicated at 1522, through appropriate input gating 1524, to recirculating register A. This operation is continued until the entire word is built up in recirculating register A with the bits appearing in reversed order, the data being preserved by recirculation in register A through cooperation of suitable output gating 1526 with the input gating 1514, as is schematically represented by the flow line 1528.

When the entire word, taken from the recirculating channel, has been placed in register A with its individual bits arranged in reversed order, the output gating 1526 functions to circulate a part of the word through an arithmetic unit 1530, as is indicated by the lines 1532 and 1534.

The arithmetic unit performs a division operation using a built-in divisor 10 to develop a series of individual code groups each representing a decimal digit. These code groups, which represent the remainders resulting from each successive division, are transmitted as indicated at 1536 through the input gating 1512 and placed in register B, the quotients being returned as indicated at 1534 through input gating 1524 to recirculating register A. In this fashion a binary coded decimal number is built up in register B.

When conversion of each word of numeric data is completed, the converted word then held in register B is routed by the gating 1514 to the recirculating channel, through the input gating 1504, as is represented by the flow line 1538, the controls being so arranged that the binary coded decimal data is written into the recirculating channel in the same word space as that from which the original binary data were taken. In this fashion, word-by-word, the binary data are converted to binary coded decimal data; alphabetic data contained in the recirculating channel remain unaltered.

When the conversion operation is completed, the contents of the recirculating channel are then routed by action of the output gating 1506 to a de-coder 1540, as indicated by the flow line 1542.

The decoder 1540 cooperates with the row counter 336 and the bit counter 338 in a manner somewhat analogous to that previously described with reference to the "read" cycle to deliver to a distributor 1544 signals appropriate to the setting of the individual storage elements of the eighty element storage register 326. The distributing action of the distributor 1544 is governed by the column counter 330 in such wise that the storage register elements are set in accordance with the intended columnar location of the data. This operation is continued until all of the data relative to one card row are placed in the storage register, whereupon the contents of the storage register are transferred to the punch card by actuation of the appropriate punch selectors of the card machine 104. This operation is repeated for each of the twelve rows of the card.

Figure 64:
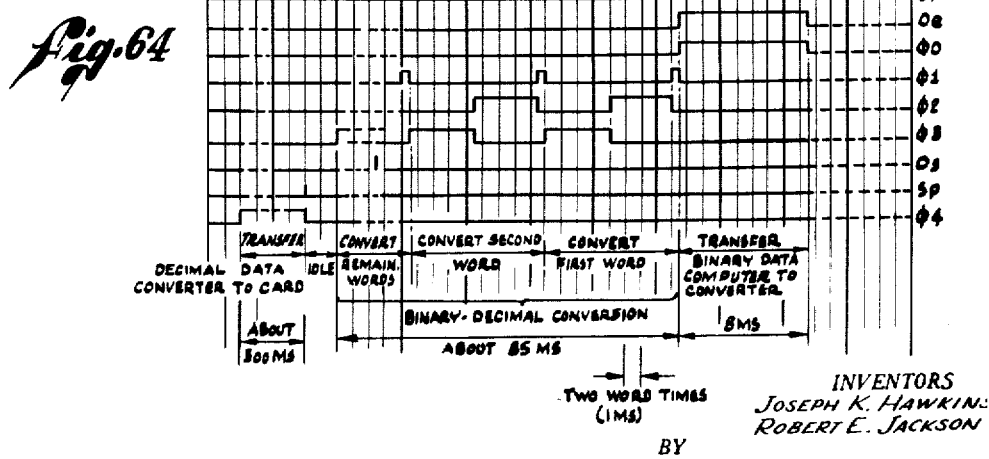
Figure 64 is a timing chart illustrating the relative times of occurrence of the various sequences and phases comprising the "punch" cycle.

As was the case with the "read" cycle previously described, the above-mentioned functions occur in a regularly timed series of sequences which are represented in a timing chart Figure 64. As is therein indicated, the "punch" cycle is initiated by including in the computer program a punch order O*p* followed by an exchange order O*e*. The punch order O*p* serves to select the card punching machine 104 and to condition the logic and control section 114 for the performance of the computational and logical functions appropriate to the cycle being considered. As soon as the exchange order O*e* is given, the apparatus goes into Sequence Zero which lasts for eight milliseconds, and during which time the data are transferred from the computer working channel to the recirculating channel J/L.

The binary to decimal conversion operation starts at the conclusion of Sequence Zero and consists of a repetitive series of operations performed in three sequences, designated Sequence One, Sequence Two and Sequence Three, the series of three sequences being repeated for each word converted.

During Sequence One, the first word of the recirculating channel is transferred to register B; during Sequence Two, the binary number in register B is written into register A with the order of the bits reversed; and during Sequence Three, the reversed binary number is subjected to the computational routine which produces in register B the binary coded decimal number. Sequence One lasts for one word time; Sequence Two lasts for eight word times; and Sequence Three lasts for eight word times.

The individual words of numeric data carried in the recirculating channel are in this fashion converted, a word at a time, and replaced in their original locations in the channel. Ten such words (the entire contents of an IBM card) are converted in about 85 milliseconds.

At the appropriate time during the conversion operation the start order O*s* is given which serves to engage the clutch of the card punching machine to start the first blank card feeding toward the card punches. Before the card reaches the first punching position, the binary-decimal conversion will have been completed, and the machine idles until the start pulse S*p* is produced. This pulse transfers the operation to Sequence Four during which time the binary coded decimal data and the binary coded alphabetic characters are decoded, distributed and punched into the card, row-by-row, until the twelfth card row is punched, an operation requiring about 500 milliseconds.

The individual elements and components utilized and the manner of their functioning in carrying out the series of operations thus generally described, are considered in detail in the ensuing subdivisions of this section.

MACHINE SELECTION AND START CONTROL

The "punch" order O*p* serves to turn on flip-flop U2 through gate 415 (Figure 35), and U2 in turn energizes relays U1 and U (Figure 36, thus operatively connecting the logic and control section 114 (Figure 2) to the card punching machine 104. Switches 423 and 424 serve to ground conductor 434 and connect conductor 433 to the +15 volt source, thus transmitting to the logic and control section the signal U representing the punch cycle.

The order O*s*, when it is ultimately given, turns on flip-flop M*s*, as was described in connection with the "read" cycle, thus engaging the clutch of the punch machine 104, the start controls having been transferred from the reading machine 103 to the punch machine 104 by the energization of relay U. In this connection, it will be noted that relay U will remain energized so long as flip-flop U2 is in its "on" condition, and further, that once turned on, flip-flop U2 can be turned off only by a read order O*r* given during Sequence Blank. The signal U produced by the energization of relay U is the signal U appearing in the various wiring diagrams and logic equations hereinafter described with reference to the punch cycle.

Figure 65:
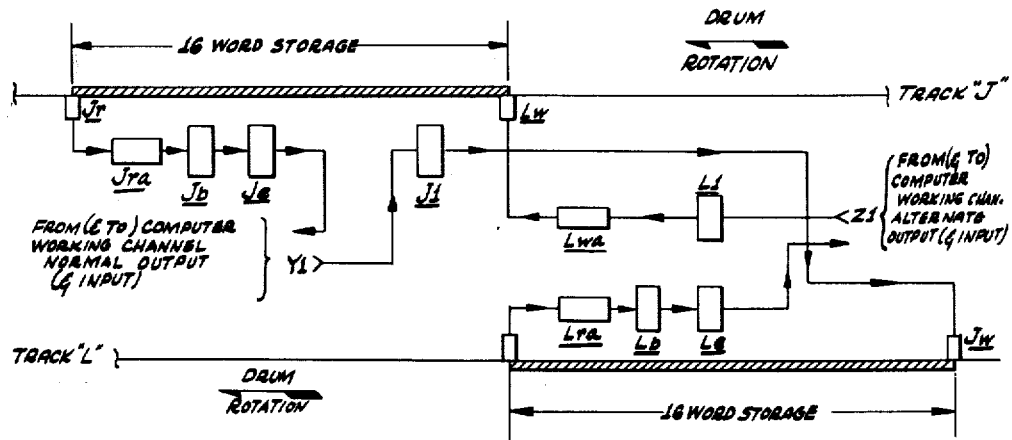
Figure 65 is a block diagram illustrating the functional inter-relation of the various parts and components operative during Sequence Zero of the "punch" cycle.

*Sequence Zero—Transfer data from computer working channel to recirculating channel.*—The actual functioning of the converter-transducer begins with the giving of the exchange order O*e* which serves to turn on Sequence Zero as soon as word No. 0 arrives at either the normal or alternate input position, as was described previously. During Sequence Zero which lasts for 16 word times, the entire 32 word contents of the computer working channel are written into the recirculating channel J/L in the manner indicated by the block diagram Figure 65. The transfer is actually effected by an exchange of information between the two channels in exactly the same manner and utilizing exactly the same instrumentalities as was previously described in connection with the "read" cycle.

At the end of the sixteenth word time of Sequence Zero, the pulse V*e* T32 is produced turning off Sequence Zero in a manner previously described and turning on Sequence One, the first sequence of the conversion operation.

The operation is transferred to Sequence One by turning on Sequence flip-flop $\phi 1$. This is effected by means of the circuitry illustrated in Figure 40 associated with "and" gate 1548 and previously mentioned "or" gate 1018. The construction and operation of this circuitry is defined by the following logic equation:

$$\phi 1 = U\ \phi 0\ Ve\ T32\ C$$

CONVERSION OF NUMERICAL DATA—BINARY TO DECIMAL

The binary to decimal conversion performed in the punch cycle during Sequences One, Two, and Three, is, generally speaking, the converse of the decimal to binary conversion described with reference to the "read" cycle. The binary to decimal conversion is, in substance, effected by dividing the binary number by ten to produce a quotient and a remainder, the remainder constituting a binary number having a value of nine or less, and thus being equivalent to a single code group of a binary coded decimal number. The quotient produced by the division is then divided by ten to produce a new quotient and a new remainder which serves as the next code group of the binary coded decimal number which is thus built up by a repeated series of such dividing operations.

The conversion of all of the numeric data carried by the recirculating channel is effected word-by-word, each word being taken from the channel, converted, and replaced in the channel in its original location, a series of operations which is continued until the reading of the alphabetic-numerical control pulse stops the conversion operation.

*Sequence One.—Transfer one word to register B.—* Since Sequence One comes on at the pulse following $Ve$ T32, the first word to be copied from the recirculating channel is word No. 0, the data signals being taken either from the normal read flip-flop $Je$ or the alternate read flip-flop $Le$ depending upon the condition of the normal-alternate indicator flip-flop $X0$, as has already been explained. The data are copied into the B register through the driver $Bd$ in the manner diagrammatically illustrated by the block diagram Figure 66. The circuits used for so selectively connecting the input of driver $Bd$ to the outputs of the read flip-flops $Je$ and $Le$ are those shown in Figure 67 as being associated with "and" gates 1552, 1554, and 1556, and "or" gate 1558. The circuits so illustrated and their operation are defined by the following logic equation:

$$(Bd) = U\ \phi 1\ (X0'\ Je + X0\ Le)$$

Figure 66:
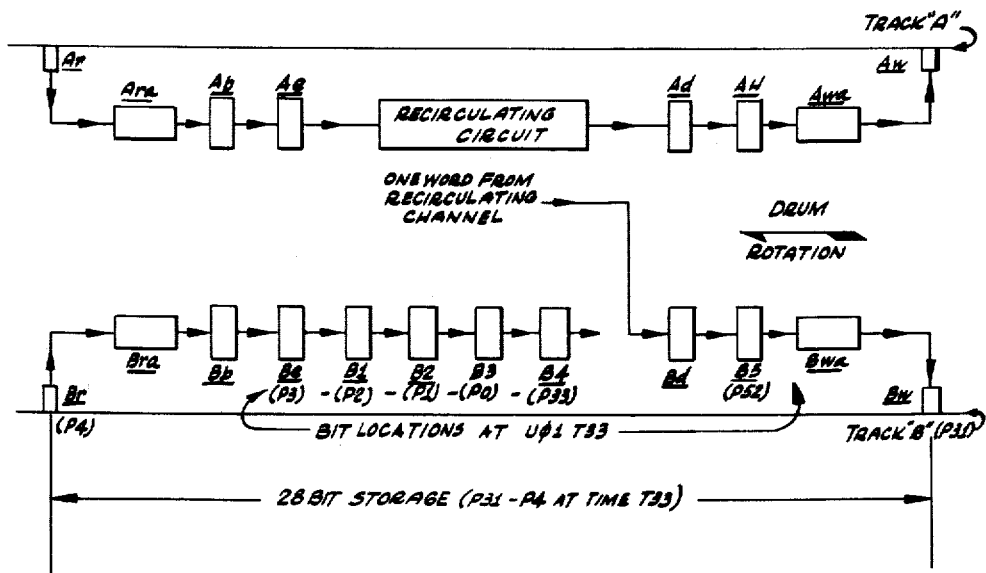
Figure 66 is a block diagram illustrating the functional relationship of the various components operative during Sequence One of the "punch" cycle.

Sequence One lasts for one word time, terminating at the end of pulse time P33, at which time the individual bits of word No. 0 occupy the positions indicated by the legends in Figure 66. At the fall of the clock concluding pulse time P33, Sequence One goes off and Sequence Two comes on in the same manner as was explained in connection with the "read" cycle.

*Sequence Two.—Bit reversal.—*During Sequence Two, which in the punch cycle lasts for eight word times, the word which is held in the B register is transferred into the A register with the order of the bits reversed so that the most significant bit will occupy pulse position P1 and the least significant digit will occupy pulse position P32. This reversal of the bits is effected by the apparatus illustrated diagrammatically by the block diagram Figure 68. As is shown therein, the bit reversing apparatus, which is represented by the broken line 1562, comprises four flip-flops $D6$, $D7$, $D8$ and $D9$, and four gating circuits indicated generally by reference characters 1564, 1566, 1568, and 1570. The four flip-flops D6–D9 are connected in a chain between the output of flip-flop B4 and the input to driver $Bd$, thus increasing by four pulses the length of the B register, thereby causing the bits in the B register to shift to the left four binary orders each word time. Concurrently, once each word time, four bits from the B register are selected by the gates 1564, 1566, 1568 and 1570 and introduced one after the other into the driver $Ad$ and so placed in the A register. The gating networks just mentioned are arranged to take the four bits in inverse order starting with bit P32. The four order left shift which occurs in the B register each revolution serves to supply four new bits to the selective gating networks each revolution, these new groups being transferred into the A register in reverse order. At the same time, the A register is shortened four bits by connecting the output of flip-flop $Ae$ to the input of driver $Ad$ so as to cause the contents in register A to shift right four bits each word time. This right shifting of the bits in register A makes room for the group of four bits introduced from B each word time. Since four bits are exchanged between registers in reverse order each word time, the thirty-two bits comprising the entire word are transferred in reverse order in the eight word time duration of Sequence Two.

Figure 68:
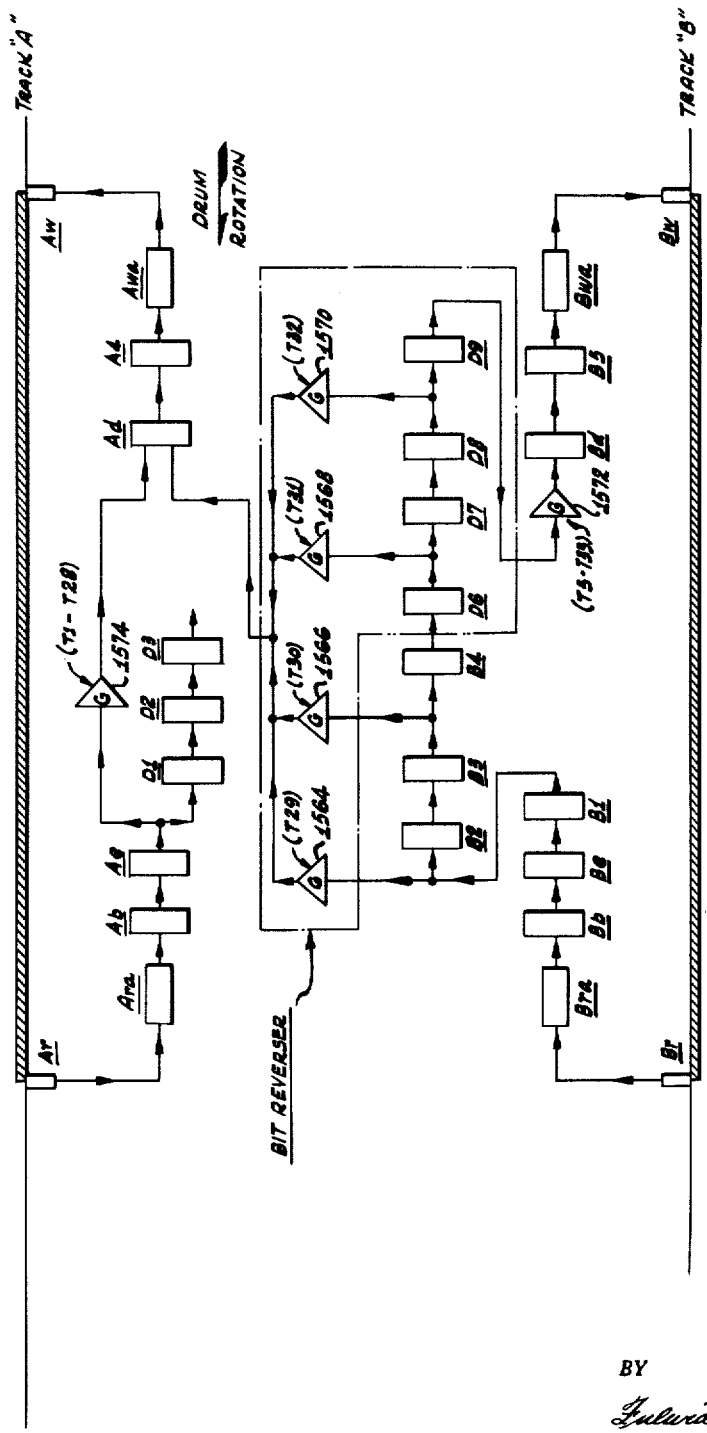
Figure 68 is a block diagram showing the inter-relationship of the various components utilized during Sequence Two of the "punch" cycle.
Figure 69:
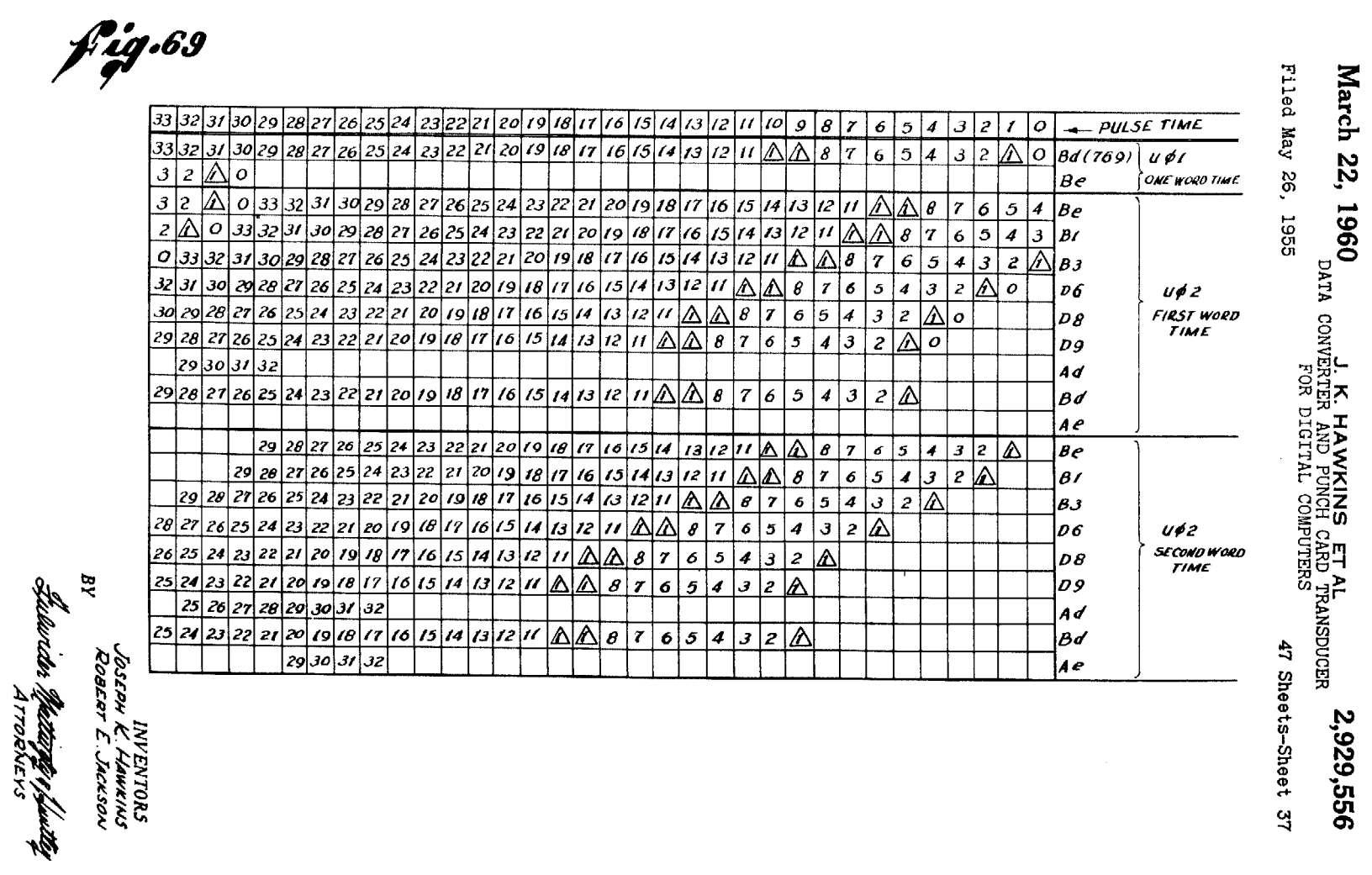
Figure 70:
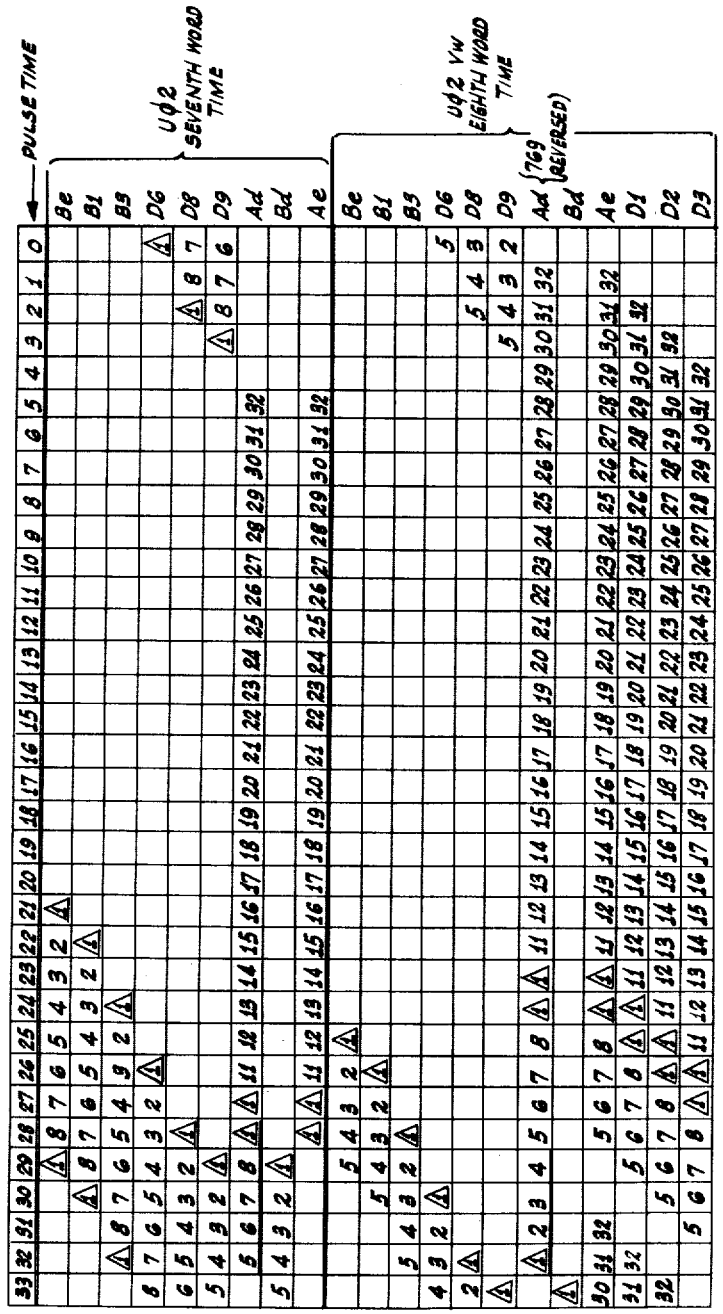
Figure 70 is a timing chart forming a continuation of Figure 69 and showing the operation during the seventh and eighth word times of Sequence Two.

The operation of the apparatus represented in Figure 68 may be better understood by reference to Figures 69 and 70 which are timing charts showing the functioning of the various components indicated schematically in Figure 68. Figure 69 shows the word introduced into the B register during Sequence One and the steps in the bit reversing operation which are carried out in the first and second word times of Sequence Two. Figure 70 shows the completion of the bit reversing operation, indicating the functioning of the various components during the seventh and eighth word times of Sequence Two. In these figures the heavy horizontal lines are used to separate one word time from another. The pulse times are indicated at the top of the figure by appropriate numerals heading each of the 33 columns. Time is considered as moving from right to left so that the bits of least significance normally appear at the right. Each horizontal row of the chart is identified by the designation corresponding to the flip-flop or driver whose performance is represented by the numbers and symbols appearing in the row.

In order that the rearrangement of and shifting of the signals may better be seen, the individual bits of the word are represented by the Arabic numerals from 0 to 33, with the exception that bits 1, 9 and 10, are represented by the Arabic numeral 1 enclosed by a triangle. This convention is utilized to indicate that the bits so designated constitute binary "1's," it being assumed that all of the other bits are binary "0's." The binary number thus represented (see the row $Bd$ in Sequence One) has a value of 769, the same as word No. 0 of the IBM card illustrated in Figure 31. This number has been selected for illustration with the intention of showing how a binary number having the value 769 and occupying word space No. 0 in the digital computer is ultimately converted into the form of holes punched in appropriate locations in the IBM card.

From the bit positions indicated in Figure 66 at time $\phi 1$ T33 it will be seen that at the first P0 time of Sequence Two bit 4 will be held in $Be$, bit 3 will be held in $B1$, bit 2 will be held in $B2$, bit 1 will be held in $B3$, and bit 0 will be held in $B4$. As is shown in Figure 68, the data delivered by $B4$ are stepped through flip-flops $D6$, $D7$, $D8$ and $D9$ successively, the output of $D9$ being returned to the B register through the driver $Bd$. Driver $Bd$ is, however, supplied through a gating network 1572 which will pass data to $Bd$ only during pulse times P5 to P33 inclusive. Thus, any data held in flip-flops $B4$ and $D6$ to $D9$ will be excluded as is indicated in Figure 69 by the five blank spaces indicated for pulse times P0–P4 for $Bd$ in the first word time of Sequence Two. At pulse time P5 bit 1 appears at the output of flip-flop $\underline{D9}$ and is introduced into the B register through $\underline{Bd}$. Reading the chart to the left, a pulse at a time, will show that the individual bits are stepped through the flip-flop chain to be recorded in the B register through $\underline{Bd}$ in positions shifted four spaces to the left from the positions originally occupied by those bits.

At pulse time P29 gate 1564 operates to deliver to the driver $\underline{Ad}$ bit 32 held in $\underline{B1}$. At this time bit 31 is held in $\underline{B2}$, and will be held in $\underline{B3}$ one pulse later at pulse time P30. At this time gate 1566 operates to deliver to $\underline{Ad}$ bit 31 held by $\underline{B3}$. At the time in question bit 30 is held by $\underline{B4}$ and will be held by $\underline{D6}$ one pulse time later at P31. At P31 time gate 1568 operates to supply to driver $\underline{Ad}$ bit 30 held in $\underline{D6}$. At this time bit 29 is held in $\underline{D7}$ and one pulse time later at P32 will be held in $\underline{D8}$. At P32 time gate 1570 delivers to the driver $\underline{Ad}$ bit 29 held in $\underline{D8}$. As a consequence there is passed through driver $\underline{Ad}$ during pulse times P29, P30, P31 and P32 bits 32, 31, 30 and 29 respectively of the original binary number.

During the second word time the four bits so introduced into the A register are recirculated by connecting the output of flip-flop $\underline{Ae}$ to the input of the driver $\underline{Ad}$ through a gate 1574 which operates to deliver data from $\underline{Ae}$ to $\underline{Ad}$ during pulse times P1 to P28 inclusive. As previously pointed out, the A recirculating line is four bits short and as a consequence the bits circulated therein are shifted to the right four places each word time. Thus as may be seen in Figure 69, bits 32, 31, 30 and 29 are shifted four places to the right and during the second word time occupy pulse positions 25, 26, 27 and 28. At P29 time gate 1574 disconnects $\underline{Ad}$ from $\underline{Ae}$ and during P29–P32 $\underline{Ad}$ takes its data from gates 1564, 1566, 1568 and 1570.

As previously pointed out the B register recirculation is four pulses too long so that the number carried in B shifts four places to the left. Thus in the second word time bits 25, 26, 27 and 28 occupy the pulse positions occupied the previous word time by bits 29, 30, 31 and 32. As a consequence during the second word time bits 25, 26, 27 and 28 are fed into the A register in reverse order in the same manner as has just been described in connection with the first word time of Sequence Two.

The described operation continues, four bits being taken from the B register and placed in the A register in reversed order each word time. Figure 70 shows the conditions obtaining during the seventh word time of Sequence Two and the eighth and final word time showing that the bits fed into the A register through $\underline{Ad}$ are at that time reversed with bit 32 being fed in at pulse time P1 and bit 1 being fed in at pulse time P32.

Figure 67:
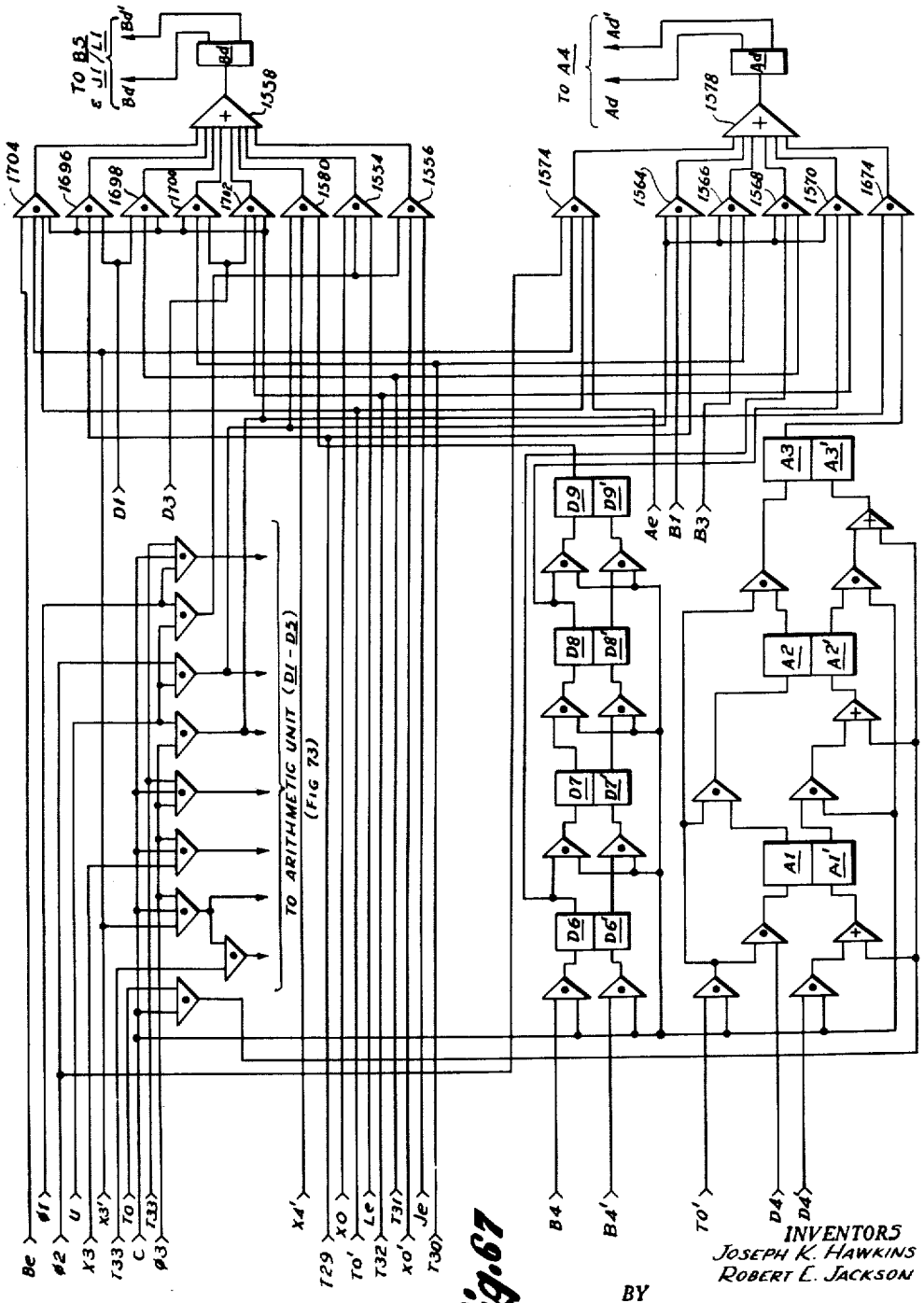
Figure 67 is a schematic diagram of the circuitry utilized to reverse the order of the digits of a straight binary number.

The circuitry used to interconnect the various gates and flip-flops as represented functionally in Figure 68 are illustrated schematically in Figure 67. Gate 1574 used to control the transfer of information from flip-flop $\underline{Ae}$ to driver $\underline{Ad}$ is shown, its four inputs being suitably identified by legends on the drawing, and its output being connected through an "or" gate 1578 to the input terminal of driver $\underline{Ad}$. Gate 1572 controlling the flow of data from flip-flop $\underline{D9}$ to the driver $\underline{Bd}$ is shown in Figure 67 as comprising two "and" gates 1580 and 1582 working through the previously mentioned "or" gate 1558.

Figure 67 also shows the chain of four flip-flops $\underline{D6}$–$\underline{D9}$ each with an associated input gate on the "true" side and on the "false" side for gating to the clock the input signal delivered from the corresponding output of the preceding flip-flop. The gates 1564, 1566, 1568 and 1570 for coupling the outputs of flip-flops $\underline{B1}$, $\underline{B3}$, $\underline{D6}$ and $\underline{D8}$ respectively to the input of $\underline{Ad}$ are identified in Figure 67 and shown as having their outputs connected to $\underline{Ad}$ through the "or" gate 1578.

The construction and operation of the circuitry thus illustrated is specified explicitly by the following logic equations.

$\underline{D6} = B4\ C$
$\underline{D6'} = B4'\ C$
$\underline{D7} = D6\ C$
$\underline{D7'} = D6'\ C$
$\underline{D8} = D7\ C$
$\underline{D8'} = D7'\ C$
$\underline{D9} = D8\ C$
$\underline{D9'} = D8'\ C$
$(\underline{Bd}) = U\phi 2\ X4'\ D9$
$(\underline{Ad}) = \phi 2\ X3'\ T0'\ Ae$
$\quad + U\phi 2\ (T29\ B1 + T30\ B3 + T31\ D6 + T32\ D8)$ In the above equations the signal X4' included in the logic for driver $\underline{Bd}$ will be recognized as the "false" output signal of auxiliary timing flip-flop $\underline{X4}$ which is "on" during pulse times P5 to P33 inclusive. Similarly, the signal configuration X3' T0' found in the logic for driver $\underline{Ad}$ will be recognized as a timing signal configuration defining pulse times P1 to P28 inclusive.

From the foregoing and particularly with reference to Figure 70, it will be seen that during the eighth word time of Sequence Two there is introduced into the A register through $\underline{Ad}$ a binary number consisting of original word No. 0 with the individual bits thereof arranged in inverse order, the most significant being at the right and the least significant being at the left. Also, register B is cleared except for the 1 which is introduced into $\underline{Bd}$ at the thirty-third pulse time. This digit is cleared during the first word time of Sequence Three.

Figure 71:
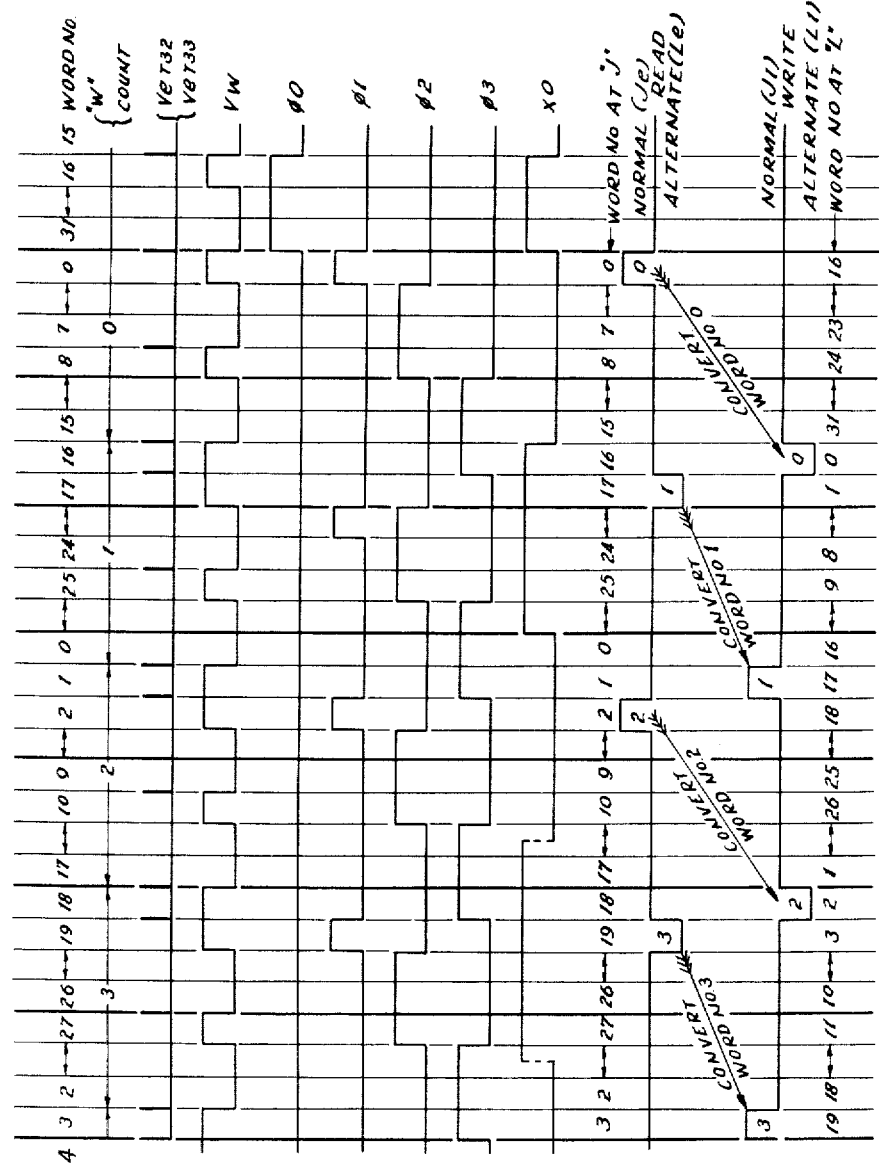
Figure 71 is a timing chart showing the times of occurrence of the various sequencing and control functions operative during Sequences Zero, One, Two and Three of the "punch" cycle.

At the end of the eighth word time of Sequence Two, Sequence Two goes off and Sequence Three comes on, reference being made to Figure 71, a timing chart similar to Figure 59 but illustrating the arrangement and duration of the sequences during the punch cycle, along with the timing of flip-flop $\underline{Vw}$ and pulses Ve T32 and Ve T33. In comparing these figures this difference will be noted: in the read cycle $\underline{Vw}$ is not turned on at the Ve T33 pulse marking the end of Sequence Two, whereas in the punch cycle the circuitry is arranged to turn on flip-flop $\underline{Vw}$ at this time as well. This difference in the operation of the flip-flop $\underline{Vw}$ is secured by applying the signal U to the "and" gate 624 through "or" gate 630 as shown in Figure 45, the controlling circuitry for the flip-flop $\underline{Vw}$ operative during the punch cycle as illustrated in Figure 45 being defined by the following logic equations.

$\underline{Vw} = U\ Ve\ T33\ C$
$\underline{Vw'} = Ve'\ T33\ C$

A comparison of Figures 59 and 71 will also reveal that in the punch cycle Sequence Two lasts for eight word times instead of seven word times as in the case of the read cycle. This difference in operation is secured by turning flip-flop $\phi 2$ off and flip-flop $\phi 3$ on at the end of time Vw T33 instead of at the end of pulse Ve T33 as was the case during the read cycle. The circuits for so controlling flip-flops $\phi 2$ and $\phi 3$ are those illustrated in Figure 40 as associated with "and" gate 1586 and previously mentioned "or" gates 1190 and 505. The construction and operation of the circuits thus illustrated which are operative during the punch cycle to turn off flip-flop $\phi 2$ and turn on flip-flop $\phi 3$ are defined by the following logic equations.

$$\phi2' = U\phi2\ Vw\ T33\ C$$
$$\phi3 = U\phi2\ Vw\ T33\ C$$

The turning off of flip-flop $\phi2$ and the turning on of flip-flop $\phi3$ marks the transfer of the operations from Sequence Two to Sequence Three and the commencement of the actual conversion computation.

*Sequence Three.—Conversion computation.*—The conversion computation which is performed during Sequence Three consists in dividing the binary number held in register A by ten to produce a quotient which is replaced in the A Register and leaving a remainder is expressed by four binary bits which are introduced into the B register as one of the required code groups of the desired binary coded decimal number. This operation is repeated each word time, the quotient placed in A during the preceding word time being divided by ten and the new quotient being placed back in the A register, the additional code group represented by the remainder being inserted into the B register. One code group is generated each word time so that in the eight word time duration of Sequence Three the required number of code groups is generated and placed in the B register.

Figure 72:
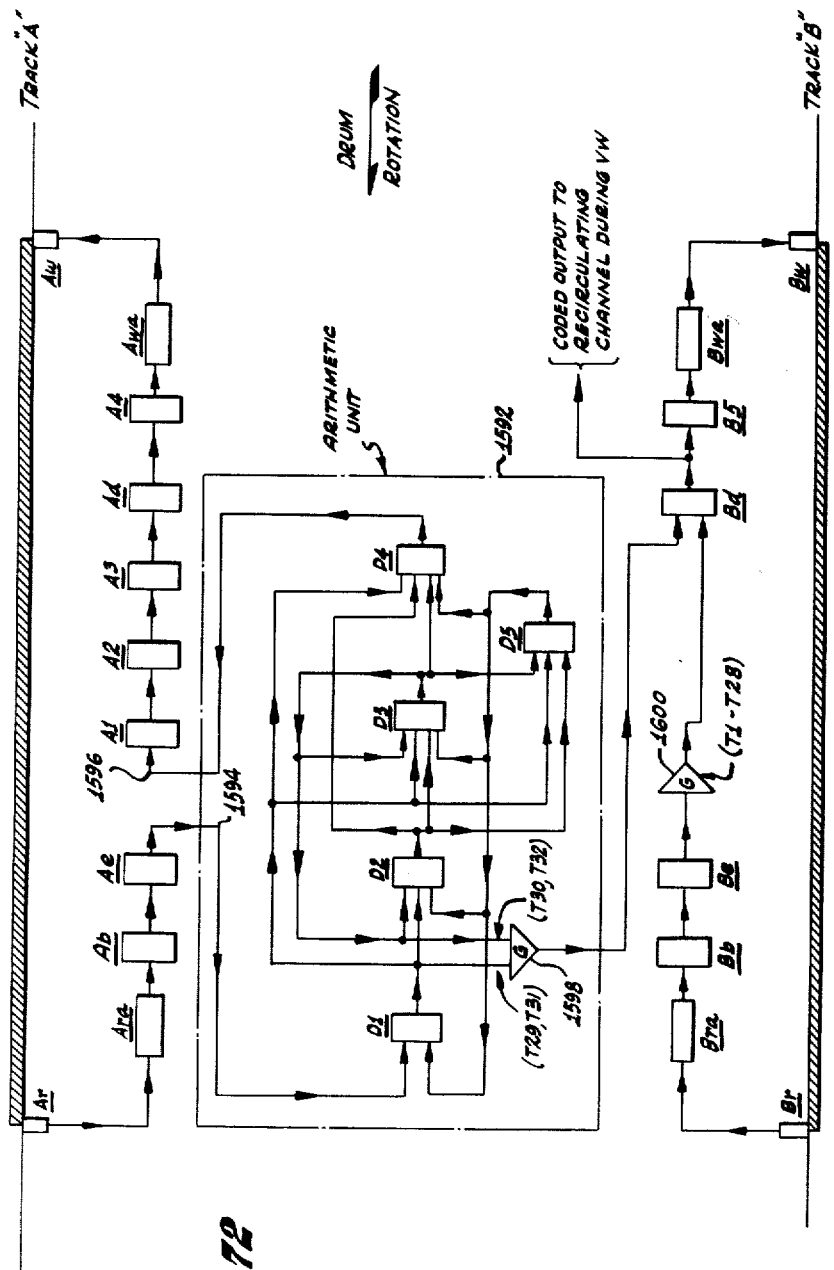
Figure 72 is a block diagram showing the functional inter-relation of the various components utilized during Sequence Three of the "punch" cycle.

The apparatus for performing this computation is illustrated in block diagram form in Figure 72, the arithmetic unit which performs the division operation constituting the flip-flops D1–D5 and their associated gating circuitry enclosed by the broken line marked 1592. The original binary number (and in word times subsequent to the first, the quotient produced by the previous division) is introduced into the arithmetic unit, most significant digit first, from the output of flip-flop Ae as is indicated at 1594. The quotient is generated in flip-flop D4 and delivered as indicated at 1596 to a flip-flop A1, the first of a chain of delay flip-flops A1, A2 and A3 which feed the driver Ad.

The remainder resulting from the division is taken from the output of flip-flops D1 and D3 and passed through a gating network 1598 to the driver Bd for insertion into the B register. This is accomplished as indicated in Figure 72 during pulse times T29–T32. During the preceding pulse times T1–T28 Bd receives its data from flip-flop Be through a gating network 1600. The recirculating line provided by connecting the output of flip-flop Be to the input of driver Bd being four pulses shorter than normal, the information in the B register is caused to shift to the right four pulse times each word time thus vacating pulse positions P29–P32 to permit the injection of each code group into such pulse positions.

It should at this time be noted that at pulse time T1 of the first word time of Sequence Three the four most significant bits of the reversed binary number held in A are found in flip-flops D3, D2, D1 and Ae respectively. This results from the fact that during Sequence Two flip-flops D1, D2 and D3 are interconnected as a stepping chain to be driven by the output of flip-flop Ae as is represented diagrammatically in Figure 68. The actual circuits so interconnecting the designated flip-flops are illustrated schematically in Figure 73 and are in the case of flip-flop D1 those associated with "and" gate 1604 in which signals Ae and C are combined with a signal having the configuration $U\phi2$ taken from the gating illustrated in Figure 67, the output of "and" gate 1604 being passed through "or" gate 1608 and applied to the "on" input terminal of flip-flop D1; similarly, signals Ae' and C are combined with the aforementioned signal configuration $U\phi2$ in "and" gate 1606, the output of this gate being passed through "or" gate 1610 to the "off" input terminal of flip-flop D1. As may be seen from Figure 73, the aforementioned signal configuration $U\phi2$ is combined with the clock signal C in gates 1612 and 1614 associated with flip-flop D2 and in gates 1620 and 1622 associated with flip-flop D3. These three signals are also combined in gate 1612 with a signal D1 taken from the output of flip-flop D1 and the output of gate 1612 is passed through "or" gate 1616 to the "on" input terminal of flip-flop D2. The output signal D1' from the "off" output terminal of flip-flop D1 is combined in gate 1614 with the above-mentioned signals $U\phi2$ and C and the output passed through "or" gate 1618 to the "off" input terminal of flip-flop D2. Similarly, gate 1620 serves to combine the signals $U\phi2$ and C with a signal D2 taken from the output of flip-flop D2, the output of gate 1620 being passed through "or" gate 1624 and applied to the "on" input terminal of flip-flop D3. Gate 1622 serves to combine with signals $U\phi2$ and C a signal D2' taken from the "false" output terminal of flip-flop D2, the output of gate 1622 being passed through "or" gate 1626 and applied to the "off" input terminal of flip-flop D3. The construction and operation of the circuits thus schematically illustrated are defined by the following logic equations.

$$D1 = U\phi2\ Ae\ C$$
$$D1' = U\phi2\ Ae'\ C$$
$$D2 = U\phi2\ D1\ C$$
$$D2' = U\phi2\ D1'C$$
$$D3 = U\phi2\ D2\ C$$
$$D3' = U\phi2\ D2'\ C$$

Flip-flops Ae, D1, D2 and D3 thus constitute at the start of Sequence Three a stepping register into which the number in A is stepped in, most significant digit first, into flip-flop Ae, the most significant bit of the four being held in D3. During pulse times P1 to P28 of Sequence Three each pulse time places a bit from the next lower binary order in Ae and steps the bit previously held by Ae into D1.

As will be explained the circuitry is so arranged that the digit in D1 is stepped into D2 and that in D2 is stepped into D3 so long as the binary number represented by the digits held in D3, D2, D1 and Ae has a value less than ten. In the event values of eight or nine are represented by the four bits held in these flip-flops, the one held in D3 will be stepped into a fifth bit flip-flop D5 when the new bit is placed in Ae. Certain gating, however, shortly to be explained, interconnects flip-flops D1, D2, D3 and D5 in suchwise that whenever the values of the four bits held in Ae, D1, D2 and D3 exceeds nine, and whenever a one is held in D5, there will be produced in flip-flops D1, D2, D3 and D5 at the next pulse time a binary number ten less than the value of the number held in Ae, D1, D2, D3, and D5 the preceding pulse time. When this occurs flip-flop D4 is turned on to place a 1 in the corresponding pulse position in the A register to thereby generate a quotient. Otherwise stated, the bits held in Ae, D1, D2, D3 and D5 have at any given pulse time a dual significance, the five bits constitute the five most significant bits of the dividend to be operated upon by the divisor ten during the given pulse time, while at the same time the bits held in D1, D2, D3 and D5 constitute a four bit remainder left from the operation in the previous pulse time. Placing the remainder in flip-flops D1, D2, D3 and D5 is, of course, the equivalent of placing the remainder in Ae, D1, D2, and D3 and then shifting the number one binary order to pick up the digit of next lower significance before performing the subtraction; generating the remainder in D1, D2, D3 and D5 combines into a single step the subtraction and shifting step characteristic of division operations.

The gating for appropriately controlling flip-flops D1, D2, D3 and D5 can, of course, be deduced directly from a tabulation of dividends having values ranging from zero to nineteen with the quotients and remainders produced by a single step in the division process set opposite. Such a table is reproduced below.

$D1 = \phi3\ X3'\ Ae\ C$ $D1' = \phi3\ X3'\ Ae'\ C$ $D2 = \phi3'\ X3'\ (D5'\ D3'\ D1 + D5\ D1')\ C$ $D2' = \phi3\ X3'\ (D5'\ D3'\ D1' + D3\ D1)\ C$ $D3 = \phi3\ X3'\ (D3'\ D2 + D5\ D1')\ C$ $D3' = \phi3\ X3'\ (D5'\ D2' + D3\ D2\ D1' + D5\ D1)\ C$ $D4 = X3'\ (D5 + D3\ D2 + D3\ D1)\ C$ $D4' = X3'\ (D3' + D2'\ D1')\ D5'\ C$

DIVISION BY TEN

| At given pulse time | | | | | | At following pulse time | | | | |
|---|---|---|---|---|---|---|---|---|---|---|
| Dividend | | | | | | Quotient | Remainder | | | |
| Decimal | Binary | | | | | Binary | Binary | | | Decimal |
| 0 | 0 | 0 | 0 | 0 | 0 | 0 | 0 | 0 | 0 | 0 | 0 |
| 1 | 0 | 0 | 0 | 0 | 1 | 0 | 0 | 0 | 0 | 1 | 1 |
| 2 | 0 | 0 | 0 | 1 | 0 | 0 | 0 | 0 | 1 | 0 | 2 |
| 3 | 0 | 0 | 0 | 1 | 1 | 0 | 0 | 0 | 1 | 1 | 3 |
| 4 | 0 | 0 | 1 | 0 | 0 | 0 | 0 | 1 | 0 | 0 | 4 |
| 5 | 0 | 0 | 1 | 0 | 1 | 0 | 0 | 1 | 0 | 1 | 5 |
| 6 | 0 | 0 | 1 | 1 | 0 | 0 | 0 | 1 | 1 | 0 | 6 |
| 7 | 0 | 0 | 1 | 1 | 1 | 0 | 0 | 1 | 1 | 1 | 7 |
| 8 | 0 | 1 | 0 | 0 | 0 | 0 | 1 | 0 | 0 | 0 | 8 |
| 9 | 0 | 1 | 0 | 0 | 1 | 0 | 1 | 0 | 0 | 1 | 9 |
| 10 | 0 | 1 | 0 | 1 | 0 | 1 | 0 | 0 | 0 | 0 | 0 |
| 11 | 0 | 1 | 0 | 1 | 1 | 1 | 0 | 0 | 0 | 1 | 1 |
| 12 | 0 | 1 | 1 | 0 | 0 | 1 | 0 | 0 | 1 | 0 | 2 |
| 13 | 0 | 1 | 1 | 0 | 1 | 1 | 0 | 0 | 1 | 1 | 3 |
| 14 | 0 | 1 | 1 | 1 | 0 | 1 | 0 | 1 | 0 | 0 | 4 |
| 15 | 0 | 1 | 1 | 1 | 1 | 1 | 0 | 1 | 0 | 1 | 5 |
| 16 | 1 | 0 | 0 | 0 | 0 | 1 | 0 | 1 | 1 | 0 | 6 |
| 17 | 1 | 0 | 0 | 0 | 1 | 1 | 0 | 1 | 1 | 1 | 7 |
| 18 | 1 | 0 | 0 | 1 | 0 | 1 | 1 | 0 | 0 | 0 | 8 |
| 19 | 1 | 0 | 0 | 1 | 1 | 1 | 1 | 0 | 0 | 1 | 9 |
| Held in flip-flops | D5 | D3 | D2 | D1 | Ae | D4 | D5 | D3 | D2 | D1 | |

Figure 73:
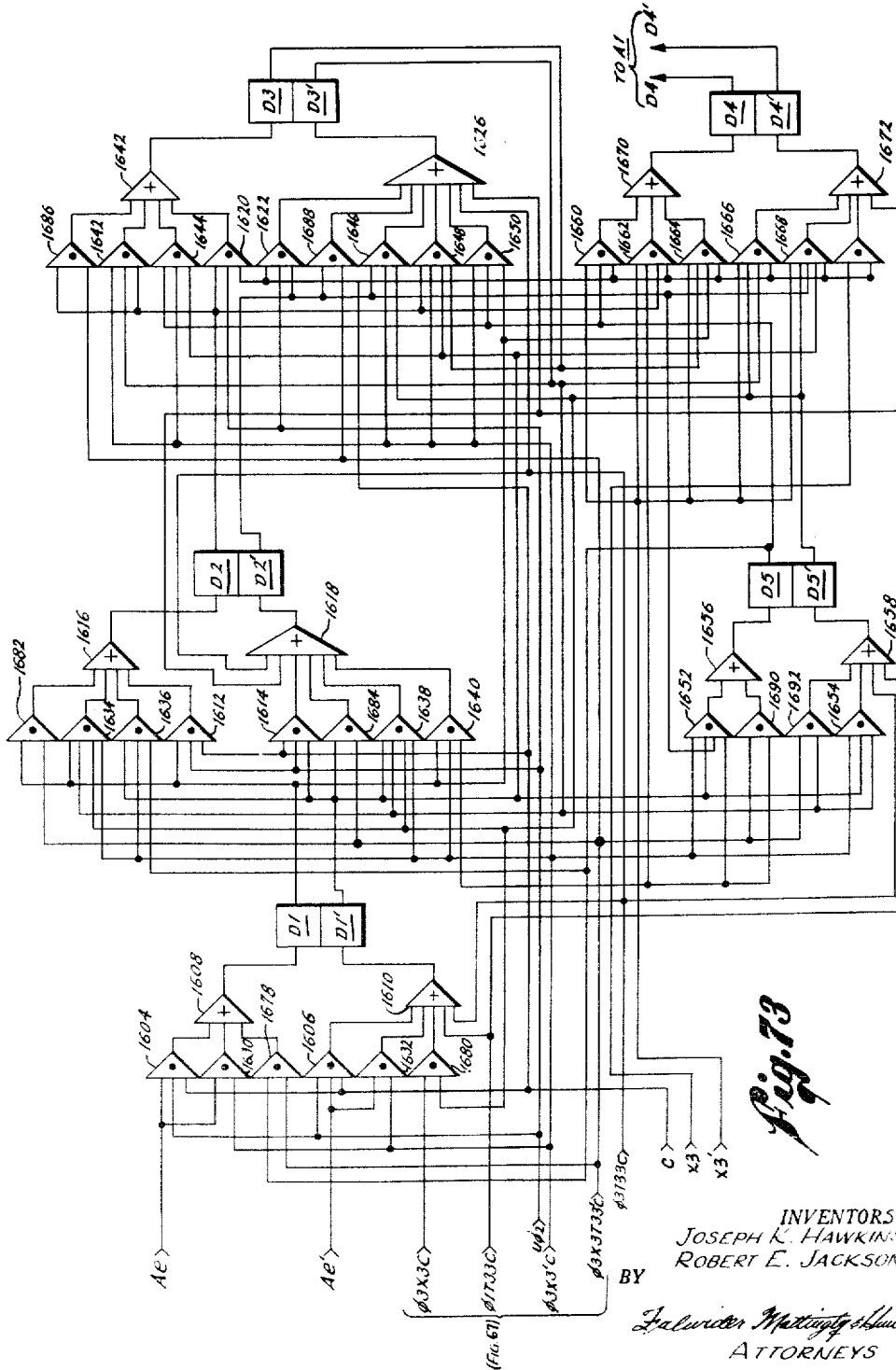
Figure 73 is a schematic diagram of an arithmetic apparatus used during the "punch" cycle to perform the arithmetic process of division.

Gating circuits such as may be deduced from the dividend-quotient-remainder table are illustrated in Figure 73. In connection with this figure it is to be observed that at pulse time P1 the four most significant digits of the number are already held in flip-flops D3, D2, D1 and Ae. Consequently, the entire division may be completed in twenty-eight pulse times. The gating is accordingly arranged to terminate the division operation at the end of pulse time P28, pulse times P29–P32 being used to recirculate the digits of the remainder held in D1, D2, D3 and D5 so that they may be placed into the B register in the proper order; i.e., with the least significant bit on the right. The limitation of the division operation to the pulse times preceding P29 is effected by using the auxiliary timing signal X3' which it will be recalled is on for the period P0–P28 inclusive.

In Figure 73 the gating arrangements for performing the described division operation are those which are associated in the case of flip-flop D1 with "and" gates 1630 and 1632 previously mentioned "or" gates 1608 and 1610; in the case of flip-flop D2, those associated with "and" gates 1634, 1636, 1638 and 1640 and previously mentioned "or" gates 1616 and 1618; in the case of flip-flop D3, those associated with "and" gates 1642, 1644, 1646, 1648, and 1650, and previously mentioned "or" gates 1624 and 1626; and in the case of flip-flop D5, those associated with "and" gates 1652 and 1654 and "or" gates 1656 and 1658.

The circuitry used to generate the quotient in D4 comprises that associated with "and" gates 1660, 1662, 1664, 1666 and 1668 and "or" gates 1670 and 1672. The construction and operation of the circuitry thus schematically illustrated is defined by the following logic equations.

$D5 = \phi3\ X3'\ D3\ D2'\ D1'\ C$ $D5' = \phi3\ X3'\ D3'\ D1'\ C$

As is shown in Figure 73, signals $\phi3$, X3', C, and Ae are combined in gate 1630 and the output passed through "or" gate 1608 to the "on" input terminal of flip-flop D1. In a similar fashion, signals $\phi3$, X3', C and Ae' are combined in "and" gate 1632, the output of which is passed through "or" 1610 and applied to the "off" input terminal of flip-flop D1.

Gate 1634 serves to combine signals D1, D3', D5', $\phi3$ and X3', the output of gate 1634 being passed through "or" gate 1616 to the "on" terminal of flip-flop D2.

"And" gate 1636 serves to combine signals $\phi3$, X3' D5, D1' and C, the output of gate 1636 being also passed through the "or" gate 1616 to the "on" input terminal of flip-flop D2. In a similar manner, "and" gate 1638 serves to combine signals $\phi3$, X3', D1', D3', D5' and C, whereas "and" gate 1640 serves to combine signals $\phi3$, X3', D1, D3 and C, the outputs of gates 1638 and 1640 being passed through the "or" gate 1618 and applied to the "off" input terminal of flip-flop D2.

With reference to flip-flop D3, "and" gate 1642 serves to combine signals $\phi3$, X3' D2, D3' and C, whereas gate 1644 serves to combine signals $\phi3$, X3', D1', D5 and C, the outputs of these gates being passed through "or" gate 1642 and applied to the "on" input terminal of flip-flop D3. Gate 1646 serves to combine signals $\phi3$, X3', D2', D5' and C, while gate 1648 serves to combine signals $\phi3$, X3', D1', D2, and D3 and C, gate 1650 serving to combine signals $\phi3$, X3', D1, D5 and C, the outputs of the three "and" gates 1646, 1648 and 1650 being passed through "or" gate 1626 and applied to the "off" input terminal of flip-flop D3.

91

With reference to flip-flop D5, "and" gate 1652 serves to combine signals φ3', X3', D3, D2', D1' and C, the output of "and" gate 1652 being passed through "or" gate 1656 and applied to the "on" input terminal of flip-flop D5.

"And" gate 1654 serves to combine signals φ3, X3', D3', D1' and C, the output of this gate being passed through "or" gate 1658 and applied to the "off" input terminal of flip-flop D5.

With reference to flip-flop D4, "and" gate 1660 serves to combine signals X3', D5 and C; "and" gate 1662 serves to combine signals X3', D3, D2, and C; and "and" gate 1664 serves to combine signals X3', D1, D3 and C. The outputs of gates 1660, 1662 and 1664 are each passed through "or" gate 1670 and applied to the "on" input terminal of flip-flop D4. Signals X3', D3', D5' and C are combined in "and" gate 1666, whereas signals X3', D1', D2', D5' and C are combined in "and" gate 1668, the outputs of gates 1666 and 1668 being passed through "or" gate 1672 and applied to the "off" input terminal of flip-flop D4.

The circuit arrangement for introducing the quotient developed in D4 into the A register is illustrated in Figure 67, reference being had to flip-flops A1, A2 and A3 and the gating associated therewith, the "true" output of flip-flop A3 being applied to Ad through "and" gate 1674 and previously mentioned "or" gate 1578. The construction and operation of the circuit arrangement thus schematically illustrated is defined by the following logic equations.

With reference to flip-flop D1, "and" gate 1678 serves to combine signals φ3, X3, T33', D5 and C, whereas "and" gate 1680 serves to combine signals φ3, X3, D5' and C, the outputs of gates 1678 and 1680 being applied respectively to the "on" and "off" input terminals to flip-flop D1 through associated "or" gates 1608 and 1610.

With reference to flip-flop D2, "and" gate 1682 serves to combine signals φ3, X3, T33', D1 and C, the resulting output signal being applied through "or" gate 1616 to the "on" input terminal of flip-flop D2. "And" gate 1684 serves to combine signals φ3, X3, T33', D1' and C, the output thereof being passed through "or" gate 1618 to the "off" input terminal of flip-flop D2.

In the case of flip-flop D3, signals φ3, X3, T33', D2 and C are combined in "and" gate 1686 and passed through "or" gate 1642 to the "on" input terminal of flip-flop D3, whereas signals φ3, X3, T33', D2' and C are combined in "and" gate 1688, the output of which is coupled through "or" gate 1626 to the "off" input terminal of flip-flop D3.

In the case of flip-flop D5, "and" gate 1690 serves to combine signals φ3, X3, T33', D3 and C, the output thereof being connected through "or" gate 1656 to the "on" terminal of flip-flop D5; whereas "and" gate 1692 serves to combine signals φ3, X3, T33', D3' and C for application through "or" gate 1658 to the "off" input terminal of flip-flop D5.

$$A1 = T0' D4 C$$
$$A1' = D4' C$$
$$A2 = T0' A1 C$$
$$A2' = A1' C$$
$$A3 = T0' A2 C$$
$$A3' = A2' C$$
$$(Ad) = U\phi3\ A3$$

The circuitry arrangement for recirculating among flip-flops D1, D2, D3 and D5 the binary bits held by each

92 is shown in Figure 73 as that associated with "and" gates 1678 and 1680 and previously mentioned "or" gates 1608 and 1610, in the case of flip-flop D1; in the case of flip-flop D2 it is that associated with "and" gates 1682 and 1684 and previously mentioned "or" gates 1616 and 1618; in the case of flip-flop D3 it is that associated with "and" gates 1686 and 1688 and previously mentioned "or" gates 1624 and 1626; and in the case of flip-flop D5, it is that associated with "and" gates 1690 and 1692 and previously mentioned "or" gates 1656 and 1658. The construction and operation of the circuit arrangements thus schematically illustrated is defined by the following logic equations.

$$D1 = \phi3\ X3\ T33'\ D5\ C$$
$$D1' = \phi3\ X3\ D5'\ C$$
$$D2 = \phi3\ X3\ T33'\ D1\ C$$
$$D2' = \phi3\ X3\ T33'\ D1'\ C$$
$$D3 = \phi3\ X3\ T33'\ D2\ C$$
$$D3' = \phi3\ X3\ T33'\ D2'\ C$$
$$D5 = \phi3\ X3\ T33'\ D3\ C$$
$$D5' = \phi3\ X3\ T33'\ D3'\ C$$

The circuit arrangements providing for copying the remainder bit by bit in the correct order of significance into the B register through the driver Bd is shown in Figure 67 by the circuitry associated with "and" gates 1696, 1698, 1700 and 1702, and the aforementioned "or" gate 1558. The construction and operation of the circuitry just mentioned is defined by the following logic equation.

$$(Bd) = U\phi3(T29+T31)D1$$
$$+ U\phi3(T30+T32)D3$$

The circuit arrangement operative during pulse times P1–P28 inclusive for connecting the output of flip-flop Be to the input of driver Bd for recirculating the contents of the B register is illustrated in Figure 67 and is that associated with "and" gate 1704 and previously mentioned "or" gate 1558. The construction and operation of such circuit is defined by the following logic equation.

$$(Bd) = U\phi3\ X3'\ T0'\ Be$$

As will be seen from Figure 67, "and" gate 1696 serves to combine signals Uφ3, T29 and D1; "and" gate 1698 serves to combine signals Uφ3, T31 and D1; "and" gate 1700 serves to combine signals Uφ3, T30 and D3; and "and" gate 1702 serves to combine signals Uφ3, T32 and D3, the outputs of gates 1696, 1698, 1700 and 1702 being passed through "or" gate 1558 to the driver Bd. In addition, "and" gate 1702 serves to combine signals Uφ3, X3', T0' and Be, the output also being passed through "or" gate 1558 to the driver Bd.

Figure 74:
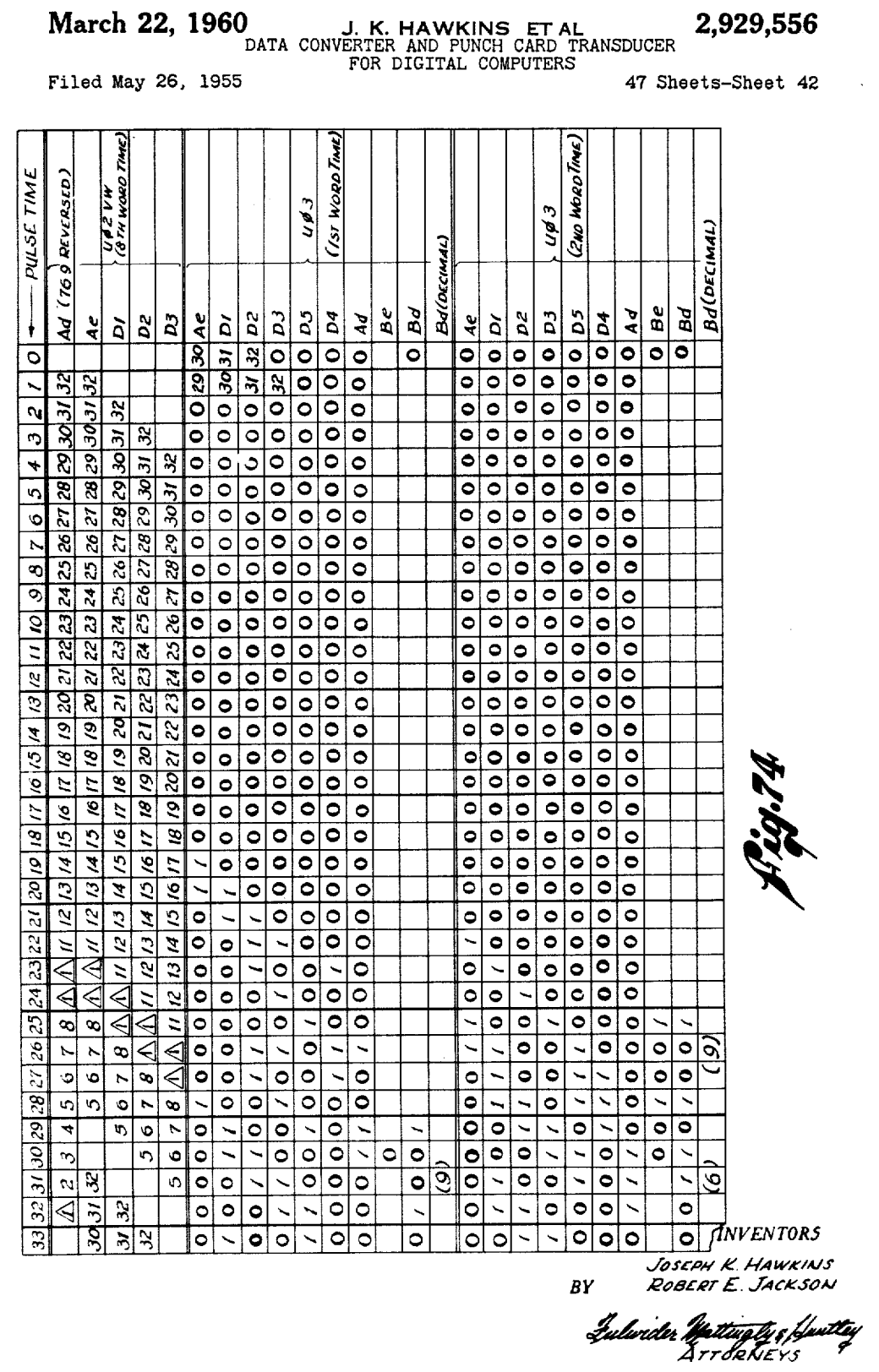
Figure 75:
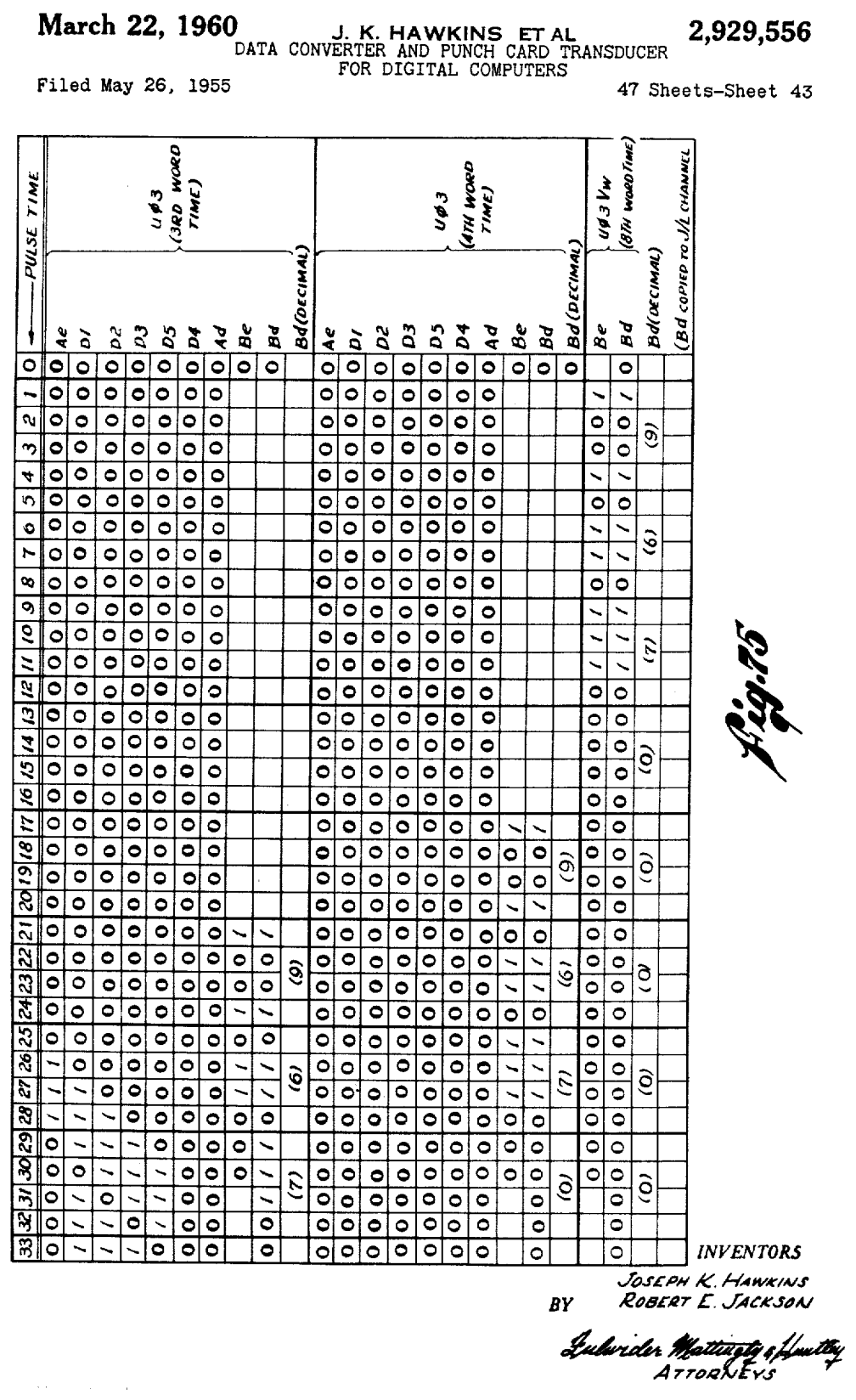

Attention is directed to Figures 74 and 75 which are timing charts showing the conversion of the binary number having a numerical value of 769 to a binary coded decimal number of the same value. Figures 74 and 75 utilize the same arrangement as was previously explained in connection with Figures 69 and 70 and actually constitute a continuation of the specific numerical example set forth therein, the eighth word time of Sequence Two set out in Figure 70 being in part reproduced in the upper portion of Figure 74. The section of Figure 74 marked "Uφ3 (1st word time)" shows the initial division of the number 769 by ten producing D4 a quotient of 76 (least significant digit in pulse position P29) and at P29 in D1, D2, D3 and D5 a remainder of nine. During the recirculation of the bits through the aforenamed flip-flops the remainder is copied into Bd at pulse times 29–32.

The lower portion of Figure 74 illustrates the operation taking place during the second word time in which the previous quotient of 76 is divided by ten to produce a quotient in $\underline{D4}$ of 7 (least significant bit in pulse position P29) and in $\underline{D1}$, $\underline{D2}$, $\underline{D3}$ and $\underline{D5}$ at pulse time P29 a remainder of 6 which during the recirculation period P29–P32 is copied into the B register through driver $\underline{Bd}$. The right shift of the first code group four bit positions is also seen.

The third word time of Sequence Three shown at the top of Figure 75 illustrates in a similar manner the generation of the third code group corresponding to a decimal seven. The complete elimination of the dividend is shown by the digit shifting represented in Figure 75 for the fourth word time. The last section of Figure 75 shows the binary coded decimal number 00000769 as it is held in the register.

During the eighth word time of Sequence Three, flip-flop $\underline{Vw}$ is on as indicated in Figure 71 and the converted word is copied into the J/L channel in the same position as that from which it was taken in the same manner and by means of the same instrumentalities as were previously described in connection with the read cycle. At the conclusion of the copying operation Sequence Three goes off and Sequence One comes back on, also by means of the same instrumentalities operating in the same way as has been previously described.

*Convert remaining numeric words.*—The remaining words of numeric data are converted in the same way as was described in the preceding section, word No. 1 being read from the J/L channel immediately following the writing therein of converted word No. 0. The progression from word to word, the copying and recirculation functions, and the selection of the normal or alternate input output station for channel J/L is all effected in the same manner as has already been described with reference to the read cycle, such progression being controlled by the word counter comprising flip-flops $\underline{W1}$–$\underline{W4}$.

When at the end of the conversion of word No. 3 the alphabetic-numeric control pulse is read from the computer control channel, flip-flop $\underline{Va}$ is turned on preventing Sequence One from coming on, all as has been previously explained. Sequence Three however, goes off due to flip-flop $\phi 3$ being turned to its off condition, thus putting the machine in the sequence hereinbefore referred to as Sequence Blank. During this sequence, the apparatus idles waiting for Sequence Four to come on. During this idle period, the information is preserved in the J/L channel by recirculation, the output of flip-flop $\underline{Je}$ being applied to the input of flip-flop $\underline{J1}$ and the output of flip-flop $\underline{Le}$ being applied to the input of flip-flop $\underline{L1}$, as has already been described in connection with the read cycle.

*Sequence Four.—Transfer date to punch card.*—As was described in connection with the read cycle, Sequence Four is turned on by the start pulse $Sp$. In the punch cycle flip-flop $\underline{Sp}$ which generates this start pulse is controlled in a slightly different manner than in the read cycle, reference being had to Figure 38 and the circuitry associated with "and" gate 1708 which is defined by the following logic equation:

$$\underline{Sp} = U\ Sx'\ s\ T33\ C$$

The above equation differs from that operative in the read cycle by the substitution of the signal U for the signal configuration (U' Ed) utilized during the read cycle. As a consequence, Sequence Four comes on at the first T33 pulse following the coming on of the start signal "$s$." Reference should at this point be made to Figure 76, which is a timing chart showing on a relatively expanded time scale, the period of time extending from the coming on of the start signal "$s$" to the end of the first emitter pulse "$e$," showing the functioning of flip-flops $\underline{Sp}$, $\phi 4$, $\underline{Pe}$, $\underline{Sx}$, $\underline{Sa}$, X1, X2, and the functioning of the one shot $\underline{So}$, and the times of occurrence of the synchronizing pulses V$e$ T33. Figure 77 covers the 550 millisecond duration of the card punching cycle.

From Figure 76, it will be seen that the start pulse $Sp$ lasts for one pulse time at the end of which Sequence Four comes on. Flip-flop $\underline{Sx}$ is turned on at the same time for one pulse time and one shot $\underline{So}$ is fired. At the fall of the $Sx$ pulse, flip-flop $\underline{Sa}$ comes on and flip-flop $\underline{X1}$ is turned off. At the first V$e$ T33 time thereafter, flip-flop $\underline{X2}$ goes off marking the beginning of the working revolution, the "R" counter being at that time advanced from its cleared condition to a count of one identifying the first card row as that to be punched. The circuits controlling the action of flip-flops V$e$, and $\underline{X2}$ have already been described. The circuits controlling flip-flops $\underline{Sp}$, $\underline{Pe}$, $\underline{Sx}$, $\underline{Sa}$, driver $\underline{Ed}$, and one shot $\underline{So}$ are shown in Figure 38, and the control circuits for $\underline{X1}$ are shown in Figure 39. The control for flip-flop $\underline{Sp}$ has already been described, and the circuitry for the remaining instrumentalities, insofar as it differs from that functioning during the read sequence, is defined by the following logic equations.

$$(\underline{Ed}) = \phi 4\ e$$
$$\underline{Pe} = U\phi 4\ Ed\ C$$
$$\underline{Pe'} = U\ \phi 4\ Ed'\ C + Sc\ C$$
$$\underline{Sx} = Sp\ C$$
$$\underline{Sx'} = U\phi 4\ Pe'\ Sa'\ C$$
$$\underline{Sa} = U\phi 4\ Sa'\ So\ C$$
$$\underline{Sa'} = U\phi 4\ Sa\ Pe\ C$$
$$\underline{So} = Sp\ C + U\ \phi 4\ Sa'\ Pe'\ C$$
$$\underline{X1'} = U\phi 4\ X1\ So\ C$$

*Decode data and transfer to storage register.*—The decoder distributor arrangement for actuating the card punches in accordance with the data contained in the J/L channel is represented diagrammatically in Figure 78. The data signals from the recirculating channel are introduced as indicated at 1712 into a code group register 1714 consisting of a driver $\underline{Gd}$ and three flip-flops $\underline{G1}$, $\underline{G2}$ and $\underline{G3}$. The previously mentioned bit counter 526 coacts with the decoder $\underline{Sd}$ to test the contents of the code group register at the count corresponding to the appearance time of each complete code group in the code group register. The status of the code group register elements is then compared with the signal configuration established by the row counter 524 to ascertain whether the code group then contained in the register has the configuration corresponding to the row number identified by the row counter. Whenever this comparison does not fail, a signal $Sd$ is transmitted as represented at 1716 to the distributor $\underline{Ss}$. This distributor, in cooperation with the column counter 518, sets the elements of the 80 element storage register identified by the then count of the column counter.

Figure 79:
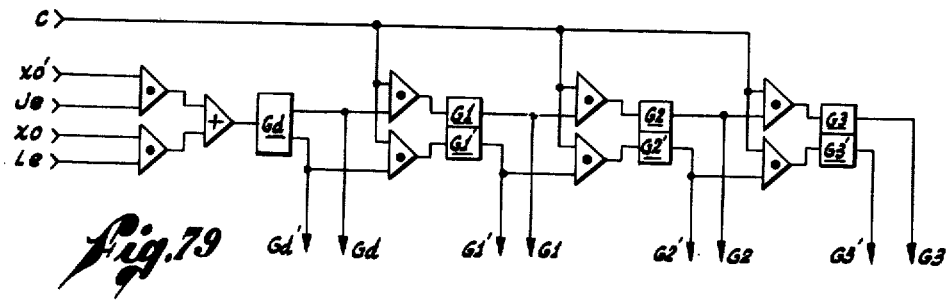
Figure 79 is a schematic diagram illustrating a code group register.

The circuitry interconnecting the driver $\underline{Gd}$ and the flip-flops $\underline{G1}$, $\underline{G2}$ and $\underline{G3}$ of the code group register is illustrated in Figure 79 and defined by the following logic equations:

$$(\underline{Gd}) = X0'\ Je + X0\ Le$$
$$\underline{G1} = Gd\ C$$
$$\underline{G1'} = Gd'\ C$$
$$\underline{G2} = G1\ C$$
$$\underline{G2'} = G1'\ C$$
$$\underline{G3} = G2\ C$$
$$\underline{G3'} = G2'\ C$$

From the logic equations above, it will be seen that the data from the circulating channel J/L taken from the appropriate read flip-flop $\underline{Je}$ or $\underline{Le}$, depending upon the status of flipflop $\underline{X0}$, will be merely stepped through the code group register. Since the time of appearance of a particular bit at the output of the driver $\overline{Gd}$ is the normal time referred to the read flip-flops, it will be seen that a complete numeric code group will be contained in the register when the bit counter "N" stands at a count of three (e.g. 011). In the same way, the fifth and sixth bits of an alphabetic code group will be held by flip-flop $\overline{G1}$ and driver $\overline{Gd}$ when the bit counter holds a count of five (e.g. 101).

Figure 80:
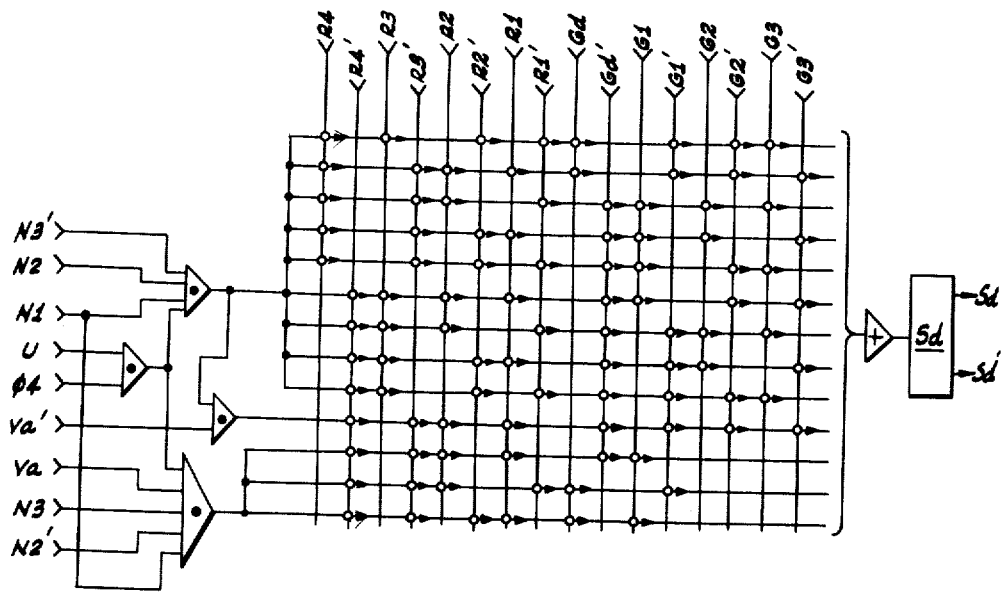
Figure 80 is a schematic diagram of the control circuitry and apparatus used during the "punch" cycle to decode binary coded decimal and alphabetic data contained in the recirculating channel.

The aforementioned de-coder $\overline{Sd}$ comprises a driver, the control circuitry for which is illustrated schematically in Figure 80 and defined by the following logic equation:

$(\overline{Sd}) = U\phi 4\ Va\ (R4'\ R3'\ R2'\ R1)\ (N3\ N2'\ N1)\ Gd\ G1$
$+ U\phi 4\ Va\ (R4'\ R3'\ R2\ R1')\ (N3\ N2'\ N1)\ Gd\ G1'$
$+ U\phi 4\ Va\ (R4'\ R3'\ R2\ R1)\ (N3\ N2'\ N1)\ Gd'\ G1$
$+ U\phi 4\ Va'\ (R4'\ R3'\ R2\ R1)\ (N3'\ N2\ N1)\ Gd'\ G1'\ G2'\ G3'$
$+ U\phi 4\ (R4'\ R3\ R2'\ R1')\ (N3'\ N2\ N1)\ Gd'\ G1'\ G2'\ G3$
$+ U\phi 4\ (R4'\ R3\ R2'\ R1)\ (N3'\ N2\ N1)\ Gd'\ G1'\ G2\ G3'$
$+ U\phi 4\ (R4'\ R3\ R2\ R1')\ (N3'\ N2\ N1)\ Gd'\ G1'\ G2\ G3$
$+ U\phi 4\ (R4'\ R3\ R2\ R1)\ (N3'\ N2\ N1)\ Gd'\ G1\ G2'\ G3'$
$+ U\phi 4\ (R4\ R3'\ R2'\ R1')\ (N3'\ N2\ N1)\ Gd'\ G1\ G2'\ G3$
$+ U\phi 4\ (R4\ R3'\ R2'\ R1)\ (N3'\ N2\ N1)\ Gd'\ G1\ G2\ G3'$
$+ U\phi 4\ (R4\ R3'\ R2\ R1')\ (N3'\ N2\ N1)\ Gd'\ G1\ G2\ G3$
$+ U\phi 4\ (R4\ R3'\ R2\ R1)\ (N3'\ N2\ N1)\ Gd\ G1'\ G2'\ G3'$
$+ U\phi 4\ (R4\ R3\ R2'\ R1')\ (N3'\ N2\ N1)\ Gd\ G1'\ G2'\ G3$ In the logic equation for $\overline{Sd}$ as above set out, the first three lines correspond to the Y, X, and 0 rows on the IBM card and the "N" counter configuration indicated is that required to find the fifth and sixth bits of the corresponding code group in driver $\overline{Gd}$ and flip-flop $\overline{G1}$. The fourth line corresponds also to the 0 row of the IBM card, but relates to the de-coding of numeric date as is governed by the signal $Va'$ and the "N" counter setting for finding the four bits of the corresponding numeric code group in the four elements of the code group register. The remaining nine rows of the equation correspond respectively to the last nine rows of the IBM card, the "N" count in each case being that required for finding a complete corresponding code group in the code group register.

It will be observed that the code group register signal configurations set forth in each line correspond to the coding of the respective code groups. It follows, therefore, that whenever all of the conditions specified by any line of the equation are met, the driver $\overline{Sd}$ will produce a true output signal. For example, if it be assumed that the row counter configuration stands at 0110 designating the IBM card row having a decimal value of three, the only time the driver $\overline{Sd}$ will produce a signal is when the four digits held by the code group register are 0011, conforming to the value three identified by the particular row being de-coded. Under this condition, and this condition only, is an output signal $Sd$ produced. It follows that for every setting of the row counter every code group contained in the entire J/L channel will be examined in this fashion, and the signal $Sd$ will be produced whenever a code group is encountered having a value corresponding to the IBM card row value designated by the row counter setting.

Figure 81:
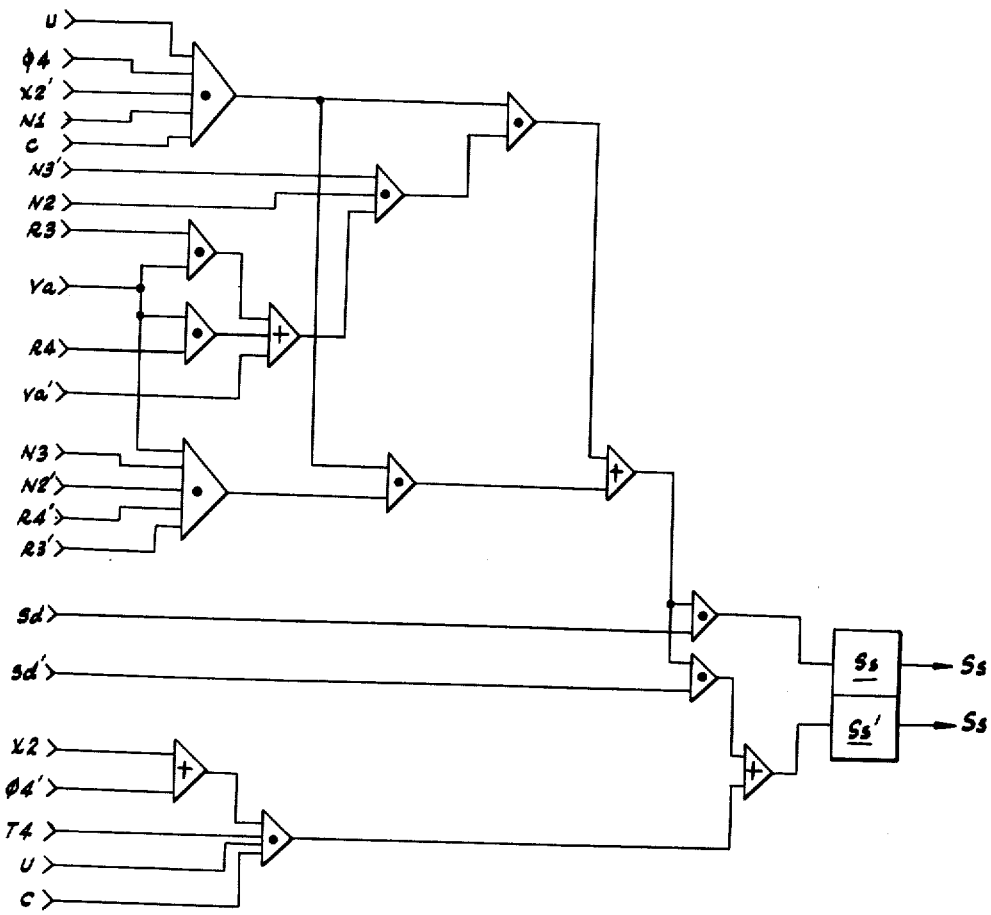
Figure 81 is a schematic diagram illustrating the control network operating during the "punch" cycle to distribute the data indicative signals to the various elements of the 80 element storage register.

Because the $Sd$ signal persists for only one pulse time, a period of time likely to be too short to certainly fire the selected Thyratron of the 80 element storage register, the signal $Sd$ is used to control a flip-flop $\overline{Ss}$ which in its cooperative relation with the column counter 518 and associated gating constitutes the distributor previously referred to. The circuitry for controlling the flip-flop $\overline{Ss}$ is illustrated in Figure 81 and defined by the following logic equations:

$\overline{Ss} = U\phi 4\ X2'\ N3'\ N2\ N1\ (Va' + Va\ R3 + Va\ R4)\ Sd\ C$
$\quad + U\phi 4\ X2'\ Va\ N3\ N2'\ N1\ R4'\ R3'\ Sd\ C$
$\overline{Ss'} = U\phi 4\ X2'\ N3'\ N2\ N1\ (Va' + Va\ R3 + Va\ R4)\ Sd'\ C$
$\quad + U\phi 4\ X2'\ Va\ N3\ N2'\ N1\ R4'\ R3'\ Sd'\ C$
$\quad + U\ (X2 + \phi 4')\ T4\ C$ From the above logic equations it will be seen that when the gating conditions are met, $\overline{Ss}$ will be turned on by an output signal $Sd$ and turned off from four to six pulse times later (at the end of the next code group) if $\overline{Sd}$ is not then on. In these two logic equations, the first term of each is operative during the working revolution $(X2')$ of Sequence Four $(\phi 4)$ of the "punch" cycle (U) at an "N" count of three to turn on $\overline{Ss}$ if there is an $Sd$ signal representing numeric data $(Va')$ or the first four bits (the numeric portion) of alphabetic data $(Va\ R3 + Va\ R4)$, and to turn $\overline{Ss}$ off if there is an $Sd'$ signal. The second term of each equation operates similarly at an "N" count of five in response to $Sd$ and $Sd'$ signals relating to the fifth and sixth bits of alphabetic data $(Va\ R4'\ R3')$. The last term of the "off" side equation operates to turn $\overline{Ss}$ off at the end of pulse time $P4$ following the end of a working revolution (U $X2$ $T4$ $C$), even if it is the last working revolution of Sequence Four (U $\phi 4'$ $T4$ C). Thus, $\overline{Ss}$ will always remain on for at least four pulse times to ensure firing of the Thyratrons of the storage register.

Figure 44:
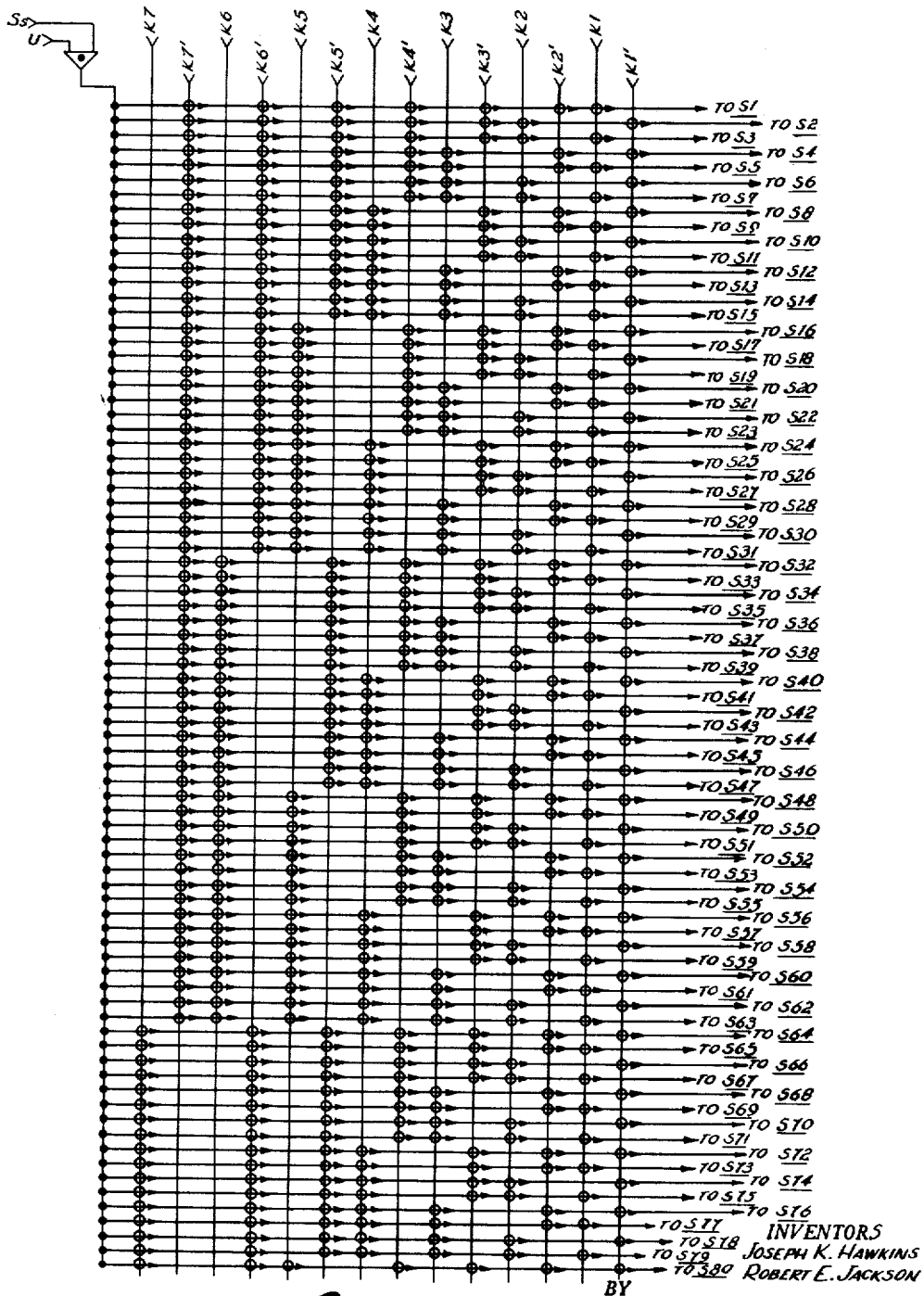
Figure 44 is a schematic diagram illustrating the circuitry used during the punch cycle to control the 80 element storage register.

The signal $Ss$ is gated to each of the 80 elements of the storage register, the circuit arrangement being shown on Figure 44, so that the $Ss$ signal will be applied to fire the Thyratron tube numbered to correspond with the number of the column in which the data is to be punched, it being recalled that the distribution of the data among the various columns of the card is controlled by the counting function of the column counter, as is fully set forth by the logic equations for register elements $\overline{S1}$ to $\overline{S80}$ set forth in full in the section hereof entitled "Complete Logic."

In this connection it should be observed that the column counter functions during the "punch" cycle in a manner slightly different than was described with reference to the "read" cycle, the counting pulse $Kd$ being produced at the end of the code group instead of immediately preceding the code group. This modified operation results from the control of the driver $\overline{Kd}$ through the circuits shown in Figure 48 and defined by the following logic equation:

$(\overline{Kd}) = U\ \phi 4\ X2'\ N3'\ N2\ N1\ (Va' + Va\ R3 + Va\ R4)$
$\quad + U\ \phi 4\ Va\ X2'\ N3\ N2'\ N1\ R4'\ R3'$ From the above equation, it will be seen that $\overline{Kd}$ delivers the counting pulse $Kd$ at the end of every code group, as is illustrated in Figure 50 by the lines marked "$Kd - (U\ \phi 4\ X2')$", and as was explained above with reference to the similar circuitry used to control the distributor $\overline{Ss}$.

It will be seen by reference to Figure 42, that the $+15$ volt signal delivered by the flip-flop $\overline{Ss}$ when applied to the register element input terminal 552, will put the Thyratron tube 534 in a conducting condition, and that it will remain in that condition until the one shot $\overline{So}$ is fired to clear the entire register.

It is thus seen that at the end of the first full working revolution that the various elements of the 80 element storage register are set to correspond with the data contained in the J/L channel which is to be punched into the first row of the card. As will be explained, the operation described is repeated for each succeeding card row.

Transfer data from storage register to card.

After the storage register elements are all set, the advancing movement of the card through the card punching machine finally brings it into a position appropriate to the punching of the first data row. At this time the emitter pulse "e" comes on (see Figure 76) and is applied as may be seen from Figure 42 through a blocking diode directly to the anodes of all of the Thyratron tubes of the storage register. The emitter pulse has a magnitude of about 40 volts and is delivered by a source of substantial capacity. As a consequence, a substantial current flows through those of the Thyratron tubes 534 that are already in a conductive condition, whereas no substantial current will flow through those which are not. The conducting Thyratrons will thus pass a substantial current pulse from their cathodes through the associated punch magnet conductors $m1$–$m80$ and through the associated punch magnets 200 so as to move the interposer 198 into actuating position. As a consequence, a data indicative hole is punched in the card for each of the register elements $\underline{S1}$–$\underline{S80}$ which is found in a conductive or set condition at the time the emitter pulse comes on.

As may be seen by reference to Figure 76, when the emitter pulse came on it triggered the emitter pulse flip-flop $\underline{Pe}$ to be on the following pulse times. The emitter pulse flip-flop $\underline{Pe}$ stays on until the emitter pulse falls and flip-flop $\underline{Pe}$ goes off at the end of the pulse time following. Flip-flop $\underline{Sa}$ was turned off by the on signal of flip-flop $\underline{Pe}$ so that one pulse time after the fall of the signal $\underline{Pe}$, the one shot $\underline{So}$ is fired and the Thyratron register is cleared. This starts a new series of operations, flip-flop $\underline{Sa}$ being turned on to prevent multiple operation of the one shot, flip-flop $\underline{X1}$ being turned off setting the apparatus to wait for the arrival of the next pulse $Ve$ $T33$. Such a pulse turns flip-flop $\underline{X2}$ off, marks the start of the next working revolution, and advances the row or "R" counter from a count of one to a count of two. Data for the second row of the card is then taken from the J/L channel through the de-coder and the distributor in the manner previously described.

The operation of de-coding the data in the recirculating channel, setting the 80 element storage register, punching the card in accordance with the storage register setting, and then clearing the register is repeated for each of the twelve rows of the card.

During the reading of the data through the code group register, and during the idle time between working revolutions, the data is preserved by recirculation in channel J/L by means of the circuits shown in Figures 20 and 21 and defined by the following logic equations:

$$\underline{J1} = U\ \phi0'\ \phi4\ Je\ C$$
$$\underline{J1'} = U\ \phi0'\ \phi4\ Je'\ C$$
$$\underline{L1} = U\ \phi0'\ \phi4\ Le\ C$$
$$\underline{L1'} = U\ \phi0'\ \phi4\ Le'\ C$$

When the last row has been punched, Sequence Four goes off as previously explained, and the machine idles awaiting a new order from the computer. In the event the appropriate order has already been given, the machine starts a repetition of the punch cycle or transfers to the read machine to perform a card reading operation, all in accordance with the sequence of orders put into the internal program of the digital computer by the program author. If the exchange order $Oe$ was given before the storage register is set for the last card row, Sequence Zero will overlap Sequence Four during the last half of the last working revolution of Sequence Four so that new data may be read into the J/L channel while the last half of the channel is being stepped through the code group register. The circuitry for producing this overlapping of sequences is shown in Figure 40 and defined by the following logic equation:

$$\underline{\phi0} = U\ \phi4\ X2'\ X1'\ R4\ R3\ R2'\ R1'\ Oe\ Ve\ T33\ C$$

In the above equation, the signal configuration ($R4$ $R3$ $R2'$ $R1'$) defines the last card row, and ($X2'$ $X1'$) defines the first half of the working revolution, the last pulse thereof being marked by the pulse $Ve$ $T33$. As soon as Sequence Zero comes on, recirculation in channel J/L is arrested (note the $\phi0'$ signal in the above equations for $\underline{J1}$ and $\underline{L1}$) since the last of the data will be read out during the last sixteen word times and preservation by recirculation is no longer required.

In the preceding description of the operations performed during the "read" and "punch" cycles, it has been assumed that some numeric data was to be transferred between each card and the computer, but this need not be so; data consisting solely of alphabetic data may be exchanged as well. In the event there is no numeric data to be processed, it is necessary to turn on flip-flop $\underline{Va}$ before P0 time of word No. 0 at the start of Sequence One in order to skip the conversion sequences (i.e., Sequences One, Two, and Three). This is accomplished by placing the alphabetic-numeric control pulse in the H/I channel at pulse position P32 of word No. 31. Such a pulse may be used to control $\underline{Va}$ at $Ve$ $T33$ time of word No. 31 of the preceding sequence (Sequence Zero of the "punch" cycle; Sequence Four of the "read" cycle) by means of the delayed control pulse H1/L1 previously mentioned.

The circuits for so controlling flip-flop $\underline{Va}$ (and the control pulse driver $\underline{Pd}$) are shown in Figure 52 and defined by the following logic equations:

$$\underline{Va} = \phi4\ X2\ Ve\ T33\ (F'\ H1 + F\ I1)\ C$$
$$\qquad + U\ \phi0\ Pd\ C$$
$$\underline{Va'} = \phi4\ X2'\ X1\ Pd'\ Ve\ T33\ C$$
$$\qquad + \phi1\ Vw\ T33\ C$$
$$\underline{(Pd)} = \phi4\ X2'\ X1\ R4\ R3\ R2'\ R1'\ Ve\ T33$$
$$\qquad (X0'H1 + X0\ I1)$$
$$\qquad + \phi0\ \phi4'\ Ve\ T33\ (F'\ H1 + F\ I1)$$

"Decimal to binary conversion" cycle

In the decimal to binary conversion cycle, binary coded decimal data is taken from the digital computer and converted to a straight binary number and then transferred back to the working channel of the computer. This cycle is executed by including in the internal program of the computer the read order $Or$ followed by two exchange orders $Oe$ in succession. Between the two exchange orders there is placed in the working channel of the computer the binary coded decimal data desired to be converted.

The read order serves to set the apparatus for the card reading function as was first described in this section in connection with the "read" cycle. The first exchange order causes the machine to execute Sequence Zero and exchange data between the computer working channel and the recirculating channel. This exchange information is carried out in the same way as has been previously described in connection with both the read and punch sequences.

At the end of the exchange, Sequence Zero goes off by the turning off of flip-flop $\underline{\phi0}$ as previously described. At the same time the auxiliary sequence flip-flop $\underline{\phi X}$ is turned on by the circuitry illustrated in Figure 40 and defined by the following logic equation.

$$\underline{\phi X} = U'\phi0\ Ve\ T32\ C$$

The machine idles until the second exchange order is reached which again places the machine in Sequence Zero and exchanges information between the computer working channel and the recirculating channel J/L, this time placing in channel J/L the binary coded decimal data desired to be converted. At the end of this transfer, Sequence Zero goes off by reason of flip-flop $\underline{\phi 0}$ being turned off as previously described herein. At the same time Sequence One comes on, sequence flip-flop $\underline{\phi 1}$ being turned on by the circuitry illustrated in Figure 40 and defined by the following logic equation.

$$\underline{\phi 1} = U'\underline{\phi 0}\ \underline{\phi X}\ Ve\ T32\ C$$

It will be seen from the above equation that it is the fact that flip-flop $\underline{\phi X}$ has been turned on that provides for the transfer of operations from Sequence Zero to Sequence One. It will also be appreciated that flip-flop $\underline{\phi X}$ has been turned on by the circumstance of two exchange orders Oe having been given in succession without an intervening order relating to the operation of the converter-transducer.

Once the machine is in Sequence One the decimal to binary conversion is carried out in exactly the same manner as has been previously described with reference to the "read" cycle. At the end of the conversion the automatic transfer to Sequence Zero normally characterizing the operation is prevented by reason of the signal $\underline{\phi X'}$ included included in the logic equation defining the input control circuitry for flip-flop $\underline{\phi 0}$, as may be seen from the following equation.

$$\underline{\phi 0} = U'\underline{\phi 3}\ \underline{\phi X'}\ Oe\ Vw\ Ve\ T32\ Pd\ C$$

As a consequence the machine is forced to Sequence Blank in which all of sequence flip-flops $\underline{\phi 0}$ to $\underline{\phi 4}$ are turned off. From this sequence the machine may be put into Sequence Zero by the giving of a third exchange order as has been previously described. This third exchange order will operate to place the converted data carried in recirculating channel J/L back into the computer working channel.

The above described series of operations may then be continued for as many cycles as desired since flip-flop $\underline{\phi X}$ will remain in its on condition until turned off either by a clear signal produced by operating the clear button on the computer control panel or by starting the operation of the card reading machine 103, as is shown by the circuitry illustrated in Figure 40 and defined by the following logic equation.

$$\underline{\phi X'} = Sc\ C + U'\ Sp\ C$$

*"Binary to decimal conversion" cycle*

The binary to decimal conversion cycle is similar to that described in the preceding sub-section, but produces the reverse conversion, that is, straight binary data taken from the working channel of the computer is converted into binary coded decimal data and returned to the computer working channel.

The binary to decimal conversion cycle is executed merely by omitting from the sequence of orders used to execute the punch cycle, the start order Os and in its place giving an exchange order Oe. The cycle proceeds in exactly the same fashion as does the punch cycle previously described until all of the binary numerical data has been converted into binary coded decimal data and placed in channel J/L. At that time the apparatus ordinarily idles in Sequence Blank as previously described until the start order is given to effect the transfer of the data into the appropriate punching of a card. If instead of giving the start order Os at this time, an exchange order Oe is given, the machine transfers from Sequence Blank to Sequence Zero and exchanges information between the computer working channel and the recirculating channel J/L, thus transferring to the computer the decimal coded binary data derived from the straight binary data originally supplied by the computer.

In the foregoing description of the construction and operation of the apparatus of this invention particularly with reference to the execution of the four different cycles of operation of which it is capable, the various portions of the control circuitry have been described with reference to schematic diagrams such as comprise many of the figures of the drawings accompanying this specification. It will be realized that many different arrangements of the various gating circuits may be utilized to perform exactly identical functions, in the same way that various terms of a logic equation may be combined, factored, or expanded without changing the actual circuit so defined. For this reason logic equations have been heavily relied upon to present the complete and accurate definition of the control circuits. In many instances, the logic equations have been presented as "partial logic," setting forth in each such instance only those terms which define the effective control under the conditions or circumstances then being considered. In order that any person skilled in this art may be enabled to make and use this invention the complete logic equations for the entire apparatus are set forth in the following section. These equations include certain clearing terms, not specifically mentioned in the foregoing, which serve to turn off certain of the flip-flops at appropriate times, as will be obvious (see, for example, the terms T0 C for A1, A2, A3; $\phi 1$ T33, $\phi 3$ T33 C, and X3 C for the divider $\underline{D1-D5}$; $\phi 3$ T33 C for the row counter $\underline{R1-R4}$; $\phi 4'$ C for $\underline{Sa}$; and Sc C for the sequence counter.)

COMPLETE LOGIC $$\underline{(Ab)} = Ara$$
$$\underline{(Ab')} = Ara'$$
$$\underline{(Ad)} = U'\ \phi 1(X0'\ Je + X0\ Le)$$
$$+ U\ \phi 3\ A3$$
$$+ \phi 2\ X3'\ T0'\ Ae$$
$$+ U\ \phi 2(T29\ B1 + T30\ B3 + T31\ D6 + T32\ D8)$$
$$\underline{Ae} = Ae'\ Ab\ C$$
$$\underline{Ae'} = Ae\ Ab'\ C$$
$$\underline{(Ara)} = Ar$$
$$\underline{(Ara')} = Ar'$$
$$\underline{(Aw)} = Awa$$
$$\underline{(Aw')} = Awa')$$
$$\underline{(Awa)} = A4$$
$$\underline{(Awa')} = A4'$$
$$\underline{A1} = T0'\ D4\ C$$
$$\underline{A1'} = (D4' + T0)C$$
$$\underline{A2} = T0'\ A1\ C$$
$$\underline{A2'} = (A1' + T0)C$$
$$\underline{A3} = T0'\ A2\ C$$
$$\underline{A3'} = (A2' + T0)C$$
$$\underline{A4} = Ad\ C$$
$$\underline{A4'} = Ad'\ C$$
$$\underline{(Bb)} = Bra$$
$$\underline{(Bb')} = Bra$$
$$\underline{(Bd)} = U\ \phi 1(X0'\ Je + X0\ Le)$$
$$+ U\ \phi 2\ X4'\ D9$$
$$+ U\ \phi 3\ T0'\ X3'\ Be$$
$$+ U\ \phi 3(T29 + T31)D1$$
$$+ U\phi 3(T30 + T32)D3$$
$$+ U'\ \phi 1\ X4\ Ad$$
$$+ U'\ \phi 2\ X4(Ad\ M1\ M3 + Ad\ M1'\ M3' + Ad'\ M1\ M3' + Ad'\ M1'\ M3)$$
$$+ U'\ \phi 2\ X4'(M1'\ M3\ T0' + M1\ M3'\ T0')$$
$$+ U'\ \phi 3\ B4$$
$$\underline{Be} = Be'\ Bb\ C$$
$$\underline{Be'} = Be\ Bb'\ C$$
$$\underline{(Bra)} = Br$$
$$\underline{(Bra')} = Br'$$
$$\underline{(Bw)} = Bwa$$
$$\underline{(Bw')} = Bwa'$$
$$\underline{(Bwa)} = B5$$

101

$(\underline{Bwa'}) = B5'$
$\underline{B1} = Be\ C$
$\underline{B1'} = Be'\ C$
$\underline{B2} = B1\ C$
$\underline{B2'} = B1'\ C$
$\underline{B3} = B2\ C$
$\underline{B3'} = B2'\ C$
$\underline{B4} = (\phi + U'\ \phi 3) B3\ C$
$\underline{B4'} = (\phi 2 + U'\ \phi 3) B3'\ C\ U'\ \phi 1\ C$
$\underline{B5} = Bd\ C$
$\underline{B5'} = Bd'\ C$
$\underline{D1} = U\ \phi 2\ Ae\ C$
$\quad + \phi 3(X3'\ Ae + X3\ D5\ T33')C$
$\underline{D1'} = \phi 1\ T33\ C$
$\quad + U\ \phi 2\ Ae'\ C$
$\quad + \phi 3(X3'\ Ae' + T33 + X3\ D5')C$
$\underline{D2} = (U\ \phi 2 + \phi 3\ X3\ T33') D1\ C$
$\quad + \phi 3\ X3'(D5'\ D3\ D1 + D5\ D1')C$
$\underline{D2'} = (U\ \phi 2 + \phi 3\ X3\ T33') D1'\ C$
$\quad + \phi 3\ X3'(D5'\ D3\ D1' + D3\ D1)C$
$\quad + \phi 1\ T33\ C$
$\underline{D3} = (U\ \phi 2 + \phi 3\ X3\ T33')\ D2\ C$
$\quad + \phi 3\ X3'(D3'\ D2 + D5\ D1')C$
$\underline{D3'} = (U\ \phi 2 + \phi 3\ X3\ T33') D2'\ C$
$\quad + \phi 3\ X3'(D5'\ D2' + D3\ D2\ D1' + D5\ D1)C$
$\quad + \phi 1\ T33\ C$
$\quad + \phi 3\ T33\ C$
$\underline{D4} = X3'(D5 + D3\ D2 + D3\ D1)C$
$\underline{D4'} = X3'(D3' + D2'\ D1') D5'\ C$
$\quad + X3\ C$
$\quad + \phi 1\ T33\ C$
$\underline{D5} = U\ \phi 3\ D3(X3'\ D2'\ D1' + X3\ T33')C$
$\underline{D5'} = U\ \phi 3\ X3\ T33'\ D3'\ C$
$\quad + U\ \phi 3\ X3'\ D3'\ D1'\ C$
$\quad + \phi 3\ T33\ C$
$\quad + \phi 1\ T33\ C$
$\underline{D6} = B4\ C$
$\underline{D6'} = B4'\ C$
$\underline{D7} = D6\ C$
$\underline{D7'} = D6'\ C$
$\underline{D8} = D7\ C$
$\underline{D8'} = D7'\ C$
$\underline{D9} = D8\ C$
$\underline{D9'} = D8'\ C$
$(Ed) = (\phi 4 + U')e$
$(Gd) = X0'\ Je + X0\ Le$
$\underline{G1} = Gd\ C$
$\underline{G1'} = Gd'\ C$
$\underline{G2} = G1\ C$
$\underline{G2'} = G1'\ C$
$\underline{G3} = G2\ C$
$\underline{G3'} = G2'\ C$
$(Ja) = U'\ \phi 4(K7'\ K6'\ K5'\ K4'\ K3'\ K2'\ K1)S1$
$+ U'\ \phi 4(K7'\ K6'\ K5'\ K4'\ K3'\ K2\ K1')S2$
$+ U'\ \phi 4(K7'\ K6'\ K5'\ K4'\ K3'\ K2\ K1)S3$
$+ U'\ \phi 4(K7'\ K6'\ K5'\ K4'\ K3\ K2'\ K1')S4$
$+ U'\ \phi 4(K7'\ K6'\ K5'\ K4'\ K3\ K2'\ K1)S5$
$+ U'\ \phi 4(K7'\ K6'\ K5'\ K4'\ K3\ K2\ K1')S6$
$+ U'\ \phi 4(K7'\ K6'\ K5'\ K4'\ K3\ K2\ K1)S7$
$+ U'\ \phi 4(K7'\ K6'\ K5'\ K4\ K3'\ K2'\ K1')S8$
$+ U'\ \phi 4(K7'\ K6'\ K5'\ K4\ K3'\ K2'\ K1)S9$
$+ U'\ \phi 4(K7'\ K6'\ K5'\ K4\ K3'\ K2\ K1')S10$

102

$+ U'\ \phi 4(K7'\ K6'\ K5'\ K4\ K3'\ K2\ K1)S11$
$+ U'\ \phi 4(K7'\ K6'\ K5'\ K4\ K3\ K2'\ K1')S12$
$+ U'\ \phi 4(K7'\ K6'\ K5'\ K4\ K3\ K2'\ K1)S13$
$+ U'\ \phi 4(K7'\ K6'\ K5'\ K4\ K3\ K2\ K1')S14$
$+ U'\ \phi 4(K7'\ K6'\ K5'\ K4\ K3\ K2\ K1)S15$
$+ U'\ \phi 4(K7'\ K6'\ K5\ K4'\ K3'\ K2'\ K1')S16$
$+ U'\ \phi 4(K7'\ K6'\ K5\ K4'\ K3'\ K2'\ K1)S17$
$+ U'\ \phi 4(K7'\ K6'\ K5\ K4'\ K3'\ K2\ K1')S18$
$+ U'\ \phi 4(K7'\ K6'\ K5\ K4'\ K3'\ K2\ K1)S19$
$+ U'\ \phi 4(K7'\ K6'\ K5\ K4'\ K3\ K2'\ K1')S20$
$+ U'\ \phi 4(K7'\ K6'\ K5\ K4'\ K3\ K2'\ K1)S21$
$+ U'\ \phi 4(K7'\ K6'\ K5\ K4'\ K3\ K2\ K1')S22$
$+ U'\ \phi 4(K7'\ K6'\ K5\ K4'\ K3\ K2\ K1)S23$
$+ U'\ \phi 4(K7'\ K6'\ K5\ K4\ K3'\ K2'\ K1')S24$
$+ U'\ \phi 4(K7'\ K6'\ K5\ K4\ K3'\ K2'\ K1)S25$
$+ U'\ \phi 4(K7'\ K6'\ K5\ K4\ K3'\ K2\ K1')S26$
$+ U'\ \phi 4(K7'\ K6'\ K5\ K4\ K3'\ K2\ K1)S27$
$+ U'\ \phi 4(K7'\ K6'\ K5\ K4\ K3\ K2'\ K1')S28$
$+ U'\ \phi 4(K7'\ K6'\ K5\ K4\ K3\ K2'\ K1)S29$
$+ U'\ \phi 4(K7'\ K6'\ K5\ K4\ K3\ K2\ K1')S30$
$+ U'\ \phi 4(K7'\ K6'\ K5\ K4\ K3\ K2\ K1)S31$
$+ U'\ \phi 4(K7'\ K6\ K5'\ K4'\ K3'\ K2'\ K1')S32$
$+ U'\ \phi 4(K7'\ K6\ K5'\ K4'\ K3'\ K2'\ K1)S33$
$+ U'\ \phi 4(K7'\ K6\ K5'\ K4'\ K3'\ K2\ K1')S34$
$+ U'\ \phi 4(K7'\ K6\ K5'\ K4'\ K3'\ K2\ K1)S35$
$+ U'\ \phi 4(K7'\ K6\ K5'\ K4'\ K3\ K2'\ K1')S36$
$+ U'\ \phi 4(K7'\ K6\ K5'\ K4'\ K3\ K2'\ K1)S37$
$+ U'\ \phi 4(K7'\ K6\ K5'\ K4'\ K3\ K2\ K1')S38$
$+ U'\ \phi 4(K7'\ K6\ K5'\ K4'\ K3\ K2\ K1)S39$
$+ U'\ \phi 4(K7'\ K6\ K5'\ K4\ K3'\ K2'\ K1')S40$
$+ U'\ \phi 4(K7'\ K6\ K5'\ K4\ K3'\ K2\ K1')S46$
$+ U'\ \phi 4(K7'\ K6\ K5'\ K4\ K3\ K2\ K1)S47$
$+ U'\ \phi 4(K7'\ K6\ K5'\ K4'\ K3'\ K2'\ K1')S48$
$+ U'\ \phi 4(K7'\ K6\ K5'\ K4'\ K3'\ K2\ K1)S49$
$+ U'\ \phi 4(K7'\ K6\ K5'\ K4'\ K3\ K2\ K1)S50$
$+ U'\ \phi 4(K7'\ K6\ K5\ K4'\ K3'\ K2\ K1)S51$
$+ U'\ \phi 4(K7'\ K6\ K5\ K4'\ K3\ K2'\ K1')S52$
$+ U'\ \phi 4(K7'\ K6\ K5\ K4'\ K3\ K2\ K1')S53$
$+ U'\ \phi 4(K7'\ K6\ K5\ K4'\ K3\ K2\ K1)S54$
$+ U'\ \phi 4(K7'\ K6\ K5\ K4'\ K3'\ K2'\ K1')S55$
$+ U'\ \phi 4(K7'\ K6\ K5\ K4\ K3'\ K2'\ K1')S56$
$+ U'\ \phi 4(K7'\ K6\ K5\ K4\ K3'\ K2\ K1)S57$
$+ U'\ \phi 4(K7'\ K6\ K5\ K4\ K3\ K2'\ K1)S58$
$+ U'\ \phi 4(K7'\ K6\ K5\ K4\ K3\ K2\ K1')S59$
$+ U'\ \phi 4(K7'\ K6\ K5\ K4\ K3\ K2'\ K1')S60$
$+ U'\ \phi 4(K7\ K6\ K5\ K4\ K3\ K2'\ K1)S61$
$+ U'\ \phi 4(K7\ K6\ K5\ K4\ K3\ K2\ K1')S62$
$+ U'\ \phi 4(K7\ K6\ K5\ K4\ K3\ K2\ K1)S63$
$+ U'\ \phi 4(K7\ K6'\ K5'\ K4'\ K3'\ K2'\ K1)S64$
$+ U'\ \phi 4(K7\ K6'\ K5'\ K4'\ K3'\ K2\ K1)S65$
$+ U'\ \phi 4(K7\ K6'\ K5'\ K4'\ K3'\ K2\ K1')S66$
$+ U'\ \phi 4(K7\ K6'\ K5'\ K4'\ K3\ K2'\ K1)S67$
$+ U'\ \phi 4(K7\ K6'\ K5'\ K4'\ K3\ K2\ K1)S68$
$+ U'\ \phi 4(K7\ K6'\ K5'\ K4\ K3'\ K2'\ K1')S69$
$+ U'\ \phi 4(K7\ K6'\ K5'\ K4\ K3\ K2\ K1)S70$
$+ U'\ \phi 4(K7\ K6'\ K5'\ K4\ K3\ K2\ K1')S71$
$+ U'\ \phi 4(K7\ K6'\ K5'\ K4\ K3'\ K2'\ K1')S72$
$+ U'\ \phi 4(K7\ K6'\ K5'\ K4\ K3\ K2'\ K1)S73$
$+ U'\ \phi 4(K7\ K6'\ K5'\ K4\ K3\ K2\ K1)S74$
$+ U'\ \phi 4(K7\ K6'\ K5'\ K4\ K3'\ K2'\ K1)S75$
$+ U'\ \phi 4(K7\ K6'\ K5'\ K4\ K3\ K2'\ K1')S76$
$+ U'\ \phi 4(K7\ K6'\ K5'\ K4\ K3\ K2'\ K1)S77$
$+ U'\ \phi 4(K7\ K6'\ K5'\ K4\ K3\ K2\ K1')S78$
$+ U'\ \phi 4(K7\ K6'\ K5'\ K4\ K3\ K2\ K1)S79$
$+ U'\ \phi 4(K7\ K6'\ K5'\ K4\ K3'\ K2'\ K1')S80$ $(Jb) = Jra$
$(Jb') = Jra'$ $(Jd) = U'\ \phi 4\ Va(R4'\ R3'\ R2'\ R1)(N3\ N2')Ja'$
$+ U'\ \phi 4\ Va(R4'\ R3'\ R2\ R1')(N3\ N2'\ N1)Ja'$
$+ U'\ \phi 4\ Va(R4'\ R3'\ R2\ R1)(N3\ N2'\ N1')Ja'$
$+ U'\ \phi 4(R4'\ R3\ R2'\ R1')(N3'\ N2'\ N1)Ja'$
$+ U'\ \phi 4(R4'\ R3\ R2\ R1')(N3'\ N2'\ N1)Ja'$
$+ U'\ \phi 4(R4'\ R3\ R2\ R1')(N3'\ N2')Ja'$
$+ U'\ \phi 4(R4'\ Re\ R2\ R1)(N3'\ N2\ N1')Ja'$
$+ U'\ \phi 4(R4\ R3'\ R2'\ R1')(N3'\ N1')Ja'$ $+U'\ \phi4(R4\ R3'\ R2'\ R1)(N3'\ N2'\ N1+N3'\ N2\ N1')Ja'$
$+U'\ \phi4(R4\ R3'\ R2\ R1')(N3'\ N1'+N3'\ N2'\ N1)Ja'$
$+U'\ \phi4(R4\ R3'\ R2\ R1)(N3'\ N2\ N1)Ja'$
$+U'\ \phi4(R4\ R3\ R2'\ R1')(N3'\ N2\ N1+N3'\ N2'\ N1')Ja'$
$+U'\ \phi4\ Ja(X0'\ Je+X0\ Le)$
$+U'\ \phi4\ Va\ N3\ N2\ (X0'\ Je+X0\ Le)$ $\underline{Je} = Je'\ Jb\ C$
$\underline{Je'} = Je\ Jb'\ C$
$\underline{(Jra)} = Jr$
$\underline{(Jra')} = Jr'$
$\underline{(Jw)} = Jwa$
$\underline{(Jw')} = Jwa'$
$\underline{(Jwa)} = J1$
$\underline{(Jwa')} = J1'$ $\underline{J1} = U'\ \phi4\ Sx'(X2+X0)Je\ C+U'\ \phi4\ X2'\ X0'\ Jd\ C$
$+U\ \phi0'\ \phi4\ Je\ C$
$+\phi3\ Vw\ X0'\ T0'\ Bd\ C$
$+\phi3\ Sx'\ (Vw'+X0)\ Je\ C+\phi0'\ \phi3'\ \phi4'\ Sx'\ Je\ C$
$+\phi0\ Y1\ C$ $\underline{J1'} = U'\ \phi4(X2+X0)Je'\ C+U'\ \phi4\ X2'\ X0'\ Jd'\ C$
$+U\ \phi0'\ \phi4\ Je'\ C$
$+\phi3\ Vw\ X0'\ T0'\ Bd'\ C$
$+\phi3\ (Vw'+X0)\ Je'\ C+\phi0'\ \phi3'\ \phi4'\ Je'\ C$
$+\phi0\ Y1'\ C+U'\ Sx\ C$ $(Kd) = U'\ \phi4\ X2'\ T33'\ T32'\ (X0'He+X0\ Ie)$
$+U\ \phi4\ X2'\ N3'\ N2\ N1\ (Va'+Va\ R3+Va\ R4)$
$+U\ \phi4\ X2'\ Va\ N3\ N2'\ N1\ R3'\ R4'$ $\underline{K1} = K1'\ Kd\ C$
$\underline{K1'} = K1\ Kd\ C$
$+\phi4\ X2\ X1'\ Pe'\ So'\ Ve\ T33\ C$
$\underline{K2} = K2'\ K1\ Kd\ C$
$\underline{K2'} = K2\ K1\ Kd\ C$
$+\phi4\ X2\ X1'\ Pe'\ So'\ Ve\ T33\ C$
$\underline{K3} = K3'\ K2\ K1\ Kd\ C$
$\underline{K3'} = K3\ K2\ K1\ Kd\ C$
$+\phi4\ X2\ X1'\ Pe'\ So'\ Ve\ T33\ C$
$\underline{K4} = K4'\ K3\ K2\ K1\ Kd\ C$
$\underline{K4'} = K4\ K3\ K2\ K1\ Kd\ C$
$+\phi4\ X2\ X1'\ Pe'\ So'\ Ve\ T33\ C$
$\underline{K5} = K5'\ K4\ K3\ K2\ K1\ Kd\ C$
$\underline{K5'} = K5\ K4\ K3\ K2\ K1\ Kd\ C$
$+\phi4\ X2\ X1'\ Pe'\ So'\ Ve\ T33\ C$
$\underline{K6} = K6'\ K5\ K4\ K3\ K2\ K1\ Kd\ C$
$\underline{K6'} = K6\ K5\ K4\ K3\ K2\ K1\ Kd\ C$
$+\phi4\ X2\ X1'\ Pe'\ So'\ Ve\ T33\ C$
$\underline{K7} = K7'\ K6\ K5\ K4\ K3\ K2\ K1\ Kd\ C$
$\underline{K7'} = \phi4\ X2\ X1'\ Pe'\ So'\ Ve\ T33\ C$ $(Lb) = Lra$
$(Lb') = Lra'$
$\underline{Le} = Le'\ Lb\ C$
$\underline{Le'} = Le\ Lb'\ C$
$(Lra) = Lr$
$(Lar') = Lr'$
$(Lw) = Lwa$
$(Lw') = Lwa'$
$(Lwa) = l1$
$(Lwa') = l1'$ $\underline{L1} = U'\ \phi4\ Sx'(X2+X0')Le\ C+U'\ \phi4\ X2'\ X0\ Jd\ C$
$+U\ \phi0'\ \phi4\ Le\ C$
$+\phi3\ Vw\ X0\ T0'\ Bd\ C$
$+\phi3\ Sx'\ (Vw'+X0')\ Le\ C+\phi0'\ \phi3'\ \phi4'\ Sx'\ Le\ C$
$+\phi0\ Z1\ C$ $\underline{L1'} = U'\ \phi4\ (X2+X0')\ Le'\ C+U'\ \phi4\ X2'\ X0\ Jd'\ C$
$+U\ \phi0'\ \phi4\ Le'\ C$
$+\phi3\ Vw\ X0\ T0'\ Bd'\ C$
$+\phi3\ (Vw'+X0')\ Le'\ C+\phi0'\ \phi3'\ \phi4'\ Le'\ C$
$+\phi0\ Z1'\ C+U'\ Sx\ C$ $(Mr)\ (\text{relay}) = Ms$
$\underline{Ms} = Os\ C$
$\underline{Ms'} = s\ C+Sc\ C$ $\underline{M1} = M5\ B4\ M2\ C+M5\ B4'\ M2'\ C+M5'\ B4\ M2'C$
$+M5'\ B4'\ M2\ C$
$\underline{M1'} = M5'\ B4'\ M2'\ C+M5'\ B4\ M2\ C+M5\ B4'\ M2\ C+M5\ Br\ M2'\ C+T33\ C$
$\underline{M2} = M5\ Br\ C$
$\underline{M2'} = M5'\ B4'\ C+T0\ C$ $\underline{M3} = X4\ M1\ Ad\ C$
$\underline{M3'} = T0\ C+X4\ M1'\ Ad'\ C+X4'\ M1'\ C$ $\underline{M4} = T33'\ B4\ C$
$\underline{M4'} = B4'\ C+T33\ C$ $\underline{M5} = M4\ C$
$\underline{M5'} = M4'\ C$ $\underline{N1} = Sp\ C+\phi4\ N1'\ Pd'\ C$
$\underline{N1'} = \phi4\ Pd\ C+\phi4\ N1\ (N3'+N2')\ C$ $\underline{N2} = Sp\ C+\phi4\ N2'\ N1\ Pd'\ C$
$\underline{N2'} = \phi4\ Pd\ C+\phi4\ N3'\ N2\ N1\ C$ $\underline{N3} = Sp\ C+\phi4\ N3'\ N2\ N1\ Pd'\ C$
$\underline{N3'} = \phi4\ Pd\ C$ $(Pd) = \phi4\ X2'\ T33'\ T32'\ (X0'\ He+X0\ Ie)$
$+\phi3\ Vw\ T32\ (X0'\ He+X0\ Ie)$
$+\phi0\ \phi4'\ Ve\ T33\ (F'\ H1+F\ I1)$
$+\phi4\ X2'\ X1\ R4\ R3\ R2'\ R1'\ Ve\ T33\ (X0'\ H1+X0\ I1)$ $\underline{Pe} = U\ \phi4\ Ed\ C$
$+U'\ \phi4\ X2\ X1\ So'\ T33\ Ed\ C$
$\underline{Pe'} = U\ \phi4\ Ed'\ C$
$+U'\ \phi4\ T33\ Pe\ Sx'\ C$
$+Sc\ C$ $\underline{R1} = \phi4\ X2\ X1'\ Pe'\ So'\ Ve\ T33\ R1'\ C$
$\underline{R1'} = \phi4\ X2\ X1'\ Pe'\ So'\ Ve\ T33\ R1\ C$
$+Sp\ C+\phi3\ T33\ C$
$\underline{R2} = \phi4\ X2\ X1'\ Pe'\ So'\ Ve\ T33\ R2'\ R1\ C$
$\underline{R2'} = \phi4\ X2\ X1'\ Pe'\ So'\ Ve\ T33\ R2\ R1\ C$
$+Sp\ C+\phi3\ T33\ C$
$\underline{R3} = \phi4\ X2\ X1'\ Pe'\ So'\ Ve\ T33\ R3'\ R2\ R1\ C$
$\underline{R3'} = \phi4\ X2\ X1'\ Pe'\ So'\ Ve\ T33\ R3\ R2\ R1\ C$
$+Sp\ C+\phi3\ T33\ C$
$\underline{R4} = \phi4\ X2\ X1'\ Pe'\ So'\ Ve\ T33\ R4'\ R3\ R2\ R1\ C$
$\underline{R4'} = Sp\ C+\phi3\ T33\ C$ $\underline{Sa} = U\ \phi4\ Sa'\ So\ C$
$\underline{Sa'} = U\ \phi4\ Sa\ Pe\ C$
$+\phi4'\ C$ $\underline{Sd} = U\ \phi4\ Va\ (R4'\ R3'\ R2'\ R1)\ (N3\ N2'\ N1)\ Gd\ G1$
$+U\ \phi4\ Va\ (R4'\ R3'\ R2\ R1')\ (N3\ N2'\ N1)\ Gd\ G1'$
$+U\ \phi4\ Va\ (R4'\ R3'\ R2\ R1)\ (N3\ N2'\ N1)\ Gd'\ G1$
$+U\ \phi4\ Va'\ (R4'\ R3'\ R2\ R1)\ (N3'\ N2\ N1)\ Gd'\ G1'\ G2'\ G3'$
$+U\ \phi4\ (R4'\ R3\ R2'\ R1')\ (N3'\ N2\ N1)\ Gd'\ G1'\ G2'\ G3$
$+U\ \phi4\ (R4'\ R3\ R2'\ R1)\ (N3'\ N2\ N1)\ Gd'\ G1'\ G2\ G3'$
$+U\ \phi4\ (R4'\ R3\ R2\ R1')\ (N3'\ N2\ N1)\ Gd'\ G1'\ G2\ G3$
$+U\ \phi4\ (R4'\ R3\ R2\ R1)\ (N3'\ N2\ N1)\ Gd'\ G1\ G2'\ G3'$
$+U\ \phi4\ (R4\ R3'\ R2'\ R1')\ (N3'\ N2\ N1)\ Gd'\ G1\ G2'\ G3$
$+U\ \phi4\ (R4\ R3'\ R2'\ R1)\ (N3'\ N2\ N1)\ Gd'\ G1\ G2\ G3'$ $+U \phi4 \ (R4 \ R3' \ R2 \ R1') \ (N3' \ N2 \ N1) \ Gd' \ G1 \ G2 \ G3$ $+U \phi4 \ (R4 \ R3' \ R2 \ R1) \ (N3' \ N2 \ N1) \ Gd \ G1' \ G2' \ G3'$ $+U \phi4 \ (R4 \ R3 \ R2' \ R1') \ (N3' \ N2 \ N1) \ Gd \ G1' \ G2' \ G3$ $\underline{So} = U' \ \phi4 \ X2' \ X1 \ Ve \ T33 \ C$
$\qquad +Sp \ C$
$\qquad +U \ \phi4 \ Sa' \ Pe' \ C$ $\underline{Sp} = (U' \ Ed + U)s \ Sx' \ T33 \ C$ $\underline{Sp'} = Sp \ C$ $\underline{Ss} = U \ \phi4 \ X2' \ N3' \ N2 \ N1 \ (Va' + Va \ R3 + Va \ R4)Sd \ C$
$\qquad +U \ \phi4 \ X2' \ Va \ N3 \ N2' \ N1 \ R4' \ R3' \ Sd \ C$ $\underline{Ss'} = U \ \phi4 \ X2' \ N3' \ N2 \ N1(Va' + Va \ R3 + Va \ R4)Sd' \ C$
$\qquad +U \ \phi4 \ X2' \ Va \ N3 \ N2' \ N1 \ R4' \ R3' \ Sd' \ C$
$\qquad +U(X2+\phi4')T4 \ C$ $\underline{Sx} = Sp \ C$ $\underline{Sx'} = U' \ \phi4 \ Ed' \ C + U \ \phi4 \ Pe' \ Sa' \ C + Sc \ C$ $\underline{(S1)} = U' \ \phi4 \ Pe \ b1$
$\qquad +U \ (K7' \ K6' \ K5' \ K4' \ K3' \ K2 \ K1)Ss$ $\underline{(S2)} = U' \ \phi4 \ Pe \ b2$
$\qquad +U \ (K7' \ K6' \ K5' \ K4' \ K3' \ K2 \ K1')Ss$ $\underline{(S3)} = U' \ \phi4 \ Pe \ b3$
$\qquad +U(K7' \ K6' \ K5' \ K4' \ K3' \ K2 \ K1)Ss$ $\underline{(S4)} = U' \ \phi4 \ Pe \ b4$
$\qquad +U(K7' \ K6' \ K5' \ K4' \ K3 \ K2' \ K1')Ss$ $\underline{(S5)} = U' \ \phi4 \ Pe \ b5$
$\qquad +U(K7' \ K6' \ K5' \ K4' \ K3 \ K2' \ K1)Ss$ $\underline{(S6)} = U' \ \phi4 \ Pe \ b6$
$\qquad +U(K7' \ K6' \ K5' \ K4' \ K3 \ K2 \ K1')Ss$ $\underline{(S7)} = U' \ \phi4 \ Pe \ b7$
$\qquad +U(K7' \ K6' \ K5' \ K4' \ K3 \ K2 \ K1)Ss$ $\underline{(S8)} = U' \ \phi4 \ Pe \ b8$
$\qquad +U(K7' \ K6' \ K5' \ K4 \ K3' \ K2' \ K1')Ss$ $\underline{(S9)} = U' \ \phi4 \ Pe \ b9$
$\qquad +U(K7' \ K6' \ K5' \ K4 \ K3' \ K2' \ K1)Ss$ $\underline{(S10)} = U' \ \phi4 \ Pe \ b10$
$\qquad +U(K7' \ K6' \ K5' \ K4 \ K3' \ K2 \ K1')Ss$ $\underline{(S11)} = U' \ \phi4 \ Pe \ b11$
$\qquad +U(K7' \ K6' \ K5' \ K4 \ K3' \ K2 \ K1)Ss$ $\underline{(S12)} = U' \ \phi4 \ Pe \ b12$
$\qquad +U(K7' \ K6' \ K5' \ K4 \ K3 \ K2' \ K1')Ss$ $\underline{(S13)} = U' \ \phi4 \ Pe \ b13$
$\qquad +U(K7' \ K6' \ K5' \ K4 \ K3 \ K2' \ K1)Ss$ $\underline{(S14)} = U' \ \phi4 \ Pe \ b14$
$\qquad +U(K7' \ K6' \ K5' \ K4 \ K3 \ K2 \ K1')Ss$ $\underline{(S15)} = U' \ \phi4 \ Pe \ b15$
$\qquad +U(K7' \ K6' \ K5' \ K4 \ K3 \ K2 \ K1)Ss$ $\underline{(S16)} = U' \ \phi4 \ Pe \ b16$
$\qquad +U(K7' \ K6' \ K5 \ K4' \ K3' \ K2' \ K1')Ss$ $\underline{(S17)} = U' \ \phi4 \ Pe \ b17$
$\qquad +U(K7' \ K6' \ K5 \ K4' \ K3' \ K2' \ K1)Ss$ $\underline{(S18)} = U' \ \phi4 \ Pe \ b18$
$\qquad +U(K7' \ K6' \ K5 \ K4' \ K3' \ K2 \ K1')Ss$ $\underline{(S19)} = U' \ \phi4 \ Pe \ b19$
$\qquad +U(K7' \ K6' \ K5 \ K4' \ K3' \ K2 \ K1)Ss$ $\underline{(S20)} = U' \ \phi4 \ Pe \ b20$
$\qquad +U(K7' \ K6' \ K5 \ K4' \ K3 \ K2' \ K1')Ss$ $\underline{(S21)} = U' \ \phi4 \ Pe \ b21$
$\qquad +U(K7' \ K6' \ K5 \ K4' \ K3 \ K2' \ K1)Ss$ $\underline{(S22)} = U' \ \phi4 \ Pe \ b22$
$\qquad +U(K7' \ K6' \ K5 \ K4' \ K3 \ K2 \ K1')Ss$ $\underline{(S23)} = U' \ \phi4 \ Pe \ b23$
$\qquad +U(K7' \ K6' \ K5 \ K4' \ K3 \ K2 \ K1)Ss$ $\underline{(S24)} = U' \ \phi4 \ Pe \ b24$
$\qquad +U(K7' \ K6' \ K5 \ K4 \ K3' \ K2' \ K1')Ss$ $\underline{(S25)} = U' \ \phi4 \ Pe \ b25$
$\qquad +U(K7' \ K6' \ K5 \ K4 \ K3' \ K2' \ K1)Ss$ $\underline{(S26)} = U' \ \phi4 \ Pe \ b26$
$\qquad +U(K7' \ K6' \ K5 \ K4 \ K3' \ K2 \ K1')Ss$ $\underline{(S27)} = U' \ \phi4 \ Pe \ b27$
$\qquad +U(K7' \ K6' \ K5 \ K4 \ K3' \ K2 \ K1)Ss$ $\underline{(S28)} = U' \ \phi4 \ Pe \ b28$
$\qquad +U(K7' \ K6' \ K5 \ K4 \ K3 \ K2' \ K1')Ss$ $\underline{(S29)} = U' \ \phi4 \ Pe \ b29$
$\qquad +U(K7' \ K6' \ K5 \ K4 \ K3 \ K2' \ K1)Ss$ $\underline{(S30)} = U' \ \phi4 \ Pe \ b30$
$\qquad +U(K7' \ K6' \ K5 \ K4 \ K3 \ K2 \ K1')Ss$ $\underline{(S31)} = U' \ \phi4 \ Pe \ b31$
$\qquad +U(K7' \ K6' \ K5 \ K4 \ K3 \ K2 \ K1)Ss$ $\underline{(S32)} = U' \ \phi4 \ Pe \ b32$
$\qquad +U(K7' \ K6 \ K5' \ K4' \ K3' \ K2' \ K1')Ss$ $\underline{(S33)} = U' \ \phi4 \ Pe \ b33$
$\qquad +U(K7' \ K6 \ K5' \ K4' \ K3' \ K2' \ K1)Ss$ $\underline{(S34)} = U' \ \phi4 \ Pe \ b34$
$\qquad +U(K7' \ K6 \ K5' \ K4' \ K3' \ K2 \ K1')Ss$ $\underline{(S35)} = U' \ \phi4 \ Pe \ b35$
$\qquad +U(K7' \ K6 \ K5' \ K4' \ K3' \ K2 \ K1)Ss$ $\underline{(S36)} = U' \ \phi4 \ Pe \ b36$
$\qquad +(K7' \ K6 \ K5' \ K4' \ K3 \ K2' \ K1')Ss$ $\underline{(S37)} = U' \ \phi4 \ Pe \ b37$
$\qquad +U(K7' \ K6 \ K5' \ K4' \ K3 \ K2' \ K1)Ss$ $\underline{(S38)} = U' \ \phi4 \ Pe \ b38$
$\qquad +U(K7' \ K6 \ K5' \ K4' \ K3 \ K2 \ K1')Ss$ $\underline{(S39)} = U' \ \phi4 \ Pe \ b39$
$\qquad +U(K7' \ K6 \ K5' \ K4' \ K3 \ K2 \ K1)Ss$ $\underline{(S40)} = U' \ \phi4 \ Pe \ b40$
$\qquad +U(K7' \ K6 \ K5' \ K4 \ K3' \ K2' \ K1')Ss$ $\underline{(S41)} = U' \ \phi4 \ Pe \ b41$
$\qquad +U(K7' \ K6 \ K5' \ K4 \ K3' \ K2' \ K1)Ss$ $\underline{(S42)} = U' \ \phi4 \ Pe \ b42$
$\qquad +U(K7' \ K6 \ K5' \ K4 \ K3' \ K2 \ K1')Ss$ $\underline{(S43)} = U' \ \phi4 \ Pe \ b43$
$\qquad +U(K7' \ K6 \ K5' \ K4 \ K3' \ K2 \ K1)Ss$ $\underline{(S44)} = U' \ \phi4 \ Pe \ b44$
$\qquad +U(K7' \ K6 \ K5' \ K4 \ K3 \ K2' \ K1')Ss$ $\underline{(S45)} = U' \ \phi4 \ Pe \ b45$
$\qquad +U(K7' \ K6 \ K5' \ K4 \ K3 \ K2' \ K1)Ss$ $\underline{(S46)} = U' \ \phi4 \ Pe \ b46$
$\qquad +U(K7' \ K6 \ K5' \ K4 \ K3 \ K2 \ K1')Ss$ $\underline{(S47)} = U' \ \phi4 \ Pe \ b47$
$\qquad +U(K7' \ K6 \ K5' \ K4 \ K3 \ K2 \ K1)Ss$ $\underline{(S48)} = U' \ \phi4 \ Pe \ b48$
$\qquad +U(K7' \ K6 \ K5 \ K4' \ K3' \ K2' \ K1')Ss$ $\underline{(S49)} = U' \ \phi4 \ Pe \ b49$
$\qquad +U(K7' \ K6 \ K5 \ K4' \ K3' \ K2' \ K1)Ss$ $\underline{(S50)} = U' \ \phi4 \ Pe \ b50$
$\qquad +U(K7' \ K6 \ K5 \ K4' \ K3' \ K2 \ K1')Ss$ $\underline{(S51)} = U' \ \phi4 \ Pe \ b51$
$\qquad +U(K7' \ K6 \ K5 \ K4' \ K3' \ K2 \ K1)Ss$ $\underline{(S52)} = U' \ \phi4 \ Pe \ b52$
$\qquad +U(K7' \ K6 \ K5 \ K4' \ K3 \ K2' \ K1')Ss$ $\underline{(S53)} = U' \ \phi4 \ Pe \ b53$
$\qquad +U(K7' \ K6 \ K5 \ K4' \ K3 \ K2' \ K1)Ss$ $(\underline{S54}) = U' \phi 4\ Pe\ b54$
$\quad + U(K7'\ K6\ K5\ K4'\ K3\ K2\ K1')Ss$
$(\underline{S55}) = U' \phi 4\ Pe\ b55$
$\quad + U(K7'\ K6\ K5\ K4'\ K3\ K2\ K1)Ss$
$(\underline{S56}) = U' \phi 4\ Pe\ b56$
$\quad + U(K7'\ K6\ K5\ K4\ K3'\ K2'\ K1')Ss$
$(\underline{S57}) = U' \phi 4\ Pe\ b57$
$\quad + U(K7'\ K6\ K5\ K4\ K3'\ K2'\ K1)Ss$
$(\underline{S58}) = U' \phi 4\ Pe\ b58$
$\quad + U(K7'\ K6\ K5\ K4\ K3'\ K2\ K1')Ss$
$(\underline{S59}) = U' \phi 4\ Pe\ b59$
$\quad + U(K7'\ K6\ K5\ K4\ K3'\ K2\ K1)Ss$
$(\underline{S60}) = U' \phi 4\ Pe\ b60$
$\quad + U(K7'\ K6\ K5\ K4\ K3\ K2'\ K1')Ss$
$(\underline{S61}) = U' \phi 4\ Pe\ b61$
$\quad + U(K7'\ K6\ K5\ K4\ K3\ K2'\ K1)Ss$
$(\underline{S62}) = U' \phi 4\ Pe\ b62$
$\quad + U(K7'\ K6\ K5\ K4\ K3\ K2\ K1')Ss$
$(\underline{S63}) = U' \phi 4\ Pe\ b63$
$\quad + U(K7'\ K6\ K5\ K4\ K3\ K2\ K1)Ss$
$(\underline{S64}) = U' \phi 4\ Pe\ b64$
$\quad + U(K7\ K6'\ K5'\ K4'\ K3'\ K2'\ K1')Ss$
$(\underline{S65}) = U' \phi 4\ Pe\ b65$
$\quad + U(K7\ K6'\ K5'\ K4'\ K3'\ K2'\ K1)Ss$
$(\underline{S66}) = U' \phi 4\ Pe\ b66$
$\quad + U(K7\ K6'\ K5'\ K4'\ K3'\ K2\ K1')Ss$
$(\underline{S67}) = U' \phi 4\ Pe\ b67$
$\quad + U(K7\ K6'\ K5'\ K4'\ K3'\ K2\ K1)Ss$
$(\underline{S68}) = U' \phi 4\ Pe\ b68$
$\quad + U(K7\ K6'\ K5'\ K4'\ K3\ K2'\ K1')Ss$
$(\underline{S69}) = U' \phi 4\ Pe\ b69$
$\quad + U(K7\ K6'\ K5'\ K4'\ K3\ K2'\ K1)Ss$
$(\underline{S70}) = U' \phi 4\ Pe\ b70$
$\quad + U(K7\ K6'\ K5'\ K4'\ K3\ K2\ K1')Ss$
$(\underline{S71}) = U' \phi 4\ Pe\ b71$
$\quad + U(K7\ K6'\ K5'\ K4'\ K3\ K2\ K1)Ss$
$(\underline{S72}) = U' \phi 4\ Pe\ b72$
$\quad + U(K7\ K6'\ K5'\ K4\ K3'\ K2'\ K1')Ss$
$(\underline{S73}) = U' \phi 4\ Pe\ b73$
$\quad + U(K7\ K6'\ K5'\ K4\ K3'\ K2'\ K1)Ss$
$(\underline{S74}) = U' \phi 4\ Pe\ b74$
$\quad + U(K7\ K6'\ K5'\ K4\ K3'\ K2\ K1')Ss$
$(\underline{S75}) = U' \phi 4\ Pe\ b75$
$\quad + (K7\ K6'\ K5'\ K4\ K3'\ K2\ K1)Ss$
$(\underline{S76}) = U' \phi 4\ Pe\ b76$
$\quad + U(K7\ K6'\ K5'\ K4\ K3\ K2'\ K1')Ss$
$(\underline{S77}) = U' \phi 4\ Pe\ b77$
$\quad + U(K7\ K6'\ K5'\ K4\ K3\ K2'\ K1)Ss$
$(\underline{S78}) = U' \phi 4\ Pe\ b78$
$\quad + U(K7\ K6'\ K5'\ K4\ K3\ K2\ K1')Ss$
$(\underline{S79}) = U' \phi 4\ Pe\ b79$
$\quad + U(K7\ K6'\ K5'\ K4\ K3\ K2\ K1)Ss$
$(\underline{S80}) = U' \phi 4\ Pe\ b80$
$\quad + U(K7\ K6'\ K5'\ K4'\ K3'\ K2'\ K1')Ss$ $\underline{T1} = T0\ C$
$\underline{T1'} = T1\ C$
$\underline{T28} = T27\ C$
$\underline{T28'} = T28\ C$
$\underline{T29} = T28\ C$
$\underline{T29'} = T29\ C$
$\underline{T30} = T29\ C$
$\underline{T30'} = T30\ C$
$\underline{T31} = T30\ C$
$\underline{T31'} = T31\ C$
$\underline{T32} = T31\ C$
$\underline{T32'} = T32\ C$
$\underline{T33} = T32\ C$
$\underline{T33'} = T33\ C$ $(\underline{U})(\text{relay}) = U1$
$(\underline{U1})(\text{relay}) = U2$
$\underline{U2} = \phi 0'\ \phi 1'\ \phi 2'\ \phi 3'\ \phi 4'\ Op\ C$
$\underline{U2'} = \phi 0'\ \phi 1'\ \phi 2'\ \phi 3'\ \phi 4'\ Or\ C$ $\underline{Va} = \phi 4\ X2'\ T32(X0'\ He + X0\ Ie)C$
$\quad + \phi 4\ X2\ Ve\ T33(F'\ H1 + F\ 11)C$
$\quad + U\ \phi 0\ Pd\ C + \phi 3\ Pd\ C$
$\underline{Va'} = \phi 4\ X2'\ X1\ Pd'\ Ve\ T33\ C$
$\quad + (\phi 1 + \phi 3)Vw\ T33\ C$
$\quad + \phi 4\ So\ C$ $\underline{Ve} = T27\ C$
$\underline{Ve'} = \phi 4'\ T28(F\ W1' + F'\ W1)C$
$\quad + \phi 4'\ T29(F\ W2' + F'\ W2)C$
$\quad + \phi 4'\ T30(F\ W3' + F'\ W3)C$
$\quad + \phi 2'\ \phi 4'\ T31(F\ W4' + F'\ W4)C$
$\quad + \phi 4(T28 + T29 + T30 + T31)F\ C$ $\underline{Vw} = (U + U'\ \phi 2')Ve\ T33\ C$
$\underline{Vw'} = Ve'\ T33\ C$ $\underline{W1} = \phi 3\ Vw\ T0\ W1'\ C$
$\underline{W1'} = \phi 3\ Vw\ T0\ W1\ C$
$\quad + \phi 4\ X2'\ X1\ R4\ R3\ R2'\ R1'\ Ve\ T33\ C + \phi 0'\ \phi 1'\ \phi 2'\ \phi 3'\ \phi 4'\ C + Sc\ C$
$\underline{W2} = \phi 3\ Vw\ T0\ W2'\ W1\ C$
$\underline{W2'} = \phi 3\ Vw\ T0\ W2\ W1\ C$
$\quad + \phi 4\ X2'\ X1\ R4\ R3\ R2'\ R1'\ Ve\ T33\ C + \phi 0'\ \phi 1'\ \phi 2'\ \phi 3'\ \phi 4'\ C + Sc\ C$
$\underline{W3} = \phi 3\ Vw\ T0\ W3'\ W2\ W1\ C$
$\underline{W3'} = \phi 3\ Vw\ T0\ W3\ W2\ W1\ C$
$\quad + \phi 4\ X2'\ X1\ R4\ R3\ R2'\ R1'\ Ve\ T33\ C + \phi 0'\ \phi 1'\ \phi 2'\ \phi 3'\ \phi 4'\ C + Sc\ C$
$\underline{W4} = \phi 3\ Vw\ T0\ W4'\ W3\ W2\ W1\ C$
$\underline{W4'} = \phi 3\ Vw\ T0\ W4\ W3\ W2\ W1\ C$
$\quad + \phi 4\ X2'\ X1\ R4\ R3\ R2'\ R1'\ Ve\ T33\ C + \phi 0'\ \phi 1'\ \phi 2'\ \phi 3'\ \phi 4'\ C + Sc\ C$ $\underline{X0} = \phi 4\ X2\ X1'\ So'\ Pe'\ Ve'\ T33\ F\ C$
$\quad + \phi 4'\ T33\ F\ C$
$\underline{X0'} = \phi 4\ X2\ X1'\ So'\ Pe'\ Ve'\ T33\ F'\ C$
$\quad + \phi 4'\ T33\ F'\ C$
$\underline{X1} = Sp\ C$
$\quad + \phi 4\ Ve\ T33\ X2'\ X1'\ C$
$\underline{X1'} = U\ \phi 4\ X1\ So\ C$
$\quad + U'\ \phi 4\ X1\ Pe\ C$
$\underline{X2} = Sp\ C$
$\quad + \phi 4\ Ve\ T33\ X2'\ X1\ C$
$\underline{X2'} = \phi 4\ Pe'\ Ve\ T33\ X2\ X1'\ C$
$\underline{X3} = T28\ C$
$\underline{X3'} = T33\ C$
$\underline{X4} = T0\ C$
$\underline{X4'} = T4\ C$
$\underline{\phi X} = U'\ \phi 0\ Ve\ T32\ C$
$\underline{\phi X'} = U'\ Sp\ C + Sc\ C$ $\underline{\phi 0} = \phi 0'\ \phi 1'\ \phi 2'\ \phi 3'\ \phi 4'\ Oe\ Ve\ T32\ C$
$\quad + U'\ \phi 3\ Oe\ Ve\ T32\ Vw\ Pd\ \phi x'\ C$
$\quad + U\ \phi 4\ X2'\ X1'\ R4\ R3\ R2'\ R1'\ Oe\ Ve\ T33\ C$
$\underline{\phi 0'} = \phi 0\ Ve\ T32\ C + Sp\ C + Sc\ C$ $\underline{\phi 1} = U'\ \phi 4\ X2'\ X1\ R4\ R3\ R2'\ R1'\ Ve\ T33\ C$
$\quad + \phi 3\ Va'\ Vw\ T33\ C + (U + U'\ \phi X)\phi 0\ Ve\ T32\ C$
$\underline{\phi 1'} = \phi 1\ Vw\ T33\ C + Sp\ C + Sc\ C$ $\underline{\phi 2} = \phi 1\ Va'\ Vw\ T33\ C$ $\underline{\phi 2'} = U\ \phi 2\ Vw\ T33\ C$
$\phantom{\underline{\phi 2'} =} + U'\ \phi 2\ Ve\ T33\ C$
$\phantom{\underline{\phi 2'} =} + Sp\ C + Sc\ C$
$\phi 3 = U\ \phi 2\ Vw\ T33\ C$
$\phantom{\phi 3 =} + U'\ \phi 2\ Ve\ T33\ C$
$\underline{\phi 3'} = \phi 3\ Vw\ T33\ C + Sp\ C + Sc\ C$ $\phi 4 = Sp\ C$
$\underline{\phi 4'} = \phi 4\ X2'\ X1\ R4\ R3\ R2'\ R1'\ Ve\ T33\ C + Sc\ C$ From the foregoing it will be observed that this invention provides an apparatus which serves to intercouple the input-output circuitry of an electronic digital computer with input-output devices of the type exemplified by IBM card reading and punching machines, which include means for scanning a data carrier such as a card upon which numeric or alphabetic data may be placed, the relative classification or order of the data being represented by its position on the carrier in one co-ordinate direction and its meaning or value being represented by its position in another co-ordinate direction, and in which such machine operates repetitively, once for each predetermined position in one co-ordinate direction to read in or read out any data relating to that position, such data being read in or read out simultaneously and being separately identified with its individual second co-ordinate location. In the case of card machines such as the IBM card reading and punching machines, the card is read row by row, each row identifying the character or numerical value of the data punched therein or to be punched therein, the data being read simultaneously from each of eighty columnar positions or punched simultaneously in each of eighty columnar positions, the data associated with each such columnar position being separately identified by the separate electrical conductor on which it is carried.

The apparatus of this invention co-operates with the digital computer and read in-read out devices of the character above described to take data from the read in device encode it to a binary coded decimal number or a binary coded alphabetic character, subject the numerical data to a conversion computation to reduce it to straight binary form, and introduce it into the digital computer.

The apparatus operates also in the reading out function to take binary and binary coded alphabetic data from the computer, convert the binary data to binary coded decimal data, decode it into individual data signals identified respectively with the individual co-ordinate or columnar positions in which it is to be placed, and transfers the data to the card machine by actuating the appropriate punches to place the data in the proper columns in the card.

As has been pointed out the apparatus described provides also two cycles of operation in which data may be taken from the computer, converted and returned to the computer, the apparatus being capable in these two cycles of converting straight binary data to binary coded decimal data or taking binary coded decimal data and converting it to straight binary data.

Attention is directed particularly to the novel computational apparatus which has been provided for making the necessary conversion computations in a minimum time. Because this computational apparatus is arranged especially to perform the computations required to make the mentioned conversions the arithmetic processes have been simplified to eliminate all unnecessary or time wasting steps. As a consequence it is possible to convert as many as sixteen full computer words (one hundred twenty-eight binary coded decimal digits) in the time required for the computer memory drum to make one half of a revolution.

The foregoing as well as other objects and features of the invention as heretofore set forth are believed to have been fully and completely disclosed, although it will be recognized that many changes may be made by those skilled in the art without departing from the invention. Consequently, this invention is not to be limited to the particular form, arrangement of parts, or sequences of operation herein described and shown, except as defined by the following claims.

We claim:

1. In a data converter-transducer for coupling the input-output circuits of an electronic digital computer to a read-in read-out device adapted to scan a data carrier and transduce data between said carrier and electric circuit means associated with said device wherein said data is represented on said carrier by one coding system different than another coding system used in said computer, the combination of: storage means coupled to said electric circuit for storing a plurality of discrete units of data according to said one coding system; a memory mechanism adapted to store each such discrete unit of data in the form of a group of data indicative signals and adapted to store said data when presented in a form corresponding to said other coding system; scanning means for scanning said storage means unit by unit; coding means co-acting with said scanning means to inter-couple said storage means with said memory mechanism for transmitting data therebetween and coding said data between said unit form and said group form; converting means co-acting with said memory mechanism to take data in one form from said mechanism, convert it to the other of said forms, and replace it in said memory mechanism; and means for transmitting data in said form corresponding to said other coding system between said memory mechanism and said computer input-output circuits.

2. In a data converter-transducer for coupling the input-output circuits of an electronic digital computer to a read-in read-out device adapted to scan a data carrier and transduce data between said carrier and electric circuit means associated with said device wherein said data is represented on said carrier by a decimal-alphabetic coding system different than a binary and binary coded alphabetic system used in said computer, the combination of: storage means coupled to said electric circuit for storing a plurality of discrete units of data each constituting one character of said decimal-alphabetic coding system; a memory mechanism adapted to store each such discrete unit in the form of a binary code group and adapted to store said data when presented in a form corresponding to said binary and binary coded alphabetic coding system; scanning means for scanning said storage means unit by unit; coding means coacting with said scanning means to inter-couple said storage means with said memory mechanism for transmitting data there-between and coding said data between said unit form and said code group form; converting means co-acting with said memory mechanism to take numeric data in one form from said mechanism, convert it to the other of said forms, and replace it in said memory mechanism; and means for transmitting data in said binary and binary coded alphabetic form between said memory mechanism and said computer input-output circuits.

3. In a data converter-transducer for coupling the input-output circuits of an electronic digital computer to a card reading and punching machine adapted to scan a data card row by row and transduce data between said card and electric circuit means associated with said machine wherein said data is represented on said card by holes punched according to one coding system wherein each such hole represents a single discrete unit of data having a value according to the horizontal row in which it is located and having an order significance according to the vertical column in which it is situated, and wherein said computer operates according to a binary numbering system, the combination of: storage means coupled to said electric circuit means for storing a plurality of discrete units of data each corresponding to one hole in the row scanned, the location of said unit in said storage means corresponding to the columnar location of the hole to which it corresponds; a memory mechanism adapted to store each such discrete unit of data in the form of a binary code group and adapted to store said data when presented in the form of a straight binary number; scanning means for scanning said storage means unit by unit; counting means for counting the rows scanned by said card reading and punching machine for producing a signal representative of the row last scanned; coding means co-acting with said scanning means and said counting means to intercouple said storage means with said memory mechanism for transmitting data therebetween and coding said data between said unit form and said binary code group form according to the value indicated by the signal produced by said counting means; converting means co-acting with said memory mechanism to take numeric data in one form from said mechanism, convert it to the other of said forms, and replace it in said memory mechanism; means for transmitting data in the form of a straight binary number between said memory mechanism and said computer input-output circuits.

4. In a data converter-transducer for coupling the input-output circuits of an electronic digital computer to a punch card reading machine adapted to scan a punch card row by row and produce an electrical data signal for each hole punched in the row scanned wherein the value of the data represented by each such hole is determined by the horizontal row in which it is found and wherein the order significance of said data is represented by the columnar position in which said hole is found, and wherein said computer operates on a binary numbering system, the combination of: a storage means having a storage element for each column of said card, each of said elements being responsive to said data signal and settable thereby to a condition indicating a hole punched in the corresponding column of said card; a recirculating register arranged to store and circulate a series of binary signals at least equal in number to four times the number of columns on said card; scanning means for scanning said storage means element by element; row counting means coupled to said card reading machine for counting the rows scanned by said machine and producing output signals indicative of the row last scanned; coding means co-acting with said scanning means to intercouple said storage means with said recirculating register for producing a code group of four binary signals comprising a binary number equal in value to the decimal value of the row last scanned; column counting means co-acting with said scanning means and said coding means for placing said groups of binary signals in said recirculating register in positions corresponding to the card columns from which the corresponding data was taken; converting means co-acting with said recirculating register and operable to take therefrom a plurality of binary code groups representative of a plural digit decimal number and produce binary signals representative of a binary number having a value equal to that of said plural digit decimal number; restoring means co-acting with said converting means and said recirculating register and operable to place said binary signals in said register in the same location as that occupied by said plurality of code groups; and means for transmitting said binary signals from said recirculating register to said input-output circuits of said computer.

5. An apparatus according to claim 2 wherein said computer is of the internally programmed type in which the functioning of said computer is controlled by a series of command signals stored within said computer, wherein said data converter-transducer includes means responsive to predetermined ones of said command signals for controlling the operation of said read-in read-out device.

6. An apparatus according to claim 5 wherein said apparatus also includes means responsive to predetermined others of said command signals for controlling the direction of transmission of data between said computer and said read-in read-out device.

7. A data converting apparatus for electronic digit computers comprising: a first recirculating storage means for circulating a series of data indicative signals representative of a straight binary number, said storage means including input-output means permitting data indicative signals to be taken from and placed in said storage means; a second recirculating storage means for recirculating a series of data indicative signals, said second storage means including input-output means permitting data indicative signals to be taken from and placed in said storage means; a digit reversing circuit operable between the output means of said first storage means and the input means of said second storage means to transfer signals from said first storage means to said second storage means in inverse order to thereby produce in said second storage means a series of data indicative signals representing said straight binary number with the denominational orders reversed; a dividing circuit having one input connected to the output means of said second storage means and having two outputs, one connected to the input means of said second storage means and one connected to the input means of said first storage means, said dividing circuit being operably responsive to data indicative signals taken from said second storage means and representing a binary whole number of given value to produce at said first and second outputs respectively remainder and quotient indicative signals representative of binary whole numbers having values respectively equal to the difference between said given value and ten times said quotient and to one-tenth the difference between said given value and said remainder; and means for shifting the signals in said first recirculating means four binary orders between successive productions of remainder signals whereby there is built up in said first recirculating storage means a series of data indicative signals representative of a binary coded decimal number in which each decimal digit is represented by a code group of four signals, said binary coded decimal number having a value equal to said given value of said straight binary number.

8. In a data converter-transducer for coupling the input-output circuits of an electronic digital computer to a read-in read-out device adapted to scan a data carrier whereon said data is represented as a plurality of discrete units and to transduce a plurality of such units of data simultaneously between said carrier and electric circuit means, associated with said device the combination of: storage means coupled to said electric circuit means for storing said plurality of discrete units of data and providing simultaneous access to all of said units, said storage means being coupled to said electric circuit means for simultaneous transmission of all said data into and out of said storage means; scanning means for scanning said storage means unit by unit; and means co-acting with said scanning means for transmitting said data serially between said storage means and said computer input-output circuits.

9. In a data converter-transducer for coupling the input-output circuits of an electronic digital computer to a read-in read-out device adapted to scan a data carrier and transduce data between said carrier and electric circuit means associated with said device wherein said data is represented on said carrier by one coding system different than another coding system used in said computer, the combination of: storage means coupled to said electric circuit for storing a plurality of discrete units of data according to said one coding system; a memory mechanism adapted to store each such discrete unit of data in the form of a group of data indicative signals and adapted to store said data when presented in a form corresponding to said other coding system; scanning means for scanning said storage means unit by unit; coding means co-acting with said scanning means to inter-couple said storage means with said memory mechanism for transmitting data therebetween and coding said data between said unit form and said group form; converting means co-acting with said memory mechanism to take data in one form from said mechanism, convert it to the other of said forms, and replace it in said memory mechanism; means for transmitting data in said form corresponding to said other coding system between said memory mechanism and said computer input-output circuits; and means controlled by said computer for segregating said data into classes and co-acting with said transmitting means to control the destination of each class transmitted.

10. An apparatus according to claim 2 wherein said computer is of the internally programmed type in which the functioning of said computer is controlled by a program of control signals stored within said computer, wherein said computer includes a working storage for storing in readily accessible locations data to be operated upon by said computer during the functioning thereof, and wherein said data converter-transducer includes control means connected to said computer and responsive to predetermined ones of said control signals for segregating said data into a plurality of words in accordance with the character of said predetermined control signals, and means co-acting with said control means and said transmitting means for transmitting each of said words between specified locations in said working storage and said memory mechanism.

11. An apparatus according to claim 3, wherein said computer is of the internally programmed type in which the functioning of said computer is controlled by a program of control signals stored within said computer, wherein alphabetic data is represented in any given column of said card by a plurality of holes in such given column, and wherein said data converter-transducer includes control means connected to said computer and responsive to predetermined ones of said control signals for distinguishing alphabetic data from numeric data in accordance with the character of said predetermined control signals, and means co-acting with said control means and said converting means for rendering said converting means inoperative as to alphabetic data.

12. An apparatus according to claim 3, wherein said computer is of the internally programmed type in which a series of command signals stored within said computer are utilized in a predetermined sequence to control the functioning of said computer, wherein said data converter-transducer includes means responsive to a first set of said command signals for initiating the operation of said read-in read-out device, wherein said transmitting means is operably responsive to a second set of said command signals, whereby data is transmitted between said computer and said memory mechanism as a quantum equal to the data storage capacity of one of said cards, and whereby the time of such transmission is controlled by said series of command signals, and wherein said computer is operable to function in accordance with said series of command signals independently of the operation of said converter-transducer during the time between the utilization of said first set and said second set of command signals.

13. An apparatus according to claim 12, wherein said apparatus also includes means responsive to predetermined ones of said first set of command signals for controlling the direction of transmission of data between said computer and said read-in read-out device.

14. A data converting apparatus for electronic digital computers of the internally programmed type in which a series of command signals is utilized in a predetermined sequence to control the functioning of said computer and which includes a working storage for storing in readily accessible locations a predetermined quantum of data to be operated upon by said computer during the functioning thereof, together with input-output means for transferring data into and out of said working storage, comprising: calculating means for converting signals representing data in the form of straight binary numbers into signals representing data in the form of binary coded decimal numbers, and vice-versa, said calculating means having an input for receiving data in one of said forms, and an output for delivering said data in the other of said forms after such conversion; means connected to said computer and responsive to predetermined ones of said command signals for operatively connecting said input and output to said input-output means, whereby data in one of said forms is transferred from said working storage to said calculating means, converted to the other of said forms, and restored to said working storage, thereby effecting said conversion without requiring said computer to perform any data conversion computations.

15. A data conversion apparatus according to claim 14, which includes means co-acting with said computer and said calculating means and responsive to predetermined others of said command signals for controlling the direction of the data conversion performed by said calculating means.

16. A data converting apparatus according to claim 7, wherein said dividing circuit comprises: a five bit stepping register having an input into which said reversed order signals are introduced, said input comprising the one input of said dividing circuit; comparator means for comparing the value represented by the contents of said register with the value ten for producing a control signal whenever said contents represent a value in excess of nine; a binary subtraction circuit connected to said register and coupled to said comparator means and operable in response to said control signal to reduce the value of said register contents by ten; a quotient generator coupled to said subtraction circuit for producing an output signal representing a binary unit bit each time said subtraction circuit operates, said output of said quotient generator comprising said first output of said dividing circut; and a remainder generator coupled to said register and operable when the least significant bit of said reversed order signals enters said register to produce an output signal representing the contents of said register in normal order, the output of said remainder generator comprising said output of said dividing circuit.

References Cited in the file of this patent

UNITED STATES PATENTS

| 2,657,856 | Edwards | Nov. 3, 1953 |
| 2,702,380 | Brustman | Feb. 15, 1955 |
| 2,729,811 | Gloess | Jan. 3, 1956 |
| 2,757,864 | Pollard et al. | Aug. 7, 1956 |
| 2,792,987 | Stibitz | May 21, 1957 |

OTHER REFERENCES

Mauchly: "Theory and Techniques for Design of Electronic Digital Computers," University of Penn., June 30, 1948, pages 25–1 to 25–7 relied on.

ERA, "High Speed Computing Devices," McGraw-Hill Book Co., 1950, pages 91 to 94, 411 to 413 relied on.

Berkeley et al.: "How an Electric Brain Works," Radio-Electronics, January 1951, pages 70 to 72 relied on.

UNITED STATES PATENT OFFICE
Certificate of Correction

Patent No. 2,929,556                                                March 22, 1960

Joseph K. Hawkins et al.

It is hereby certified that error appears in the printed specification of the above numbered patent requiring correction and that the said Letters Patent should read as corrected below.

Column 2, line 8, for "place" read —piece—; column 6, line 46, strike out "decimal"; column 8, line 35, beginning with "The electronic digital computer" strike out all to and including "cable 106." in line 38, same column; column 17, line 63, for "241 and 241" read —241 and 242—; line 71, for "premanently" read —permanently—; column 18, line 36, for "on", first occurrence, read —of—; column 19, line 74, for "extensive" read —extensively—; column 20, line 32, for "is", second occurrence, read —if—; column 21, line 72, for "and", first occurrence, read —an—; line 73, for "product" read —produce—; column 23, line 67, for "L$b$" read —L$\underline{b}$—; column 24, line 9, for "flop", first occurrence, read —flip—; column 27, line 2, for "relay" read —delay—; column 27, lines 17 and 18, strike out "for register A, the input signals being applied through driver B$d$"; column 29, line 35, for "Sequencie" read —Sequence—; column 30, line 4, for "numeral" read —numerical—; line 57, strike out "for", first occurrence; same line, for "inormation" read —information—; column 32, line 29, for "T0/0'" read —T0/T0'—; line 66, for "flop" read —flip—; column 42, line 1, for "V$e$" read —V$\underline{e}$—; line 2, "V$e'''$" read —V$e'$—; column 49, line 39, in the formula, for "J$e$" read —I$e$—; column 53, line 21, for "eightly" read —eighty—; line 75, for "be", second occurrence, read —by—; column 57, line 59, for "rear" read —read—; column 64, line 51, for "W$w$" read —V$w$—; column 69, line 11, for "muse" read —must—; column 75, line 25, for "1" read —"1"—; column 76, line 45, for "V$e$ 132, V$e$ 133" read —V$e$ T32, V$e$ T33—; column 82, line 35, for "(Figure 36," read —(Figure 36),—; column 87, line 12, after "remainder" insert —which—; column 88, line 55, for "D3" read —D$\underline{3}$—; column 90, line 3, for "$\phi 3'''$" read —$\phi 3$—; column 91, lines 2 and 18, for "X$3'''$", each occurrence, read —X$3'$—; line 27, for "A3" read —A$\underline{3}$—; line 74, for "circuitry" read —circuit—; column 93, line 9, for "similarj" read —similar—; column 96, line 60, for "K$d$" read —K$d$—; column 98, line 30, for "H1/L1" read —H1/I1—; column 99, line 24, strike out "included", second occurrence; column 100, line 24, for "$\phi$1 T33" read —$\phi$1 T33 C—; column 101, line 9, for "$\phi$" read —$\phi$2—; line 24, after "T33 C" add —+$\phi$3 T33 C—; column 103, lines 69 and 70, for "$l$", each occurrence, read —L—; column 107, line 31, for "K6" read —K6'—; column 108, line 14, for "11" read —I1—.

Signed and sealed this 15th day of November 1960.

[SEAL]

Attest:
KARL H. AXLINE,
*Attesting Officer.*

ROBERT C. WATSON,
*Commissioner of Patents.*